(12) United States Patent
Akutsu et al.

(10) Patent No.: US 8,480,522 B2
(45) Date of Patent: *Jul. 9, 2013

(54) POWER PLANT

(75) Inventors: Shigemitsu Akutsu, Saitama-ken (JP); Noriyuki Abe, Saitama-ken (JP); Satoyoshi Oya, Saitama-ken (JP); Kota Kasaoka, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 344 days.

This patent is subject to a terminal disclaimer.

(21) Appl. No.: 12/988,822

(22) PCT Filed: Mar. 10, 2009

(86) PCT No.: PCT/JP2009/054535
§ 371 (c)(1),
(2), (4) Date: Oct. 21, 2010

(87) PCT Pub. No.: WO2009/130951
PCT Pub. Date: Oct. 29, 2009

(65) Prior Publication Data
US 2011/0034282 A1 Feb. 10, 2011

(30) Foreign Application Priority Data
Apr. 24, 2008 (JP) .................................. 2008-114673

(51) Int. Cl.
*F16H 3/72* (2006.01)
*F16H 37/06* (2006.01)
*B60K 6/44* (2007.10)
*B60K 6/445* (2007.10)

(52) U.S. Cl.
USPC .................. 475/5; 475/4; 475/8; 180/65.225; 310/103

(58) Field of Classification Search
USPC .............................................. 475/5
See application file for complete search history.

(56) References Cited

U.S. PATENT DOCUMENTS

| | | | | |
|---|---|---|---|---|
| 6,380,653 | B1 * | 4/2002 | Seguchi | 310/112 |
| 7,063,637 | B2 * | 6/2006 | Yamauchi et al. | 475/5 |
| 7,174,979 | B2 * | 2/2007 | Ohta et al. | 180/65.25 |
| 7,204,776 | B2 * | 4/2007 | Minagawa et al. | 475/5 |
| 8,169,116 | B2 * | 5/2012 | Oya et al. | 310/112 |
| 8,183,722 | B2 * | 5/2012 | Akutsu et al. | 310/46 |

(Continued)

FOREIGN PATENT DOCUMENTS

| | | |
|---|---|---|
| JP | 08-111963 | 4/1996 |
| JP | 10-248205 | 9/1998 |

(Continued)

*Primary Examiner* — David D Le
*Assistant Examiner* — Colby M Hansen
(74) *Attorney, Agent, or Firm* — Squire Sanders (US) LLP

(57) ABSTRACT

A power plant which is capable of enhancing the driving efficiency and the power-generating efficiency thereof. A rotating machine includes a first rotor having a magnetic pole row that has each two adjacent magnetic poles, a stator having an armature row that is disposed in a manner opposed to the magnetic pole row, for generating a rotating magnetic field between the armature row and the magnetic pole row by a predetermined plurality of armature magnetic poles, and a second rotor having a soft magnetic material element row that is formed by a plurality of soft magnetic material elements arranged in a manner spaced from each other. The ratio between the number of the armature magnetic poles, the number of the magnetic poles, and the number of the soft magnetic material elements is set to $1:m:(1+m)/2$ $(m \neq 1.0)$.

23 Claims, 60 Drawing Sheets

U.S. PATENT DOCUMENTS

| | | | |
|---|---|---|---|
| 8,197,373 B2 * | 6/2012 | Akutsu et al. | 475/5 |
| 2004/0084234 A1 * | 5/2004 | Yatabe et al. | 180/65.2 |
| 2004/0124021 A1 | 7/2004 | Shirai et al. | |
| 2007/0187159 A1 * | 8/2007 | Lee et al. | 180/65.2 |
| 2008/0036330 A1 | 2/2008 | Abe et al. | |
| 2011/0109179 A1 * | 5/2011 | Akutsu et al. | 310/77 |
| 2011/0109180 A1 * | 5/2011 | Akutsu et al. | 310/77 |
| 2012/0122629 A1 * | 5/2012 | Akutsu et al. | 477/3 |
| 2012/0179320 A1 * | 7/2012 | Abe et al. | 701/22 |
| 2012/0194108 A1 * | 8/2012 | Kasaoka et al. | 318/400.02 |
| 2012/0197475 A1 * | 8/2012 | Akutsu et al. | 701/22 |
| 2012/0202645 A1 * | 8/2012 | Akutsu et al. | 477/3 |
| 2012/0203414 A1 * | 8/2012 | Akutsu et al. | 701/22 |
| 2012/0203415 A1 * | 8/2012 | Akutsu et al. | 701/22 |

FOREIGN PATENT DOCUMENTS

| | | |
|---|---|---|
| JP | 2004-175320 | 6/2004 |
| JP | 2007-325471 | 12/2007 |
| JP | 2008-067592 | 3/2008 |

* cited by examiner

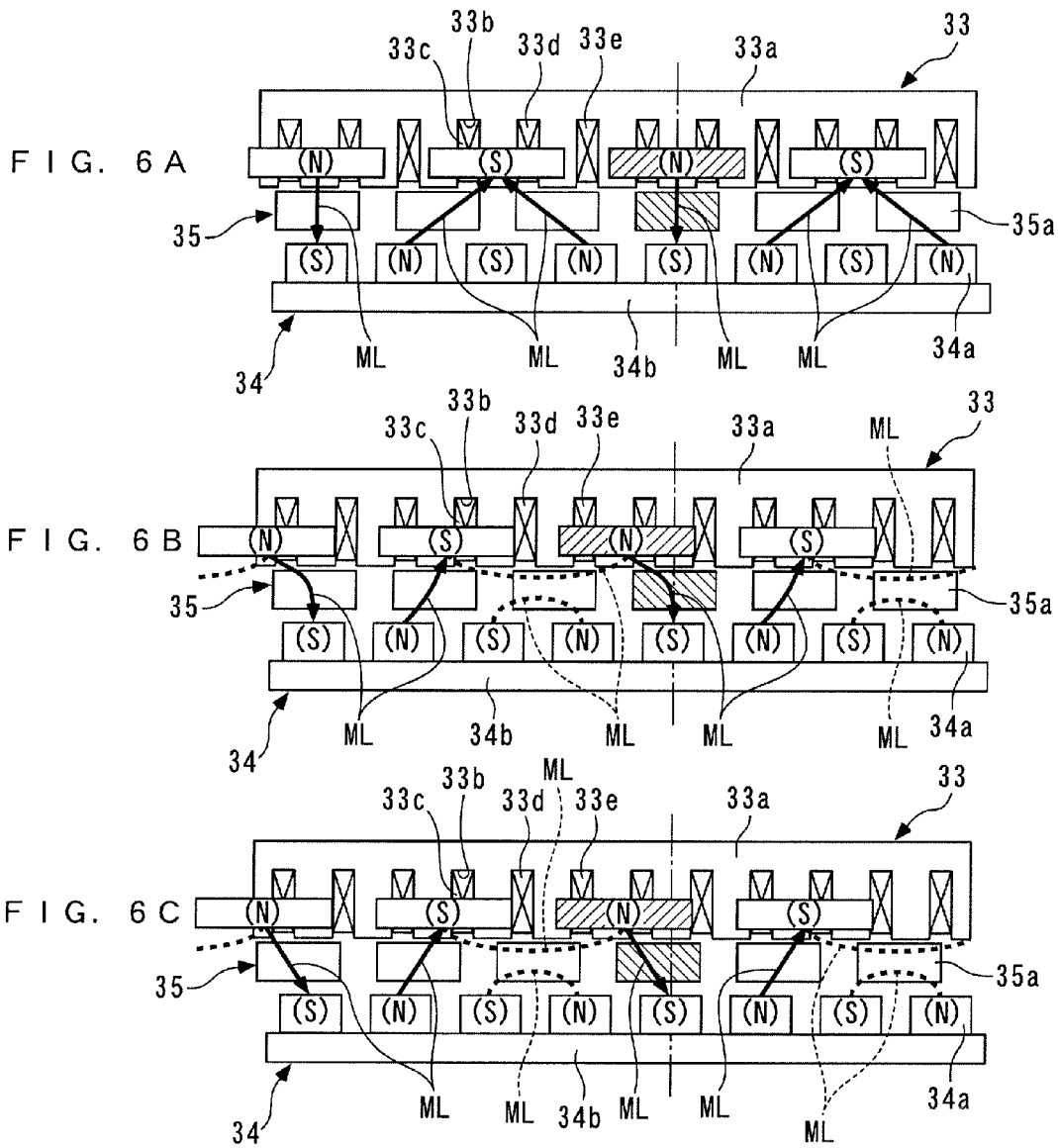

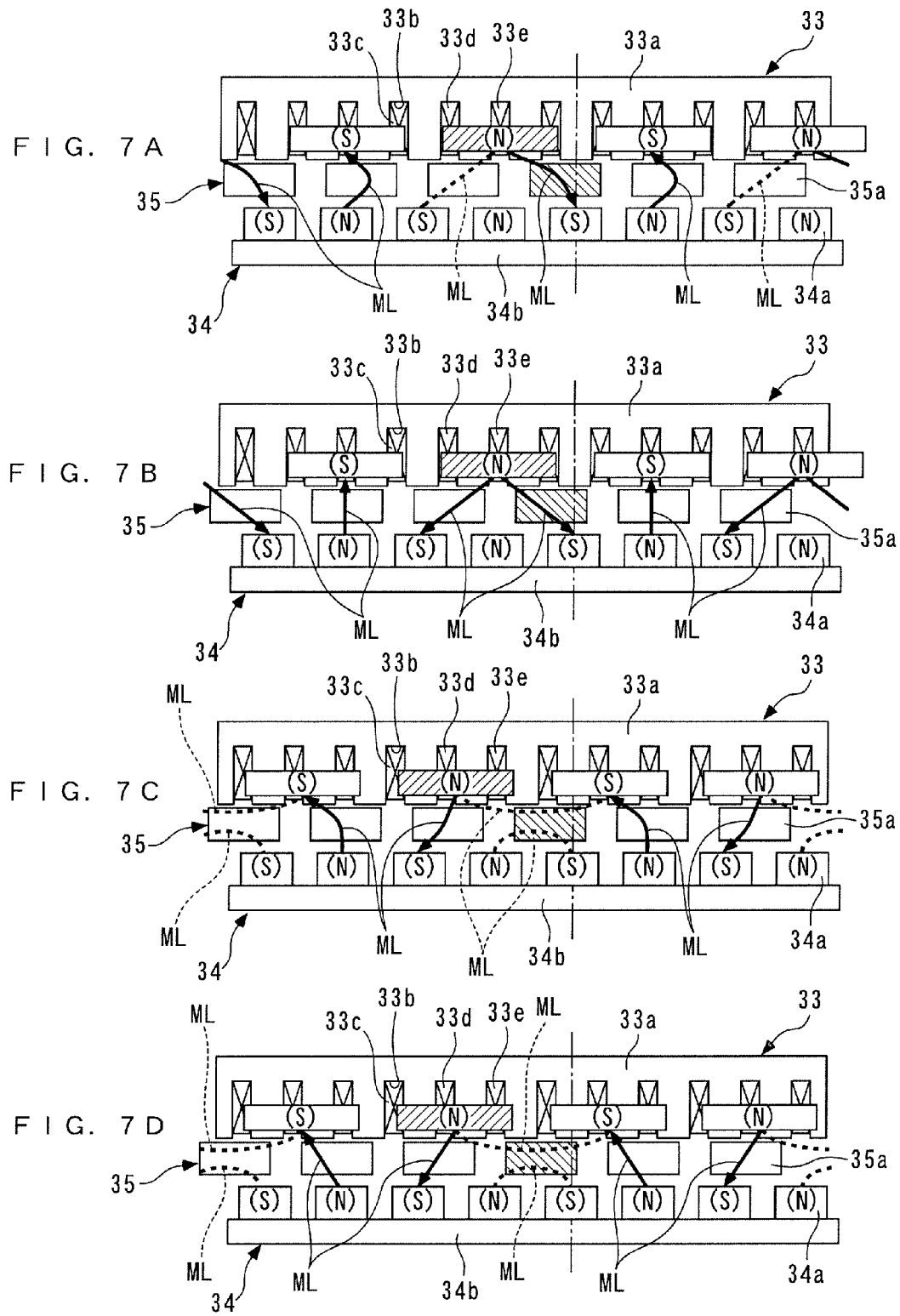

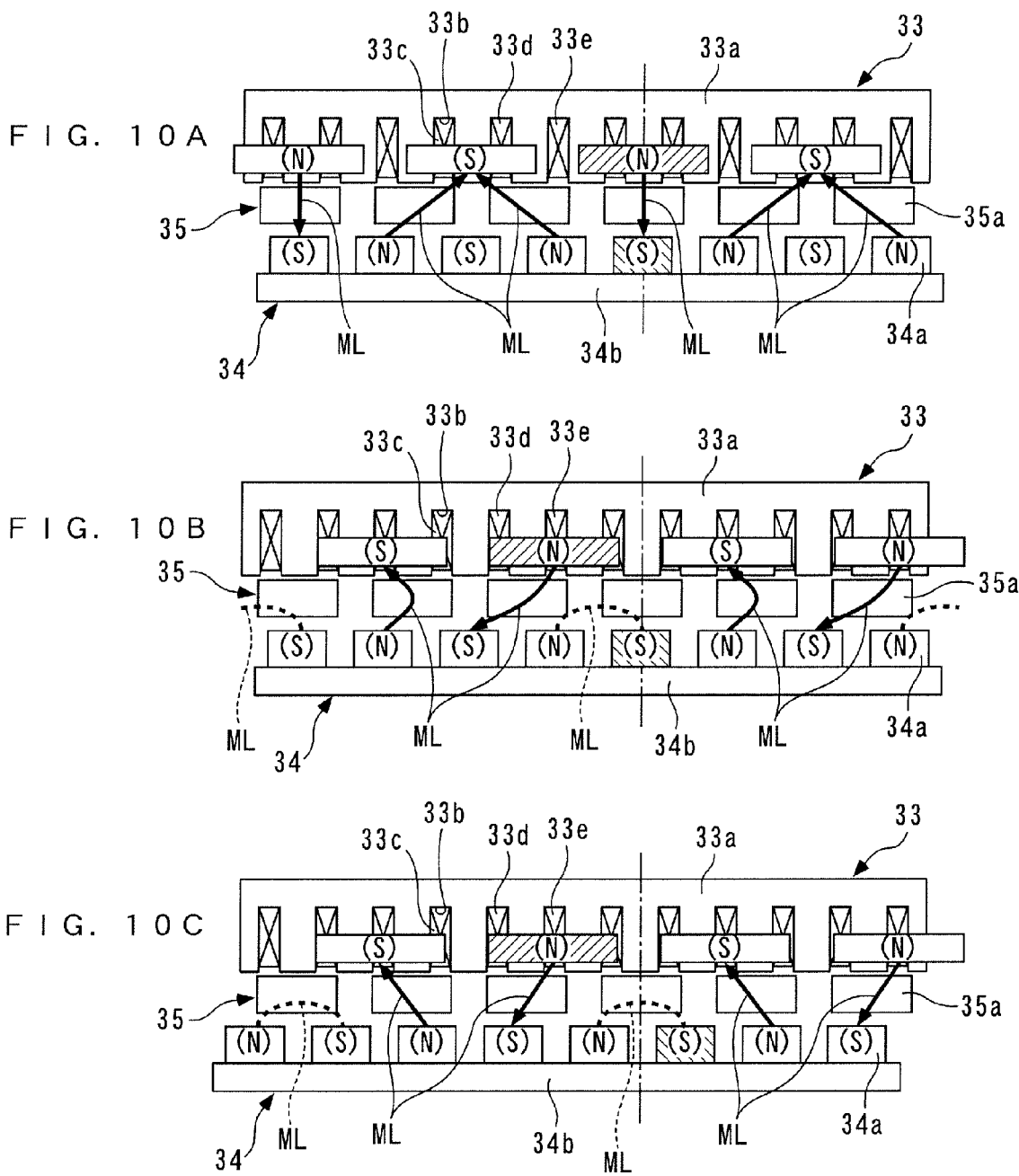

F I G. 1 3
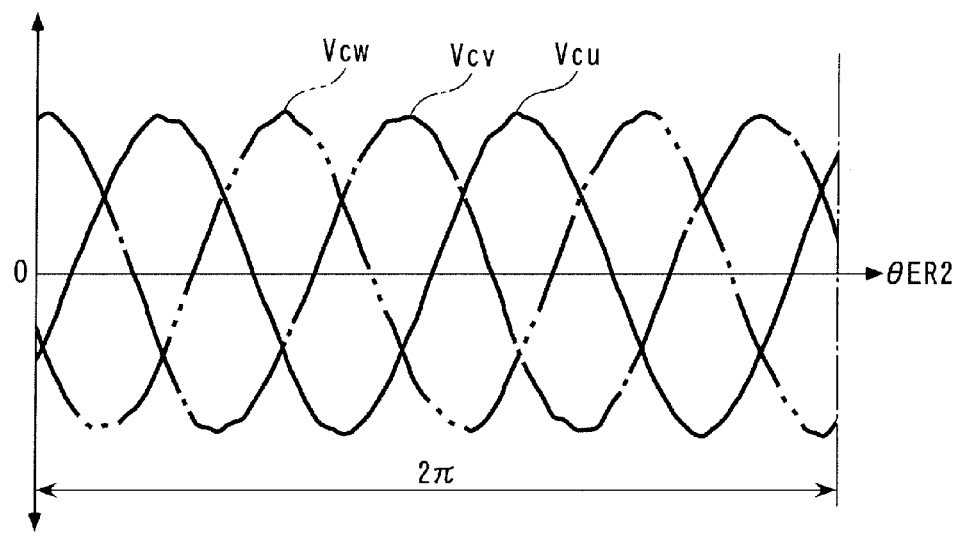
F I G. 1 4
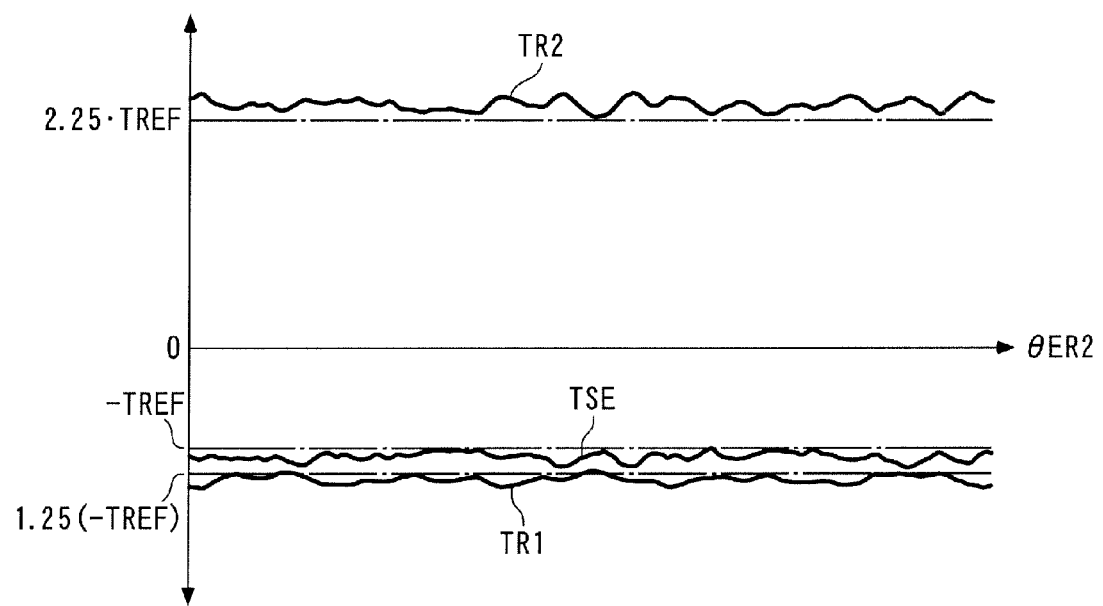

F I G. 4 3
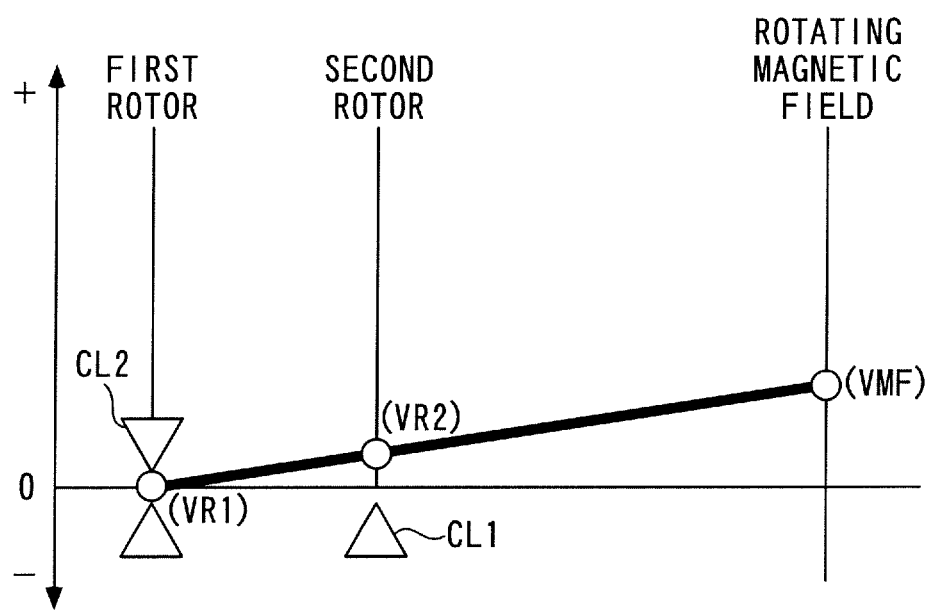

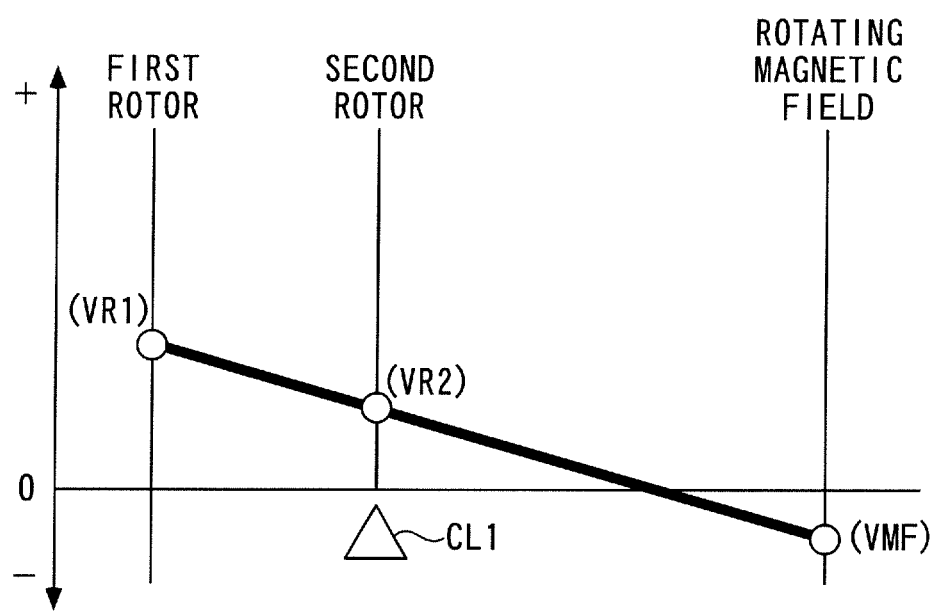
F I G. 5 0

POWER PLANT

FIELD OF THE INVENTION

The present invention relates to a power plant for driving driven parts.

BACKGROUND

A power plant is disclosed in Patent Literature 1. This power plant is for driving drive wheels of a vehicle, and is equipped with an internal combustion engine and a rotating machine as power sources, and a stepless transmission and a planetary gear unit for transmitting power to the drive wheels. The planetary gear unit is a general single pinion type that has a sun gear, a ring gear, and a carrier, and the sun gear and the ring gear are connected to the drive wheels via a high clutch and a low clutch, respectively. The engine is connected to the carrier via a main shaft, and the main shaft is connected to an input pulley of the stepless transmission. Further, the rotating machine, the output pulley of the stepless transmission, and the sun gear are connected to each other via an auxiliary shaft.

The power plant constructed as above has a torque circulation mode mainly used during low-speed traveling as an operation mode thereof. In this torque circulation mode, the aforementioned high clutch is disengaged to thereby disconnect between the sun gear and the drive wheels, and the low clutch is engaged to connect between the ring gear and the drive wheels. This causes the torque of the engine to be transmitted to the carrier via the main shaft, and the torque of the rotating machine to be transmitted to the carrier via the auxiliary shaft, the stepless transmission, and the main shaft. Further, the torque transmitted to the carrier is distributed between the ring gear and the sun gear, and torque distributed to the ring gear is transmitted to the drive wheels. On the other hand, torque distributed to the sun gear is transmitted to the auxiliary shaft, and after being combined with the torque of the rotating machine, it is transmitted to the main shaft via the stepless transmission, and further after being combined with the torque of the engine, it is transmitted to the carrier. As described above, in the torque circulation mode, the power from the engine and that of the rotating machine are transmitted to the drive wheels while circulating through the stepless transmission and the planetary gear unit.

As described above, in the conventional power plant, during the torque circulation mode, the transmission of power from the engine and the rotating machine to the drive wheels is carried out necessarily via the planetary gear unit, and hence due to power transmission loss caused by mechanical mating of teeth of gears at the planetary gear unit, the driving efficiency of the power plant is reduced. Further, the power from the rotating machine is necessarily transmitted via the stepless transmission in addition to the planetary gear unit, and hence the driving efficiency of the power plant is further reduced due to power transmission loss at the stepless transmission.

Further, during the torque circulation mode, also when electric power is generated by the rotating machine using the power from the drive wheels, the transmission of power from the drive wheels to the rotating machine is performed necessarily via the planetary gear unit and the stepless transmission, and hence it is impossible to obtain a sufficient electric power-generating efficiency due to power transmission losses at the planetary gear unit and the stepless transmission. Further, during the torque circulation mode, when electric power is generated by the rotating machine using the power from the engine, the electric power generation is performed using power distributed to the sun gear via the carrier. Thus, in this case as well, the transmission of power from the engine to the rotating machine is performed necessarily via the planetary gear unit, and hence it is impossible to obtain a sufficient electric power-generating efficiency due to power transmission losses at the planetary gear unit.

Further, due to the use of the planetary gear unit, which is a complicated mechanism in which a plurality of gears and shafts are combined, the construction of the power plant is very complicated. Further, due to the backlash between teeth of gears of the planetary gear unit, it is impossible to control the rotational speed of the drive wheels in a fine-grained manner.

The present invention has been made to provide a solution to the above-described problems, and an object thereof is to provide a power plant which is capable of improving the driving efficiency and the electric power-generating efficiency thereof.

[Patent Literature 1]
Japanese Laid-Open Patent Publication (Kokai) No. 2004-175320.

SUMMARY

To attain the above-mentioned object, one embodiment provides a power plant 1, 1A to 1C, 1G to 1J for driving driven parts (drive wheels DW and DW in the embodiment (the same applies hereinafter in this section)), including a heat engine (engine 3) having an output shaft (crankshaft 3a) for outputting power, a first transmission (stepless transmission 20) connected to the output shaft of the heat engine and the driven parts, for changing speed of power from the heat engine and transmitting the power to the driven parts, and a rotating machine 31, wherein the rotating machine 31 comprises a first rotor 34 having a magnetic pole row that is formed by a predetermined plurality of magnetic poles (permanent magnets 34a) arranged in a circumferential direction, and has each two adjacent magnetic poles so disposed as to have polarities different from each other, the first rotor 34 being rotatable in the circumferential direction, an unmovable stator 33 having an armature row that is formed by a plurality of armatures (iron cores 33a, U-phase coils 33c, V-phase coils 33d, and W-phase coils 33e) arranged in the circumferential direction, and is disposed in a manner opposed to the magnetic pole row, for generating a rotating magnetic field rotating in the circumferential direction between the armature row and the magnetic pole row by a predetermined plurality of armature magnetic poles generated at the plurality of armatures, and a second rotor 35 having a soft magnetic material element row that is formed by a predetermined plurality of soft magnetic material elements (cores 35a) arranged in the circumferential direction in a manner spaced from each other, and is disposed such that the soft magnetic material element row is positioned between the magnetic pole row and the armature row, the second rotor 35 being rotatable in the circumferential direction, wherein a ratio between a number of the armature magnetic poles, a number of the magnetic poles, and a number of the soft magnetic material elements is set to $1:m:(1+m)/2$ ($m \neq 1.0$), one of the first and second rotors 34 and 35 being connected to the output shaft of the heat engine, the other of the first and second rotors being connected to the driven parts.

According to the rotating machine of the power plant, the magnetic pole row of the first rotor that is rotatable in the circumferential direction and the armature row of the stator which is immovable are opposed to each other, and between these magnetic pole row and the armature row, the soft magnetic material element row of the second rotor that is rotatable in the circumferential direction is disposed. Further, the magnetic poles forming the magnetic pole row, the armatures forming the armature row, and the soft magnetic material elements forming the soft magnetic material element row are arranged in the circumferential direction. Further, the armature row of the stator is capable of generating a rotating magnetic field that rotates in the circumferential direction between the armature row and the magnetic pole row, by a predetermined plurality of armature magnetic poles that are generated at the armatures. Further, each two adjacent magnetic poles have different polarities from each other, and space is provided between each two adjacent soft magnetic material elements. As described above, between the magnetic pole row and the armature row, the rotating magnetic field is generated by the plurality of armature magnetic poles and further the soft magnetic material element row is disposed, so that the soft magnetic material elements are magnetized by the armature magnetic poles and the magnetic poles. Due to this fact and that space is provided between each adjacent two soft magnetic material elements, there are generated magnetic force lines in a manner connecting the magnetic poles, the soft magnetic material elements, and the armature magnetic poles. Therefore, when the rotating magnetic field is generated by the supply of electric power to the armatures, the action of magnetism of the magnetic force lines converts the electric power supplied to the armatures to motive power, and the motive power is output from the first rotor or the second rotor.

Now, a torque equivalent to the electric power supplied to the armatures and the electrical angular velocity ωmf of the rotating magnetic field is referred to as "driving equivalent torque Te". Hereafter, a description will be given of a relationship between the driving equivalent torque Te, torques transmitted to the first and second rotors (hereinafter referred to as "the first rotor transmission torque T1", and "the second rotor transmission torque T2" respectively), and a relationship between the rotating magnetic field, and the electrical angular velocities of the first and second rotors.

When the rotating machine according to the present invention is configured under the following conditions (A) and (B), an equivalent circuit corresponding to the rotating machine is expressed as shown in FIG. 64.

(A) The armatures have three-phase coils of U-phase, V-phase, and W-phase.

(B) The number of the armature magnetic poles is 2, and the number of the magnetic poles is 4, that is, a pole pair number of the armature magnetic poles, each pair being formed by an N pole and an S pole of armature magnetic poles, has a value of 1, a pole pair number of the magnetic poles, each pair being formed by an N pole and an S pole of magnetic poles, has a value of 2, and the number of the soft magnetic material elements is 3.

It should be noted that as described above, throughout the specification, the term "pole pair" is intended to mean a pair of an N pole and an S pole.

In this case, a magnetic flux $\Psi k1$ of a magnetic pole passing through a first soft magnetic material element of the soft magnetic material elements is expressed by the following equation (1):

$$\Psi k1 = \psi f \cos[2(\theta 2 - \theta 1)] \tag{1}$$

wherein φf represents the maximum value of the magnetic flux of the magnetic pole, and θ1 and θ2 represent a rotational angular position of the magnetic pole and a rotational angular position of the first soft magnetic material element, with respect to the U-phase coil. Further, in this case, since the ratio of the pole pair number of the magnetic poles to the pole pair number of the armature magnetic poles is 2.0, the magnetic flux of the magnetic pole rotates (changes) at a repetition period of the twofold of the repetition period of the rotating magnetic field, so that in the aforementioned equation (1), to indicate this fact, (θ2−θ1) is multiplied by 2.0.

Therefore, a magnetic flux $\Psi u1$ of a magnetic pole passing through the U-phase coil via the first soft magnetic material element is expressed by the following equation (2) obtained by multiplying the equation (1) by cos θ2.

$$\Psi u1 = \psi f \cos[2(\theta 2 - \theta 1)] \cos \theta 2 \tag{2}$$

Similarly, a magnetic flux $\Psi k2$ of a magnetic pole passing through a second soft magnetic material element of the soft magnetic material elements is expressed by the following equation (3):

$$\Psi k2 = \psi f \cdot \cos\left[2\left(\theta 2 + \frac{2\pi}{3} - \theta 1\right)\right] \tag{3}$$

The rotational angular position of the second soft magnetic material element with respect to the armature leads that of the first soft magnetic material element by 2π/3, so that in the aforementioned equation (3), to indicate this fact, 2π/3 is added to θ2.

Therefore, a magnetic flux $\Psi u2$ of a magnetic pole passing through the U-phase coil via the second soft magnetic material element is expressed by the following equation (4) obtained by multiplying the equation (3) by cos(θ2+2π/3).

$$\Psi u2 = \psi f \cdot \cos\left[2\left(\theta 2 + \frac{2\pi}{3} - \theta 1\right)\right] \cos\left(\theta 2 + \frac{2\pi}{3}\right) \tag{4}$$

Similarly, a magnetic flux $\Psi u3$ of a magnetic pole passing through the U-phase coil via a third soft magnetic material element of the soft magnetic material elements is expressed by the following equation (5):

$$\Psi u3 = \psi f \cdot \cos\left[2\left(\theta 2 + \frac{4\pi}{3} - \theta 1\right)\right] \cos\left(\theta 2 + \frac{4\pi}{3}\right) \tag{5}$$

In the rotating machine as shown in FIG. 64, a magnetic flux $\Psi u$ of the magnetic pole passing through the U-phase coil via the soft magnetic material elements is obtained by adding the magnetic fluxes $\Psi u1$ to $\Psi u3$ expressed by the above-described equations (2), (4) and (5), and hence the magnetic flux $\Psi u$ is expressed by the following equation (6):

$$\Psi u = \psi f \cdot \cos[2(\theta 2 - \theta 1)]\cos \theta 2 + \psi f \cdot \cos\left[2\left(\theta 2 + \frac{2\pi}{3} - \theta 1\right)\right]\cos\left(\theta 2 + \frac{2\pi}{3}\right) + \psi f \cdot \cos\left[2\left(\theta 2 + \frac{4\pi}{3} - \theta 1\right)\right]\cos\left(\theta 2 + \frac{4\pi}{3}\right) \tag{6}$$

Further, when this equation (6) is generalized, the magnetic flux $\Psi u$ of the magnetic pole passing through the U-phase coil via the soft magnetic material elements is expressed by the following equation (7):

$$\Psi u = \sum_{i=1}^{b} \psi f \cdot \cos\left\{a\left[\theta 2 + (i-1)\frac{2\pi}{b} - \theta 1\right]\right\} \cos\left\{c\left[\theta 2 + (i-1)\frac{2\pi}{b}\right]\right\} \quad (7)$$

wherein a, b and c represent the pole pair number of magnetic poles, the number of soft magnetic material elements, and the pole pair number of armature magnetic poles. Further, when the above equation (7) is changed based on the formula of the sum and product of the trigonometric function, there is obtained the following equation (8):

$$\Psi u = \sum_{i=1}^{b} \frac{1}{2} \cdot \psi f \left\{ \cos\left[(a+c)\theta 2 - a \cdot \theta 1 + (a+c)(i-1)\frac{2\pi}{b}\right] + \cos\left[(a-c)\theta 2 - a \cdot \theta 1 + (a-c)(i-1)\frac{2\pi}{b}\right] \right\} \quad (8)$$

When b=a+c is set in this equation (8), and the rearrangement is performed based on $\cos(\theta+2\pi)=\cos\theta$, there is obtained the following equation (9):

$$\Psi u = \frac{b}{2} \cdot \psi f \cdot \cos[(a+c)\theta 2 - a \cdot \theta 1] + \sum_{i=1}^{b} \frac{1}{2} \cdot \psi f \left\{ \cos\left[(a-c)\theta 2 - a \cdot \theta 1 + (a-c)(i-1)\frac{2\pi}{b}\right] \right\} \quad (9)$$

When this equation (9) is rearranged based on the addition theorem of the trigonometric function, there is obtained the following equation (10):

$$\Psi u = \frac{b}{2} \cdot \psi f \cdot \cos[(a+c)\theta 2 - a \cdot \theta 1] + \frac{1}{2} \cdot \psi f \cdot \cos[(a-c)\theta 2 - a \cdot \theta 1] \sum_{i=1}^{b} \cos\left[(a-c)(i-1)\frac{2\pi}{b}\right] - \frac{1}{2} \cdot \psi f \cdot \sin[(a-c)\theta 2 - a \cdot \theta 1] \sum_{i=1}^{b} \sin\left[(a-c)(i-1)\frac{2\pi}{b}\right] \quad (10)$$

The second term on the right side of the equation (10) is, when rearranged based on the sum total of the series and the Euler's formula on condition that a−c≠0, equal to 0, as is apparent from the following equation (11):

$$\sum_{i=1}^{b} \cos\left[(a-c)(i-1)\frac{2\pi}{b}\right] = \sum_{i=0}^{b-1} \frac{1}{2}\left\{e^{j[(a-c)\frac{2\pi}{b}i]} + e^{-j[(a-c)\frac{2\pi}{b}i]}\right\}$$

$$= \frac{1}{2}\left\{\frac{e^{j[(a-c)\frac{2\pi}{b}b]}-1}{e^{j[(a-c)\frac{2\pi}{b}]}-1} + \frac{e^{-j[(a-c)\frac{2\pi}{b}b]}-1}{e^{-j[(a-c)\frac{2\pi}{b}]}-1}\right\}$$

$$= \frac{1}{2}\left\{\frac{e^{j[(a-c)2\pi]}-1}{e^{j[(a-c)\frac{2\pi}{b}]}-1} + \frac{e^{-j[(a-c)2\pi]}-1}{e^{-j[(a-c)\frac{2\pi}{b}]}-1}\right\}$$

$$= \frac{1}{2}\left\{\frac{0}{e^{j[(a-c)\frac{2\pi}{b}]}-1} + \frac{0}{e^{-j[(a-c)\frac{2\pi}{b}]}-1}\right\}$$

$$= 0 \quad (11)$$

Further, the third term on the right side of the above-described equation (10) is also, when rearranged based on the sum total of the series and the Euler's formula on condition that a−c≠0, equal to 0, as is apparent from the following equation (12):

$$\sum_{i=1}^{b} \sin\left[(a-c)(i-1)\frac{2\pi}{b}\right] = \sum_{i=0}^{b-1} \frac{1}{2}\left\{e^{j[(a-c)\frac{2\pi}{b}i]} - e^{-j[(a-c)\frac{2\pi}{b}i]}\right\}$$

$$= \frac{1}{2}\left\{\frac{e^{j[(a-c)\frac{2\pi}{b}b]}-1}{e^{j[(a-c)\frac{2\pi}{b}]}-1} - \frac{e^{-j[(a-c)\frac{2\pi}{b}b]}-1}{e^{-j[(a-c)\frac{2\pi}{b}]}-1}\right\}$$

$$= \frac{1}{2}\left\{\frac{e^{j[(a-c)2\pi]}-1}{e^{j[(a-c)\frac{2\pi}{b}]}-1} - \frac{e^{-j[(a-c)2\pi]}-1}{e^{-j[(a-c)\frac{2\pi}{b}]}-1}\right\}$$

$$= \frac{1}{2}\left\{\frac{0}{e^{j[(a-c)\frac{2\pi}{b}]}-1} - \frac{0}{e^{-j[(a-c)\frac{2\pi}{b}]}-1}\right\}$$

$$= 0 \quad (12)$$

From the above, when a−c≠0 holds, the magnetic flux $\Psi u$ of the magnetic pole passing through the U-phase coil via the soft magnetic material elements is expressed by the following equation (13):

$$\Psi u = \frac{b}{2} \cdot \psi f \cdot \cos[(a+c)\theta 2 - a \cdot \theta 1] \quad (13)$$

Further, in this equation (13), if a/c=α, there is obtained the following equation (14):

$$\Psi u = \frac{b}{2} \cdot \psi f \cdot \cos[(\alpha+1)c \cdot \theta 2 - \alpha \cdot c \cdot \theta 1] \quad (14)$$

Furthermore, in this equation (14), if c·θ2=θe2 and c·θ1=θe1, there is obtained the following equation (15):

$$\Psi u = \frac{b}{2} \cdot \psi f \cdot \cos[(\alpha+1)\theta e2 - \alpha \cdot \theta e1] \quad (15)$$

In this equation, as is clear from the fact that θe2 is obtained by multiplying the rotational angular position θ2 of the soft magnetic material element with respect to the U-phase coil by the pole pair number c of the armature magnetic poles, θe2 represents the electrical angular position of the soft magnetic material element with respect to the U-phase coil. Further, as is clear from the fact that θe1 is obtained by multiplying the rotational angular position θ1 of the magnetic pole with respect to the U-phase coil by the pole pair number c of the armature magnetic poles, θe1 represents the electrical angular position of the magnetic pole with respect to the U-phase coil.

Similarly, since the electrical angular position of the V-phase coil leads that of the U-phase coil by the electrical angle 2π/3, the magnetic flux $\Psi v$ of the magnetic pole passing through the V-phase coil via the soft magnetic material elements is expressed by the following equation (16). Further, since the electrical angular position of the W-phase coil is retarded from that of the U-phase coil by the electrical angle 2π/3, the magnetic flux $\Psi w$ of the magnetic pole passing through the W-phase coil via the soft magnetic material elements is expressed by the following equation (17):

$$\Psi v = \frac{b}{2} \cdot \psi f \cdot \cos\left[(\alpha+1)\theta e2 - \alpha \cdot \theta e1 - \frac{2\pi}{3}\right] \quad (16)$$

$$\Psi w = \frac{b}{2} \cdot \psi f \cdot \cos\left[(\alpha+1)\theta e2 - \alpha \cdot \theta e1 + \frac{2\pi}{3}\right] \quad (17)$$

Further, when the magnetic fluxes $\Psi u$ to $\Psi w$ expressed by the aforementioned equations (15) to (17), respectively, is differentiated with respect to time, the following equations (18) to (20) are obtained:

$$\frac{d\Psi u}{dt} = -\frac{b}{2} \cdot \psi f \left\{ \begin{array}{c} [(\alpha+1)\omega e2 - \alpha \cdot \omega e1]\sin \\ [(\alpha+1)\theta e2 - \alpha \cdot \theta e1] \end{array} \right\} \quad (18)$$

$$\frac{d\Psi v}{dt} = -\frac{b}{2} \cdot \psi f \left\{ \begin{array}{c} [(\alpha+1)\omega e2 - \alpha \cdot \omega e1]\sin \\ \left[(\alpha+1)\theta e2 - \alpha \cdot \theta e1 - \frac{2\pi}{3}\right] \end{array} \right\} \quad (19)$$

$$\frac{d\Psi w}{dt} = -\frac{b}{2} \cdot \psi f \left\{ \begin{array}{c} [(\alpha+1)\omega e2 - \alpha \cdot \omega e1]\sin \\ \left[(\alpha+1)\theta e2 - \alpha \cdot \theta e1 + \frac{2\pi}{3}\right] \end{array} \right\} \quad (20)$$

wherein $\omega e1$ represents a value obtained by differentiating $\theta e1$ with respect to time, i.e. a value obtained by converting an angular velocity of the first rotor with respect to the stator to an electrical angular velocity (hereinafter referred to as the "first rotor electrical angular velocity"). Furthermore, $\omega e2$ represents a value obtained by differentiating $\theta e2$ with respect to time, i.e. a value obtained by converting an angular velocity of the second rotor with respect to the stator to an electrical angular velocity (hereinafter referred to as the "second rotor electrical angular velocity").

Further, magnetic fluxes of the magnetic poles that directly pass through the U-phase to W-phase coils without via the soft magnetic material elements are very small, and hence influence thereof is negligible. Therefore, $d\Psi u/dt$ to $d\Psi w/dt$, which are values obtained by differentiating with respect to time the magnetic fluxes $\Psi u$ to $\Psi w$ (equations (18) to (20)) of the magnetic poles, which pass through the U-phase to W-phase coils via the soft magnetic material elements, respectively, represent counter-electromotive force voltages (induced electromotive voltages), which are generated in the U-phase to W-phase coils as the magnetic poles and the soft magnetic material elements rotate with respect to the armature row.

From the above, electric currents Iu, Iv and Iw, flowing through the U-phase, V-phase and W-phase coils, respectively, are expressed by the following equations (21), (22) and (23):

$$Iu = I \cdot \sin[(\alpha+1)\theta e2 - \alpha \cdot \theta e1] \quad (21)$$

$$Iv = I \cdot \sin\left[(\alpha+1)\theta e2 - \alpha \cdot \theta e1 - \frac{2\pi}{3}\right] \quad (22)$$

$$Iw = I \cdot \sin\left[(\alpha+1)\theta e2 - \alpha \cdot \theta e1 + \frac{2\pi}{3}\right] \quad (23)$$

wherein I represents the amplitude (maximum value) of electric currents Iu to Iw flowing through the U-phase to W-phase coils, respectively.

Further, from the above equations (21) to (23), the electrical angular position $\theta mf$ of the vector of the rotating magnetic field with respect to the U-phase coil is expressed by the following equation (24), and the electrical angular velocity $\omega mf$ of the rotating magnetic field with respect to the U-phase coil (hereinafter referred to as "the magnetic field electrical angular velocity") is expressed by the following equation (25):

$$\theta mf = (\alpha+1)\theta e2 - \alpha \cdot \theta e1 \quad (24)$$

$$\omega mf = (\alpha+1)\omega e2 - \alpha \cdot \omega e1 \quad (25)$$

Further, the mechanical output (motive power) W, which is output to the first and second rotors by the flowing of the electric currents Iu to Iw through the U-phase to W-phase coils, is represented, provided that an reluctance-associated portion is excluded therefrom, by the following equation (26):

$$W = \frac{d\Psi u}{dt} \cdot Iu + \frac{d\Psi v}{dt} \cdot Iv + \frac{d\Psi w}{dt} \cdot Iw \quad (26)$$

When the above equations (18) to (23) are substituted into this equation (26) for rearrangement, there is obtained the following equation (27):

$$W = -\frac{3 \cdot b}{4} \cdot \psi f \cdot I[(\alpha+1)\omega e2 - \alpha \cdot \omega e1] \quad (27)$$

Furthermore, the relationship between this mechanical output W, the aforementioned first and second rotor transmission torques T1 and T2, and the first and second rotor electrical angular velocities $\omega e1$ and $\omega e2$ is expressed by the following equation (28):

$$W = T1 \cdot \omega e1 + T2 \cdot \omega e2 \quad (28)$$

As is clear from the above equations (27) and (28), the first and second rotor transmission torques T1 and T2 are expressed by the following equations (29) and (30):

$$T1 = \alpha \cdot \frac{3 \cdot b}{4} \cdot \psi f \cdot I \quad (29)$$

$$T2 = -(\alpha+1) \cdot \frac{3 \cdot b}{4} \cdot \psi f \cdot I \quad (30)$$

Further, due to the fact that the electric power supplied to the armature row and the mechanical output W are equal to each other (provided that losses are ignored), and from the equations (25) and (27), the aforementioned driving equivalent torque Te is expressed by the following equation (31):

$$Te = \frac{3 \cdot b}{4} \cdot \psi f \cdot I \quad (31)$$

Further, by using the above equations (29) to (31), there is obtained the following equation (32):

$$Te = \frac{T1}{\alpha} = \frac{-T2}{(\alpha+1)} \quad (32)$$

The relationship between the torques, expressed by the equation (32), and the relationship between the electrical angular velocities, expressed by the equation (25), are quite the same as the relationship between the torques and the relationship between the rotational speeds of the sun gear, the ring gear and the carrier of a planetary gear unit. Hereinafter, the sun gear, the ring gear and the carrier are generically referred to as the "three elements of the planetary gear unit".

Further, as described above, on condition that $b=a+c$ and $a-c \neq 0$, the relationship between the electrical angular velocities, expressed by the equation (25), and the relationship between the torques, expressed by the equation (32), hold. The above condition $b=a+c$ is expressed by $b=(p+q)/2$, i.e. $b/q=(1+p/q)/2$, assuming that the number of the magnetic poles is p and that of the armature magnetic poles is q. Here, as is clear from the fact that if $p/q=m$, $b/q=(1+m)/2$ is obtained, the satisfaction of the above condition of $b=a+c$ represents that the ratio between the number of the armature magnetic poles, the number of the magnetic poles, and the number of the soft magnetic material elements is $1:m:(1+m)/2$. Further, the satisfaction of the above condition of $a-c \neq 0$ represents that $m \neq 1.0$ holds. According to the rotating machine of the present invention, since the ratio between the number of the armature magnetic poles, the number of the magnetic poles, and the number of the soft magnetic material elements is set to $1:m:(1+m)/2$ ($m \neq 1.0$), the electrical angular velocity relationship expressed by the equation (25) and the torque relationship expressed by the equation (32) hold. From this, it is understood that the rotating machine properly operates.

Further, as is clear from the equations (25) and (32), by setting $\alpha = a/c$, i.e. the ratio of the pole pair number of the magnetic poles to the pole pair number of the armature magnetic poles, it is possible to freely set the relationship between the magnetic field electrical angular velocity $\omega mf$, and the first and second rotor electrical angular velocities $\omega e1$ and $\omega e2$, and the relationship between the driving equivalent torque Te, the first and second rotor transmission torques T1 and T2, and hence it is possible to enhance the degree of freedom in design of the rotating machine. The same advantageous effects can be obtained also when the number of phases of coils of the plurality of armatures is other than the aforementioned 3.

As described above, in the rotating machine, when the rotating magnetic field is generated by supplying electric power to the armatures, magnetic force lines are generated in a manner connecting between the aforementioned magnetic poles, soft magnetic material elements, and armature magnetic poles, and the action of the magnetism of the magnetic force lines converts the electric power supplied to the armatures to motive power. The motive power is output from the first rotor or the second rotor, and the aforementioned electrical angular velocity and torque relationships hold. Therefore, by supplying motive power to at least one of the first and second rotors in a state where electric power is not being supplied to the armatures, to thereby cause the same to rotate with respect to the armatures, electric power is generated in the armatures, and the rotating magnetic field is generated. Therefore, in this case as well, such magnetic force lines that connect between the magnetic poles, the soft magnetic material elements, and the armature magnetic poles are generated, and the action of the magnetism of the magnetic force lines causes the electrical angular velocity relationship shown in the equation (25) and the torque relationship shown in the equation (32), mentioned above, to hold.

That is, assuming that torque equivalent to the generated electric power and the magnetic field electrical angular velocity $\omega mf$ is the electric power-generating equivalent torque, a relationship shown in the equation (32) also holds between the electric power-generating equivalent torque and the first and second rotor transmission torques T1 and T2. As is clear from the above, the rotating machine according to the present invention has the same functions as those of an apparatus formed by combining a planetary gear unit and a general one-rotor-type rotating machine.

The rotating machine according to the present invention has the above-described functions, so that differently from the aforementioned conventional power plant, it is possible to dispense with the planetary gear unit for distributing or combining power and transmitting the distributed or combined power. Further, with the arrangement described above, one of the first and second rotors of the rotating machine (hereinafter referred to as "the one rotor") is connected to the output shaft of the heat engine, and the other thereof (hereinafter referred to as "the other rotor") is connected to the driven parts. Therefore, power transmission between the heat engine, the rotating machine, and the driven parts can be performed without causing power transmission loss at the planetary gear unit. This makes it possible to increase the driving efficiencies of the heat engine and the rotating machine in driving the driven parts, the electric power-generating efficiency of the rotating machine in generating electric power using the motive power from the driven parts, and the electric power-generating efficiency of the rotating machine in generating electric power using the motive power from the heat engine. Further, compared with the conventional cases using the planetary gear unit, it is possible to simplify the construction, and accurately control the speed of the driven parts without being affected by the backlash between teeth of the gears.

Furthermore, the output shaft of the heat engine is connected to the driven parts via the first transmission. Therefore, the speed of the motive power from the heat engine to the driven parts is changed by the first transmission. Hereinafter, a power transmission path connecting between the heat engine and the driven parts by the first transmission is referred to as the "first transmission path". Further, during generation of the rotating magnetic field in the rotating machine, the one rotor is magnetically connected to the other rotor by the magnetism of the aforementioned magnetic force lines, and hence the output shaft of the heat engine is connected to the driven parts via the one and the other of the rotors. Hereinafter, a power transmission path connecting between the heat engine and the driven parts by the above elements is referred to as the "second transmission path". In this second transmission path, the power transmission is performed in a contactless manner between the first and second rotors by the magnetism of the magnetic force lines, and hence the power transmission efficiency is high.

As described above, as the transmission path for connecting the heat engine and the driven parts, the power plant has, in addition to the first transmission path, the second transmission path which does not include a transmission and is high in power transmission efficiency. Therefore, in the second transmission path, when the connection between the heat engine and the driven parts is established without using the transmission, compared with the case in which power is transmitted from the heat engine to the driven parts necessarily via the transmission, it is possible to suppress power transmission loss in the transmission. Further, the power plant has the first and second transmission paths which are parallel to each other, so that depending on the operating state of the driven parts or the like, it is possible to select the optimum one of the first and second transmission paths, and set the ratio of energy transmitted to the driven parts via the first and second transmission paths such that the optimum efficiency is obtained. It should be noted that as described above, throughout the specification, the term "transmission" is intended to mean one which is capable of transmitting input power while changing the speed thereof at one of a plurality of transmission ratios different from each other.

Furthermore, for example, when the other rotor is connected to the driven parts without using the transmission, and power transmission between the rotating machine and the driven parts is performed via the other rotor thus connected to the driven parts, differently from the conventional case performing the power transmission necessarily via the transmission, there is no power transmission loss caused by the transmission. This makes it possible to further increase the driving efficiency of the rotating machine in driving the driven parts and the electric power-generating efficiency of the rotating machine in generating electric power using the motive power from the driven part.

Further, as described hereinabove, by setting the ratio of the pole pair number of the magnetic poles to the pole pair number of the armature magnetic poles (hereinafter referred to as "the pole pair number ratio") $\alpha$, it is possible to freely set the relationship between the magnetic field electrical angular velocity $\omega mf$, and the first and second rotor electrical angular velocities $\omega e1$ and $\omega e2$, and the relationship between the driving equivalent torque Te, the first and second rotor transmission torques T1 and T2. This applies not only during occurrence of the rotating magnetic field by the supply of electric power, but also during occurrence of the rotating magnetic field for electric power generation. In this case, specifically, as is apparent from the equation (32), as the pole pair number ratio $\alpha$ is larger, the driving equivalent torque Te becomes smaller with respect to the first and second rotor transmission torques T1 and T2. This also applies during electric power generation in the same manner. Therefore, by setting the pole pair number ratio $\alpha$ to a larger value, it is possible to reduce the size of the stator, which in turn makes it possible to reduce the size of the power plant.

Further, from the equation (25), the relationship between the magnetic field electrical angular velocity $\omega mf$ and the first and second rotor electrical angular velocities $\omega e1$ and $\omega e2$ is illustrated e.g. as shown in FIG. 65. The figure is a so-called velocity nomograph. In this velocity nomograph and other velocity nomographs, referred to hereinafter, vertical lines intersecting with a horizontal line indicative of a value of 0 are for representing the rotational speeds of parameters, and the distance between a white circle shown on each vertical line and the horizontal line corresponds to the rotational speed of each parameter.

As is clear from FIG. 65, as the pole pair number ratio $\alpha$ is smaller, the distance between a vertical line representing the magnetic field electrical angular velocity $\omega mf$ and a vertical line representing the second rotor electrical angular velocity $\omega e2$ in the velocity nomograph is smaller, and hence the ratio ($\Delta\omega 2/\Delta\omega 1$) of the difference ($\Delta\omega 2$) between the second rotor electrical angular velocity $\omega e2$ and the magnetic field electrical angular velocity $\omega mf$ to the difference ($\Delta\omega 1$) between the first rotor electrical angular velocity $\omega e1$ and the second rotor electrical angular velocity $\omega e2$ becomes smaller. Therefore, by setting the pole pair number ratio $\alpha$ to a smaller value, in such a case as the second rotor electrical angular velocity $\omega e2$ exceeds the first rotor electrical angular velocity $\omega e1$, it is possible to prevent the driving efficiency and the electric power-generating efficiency from being reduced by occurrence of loss due to an excessive increase in the magnetic field electrical angular velocity $\omega mf$.

In one embodiment, the first transmission is formed by a stepless transmission 20 that is capable of steplessly changing a transmission ratio.

In the rotating machine according to the present invention, as is clear from the equation (25) and FIG. 65, during input and output of energy (electric power and motive power) between the stator and the first and second rotors caused by occurrence of the rotating magnetic field, the rotating magnetic field and the first and second rotors rotate while holding a collinear relationship with respect to the rotational speed. Therefore, if the ratio between the rotational speeds of the first rotor and the second rotor changes, the ratio between the rotational speeds of the second rotor and the rotating magnetic field also changes in accordance therewith.

Further, since the one rotor is connected to the output shaft of the heat engine, and the other rotor is connected to the driven parts, the rotational speed of the one rotor and that of the other rotor correspond to the rotational speed of the heat engine and that of the driven parts, respectively. Therefore, as the transmission ratio of the first transmission changes to change the relationship between the rotational speeds of the heat engine and the driven parts, the ratio between the rotational speeds of the one and the other of the rotors changes, and at the same time the ratio between the rotational speeds of the other rotor and the rotating magnetic field also changes based on the relationship of the rotational speeds of the rotating magnetic field and the first and second rotors. From the above, by changing the transmission ratio of the first transmission, it is possible to change the ratio between the rotational speeds of the driven parts and the heat engine and at the same time also change the ratio between the rotational speeds of the driven parts and the rotating magnetic field.

According to the present invention, since the stepless transmission is used as the first transmission, the respective ratios of the rotational speeds of the heat engine and the rotating magnetic field to that of the driven parts can be steplessly controlled as desired, thereby making it possible to drive the driven parts while controlling the outputs of the heat engine and the rotating machine such that excellent efficiencies thereof can be obtained. This makes it possible to increase the driving efficiency of the power plant in its entirety.

One embodiment further comprises a second transmission (transmission 70) for changing speed of power from the other of the first and second rotors 34 and 35 and transmitting the power to the driven parts.

With this arrangement, the speed of the power transmitted from the other rotor of the rotating machine to the driven parts can be changed by the second transmission. Therefore, for example, when load on the driven parts is very large, by controlling the transmission ratio of the second transmission toward a speed-reducing side, it is possible to increase torque transmitted from the other rotor to the driven parts. This makes it possible to reduce the size of the other rotor, which in turn makes it possible to reduce the size and costs of the rotating machine.

Further, when the speed of the driven parts is very high, the transmission ratio of the second transmission is controlled toward an speed-increasing side, whereby it is possible to lower the rotational speed of the other rotor with respect to the speed of the driven parts. This makes it possible to prevent failure of the rotating machine due to an excessive increase in the rotational speed of the other rotor. In a case where the other rotor is the first rotor, and at the same time the magnetic poles thereof are those of permanent magnets, this arrangement is particularly effective since the strength of the permanent magnets is lower than that of the soft magnetic material elements so that the above inconvenience is liable to occur. Further, by controlling the transmission ratio of the second transmission, the rotational speed of the other rotor can be properly controlled with respect to the speed of the driven parts, thereby making it possible to enhance the driving efficiency of the rotating machine in driving the driven parts and the electric power-generating efficiency thereof.

One embodiment further comprises a third transmission (transmission 80) for changing the speed of the power from the heat engine and transmitting the power to the one of the first and second rotors 34 and 35.

With this arrangement, it is possible to change the speed of the power transmitted from the heat engine to the one rotor by the third transmission. Therefore, for example, when the rotational speed of the heat engine is very high, the transmission ratio of the third transmission is controlled toward the speed-reducing side, whereby it is possible to lower the rotational speed of the one rotor with respect to the rotational speed of the heat engine. This makes it possible to prevent failure of the rotating machine due to an excessive increase in the rotational speed of the one rotor. If the one rotor is the first rotor, and at the same time the magnetic poles thereof are those of permanent magnets, the above inconvenience is liable to occur, and hence this arrangement is particularly effective. Further, if the transmission ratio of the transmission is controlled toward the speed-increasing side, it is possible to reduce torque input from the heat engine to the one rotor. This makes it possible to reduce the size of the one rotor, which in turn makes it possible to reduce the size and costs of the rotating machine.

One embodiment further comprises a first clutch (clutch CL3) for connecting and disconnecting between the output shaft of the heat engine and the driven parts.

With this arrangement, in a state where the other rotor is connected to the driven parts, the first clutch connects and disconnects between the output shaft of the heat engine and the driven parts. Therefore, by causing the first clutch to disconnect between the output shaft of the heat engine and the driven parts to thereby release the connection between the one rotor and the driven parts via the output shaft of the heat engine, it is possible to perform power transmission between the rotating machine and the driven parts only via the other rotor. Therefore, when the other rotor is connected to the driven parts without using the transmission, it is possible to prevent power transmission loss in the transmission, and further increase the driving efficiency and the electric power-generating efficiency of the rotating machine.

Further, in one embodiment, the relationship between the driving equivalent torque Te (or electric power-generating equivalent torque) and the first and second rotor transmission torques T1 and T2 in the rotating machine is the same as the torque relationship between the three elements of the planetary gear unit. Therefore, by causing the first clutch to disconnect between the output shaft of the heat engine and the driven parts and controlling the operation of the rotating machine, it is possible to cause torque from the heat engine to be transmitted to the driven parts via the one and the other of the rotors, and progressively increase torque thus transmitted to the driven parts. Therefore, in a case where the heat engine is an internal combustion engine, even when the friction of the driven parts is very large, the driven parts at rest can be driven without causing engine stall, and hence it is possible to establish the connection between the heat engine and the driven parts without using a friction start clutch. Such a friction start clutch requires a large amount of energy for operation thereof, and if the heat engine is used as a drive source of the friction start clutch, the fuel economy of the heat engine is degraded. Therefore, according to the present invention, compared with such a case, it is possible to improve the fuel economy of the heat engine.

One embodiment further comprises a brake mechanism (one-way clutch CL1, casing CA) for limiting or blocking reverse rotation of the output shaft of the heat engine.

With this arrangement, the reverse rotation of the output shaft of the heat engine is limited or blocked by the brake mechanism. Therefore, by causing the first clutch to disconnect between the output shaft of the heat engine and the driven parts, and causing the brake mechanism to block or limit rotation in one direction of the one rotor connected to the output shaft of the heat engine, it is possible to transmit the aforementioned driving equivalent torque Te by the rotating machine to the other rotor using the one rotor as a fulcrum, and further to the driven parts. Therefore, it is possible to properly drive the driven parts using the motive power from the rotating machine, while limiting or blocking the reverse rotation of the output shaft of the heat engine. Further, in this case, by disconnecting between the output shaft of the heat engine and the driven parts by the first clutch, the heat engine is prevented from being dragged, whereby it is possible to obtain the high driving efficiency thereof.

One embodiment further comprises a rotor lock mechanism (electromagnetic brake CL2, clutch CL4, electromagnetic brake CL5) for holding the other of the first and second rotors 34 and 35 unrotatable.

With this arrangement, the other rotor is held unrotatable by the rotor lock mechanism. Therefore, by causing the rotor lock mechanism to hold the other rotor connected to the driven parts unrotatable, and by causing the first clutch to disconnect between the output shaft of the heat engine and the driven parts, it is possible to transmit the driving equivalent torque Te to the output shaft of the heat engine via the one rotor, using the other rotor as a fulcrum, without driving the driven parts. Further, in this case, by controlling the direction of rotation of the rotating magnetic field, it is possible to cause the output shaft of the heat engine to perform normal rotation. As described above, it is possible to cause the output shaft of the heat engine to perform normal rotation without driving the driven parts, which in turn makes it possible to start the engine if the heat engine is an internal combustion engine.

One embodiment further comprises a normal/reverse rotation-switching mechanism 60 for selectively switching a direction of rotation of the driven parts rotated by power transmitted from the other of the first and second rotors 34 and 35 to one of a direction of normal rotation and a direction of reverse rotation.

With this arrangement, in one embodiment, when the motive power from the heat engine or the rotating machine is transmitted to the driven parts via the other rotor in a state where disconnection between the output shaft of the heat engine and the driven parts is performed by the first clutch, it is possible to selectively cause the normal rotation and reverse rotation of the driven parts by switching the direction of rotation of the driven parts using the normal/reverse rotation-switching mechanism. In this case, even when the heat engine is an internal combustion engine, and at the same time the friction of the driven parts is very large it is possible to transmit the motive power from the heat engine to the driven parts via the one and the other of the rotors without using the friction start clutch, to cause the driven parts at rest to perform normal rotation or reverse rotation without causing engine stall.

In one embodiment, the other of the first and second rotors 34 and 35 is connected to the driven parts via the normal/reverse rotation-switching mechanism 60, and wherein the normal/reverse rotation-switching mechanism 60 comprises a planetary gear unit PS including a sun gear S, a ring gear R, and a carrier C for rotatably supporting planetary gears P in mesh with the sun gear S and the ring gear R, one of the sun gear S and the ring gear R being connected to the other of the first and second rotors 34 and 35, and the other of the sun gear S and the ring gear R being connected to the driven parts, a second clutch (clutch CL4) for connecting and disconnecting between the one of the sun gear S and the ring gear R and the carrier C, and a carrier lock mechanism (electromagnetic brake CL5) for holding the carrier C unrotatable.

With this arrangement, the other rotor is connected to the driven parts via the normal/reverse rotation-switching mechanism, and the normal/reverse rotation-switching mechanism includes the planetary gear unit. Further, one of the sun gear and the ring gear (hereinafter referred to as "the one gear") of the planetary gear unit is connected to the other rotor, and the other of the sun gear and the ring gear (hereinafter referred to as "the other gear") of the planetary gear unit is connected to the driven parts. Further, the second clutch connects or disconnects between the one gear and the carrier, and the carrier is held unrotatable by the carrier lock mechanism. Therefore, when the power from the other rotor is transmitted to the driven parts via the normal/reverse rotation-switching mechanism, the one gear, the carrier, and the other gear rotate in unison in the same direction, by causing the second clutch to connect between the one gear and the carrier, and causing the carrier lock mechanism to permit the rotation of the carrier. Therefore, in this case, by connecting the elements such that the driven parts perform normal rotation or reverse rotation, it is possible to cause the driven parts to perform normal rotation or reverse rotation. Further, the one gear, the carrier, and the other gear rotate in unison as described above, and hence it is possible to transmit the power from the other rotor to the driven parts without causing power transmission loss at the planetary gear unit due to meshing of the gears.

Further, by causing the second clutch to disconnect between the one gear and the carrier, and causing the carrier lock mechanism to hold the carrier unrotatable, the power from the other rotor is transmitted to the driven parts via the one gear, the planetary gears, and the other gear. At this time, since the carrier is held unrotatable as described above, the other gear rotates in a direction reverse to the direction of rotation of the one gear. Therefore, as described above, when the one gear, the carrier, and the other gear rotate in unison in the same direction, if the elements are connected such that the driven parts perform normal rotation or reverse rotation, the other gear rotates in a direction reverse to the direction of rotation of the one gear as described above, whereby it is possible to cause the driven parts to perform reverse rotation or normal rotation. As described hereinabove, the normal/reverse rotation-switching mechanism can be formed relatively simply by combining the planetary gear unit, the second clutch, and the carrier lock mechanism.

In one embodiment, the first rotor 34 is connected to the output shaft of the heat engine, and the second rotor 35 is connected to the driven parts.

With this arrangement, the first and second rotors are connected to the output shaft of the heat engine and the driven parts, respectively. As described hereinabove, the relationship between the driving equivalent torque Te, and the first and second rotor transmission torques T1 and T2 is the same as the torque relationship between the three elements of the planetary gear unit, and hence when the heat engine is assisted by the rotating machine, the torques of the heat engine and the rotating machine are transmitted to the driven parts in the following manner:

As the driving equivalent torque Te is transmitted to the second rotor by the aforementioned magnetism of the magnetic force lines, part of the torque of the heat engine is transmitted to the first rotor such that it is balanced with the driving equivalent torque Te, and further is transmitted to the second rotor by the magnetism of the magnetic force lines. As described above, a combined torque formed by combining the driving equivalent torque Te and the first rotor transmission torque T1 transmitted from the heat engine to the first rotor is transmitted to the second rotor, and the combined torque is transmitted to the driven parts. Further, in addition to the combined torque, remaining torque formed by subtracting the first rotor transmission torque T1 from the torque of the heat engine is also transmitted to the driven parts via the first transmission. As a consequence, torque equal in magnitude to the sum of the torque of the heat engine and the driving equivalent torque Te is transmitted to the driven parts.

As described above, during the assist by the rotating machine, motive power can be transmitted to the driven parts, without via the first transmission by an amount corresponding to the aforementioned first rotor transmission torque T1, and hence it is possible to suppress power transmission loss at the first transmission. Therefore, in a case where the second rotor is connected to the driven parts without using the transmission, it is possible to further increase the driving efficiency of the power plant in its entirety. Further, it is possible to reduce the torque transmitted to the first transmission, by torque corresponding to the aforementioned first rotor transmission torque T1, and hence, by employing a transmission adapted to the reduced transmission torque, as the first transmission, it is possible to attain the high efficiency and reduced size of the first transmission, which in turn makes it possible to attain further improvement of the driving efficiency and reduction of the size of the power plant in its entirety.

To attain the above-mentioned object, one embodiment provides a power plant 1D, 1E, 1K, 1L for driving driven parts (drive wheels DW and DW in the embodiment (the same applies hereinafter in this section)), including a heat engine (engine 3) having an output shaft (crankshaft 3a) for outputting power, the output shaft being connected to the driven parts without using a transmission, a first clutch (clutch CL3) for connecting and disconnecting between the output shaft of the heat engine and the driven parts, and a rotating machine 31, wherein the rotating machine 31 comprises a first rotor 34 having a magnetic pole row that is formed by a predetermined plurality of magnetic poles (permanent magnets 34a) arranged in a circumferential direction, and has each two adjacent magnetic poles so disposed as to have polarities different from each other, the first rotor 34 being rotatable in the circumferential direction, an unmovable stator 33 having an armature row that is formed by a plurality of armatures (iron cores 33a, U-phase coils 33c, V-phase coils 33d, and W-phase coils 33e) arranged in the circumferential direction, and is disposed in a manner opposed to the magnetic pole row, for generating a rotating magnetic field rotating in the circumferential direction between the armature row and the magnetic pole row, by a predetermined plurality of armature magnetic poles generated at the plurality of armatures, and a second rotor 35 having a soft magnetic material element row that is formed by a predetermined plurality of soft magnetic material elements (cores 35a) arranged in the circumferential direction in a manner spaced from each other, and is disposed such that the soft magnetic material element row is positioned between the magnetic pole row and the armature row, the second rotor 35 being rotatable in the circumferential direction, wherein a ratio between a number of the armature magnetic poles, a number of the magnetic poles, and a number of the soft magnetic material elements is set to $1:m:(1+m)/2$ ($m \neq 1.0$), one of the first and second rotors 34 and 35 being connected to the output shaft of the heat engine, the other of the first and second rotors being connected to the driven parts.

According to the power plant, the output shaft of the heat engine is connected to the driven parts without using a transmission. One of the first and second rotors of the rotating machine, that is, the one rotor is connected to the output shaft of the heat engine, and the other of the first and second rotors, that is, the other rotor is connected to the driven parts. Further, the first clutch connects or disconnects between the output shaft of the heat engine and the driven parts in a state where the other rotor is connected to the driven parts. Furthermore, in the rotating machine, during the supply of electric power to the armatures, and during the generation of electric power by the armatures, the electrical angular velocity relationship shown in the equation (25) and the torque relationship shown in the equation (32) hold.

As described above, in one embodiment, the rotating machine according to the present invention has functions as a combination of the planetary gear unit and a general rotating machine, and the one rotor and the other of such a rotating machine are connected to the heat engine and the driven parts, respectively, so that compared with the case where the rotors are connected via the planetary gear unit as in the above-described conventional power plant, it is possible to increase both the driving efficiencies of the heat engine and the rotating machine in driving the driven parts, and the electric power-generating efficiency of the rotating machine in generating electric power using the motive power from the driven parts. Further, it is possible to avoid inconveniences caused by the use of the planetary gear unit, thereby making it possible to obtain the aforementioned advantageous effects.

Further, according to the present invention, the connection between the output shaft of the heat engine and the driven parts is established without using the transmission. This makes it possible to transmit the motive power from the heat engine to the driven parts without causing power transmission loss in the transmission, thereby making it possible to further enhance the driving efficiency of the heat engine in driving the driven parts.

Further, according to the present invention, by causing the first clutch to disconnect between the output shaft of the heat engine and the driven parts, and controlling the operation of the rotating machine, it is possible to transmit torque from the heat engine to the driven parts via the one rotor and the other rotor, and progressively increase torque thus transmitted to the driven parts. Therefore, in a case where the heat engine is an internal combustion engine, even when the friction of the driven parts is very large, it is possible to transmit the motive power from the heat engine to the driven parts without using the friction start clutch, and drive the driven parts at rest without causing engine stall. Further, since the friction start clutch can be thus dispensed with, compared with the case where the heat engine is used as a drive source therefor, it is possible to enhance the fuel economy of the heat engine.

Furthermore, the speed of the motive power transmitted from the heat engine to the driven parts can be steplessly changed without using the stepless transmission. Specifically, through the disconnection by the first clutch and the control of the operation of the rotating machine, as described above, the torque is transmitted from the heat engine to the driven parts via the one rotor and the other rotor. In this case, as shown in FIG. 65, the magnetic field electrical angular velocity $\omega mf$ and the first and second rotor electrical angular velocities $\omega e1$ and $\omega e2$ are in the collinear relationship, and hence by controlling the rotational speed of the rotating magnetic field, the rotational speed of the other rotor connected to the driven parts can be steplessly controlled with respect to the rotational speed of the one rotor connected to the heat engine, as desired, and therefore it is possible to steplessly change the speed of the power transmitted from the heat engine to the driven parts.

Further, in the case where the other rotor is connected to the driven parts without using the transmission to thereby transmit the motive power from the heat engine to the driven parts via the other rotor, as described above, it is possible to prevent power transmission loss in the transmission, and therefore to further enhance the driving efficiency in this case. Furthermore, by transmitting the power between the rotating machine and the driven parts via the other rotor connected to the driven parts without using the transmission, as described above, it is possible to prevent power transmission loss in the transmission, and therefore to further enhance the driving efficiency of the rotating machine in driving the driven parts and the electric power-generating efficiency of the rotating machine in generating electric power using the motive power from the driven parts.

Further, as described heretofore, by setting the pole pair number ratio $\alpha$ to a larger value, it is possible to reduce the size of the stator, which in turn makes it possible to reduce the size of the power plant. For the same reason, by setting the pole pair number ratio $\alpha$ to a smaller value, it is possible to prevent the driving efficiency and the electric power-generating efficiency from being reduced by occurrence of loss due to an excessive increase in the magnetic field electrical angular velocity $\omega mf$.

As described above, according to the present invention, it is possible to obtain the same effects as obtained by the power plant including a first transmission. Further, the output shaft of the heat engine is connected to the driven parts without using the transmission, that is, the first transmission is omitted, and hence it is possible to reduce the size and costs of the power plant to an extent corresponding to the omission.

One embodiment further comprises a transmission 70 for changing speed of power from the other of the first and second rotors 34 and 35 and transmitting the power to the driven parts.

With this arrangement, the speed of the power transmitted from the other rotor of the rotating machine to the driven parts can be changed by the transmission. Therefore, by controlling the transmission ratio of the transmission according to load on the driven parts and the rotational speed thereof, it is possible to reduce the size and costs of the rotating machine, and prevent failure of the rotating machine due to an excessive increase in the rotational speed of the other rotor. In the case where the other rotor is the first rotor, and at the same time the magnetic poles thereof are those of permanent magnets, the above-mentioned inconvenience is liable to occur, and hence this arrangement is particularly effective. Further, by controlling the transmission ratio of the transmission, the rotational speed of the other rotor can be properly controlled with respect to the speed of the driven parts, whereby it is possible to enhance the driving efficiency and electric power-generating efficiency of the rotating machine.

One embodiment further comprises a brake mechanism (one-way clutch CL1, casing CA) for limiting or blocking reverse rotation of the output shaft of the heat engine.

With this arrangement, the reverse rotation of the output shaft of the heat engine is limited or blocked by the brake mechanism. Therefore, by causing the first clutch to disconnect between the output shaft of the heat engine and the driven parts, and the brake mechanism to limit or block the rotation in one direction of the one rotor connected to the output shaft of the heat engine, whereby it is possible, to transmit the driving equivalent torque Te by the rotating machine to the driven parts. Therefore, it is possible to properly drive the driven parts using the motive power from the rotating machine, while limiting or blocking the reverse rotation of the output shaft of the heat engine. Further, in this case, the disconnection by the first clutch prevents the heat engine from being dragged, whereby it is possible to obtain the high driving efficiency thereof.

One embodiment further comprises a rotor lock mechanism (clutch CL4, electromagnetic brake CL5) for holding the other of the first and second rotors 34 and 35 unrotatable.

With this arrangement, the other rotor is held unrotatable by the rotor lock mechanism. Therefore, by causing the rotor lock mechanism to hold the other rotor unrotatable and the first clutch to disconnect between the output shaft of the heat engine and the driven parts, and controlling the direction of rotation of the rotating magnetic field generated by the stator, it is possible to cause the output shaft of the heat engine to perform normal rotation without driving the driven parts, which in turn makes it possible to start the engine.

One embodiment further comprises a normal/reverse rotation-switching mechanism 60 for selectively switching a direction of rotation of the driven parts rotated by power transmitted from the other of the first and second rotors 34 and 35 to one of a direction of normal rotation and a direction of reverse rotation.

With this arrangement, when the motive power from the heat engine or the rotating machine is transmitted to the driven parts via the other rotor in the state where disconnection between the output shaft of the heat engine and the driven parts is performed by the first clutch, it is possible to selectively cause the normal rotation and reverse rotation of the driven parts by causing the normal/reverse rotation-switching mechanism to switch the direction of rotation of the driven parts. In this case, even in a case where the heat engine is an internal combustion engine and at the same time the friction of the driven parts is very large, it is possible to transmit the motive power from the heat engine to the driven part via the one rotor and the other rotor without using the friction start clutch, to cause the driven parts at rest to perform normal rotation or reverse rotation without causing engine stall.

In one embodiment, the other of the first and second rotors 34 and 35 is connected to the driven parts via the normal/reverse rotation-switching mechanism 60, and wherein the normal/reverse rotation-switching mechanism 60 comprises a planetary gear unit PS including a sun gear S, a ring gear R, and a carrier C for rotatably supporting planetary gears P in mesh with the sun gear S and the ring gear R, one of the sun gear S and the ring gear R being connected to the other of the first and second rotors 34 and 35, and the other of the sun gear S and the ring gear R being connected to the driven parts, a second clutch (clutch CL4) for connecting and disconnecting between the one of the sun gear S and the ring gear R and the carrier C, and a carrier lock mechanism (electromagnetic brake CL5) for holding the carrier unrotatable.

With this arrangement, the normal/reverse rotation-switching mechanism is configured so that it is possible to cause the driven parts to perform normal rotation or reverse rotation without causing power transmission loss at the planetary gear unit due to meshing of the gears. Further, the normal/reverse rotation-switching mechanism can be formed relatively simply.

In one embodiment, the first rotor 34 is connected to the output shaft of the heat engine, and the second rotor 35 is connected to the driven parts.

With this arrangement, the first and second rotors are connected to the output shaft of the heat engine and the driven parts, respectively. Therefore, when the torque of the heat engine is transmitted to the driven parts in the state where disconnection between the output shaft of the heat engine and the driven parts is performed by the first clutch, as is clear from the aforementioned equation (32), it is possible to combine both the driving equivalent torque Te (or the electric power-generating equivalent torque) and the torque of the heat engine transmitted to the first rotor, each as positive torque, in the second rotor, and transmit the combined torque to the driven parts. Therefore, it is possible to transmit larger torque to the driven parts.

To attain the above-mentioned object, one embodiment provides a power plant 1F, 1M for driving driven parts (drive wheels DW and DW in the embodiment (the same applies hereinafter in this section)), including a heat engine (engine 3) having an output shaft (crankshaft 3a) for outputting power, the output shaft being connected to the driven parts, a first clutch (clutch CL3) for connecting and disconnecting between the output shaft of the heat engine and the driven parts, and a rotating machine 31, wherein the rotating machine 31 comprises a first rotor 34 having a magnetic pole row that is formed by a predetermined plurality of magnetic poles (permanent magnets 34a) arranged in a circumferential direction, and has each two adjacent magnetic poles so disposed as to have polarities different from each other, the first rotor 34 being rotatable in the circumferential direction, an unmovable stator 33 having an armature row that is formed by a plurality of armatures (iron cores 33a, U-phase coils 33c, V-phase coils 33d, and W-phase coils 33e) arranged in the circumferential direction, and is disposed in a manner opposed to the magnetic pole row, for generating a rotating magnetic field rotating in the circumferential direction between the armature row and the magnetic pole row, by a predetermined plurality of armature magnetic poles generated at the plurality of armatures, and a second rotor 35 having a soft magnetic material element row that is formed by a predetermined plurality of soft magnetic material elements (cores 35a) arranged in the circumferential direction in a manner spaced from each other, and is disposed such that the soft magnetic material element row is positioned between the magnetic pole row and the armature row, the second rotor 35 being rotatable in the circumferential direction, wherein a ratio between a number of the armature magnetic poles, a number of the magnetic poles, and a number of the soft magnetic material elements is set to $1:m:(1+m)/2$ ($m \neq 1.0$), one of the first and second rotors 34 and 35 being connected to the output shaft of the heat engine, the other of the first and second rotors being connected to the driven parts, the power plant further comprising a transmission 80 for changing speed of power from the heat engine and transmitting the power to the one of the first and second rotors 34 and 35.

According to the power plant, the output shaft of the heat engine is connected to the driven parts. One of the first and second rotors of the rotating machine, that is, the one rotor is connected to the output shaft of the heat engine, and the other of the first and second rotors, that is, the other rotor is connected to the driven parts. Further, the first clutch connects or disconnects between the output shaft of the heat engine and the driven parts in a state where the other rotor is connected to the driven parts. Furthermore, in the rotating machine, during the supply of electric power to the armatures, and during the generation of electric power by the armatures, the electrical angular velocity relationship shown in the equation (25) and the torque relationship shown in the equation (32) hold.

As described above, the rotating machine according to the present invention has functions as a combination of the planetary gear unit and a general rotating machine, and the one rotor and the other rotor of the rotating machine are connected to the output shaft of the heat engine and the driven parts, respectively. Therefore, it is possible to avoid inconveniences caused by the use of the planetary gear unit, thereby making it possible to obtain the aforementioned advantageous effects, that is, the effects of enhanced driving efficiency of the heat engine and the rotating machine in driving the driven parts and enhanced electric power-generating efficiency of the rotating machine in generating electric power using the motive power from the driven parts, and the like.

Further, according to the present invention, by causing the first clutch to disconnect between the output shaft of the heat engine and the driven parts, and controlling the operation of the rotating machine, it is possible to transmit torque from the heat engine to the driven parts via the one rotor and the other rotor, and progressively increase torque thus transmitted to the driven parts. Therefore, in a case where the heat engine is an internal combustion engine, even when the friction of the driven parts is very large, it is possible to transmit the motive power from the heat engine to the driven parts without using the friction start clutch, and drive the driven parts at rest without causing engine stall. Further, since the friction start clutch can be thus dispensed with, compared with the case where the heat engine is used as a drive source therefor, it is possible to enhance the fuel economy of the heat engine.

Furthermore, by causing torque to be transmitted from the heat engine to the driven parts through the disconnection by the first clutch and control of the operation of the rotating machine as described above, and by controlling the rotational speed of the rotating magnetic field, it is possible to steplessly control the rotational speed of the other rotor connected to the driven parts with respect to the rotational speed of the one rotor connected to the heat engine. Therefore it is possible to steplessly change the speed of the power transmitted from the heat engine to the driven parts without using the stepless transmission.

Further, in the case where the other rotor is connected to the driven parts without using the transmission to thereby transmit the motive power from the heat engine to the driven parts via the other rotor, as described above, it is possible to prevent power transmission loss in the transmission, and therefore to further enhance the driving efficiency in this case. Furthermore, by transmitting the power between the rotating machine and the driven parts via the other rotor connected to the driven parts without using the transmission, as described above, it is possible to prevent power transmission loss in the transmission, and therefore to further enhance the driving efficiency of the rotating machine in driving the driven parts and the electric power-generating efficiency of the rotating machine in generating electric power using the motive power from the driven parts.

Further, in one embodiment, by setting the aforementioned pole pair number ratio α to a larger value, it is possible to reduce the size of the stator, which in turn makes it possible to reduce the size of the power plant. For the same reason, by setting the pole pair number ratio α to a smaller value, it is possible to prevent the driving efficiency and the electric power-generating efficiency from being reduced by occurrence of loss due to an excessive increase in the magnetic field electrical angular velocity ωmf.

Furthermore, according to the present invention, the speed of the power transmitted from the heat engine to the one rotor can be changed by the transmission. Therefore, it is possible to prevent failure of the rotating machine due to an excessive increase in the rotational speed of the one rotor. In the case where the one rotor is the first rotor, and at the same time the magnetic poles thereof are those of permanent magnets, the above-mentioned inconvenience is liable to occur, and hence this arrangement is particularly effective. In addition, it is possible to reduce the size of the one rotor, which in turn makes it possible to reduce the size and costs of the rotating machine.

One embodiment further comprises a brake mechanism (one-way clutch CL1, casing CA) for limiting or blocking reverse rotation of the output shaft of the heat engine.

With this arrangement, by causing the first clutch to disconnect between the output shaft of the heat engine and the driven parts, and the brake mechanism to limit or block the rotation in one direction of the one rotor connected to the output shaft of the heat engine, it is possible to properly drive the driven parts using the motive power from the rotating machine, while limiting or blocking the reverse rotation of the output shaft of the heat engine. Further, in this case, the disconnection by the first clutch prevents the heat engine from being dragged, whereby it is possible to obtain the high driving efficiency thereof.

The invention further comprises a rotor lock mechanism (clutch CL4, electromagnetic brake CL5) for holding the other of the first and second rotors 34 and 35 unrotatable.

With this arrangement, by causing the rotor lock mechanism to hold the other rotor unrotatable and the first clutch to disconnect between the output shaft of the heat engine and the driven parts, and controlling the direction of rotation of the rotating magnetic field generated by the stator, it is possible to cause the output shaft of the heat engine to perform normal direction without driving the driven parts, which in turn makes it possible to start the engine.

One embodiment further comprises a normal/reverse rotation-switching mechanism 60 for selectively switching a direction of rotation of the driven parts rotated by power transmitted from the other of the first and second rotors 34 and 35 to one of a direction of normal rotation and a direction of reverse rotation.

With this arrangement, when the motive power from the heat engine or the rotating machine is transmitted to the driven parts via the other rotor in the state where the disconnection between the output shaft of the heat engine and the driven parts is performed by the first clutch, by causing the normal/reverse rotation-switching mechanism to switch the direction of rotation of the driven parts, it is possible to selectively cause the normal rotation and reverse rotation of the driven parts. In this case, even in a case where the heat engine is an internal combustion engine and at the same time the friction of the driven parts is very large, it is possible to cause the motive power from the heat engine to be transmitted to the driven part without using the friction start clutch, to cause the driven parts at rest to perform normal rotation or reverse rotation without causing engine stall.

In one embodiment, the other of the first and second rotors 34 and 35 is connected to the driven parts via the normal/reverse rotation-switching mechanism 60, and wherein the normal/reverse rotation-switching mechanism 60 comprises a planetary gear unit PS including a sun gear S, a ring gear R, and a carrier C for rotatably supporting planetary gears P in mesh with the sun gear S and the ring gear R, one of the sun gear S and the ring gear R being connected to the other of the first and second rotors 34 and 35, and the other of the sun gear S and the ring gear R being connected to the driven parts, a second clutch (clutch CL4) for connecting and disconnecting between the one of the sun gear S and the ring gear R and the carrier C, and a carrier lock mechanism (electromagnetic brake CL5) for holding the carrier C unrotatable.

With this arrangement, the normal/reverse rotation-switching mechanism is configured so that it is possible to cause the driven parts to perform normal rotation or reverse rotation without causing power transmission loss at the planetary gear unit due to meshing of the gears. Further, the normal/reverse rotation-switching mechanism can be formed relatively simply.

In one embodiment, the first rotor 34 is connected to the output shaft of the heat engine, and the second rotor 35 is connected to the driven parts.

With this arrangement, the first and second rotors are connected to the output shaft of the heat engine and the driven parts, respectively. Therefore, when the torque of the heat engine is transmitted to the driven parts in the state where the disconnection between the output shaft of the heat engine and the driven parts is performed by the first clutch, it is possible to combine both the driving equivalent torque Te (or the electric power-generating equivalent torque) and the torque of the heat engine transmitted to the first rotor, each as positive torque, in the second rotor, and transmit the combined torque to the driven parts. Therefore, it is possible to transmit larger torque to the driven parts.

BRIEF DESCRIPTION OF THE DRAWINGS

FIG. 6 Diagrams illustrating the operation of the rotating machine in FIG. 1 in a case where electric power is supplied to the stator in a state of the first rotor being held unrotatable.

FIG. 7 Diagrams illustrating a continuation of the operation in FIG. 6.

FIG. 10 Diagrams illustrating the operation of the rotating machine in FIG. 1 in a case where electric power is supplied to the stator in a state of the second rotor being held unrotatable.

FIG. 13 A diagram illustrating an example of changes in U-phase to W-phase counter-electromotive force voltages in a case where the first rotor of the rotating machine in the present invention is held unrotatable.

FIG. 14 A diagram illustrating an example of changes in a driving equivalent torque, and first and second rotor transmission torques in the case where the first rotor of the rotating machine in the present invention is held unrotatable.

FIG. 43 A velocity nomograph illustrating an example of the relationship between the magnetic field rotational speed, and the first and second rotor rotational speeds in the power plant shown in FIG. 41 at the time of the ENG start during stoppage of the vehicle.

FIG. 50 A velocity nomograph illustrating an example of the relationship between the magnetic field rotational speed, and the first and second rotor rotational speeds in the power plant shown in FIG. 41 when the clutch is disengaged during the deceleration regeneration.

DETAILED DESCRIPTION

Figure 1:
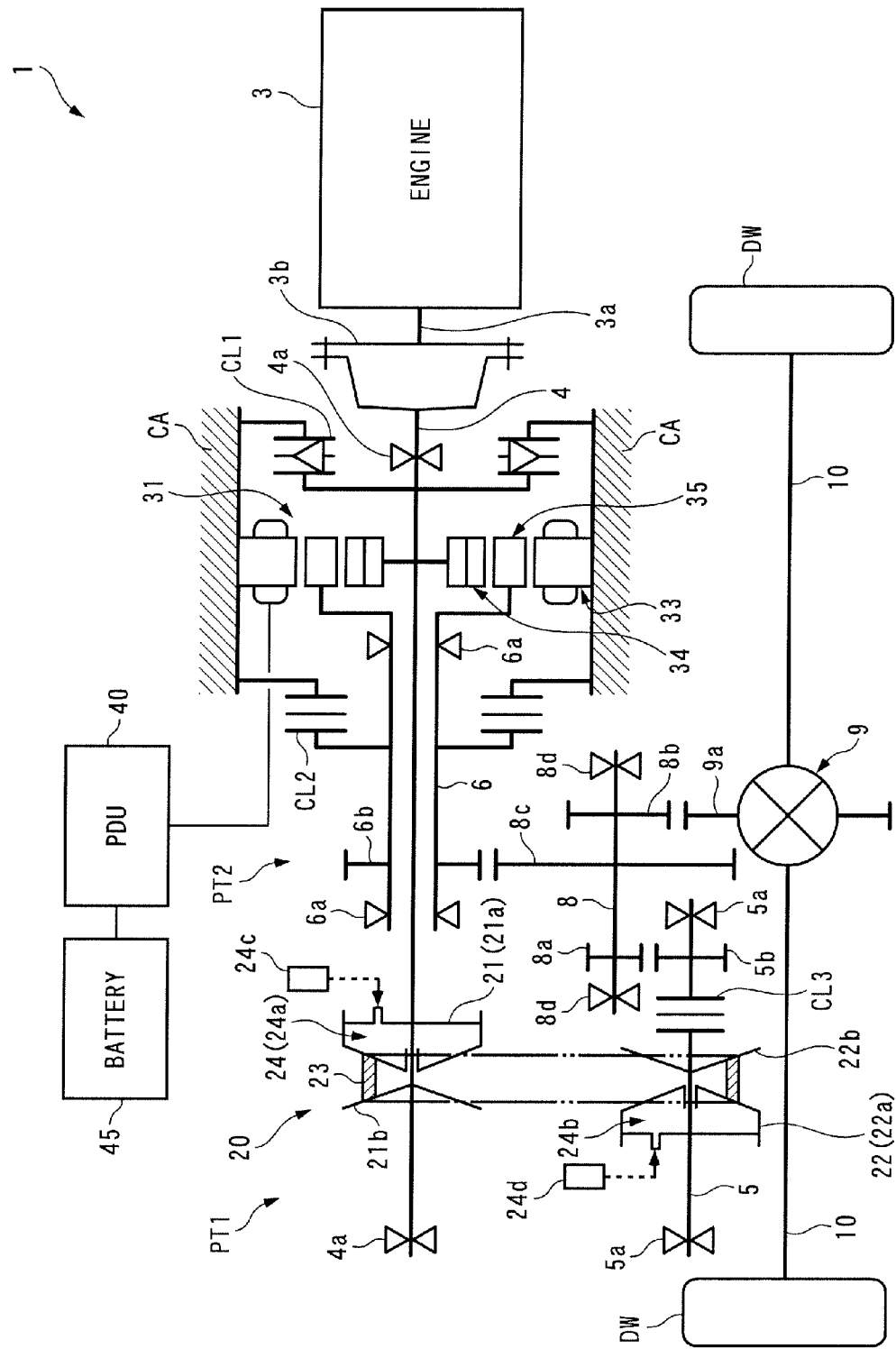
FIG. 1 A schematic diagram of a power plant according to a first embodiment.

The present invention will now be described in detail with reference to the drawings showing preferred embodiments thereof. It should be noted that in the figures, hatching in portions illustrating cross-sections are omitted for convenience. FIG. 1 schematically shows a power plant 1 according to a first embodiment of the present invention. The power plant 1 is for driving drive wheels DW and DW (driven parts) of a vehicle (not shown), and includes an internal combustion engine 3 (heat engine) and a rotating machine 31 as drive sources, a first power transmission path PT1, a second power transmission path PT2, a differential gear mechanism 9, and drive shafts 10 and 10 for transmitting power to the drive wheels DW and DW, and an ECU 2 for controlling the operations of the internal combustion engine 3 and the rotating machine 31.

The internal combustion engine (hereinafter referred to as the "engine") 3 is e.g. a gasoline engine. The intake pipe (not shown) of the engine 3 is provided with a throttle valve (not shown). The opening degree of the throttle valve (hereinafter referred to as the "throttle valve opening") is controlled by the ECU 2, whereby the amount of intake air drawn into the engine 3 is controlled.

The above-mentioned first power transmission path PT1 includes a flywheel 3b, a first main shaft 4 and an auxiliary shaft 5 arranged in parallel with each other, and a stepless transmission 20 (first transmission). The first main shaft 4 is connected to a crankshaft 3a (output shaft) of the engine 3 via the flywheel 3b, and is rotatably supported by bearings 4a and 4a. Further, the first main shaft 4 is integrally formed with a one-way clutch CL1, and a first rotor 34, described hereinafter, of the rotating machine 31. As described above, the first rotor 34 is always connected to the crankshaft 3a via the first main shaft 4 and the flywheel 3b.

The above-mentioned one-way clutch CL1 is configured such that it engages between the first main shaft 4 and an unmovable casing CA, when such power as causes the crankshaft 3a having the first main shaft 4 connected thereto to perform reverse rotation, acts on the crankshaft 3a, whereas when such power as causes the crankshaft 3a to perform normal rotation acts on the crankshaft 3a, the one-way clutch CL1 disengages between the first main shaft 4 and the casing CA. In other words, the one-way clutch CL1 and the casing CA permits the rotation of the crankshaft 3a only when the crankshaft 3a performs normal rotation together with the first main shaft 4, and blocks the reverse rotation thereof. It should be noted that in the present embodiment, the one-way clutch CL1 and the casing CA correspond to a brake mechanism according to the present invention.

The stepless transmission 20 is a so-called belt type, and is comprised of a drive pulley 21, a driven pulley 22, a transmission belt 23, and a variable pulley width mechanism 24.

The drive pulley 21 has a movable sheave 21a and a fixed sheave 21b which are frustoconical and opposed to each other. The movable sheave 21a is mounted on the above-mentioned first main shaft 4 in a manner axially movable but unrotatable relative to the first main shaft 4. The fixed sheave 21b is fixed to the first main shaft 4. Further, the opposed surfaces of the movable sheave 21a and the fixed sheave 21b are formed as inclined surfaces, whereby a V-shaped belt groove is formed between the movable sheave 21a and the fixed sheave 21b so as to receive the transmission belt 23 such that it extends therearound.

The driven pulley 22 is configured similarly to the above-described drive pulley 21. More specifically, the driven pulley 22 has a movable sheave 22a and a fixed sheave 22b which are frustoconical and opposed to each other. The movable sheave 22a is mounted on the above-mentioned auxiliary shaft 5 in a manner axially movable but unrotatable relative to the auxiliary shaft 5. The fixed sheave 22b is fixed to the auxiliary shaft 5. The auxiliary shaft 5 is rotatably supported by bearings 5a and 5a. Further, the opposed surfaces of the movable sheave 22a and the fixed sheave 22b are formed as inclined surfaces, whereby a V-shaped belt groove is formed therebetween. The transmission belt 23 is made of metal, and extends around the two pulleys 21 and 22 in a state fitted in the respective belt grooves thereof.

The variable pulley width mechanism 24 changes the pulley widths of the two pulleys 21 and 22, to thereby change the effective diameters thereof. The variable pulley width mechanism 24 includes a drive-side oil chamber 24a and a driven-side oil chamber 24b which are respectively formed within the movable sheaves 21a and 22a, and a drive-side electromagnetic valve 24c and a driven-side electromagnetic valve 24d which control respective oil pressures supplied from an oil pressure pump (not shown) to the oil chambers 24a and 24b. The electromagnetic valves 24c and 24d are connected to the ECU 2 (see FIG. 2), and have their valve openings controlled by the ECU 2.

With the arrangement described above, in the stepless transmission 20, the oil pressures supplied to the two oil chambers 24a and 24b are controlled by controlling the valve opening degrees of the two electromagnetic valves 24c and 24d by the ECU 2, whereby the two movable sheaves 21a and 22a are axially driven, respectively. This steplessly changes the respective effective diameters of the two pulleys 21 and 22, to thereby steplessly control the transmission ratio of the stepless transmission 20.

Further, the aforementioned auxiliary shaft 5 is integrally formed with a gear 5b, which is in mesh with a first idler gear 8a integrally formed on an idler shaft 8. The idler shaft 8 is rotatably supported by bearings 8d and 8d. The idler shaft 8 is integrally formed with a second idler gear 8b, which is in mesh with a gear 9a of the above-described differential gear mechanism 9. The differential gear mechanism 9 is connected to the drive wheels DW and DW via the drive shafts 10 and 10, respectively.

Further, a clutch CL3 (first clutch) is provided in the auxiliary shaft 5 between the driven pulley 22 and the gear 5b. The clutch CL3 is of a friction multi-disc clutch using the engine 3 as a drive source, and includes an input shaft (not shown) connected to a portion of the auxiliary shaft 5 toward the driven pulley 22, and an output shaft (not shown) connected to a portion of the auxiliary shaft 5 toward the gear 5b. The degree of engagement of the clutch CL3 is controlled by the ECU 2, whereby the connection between the stepless transmission 20 and the drive wheels DW and DW is established and interrupted.

With the arrangement described above, when the clutch CL3 is engaged, the crankshaft 3a of the engine 3 is mechanically connected to the drive wheels DW and DW via the first power transmission path PT1 (the flywheel 3b, the first main shaft 4, the stepless transmission 20, and the auxiliary shaft 5), the clutch CL3, the gear 5b, the first idler gear 8a, the idler shaft 8, the second idler gear 8b, the gear 9a, the differential gear mechanism 9, and the drive shafts 10 and 10. Further, during engagement of the clutch CL3, by controlling the stepless transmission 20, the power from the engine 3 is transmitted to the drive wheels DW and DW while having the speed thereof steplessly changed. Further, when the clutch CL3 is disengaged, the connection between the crankshaft 3a and the first rotor 34 integrally formed thereon, and the drive wheels DW and DW via the first power transmission path PT1 is interrupted.

The above-described second power transmission path PT2 is disposed in parallel with the first power transmission path PT1, and includes a second main shaft 6, and a gear 6b integrally formed therewith. The second main shaft 6 is formed to be hollow, and is rotatably supported by bearings 6a and 6a. The first main shaft 4 is rotatably fitted through the second main shaft 6. Further, the second main shaft 6 is integrally formed with an electromagnetic brake CL2 (rotor lock mechanism) and a second rotor 35, described hereinafter, of the rotating machine 31. The above-described gear 6b is in mesh with a third idler gear 8c integrally formed on the idler shaft 8.

As described above, the second rotor 35 is always mechanically connected to the drive wheels DW and DW without using the transmission, via the second power transmission path PT2 (the second main shaft 6 and the gear 6b), the third idler gear 8c, the idler shaft 8, the second idler gear 8b, the gear 9a, the differential gear mechanism 9, and the drive shafts 10 and 10.

Further, the above-mentioned electromagnetic brake CL2 is connected to the ECU 2 (see FIG. 2), and is turned on or off by the ECU 2. The electromagnetic brake CL2 unrotatably holds the second main shaft 6 and the second rotor 35 when in the ON state, but permits the rotation of the second rotor 35 when in the OFF state.

Figure 3:
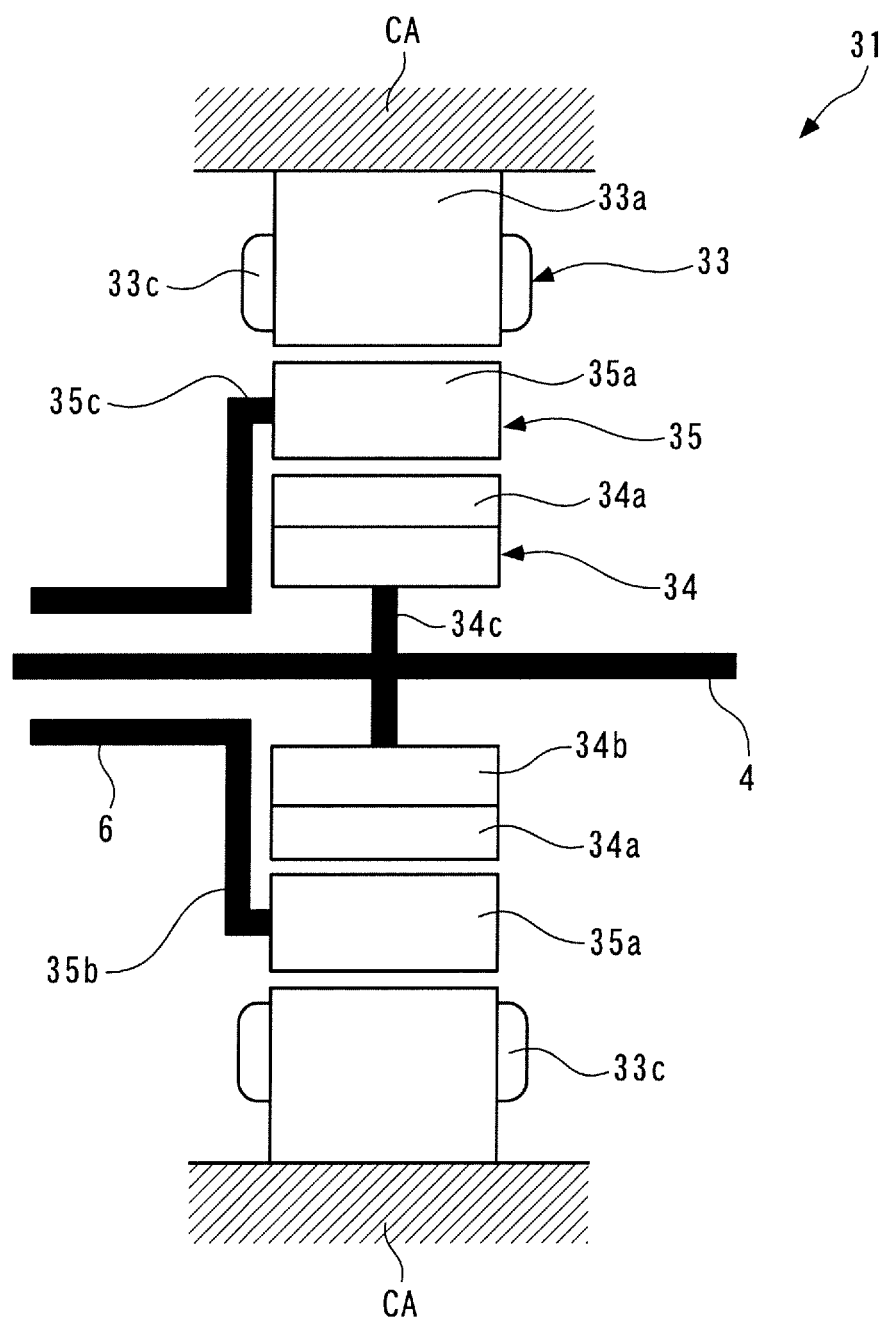
FIG. 3 An enlarged cross-sectional view of the rotating machine

Furthermore, as shown in FIGS. 1 and 3, the rotating machine 31 includes a stator 33, the first rotor 34 disposed in a manner opposed to the stator 33, and the second rotor 35 disposed between the two 33 and 34. The stator 33, the second rotor 35 and the first rotor 34 are arranged side by side in a radial direction of the first main shaft 4 (hereinafter simply referred to as "radially" or "in the radial direction") in the mentioned order. It should be noted that in FIG. 3, some of the elements, such as the first main shaft 4 and the like, are illustrated in a skeleton diagram-like manner for convenience of illustration.

Figure 4:
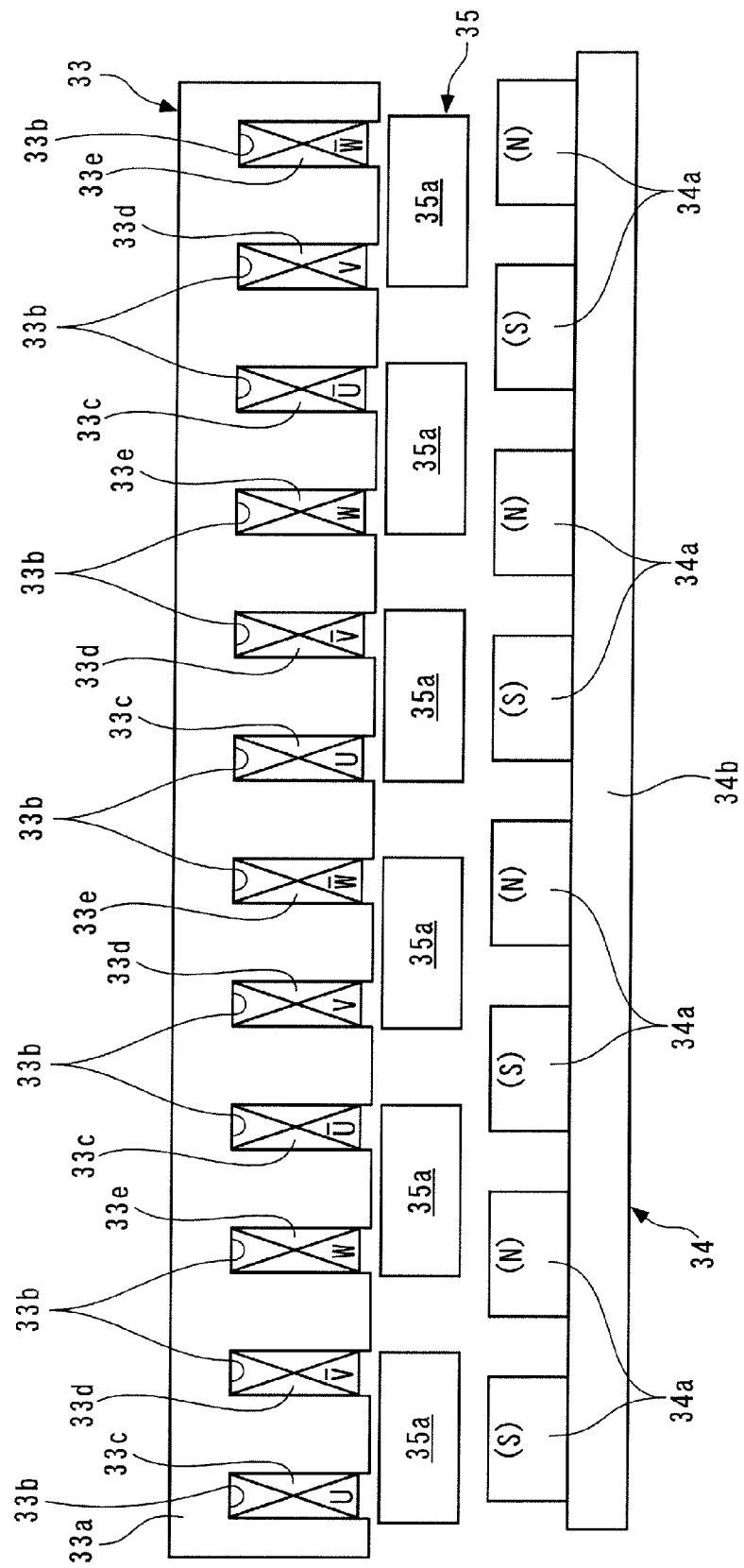
FIG. 4 A schematic development view showing a stator and first and second rotors of the rotating machine in FIG. 1, in a state developed in the circumferential direction.

The aforementioned stator 33 is for generating a rotating magnetic field, and as shown in FIGS. 3 and 4, includes an iron core 33a (armature), and U-phase, V-phase and W-phase coils 33c, 33d and 33e (armatures) provided on the iron core 33a. It should be noted that in FIG. 3, only the U-phase coil 33c is shown for convenience. The iron core 33a, which has a hollow cylindrical shape formed by laminating a plurality of steel plates, extends in the direction of axis of the first main shaft 4 (hereinafter simply referred to as "axially" or "in the axial direction"), and is mounted on the casing CA. Further, the inner peripheral surface of the iron core 33a is formed with twelve slots 33b. The slots 33b extend in the axial direction, and are arranged at equally-spaced intervals in the direction of circumference of the first main shaft 4 (hereinafter simply referred to as "circumferentially" or "in the circumferential direction"). The U-phase to W-phase coils 33c to 33e are wound in the slots 33b by distributed winding (wave winding), and are connected to a battery 45 via a power drive unit (hereinafter referred to as the "PDU") 40. The PDU 40 is implemented as an electric circuit comprised of an inverter, and is connected to the ECU 2 (see FIG. 2).

In the stator 33 configured as above, when electric power is supplied from the battery 45, to thereby cause electric current to flow through the U-phase to W-phase coils 33c to 33e, or when electric power is generated, as described hereinafter, four magnetic poles are generated at an end of the iron core 33a toward the first rotor 34 at equally-spaced intervals in the circumferential direction (see FIG. 6), and a rotating magnetic field caused by the magnetic poles rotates in the circumferential direction. Hereinafter, the magnetic poles generated on the iron core 33a are referred to as the "armature magnetic poles". Further, each two armature magnetic poles which are circumferentially adjacent to each other have polarities different from each other. It should be noted that in FIG. 6 and other figures, referred to hereinafter, the armature magnetic poles are represented by (N) and (S) over the iron core 33a and the U-phase to W-phase coils 33c to 33e.

As shown in FIG. 4, the first rotor 34 includes a magnetic pole row comprised of eight permanent magnets 34a (magnetic poles). These permanent magnets 34a are arranged at equally-spaced intervals in the circumferential direction, and the magnetic pole row is opposed to the iron core 33a of the stator 33. Each permanent magnet 34a extends in the axial direction, and the length thereof in the axial direction is set to the same length as that of the iron core 33a of the stator 33.

Further, the permanent magnets 34a are mounted on an outer peripheral surface of an annular fixed portion 34b. This fixed portion 34b is formed by a soft magnetic material, such as iron or a laminate of a plurality of steel plates, and has an inner peripheral surface thereof attached to the outer peripheral surface of a disk-shaped flange 34c. The flange 34c is integrally formed on the aforementioned first main shaft 4. Thus, the first rotor 34 including the permanent magnets 34a is rotatable in unison with the first main shaft 4. Further, the permanent magnets 34a are attached to the outer peripheral surface of the fixed portion 34b formed by the soft magnetic material, as described above, and hence a magnetic pole of (N) or (S) appears on an end of each permanent magnet 34a toward the stator 33. It should be noted that in FIG. 4 and other figures, referred to hereinafter, the magnetic poles of the permanent magnets 34a are denoted by (N) and (S). Further, each two permanent magnets 34a circumferentially adjacent to each other have polarities different from each other.

The second rotor 35 includes a soft magnetic material element row comprised of six cores 35a (soft magnetic material elements). These cores 35a are arranged at equally-spaced intervals in the circumferential direction, and the soft magnetic material element row is disposed between the iron core 33a of the stator 33 and the magnetic pole row of the first rotor 34, in a manner spaced therefrom by respective predetermined distances. Each core 35a is formed by a soft magnetic material, such as a laminate of a plurality of steel plates, and extends in the axial direction. Further, similarly to the permanent magnet 34a, the length of the core 35a in the axial direction is set to the same length as that of the iron core 33a of the stator 33. Furthermore, the core 35a is mounted on an outer end of a disk-shaped flange 35b via a hollow cylindrical connecting portion 35c slightly extending in the axial direction. This flange 35b is integrally formed on the aforementioned second main shaft 6. This arrangement makes the second rotor 35 including the cores 35a rotatable in unison with the second main shaft 6. It should be noted that in FIGS. 4 and 6, the connecting portion 35c and the flange 35b are omitted for convenience.

Now, a description will be given of the operation of the rotating machine 31 constructed as described above. As described hereinabove, the rotating machine 31 includes the four armature magnetic poles, the eight magnetic poles of the permanent magnets 34a (hereinafter referred to as the "magnet magnetic poles"), and the six cores 35a. That is, the ratio between the number of the armature magnetic poles, the number of the magnet magnetic poles, and the number of the cores 35a (hereinafter referred to as the "pole number ratio") is set to 1:2.0: (1+2.0)/2. As is clear from this configuration and the aforementioned equations (18) to (20), counter-electromotive force voltages, which are generated by the U-phase to W-phase coils 33c to 33e as the first rotor 34 and the second rotor 35 rotate with respect to the stator 33 (hereinafter referred to as the "U-phase counter-electromotive force voltage Vcu", the "V-phase counter-electromotive force voltage Vcv" and the "W-phase counter-electromotive force voltage Vcw", respectively), are expressed by the following equations (33), (34) and (35).

$$Vcu = -3 \cdot \psi F[(3 \cdot \omega ER2 - 2 \cdot \omega ER1)\sin(3 \cdot \theta ER2 - 2 \cdot \theta ER1)] \quad (33)$$

$$Vcv = -3 \cdot \psi F\left[(3 \cdot \omega ER2 - 2 \cdot \omega ER1)\sin\left(3 \cdot \theta ER2 - 2 \cdot \theta ER1 - \frac{2\pi}{3}\right)\right] \quad (34)$$

$$Vcw = -3 \cdot \psi F\left[(3 \cdot \omega ER2 - 2 \cdot \omega ER1)\sin\left(3 \cdot \theta ER2 - 2 \cdot \theta ER1 + \frac{2\pi}{3}\right)\right] \quad (35)$$

In these equations, $\phi F$ represents the maximum value of magnetic fluxes of the magnet magnetic poles. Further, $\theta ER1$ represents a first rotor electrical angle, which is a value obtained by converting a rotational angle position of a specific permanent magnet 34a of the first rotor 34 with respect to a specific U-phase coil 33c (hereinafter referred to as the "reference coil") to an electrical angular position. More specifically, the first rotor electrical angle $\theta$ ER1 is a value obtained by multiplying the rotational angle position of the specific permanent magnet 34a (hereinafter referred to as the "first rotor rotational angle $\theta R1$") by a pole pair number of the armature magnetic poles, i.e. a value of 2. Further, $\theta ER2$ represents a second rotor electrical angle, which is a value obtained by converting a rotational angle position of a specific core 35a of the second rotor 35 with respect to the aforementioned reference coil to an electrical angular position. More specifically, the second rotor electrical angle θER2 is a value obtained by multiplying the rotational angle position of this specific core 35a (hereinafter referred to as the "second rotor rotational angle θR2") by a pole pair number (value of 2) of the armature magnetic poles.

Further, ωER1 in the equations (33) to (35) represents a value obtained by differentiating θER1 with respect to time, i.e. a value obtained by converting an angular velocity of the first rotor 34 with respect to the stator 33 to an electrical angular velocity (hereinafter referred to as the "first rotor electrical angular velocity"). Furthermore, ωER2 represents a value obtained by differentiating θER2 with respect to time, i.e. a value obtained by converting an angular velocity of the second rotor 35 with respect to the stator 33 to an electrical angular velocity (hereinafter referred to as the "second rotor electrical angular velocity").

Further, as is clear from the aforementioned pole number ratio and the aforementioned equations (21) to (23), currents flowing through the respective U-phase, V-phase and W-phase coils 33c, 33d and 33e (hereinafter referred to as the "U-phase current Iu", the "V-phase current Iv" and the "W-phase current Iw") are expressed by the following equations (36), (37) and (38), respectively.

$$Iu = I \cdot \sin(3 \cdot \theta ER2 - 2 \cdot \theta ER1) \tag{36}$$

$$Iv = I \cdot \sin\left(3 \cdot \theta ER2 - 2 \cdot \theta ER1 - \frac{2\pi}{3}\right) \tag{37}$$

$$Iw = I \cdot \sin\left(3 \cdot \theta ER2 - 2 \cdot \theta ER1 + \frac{2\pi}{3}\right) \tag{38}$$

In these equations, I represents the amplitude (maximum value) of the currents flowing through the U-phase to W-phase coils 33c to 33e. Furthermore, as is clear from the pole number ratio and the aforementioned equations (24) and (25), the electrical angular position of a vector of the rotating magnetic field of the stator 33 with respect to the reference coil (hereinafter referred to as the "magnetic field electrical angular position θMFR") is expressed by the following equation (39), and the electrical angular velocity of the rotating magnetic field with respect to the stator 33 (hereinafter referred to as the "magnetic field electrical angular velocity ωMFR") is expressed by the following equation (40):

$$\theta MFR = 3 \cdot \theta ER2 - 2 \cdot \theta ER1 \tag{39}$$

$$\omega MFR = 3 \cdot \omega ER2 - 2 \cdot \omega ER1 \tag{40}$$

Figure 5:
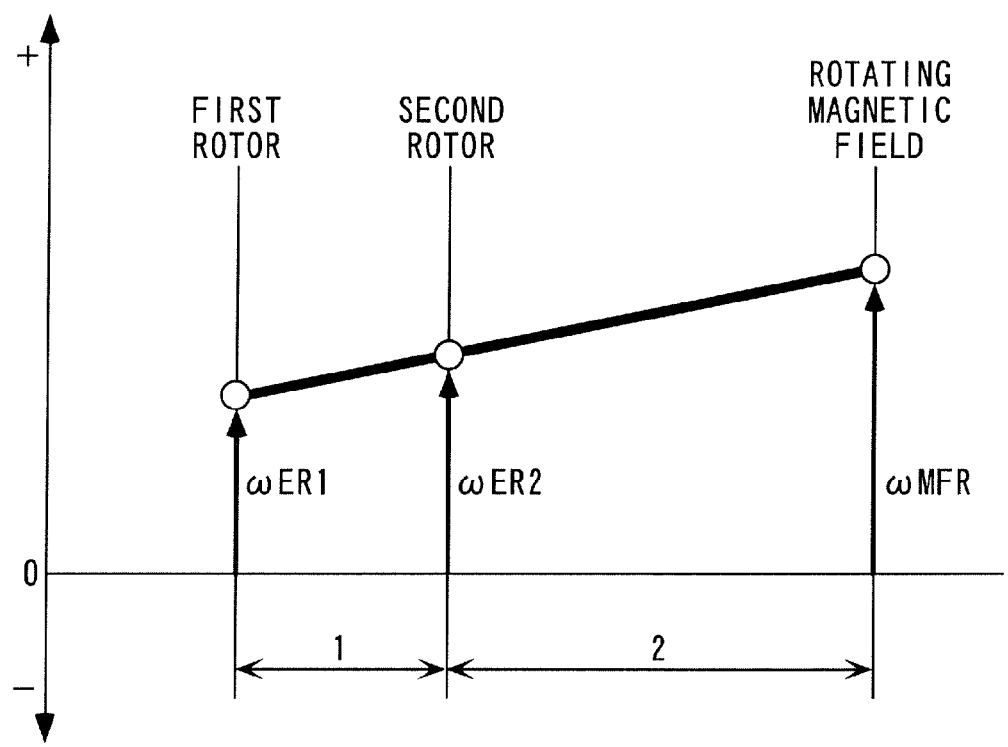
FIG. 5 A velocity nomograph illustrating an example of the relationship between a magnetic field electrical angular velocity, and first and second rotor electrical angular velocities.

Therefore, the relationship between the magnetic field electrical angular velocity ωMFR, the first rotor electrical angular velocity ωER1, and the second rotor electrical angular velocity ωER2 can be expressed by a so-called nomograph, which is illustrated e.g. as in FIG. 5.

Further, assuming that a torque equivalent to electric power supplied to the stator 33 and the magnetic field electrical angular velocity ωMFR is a driving equivalent torque TSE, as is clear from the aforementioned pole number ratio and the aforementioned equation (32), the relationship between the driving equivalent torque TSE, a torque transmitted to the first rotor 34 (hereinafter referred to as the "first rotor transmission torque") TR1, and a torque transmitted to the second rotor 35 (hereinafter referred to as the "second rotor transmission torque") TR2 is expressed by the following equation (41):

$$TSE = \frac{TR1}{2} = \frac{-TR2}{3} \tag{41}$$

The relationship of the electrical angular velocities expressed by the equation (40), and the relationship between the torques expressed by the equation (41) are quite the same as the relationship between the rotational speed of the sun gear, that of the ring gear, and that of the carrier of a planetary gear unit having a gear ratio between the sun gear and the ring gear set to 1:2, and the relationship between torques thereof.

Figure 8A:
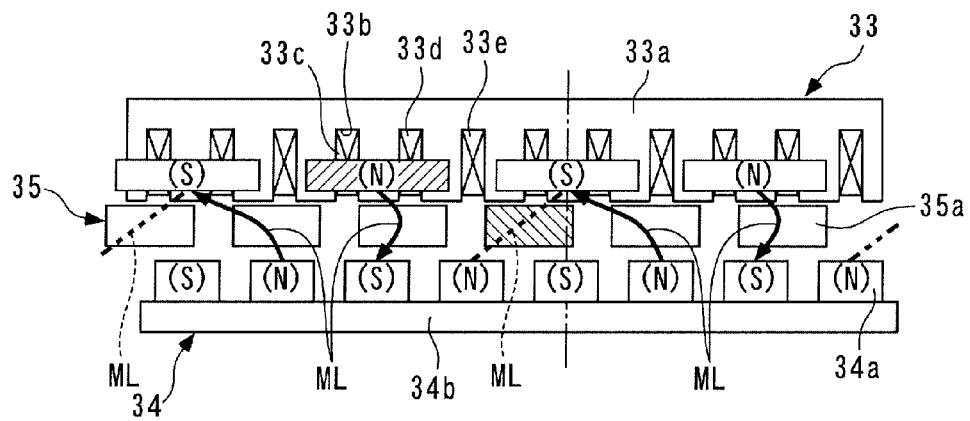
FIG. 8 Diagrams illustrating a continuation of the operation in FIG. 7.
Figure 8B:
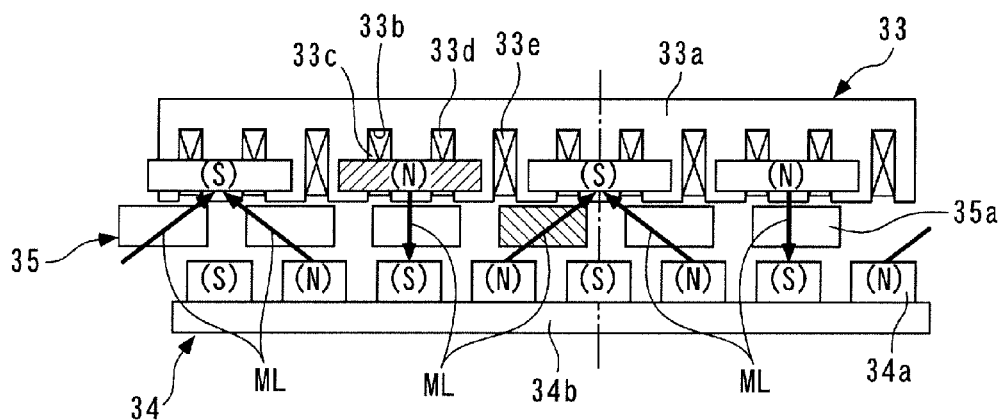

Next, a more specific description will be given of how electric power supplied to the stator 33 is converted to motive power and is output from the first rotor 34 and the second rotor 35. First, a case where electric power is supplied to the stator 33 in a state in which the first rotor 34 is held unrotatable will be described with reference to FIGS. 6 to 8. It should be noted that in FIGS. 6 to 8, reference numerals indicative of a plurality of component elements are omitted for convenience. This also applies to other figures, referred to hereinafter. Further, in FIGS. 6 to 8, one identical armature magnetic pole and one identical core 35a are indicated by hatching for clarity.

First, as shown in FIG. 6(a), from a state where the center of a certain core 35a and the center of a certain permanent magnet 34a are circumferentially coincident with each other, and the center of a third core 35a from the certain core 35a and the center of a fourth permanent magnet 34a from the certain permanent magnet 34a are circumferentially coincident with each other, the rotating magnetic field is generated such that it rotates leftward, as viewed in the figure. At the start of generation of the rotating magnetic field, the positions of two armature magnetic poles adjacent but one to each other that have the same polarity are caused to circumferentially coincide with the centers of ones of the permanent magnets 34a the centers of which are coincident with the centers of cores 35a, and the polarity of these armature magnetic poles is made different from the polarity of the magnet magnetic poles of these permanent magnets 34a.

Since the rotating magnetic field is generated by the stator 33, between the same and the first rotor 34, and the second rotor 35 having the cores 35a is disposed between the stator 33 and the first rotor 34, as described hereinabove, the cores 35a are magnetized by the armature magnetic poles and the magnet magnetic poles. Because of this fact and the fact that the cores 35a adjacent to each other are spaced from each other, magnetic force lines ML are generated in a manner connecting between the armature magnetic poles, the cores 35a, and the magnet magnetic poles. It should be noted that in FIGS. 6 to 8, magnetic force lines ML at the iron core 33a and the fixed portion 34b are omitted for convenience. This also applies to other figures, referred to hereinafter.

In the state shown in FIG. 6(a), the magnetic force lines ML are generated in a manner connecting an armature magnetic pole, a core 35a and a magnet magnetic pole circumferential positions of which are coincident with each other, and at the same time in a manner connecting armature magnetic poles, cores 35a and magnet magnetic poles which are adjacent to the above-mentioned armature magnetic pole, core 35a, and magnet magnetic pole, respectively, on circumferentially opposite sides thereof. Further, in this state, since the magnetic force lines ML are straight, no magnetic forces for circumferentially rotating the cores 35a act on the cores 35a.

When the armature magnetic poles rotate from the positions shown in FIG. 6(a) to respective positions shown in FIG. 6(b) in accordance with rotation of the rotating magnetic field, the magnetic force lines ML are bent, and accordingly magnetic forces act on the cores 35a in such a manner that the magnetic force lines ML are made straight. In this case, the magnetic force lines ML are bent at the cores 35a in a manner convexly curved in an opposite direction to a direction of rotation of the rotating magnetic field (hereinafter, this direction is referred to as "the magnetic field rotation direction") with respect to the straight lines each connecting an armature magnetic pole and a magnet magnetic pole which are connected to each other by an associated one of the magnetic force lines ML. Therefore, the above-described magnetic forces act on the cores 35a to drive the same in the magnetic field rotation direction. The cores 35a are driven in the magnetic field rotation direction by such action of the magnetic forces caused by the magnetic force lines ML, for rotation to respective positions shown in FIG. 6(c), and the second rotor 35 provided with the cores 35a also rotates in the magnetic field rotation direction. It should be noted that broken lines in FIGS. 6(b) and 6(c) indicate that the magnetic flux amount of the magnetic force lines ML is very small, and the magnetic connection between the armature magnetic poles, the cores 35a, and the magnet magnetic poles is weak. This also applies to other figures, referred to hereinafter.

As the rotating magnetic field further rotates, a sequence of the above-described operations, that is, the operations that "the magnetic force lines ML are bent at the cores 35a in a manner convexly curved in the direction opposite to the magnetic field rotation direction→the magnetic forces act on the cores 35a in such a manner that the magnetic force lines ML are made straight→the cores 35a and the second rotor 35 rotate in the magnetic field rotation direction" are repeatedly performed as shown in FIGS. 7(a) to 7(d), and FIGS. 8(a) and 8(b). As described above, in a case where electric power is supplied to the stator 33 in a state of the first rotor 34 being held unrotatable, the action of the magnetic forces caused by the magnetic force lines ML converts electric power supplied to the stator 33 to motive power, and outputs the motive power from the second rotor 35.

Figure 9:
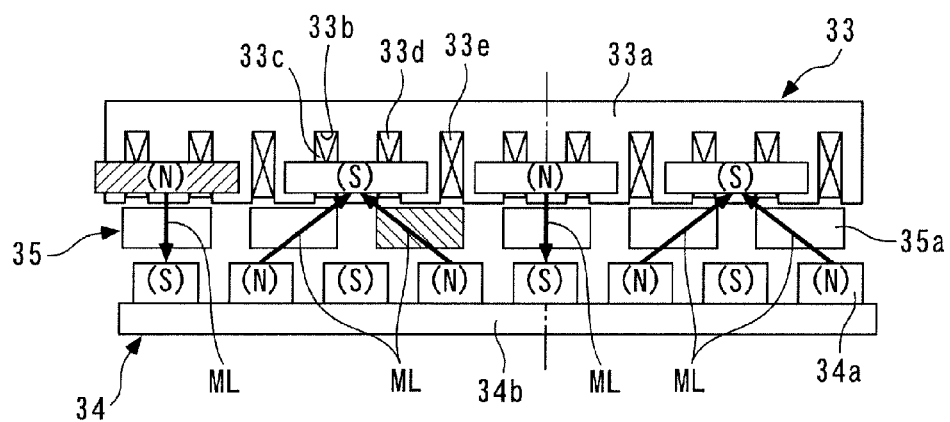
FIG. 9 A diagram illustrating the positional relationship between armature magnetic poles and cores in a case where the armature magnetic poles have rotated through an electrical angle of $2\pi$ from the state shown in FIG. 5.

FIG. 9 shows a state in which the armature magnetic poles have rotated from the FIG. 6(a) state through an electrical angle of $2\pi$. As is apparent from a comparison between FIG. 9 and FIG. 6(a), it is understood that the cores 35a have rotated in the same direction through ⅓ of a rotational angle of the armature magnetic poles. This agrees with the fact that by substituting $\omega ER1=0$ into the aforementioned equation (40), $\omega ER2=\omega MFR/3$ is obtained.

Figures 11A, 11B, 11C, 11D:
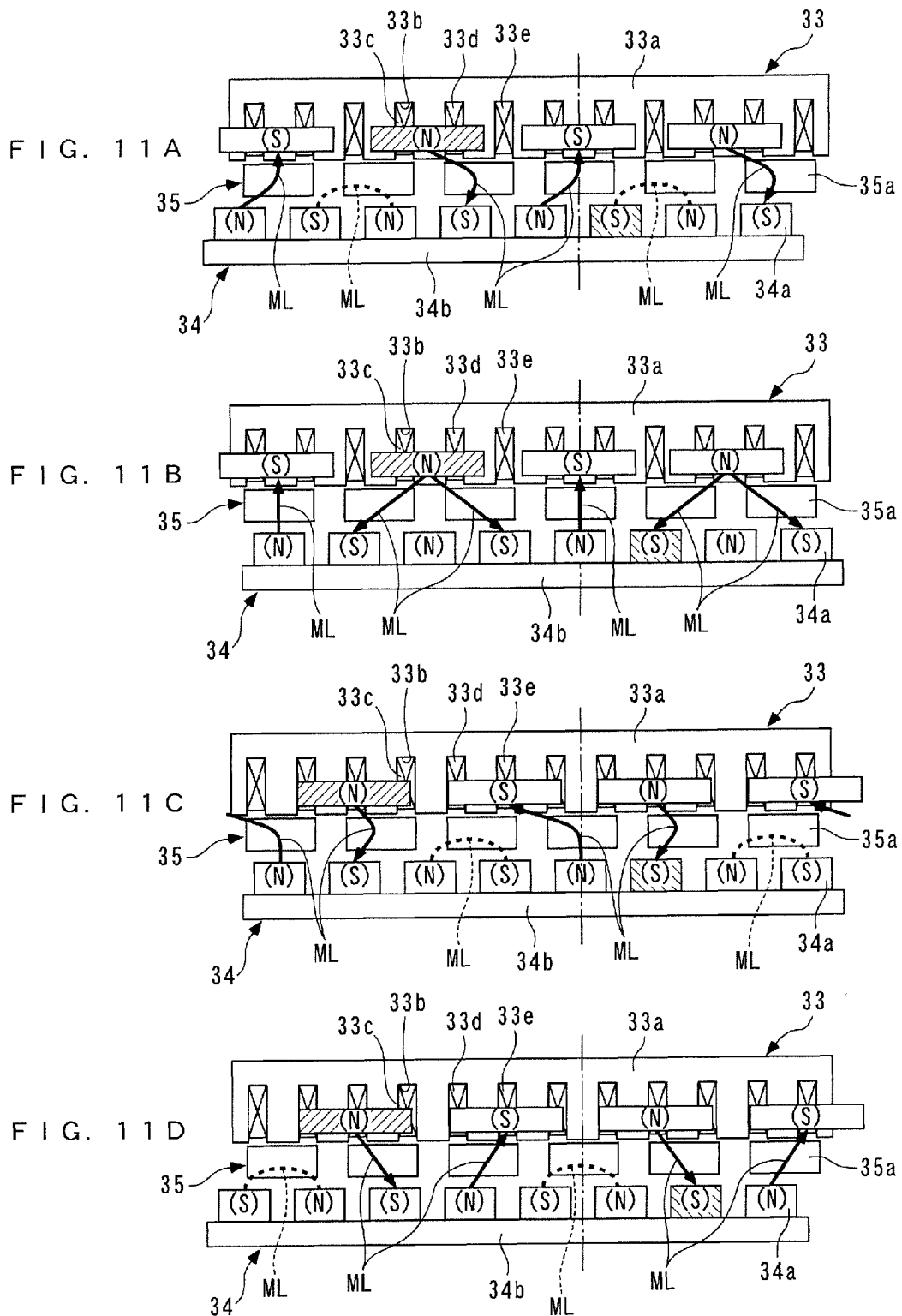
FIG. 11 Diagrams illustrating a continuation of the operation in FIG. 10.
Figure 12A:
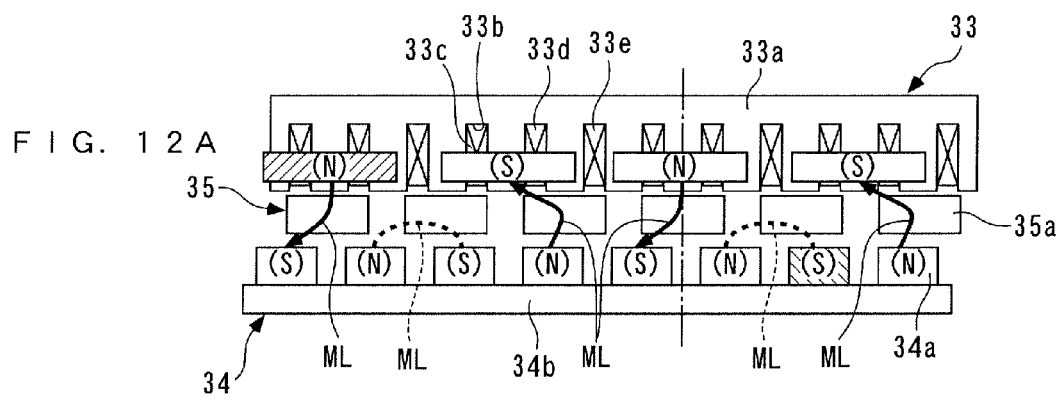
FIG. 12 Diagrams illustrating a continuation of the operation in FIG. 11.

Next, an operation in the case where electric power is supplied to the stator 33 in a state in which the second rotor 35 is held unrotatable will be described with reference to FIGS. 10 to 12. It should be noted that in FIGS. 10 to 12, one identical armature magnetic pole and one identical permanent magnet 34a are indicated by hatching for clarity. First, as shown in FIG. 10(a), similarly to the case shown in FIG. 6(a), from a state where the center of a certain core 35a and the center of a certain permanent magnet 34a are circumferentially coincident with each other, and the center of the third core 35a from the certain core 35a and the center of the fourth permanent magnet 34a from the permanent magnet 34a are circumferentially coincident with each other, the rotating magnetic field is generated such that it rotates leftward, as viewed in the figure. At the start of generation of the rotating magnetic field, the positions of two armature magnetic poles adjacent but one to each other that have the same polarity are caused to circumferentially coincide with the centers of corresponding ones of the respective permanent magnets 34a having centers coincident with the centers of cores 35a, and the polarity of these armature magnetic poles is made different from the polarity of the magnet magnetic poles of these permanent magnets 34a.

In the state shown in FIG. 10(a), similarly to the case shown in FIG. 6(a), magnetic force lines ML are generated in a manner connecting an armature magnetic pole, a core 35a and a magnet magnetic pole circumferential positions of which are coincident with each other, and at the same time in a manner connecting armature magnetic poles, cores 35a and magnet magnetic poles which are adjacent to the above-mentioned armature magnetic pole, core 35a, and magnet magnetic pole, respectively, on circumferentially opposite sides thereof. Further, in this state, since the magnetic force lines ML are straight, no magnetic forces for circumferentially rotating the permanent magnets 34a act on the permanent magnets 34a.

When the armature magnetic poles rotate from the positions shown in FIG. 10(a) to respective positions shown in FIG. 10(b) in accordance with rotation of the rotating magnetic field, the magnetic force lines ML are bent, and accordingly magnetic forces act on the permanent magnets 34a in such a manner that the magnetic force lines ML are made straight. In this case, the permanent magnets 34a are each positioned forward of a line of extension from an armature magnetic pole and a core 35a which are connected to each other by an associated one of the magnetic force lines ML, in the magnetic field rotation direction, and therefore the magnetic forces act on the permanent magnets 34a such that each permanent magnet 34a is caused to be positioned on the extension line, i.e. such that the permanent magnet 34a is driven in a direction opposite to the magnetic field rotation direction. The permanent magnets 34a are driven in a direction opposite to the magnetic field rotation direction by such action of the magnetic forces caused by the magnetic force lines ML, and rotate to respective positions shown in FIG. 10(c). The first rotor 34 provided with the permanent magnets 34a also rotates in the direction opposite to the magnetic field rotation direction.

As the rotating magnetic field further rotates, a sequence of the above-described operations, that is, the operations that "the magnetic force lines ML are bent and the permanent magnets 34a are each positioned forward of a line of extension from an armature magnetic pole and a core 35a which are connected to each other by an associated one of the magnetic force lines ML, in the magnetic field rotation direction→the magnetic forces act on the permanent magnets 34a in such a manner that the magnetic force lines ML are made straight→the permanent magnets 34a and the first rotor 34 rotate in the direction opposite to the magnetic field rotation direction" are repeatedly performed as shown in FIGS. 11(a) to 11(d), and FIGS. 12(a) and 12(b). As described above, in a case where electric power is supplied to the stator 33 in a state of the second rotor 35 being held unrotatable, the action of the magnetic forces caused by the magnetic force lines ML converts electric power supplied to the stator 33 to motive power, and outputs the motive power from the first rotor 34.

Figure 12B:
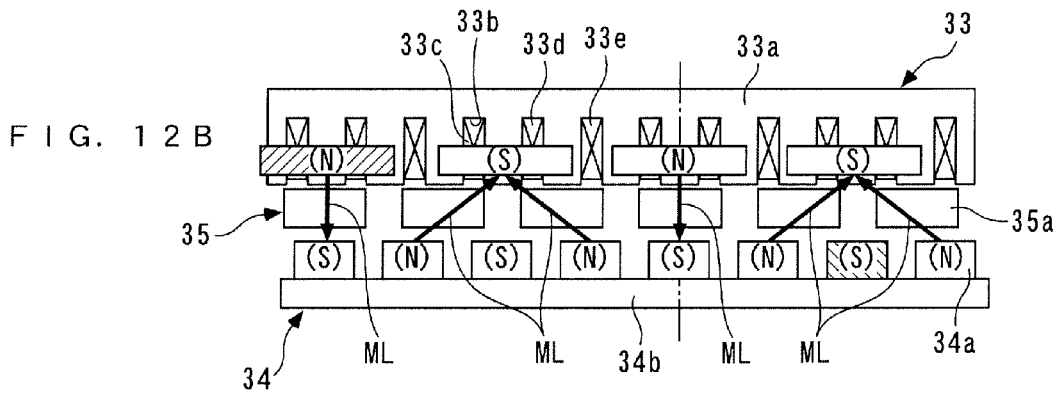

FIG. 12(b) shows a state in which the armature magnetic poles have rotated from the FIG. 10(a) state through the electrical angle of $2\pi$. As is apparent from a comparison between FIG. 12(b) and FIG. 10(a), it is understood that the permanent magnets 34a have rotated in the opposite direction through ½ of a rotational angle of the armature magnetic poles. This agrees with the fact that by substituting $\omega ER2=0$ into the aforementioned equation (40), $-\omega ER1=\omega MFR/2$ is obtained.

FIGS. 13 and 14 show results of simulations of control in which the numbers of the armature magnetic poles, the cores 35a, and the permanent magnets 34a are set to 16, 18 and 20, respectively; the first rotor 34 is held unrotatable; and motive power is output from the second rotor 35 by supplying electric power to the stator 33. FIG. 13 shows an example of changes in the U-phase to W-phase counter-electromotive force voltages Vcu to Vcw during a time period over which the second rotor electrical angle θER2 changes from 0 to 2π.

In this case, due to the fact that the first rotor 34 is held unrotatable, and the fact that the pole pair numbers of the armature magnetic poles and the magnet magnetic poles are equal to 8 and 10, respectively, and from the aforementioned equation (25), the relationship between the magnetic field electrical angular velocity ωMFR and the first and second rotor electrical angular velocities ωER1 and ωER2 is expressed by ωMFR=2.25·ωER2. As shown in FIG. 13, during a time period over which the second rotor electrical angle θER2 changes from 0 to 2π, the U-phase to W-phase counter-electromotive force voltages Vcu to Vcw are generated over approximately 2.25 repetition periods thereof. Further, FIG. 13 shows changes in the U-phase to W-phase counter-electromotive force voltages Vcu to Vcw, as viewed from the second rotor 35. As shown in the figure, with the second rotor electrical angle θER2 as the horizontal axis, the counter-electromotive force voltages are arranged in the order of the W-phase counter-electromotive force voltage Vcw, the V-phase counter-electromotive force voltage Vcv, and the U-phase counter-electromotive force voltage Vcu. This represents that the second rotor 35 rotates in the magnetic field rotation direction. The simulation results described above with reference to FIG. 13 agree with the relationship of ωMFR=2.25·ωER2, based on the aforementioned equation (25).

Further, FIG. 14 shows an example of changes in the driving equivalent torque TSE, and the first and second rotor transmission torques TR1 and TR2. In this case, due to the fact that the pole pair numbers of the armature magnetic poles and the magnet magnetic poles are equal to 8 and 10, respectively, and from the aforementioned equation (32), the relationship between the driving equivalent torque TSE, and the first and second rotor transmission torques TR1 and TR2 is represented by TSE=TR1/1.25=−TR2/2.25. As shown in FIG. 14, the driving equivalent torque TSE is approximately equal to −TREF; a first rotor transmission torque TR1 is approximately equal to 1.25·(−TREF); and the second rotor transmission torque TR2 is approximately equal to 2.25·TREF. This TREF represents a predetermined torque value (e.g. 200 Nm). The simulation results described above with reference to FIG. 14 agree with the relationship of TSE=TR1/1.25=−TR2/2.25, based on the aforementioned equation (32).

Figure 15:
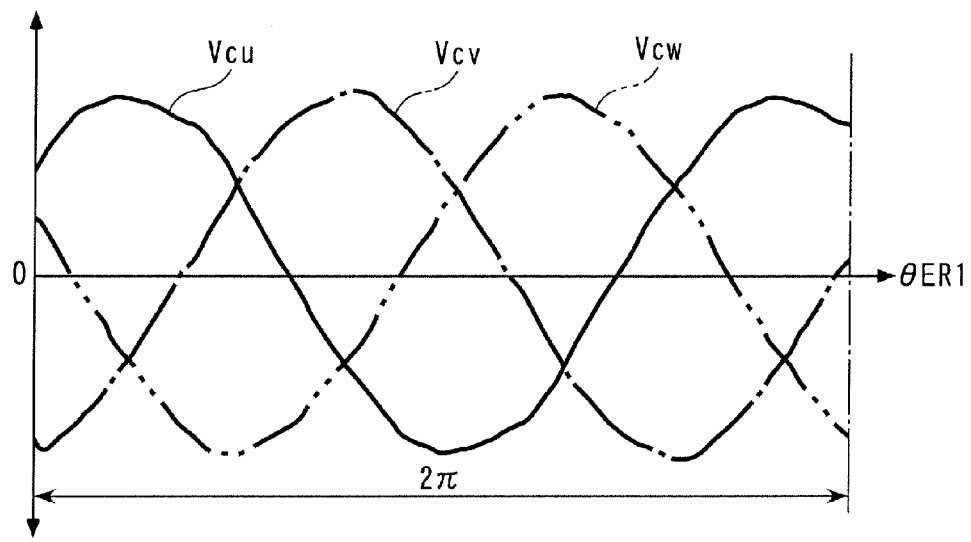
FIG. 15 A diagram illustrating an example of changes in the U-phase to W-phase counter-electromotive force voltages in the case where the second rotor of the rotating machine in the present invention is held unrotatable.
Figure 16:
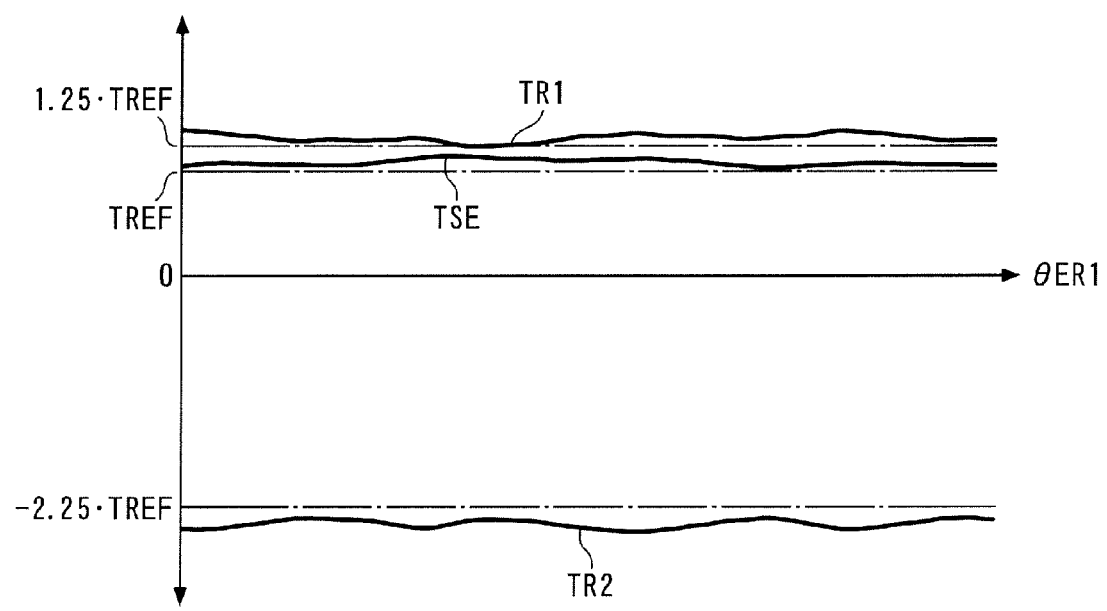
FIG. 16 A diagram illustrating an example of changes in the driving equivalent torque, and the first and second rotor transmission torques in the case where the second rotor of the rotating machine in the present invention is held unrotatable.

FIGS. 15 and 16 show results of simulations of control in which the numbers of the armature magnetic poles, the cores 35a, and the permanent magnets 34a are set in the same manner as in the cases illustrated in FIGS. 13 and 14; the second rotor 35 is held unrotatable in place of the first rotor 34; and motive power is output from the first rotor 34 by supplying electric power to the stator 33. FIG. 15 shows an example of changes in the U-phase to W-phase counter-electromotive force voltages Vcu to Vcw during a time period over which the first rotor electrical angle θ ER1 changes from 0 to 2π.

In this case, due to the fact that the second rotor 35 is held unrotatable, and the fact that the pole pair numbers of the armature magnetic poles and the magnet magnetic poles are equal to 8 and 10, respectively, and from the aforementioned equation (25), the relationship between the magnetic field electrical angular velocity ωMFR and the first and second rotor electrical angular velocities ωER1 and ωER2 is expressed by ωMFR=−1.25·ωER1. As shown in FIG. 15, during a time period over which the first rotor electrical angle θER1 changes from 0 to 2π, the U-phase to W-phase counter-electromotive force voltages Vcu to Vcw are generated over approximately 1.25 repetition periods thereof. Further, FIG. 15 shows changes in the U-phase to W-phase counter-electromotive force voltages Vcu to Vcw, as viewed from the first rotor 34. As shown in the figure, with the first rotor electrical angle θER1 as the horizontal axis, the counter-electromotive force voltages are arranged in the order of the U-phase counter-electromotive force voltage Vcu, the V-phase counter-electromotive force voltage Vcv, and the W-phase counter-electromotive force voltage Vcw. This represents that the first rotor 34 rotates in the direction opposite to the magnetic field rotation direction. The simulation results described above with reference to FIG. 15 agree with the relationship of ωMFR=−1.25·ωER1, based on the aforementioned equation (25).

Further, FIG. 16 shows an example of changes in the driving equivalent torque TSE, and the first and second rotor transmission torques TR1 and TR2. Also in this case, similarly to the FIG. 14 case, the relationship between the driving equivalent torque TSE, and the first and second rotor transmission torques TR1 and TR2 is represented by TSE=TR1/1.25=−TR2/2.25 from the aforementioned equation (32). As shown in FIG. 16, the driving equivalent torque TSE is approximately equal to TREF; the first rotor transmission torque TR1 is approximately equal to 1.25·TREF; and the second rotor transmission torque TR2 is approximately equal to −2.25·TREF. The simulation results described above with reference to FIG. 16 agree with the relationship of TSE=TR1/1.25=−TR2/2.25, based on the aforementioned equation (32).

As described above, in the rotating machine 31, when the rotating magnetic field is generated by supplying electric power to the stator 33, the aforementioned magnetic force lines ML are generated in a manner connecting between the magnet magnetic poles, the cores 35a and the armature magnetic poles, and the action of the magnetic forces caused by the magnetic force lines ML converts the electric power supplied to the armatures to motive power, and the motive power is output from the first rotor 34 and the second rotor 35. In this case, the relationship as expressed by the aforementioned equation (40) holds between the magnetic field electrical angular velocity ωMFR, and the first and second electrical angular velocities ωER1 and ωER2, and the relationship as expressed by the aforementioned equation (41) holds between the driving equivalent torque TSE, and the first and second rotor transmission torques TR1 and TR2.

Therefore, by supplying motive power to at least one of the first and second rotors 34 and 35, without electric power being supplied to the stator 33, the at least one rotor is caused to rotate with respect to the stator 33. This causes electric power to be generated by the armatures, and generates a rotating magnetic field. In this case as well, magnetic force lines ML are generated in a manner connecting between the magnet magnetic poles, the soft magnetic material elements, and the armature magnetic poles, and the action of the magnetic forces caused by the magnetic force lines ML causes the relationship of the electrical angular velocities shown in the equation (40) and the relationship of the torques shown in the equation (41) to hold.

That is, assuming that a torque equivalent to the generated electric power and the magnetic field electrical angular velocity ωMFR is an electric power-generating equivalent torque TGE, there holds the relationship expressed by the equation (41) between this electric power-generating equivalent torque TGE, and the first and second rotor transmission torques TR1 and TR2. As is clear from the above, the rotating machine according to the present invention has the same functions as those of an apparatus formed by combining a planetary gear unit and a general one-rotor-type rotating machine.

Figure 2:
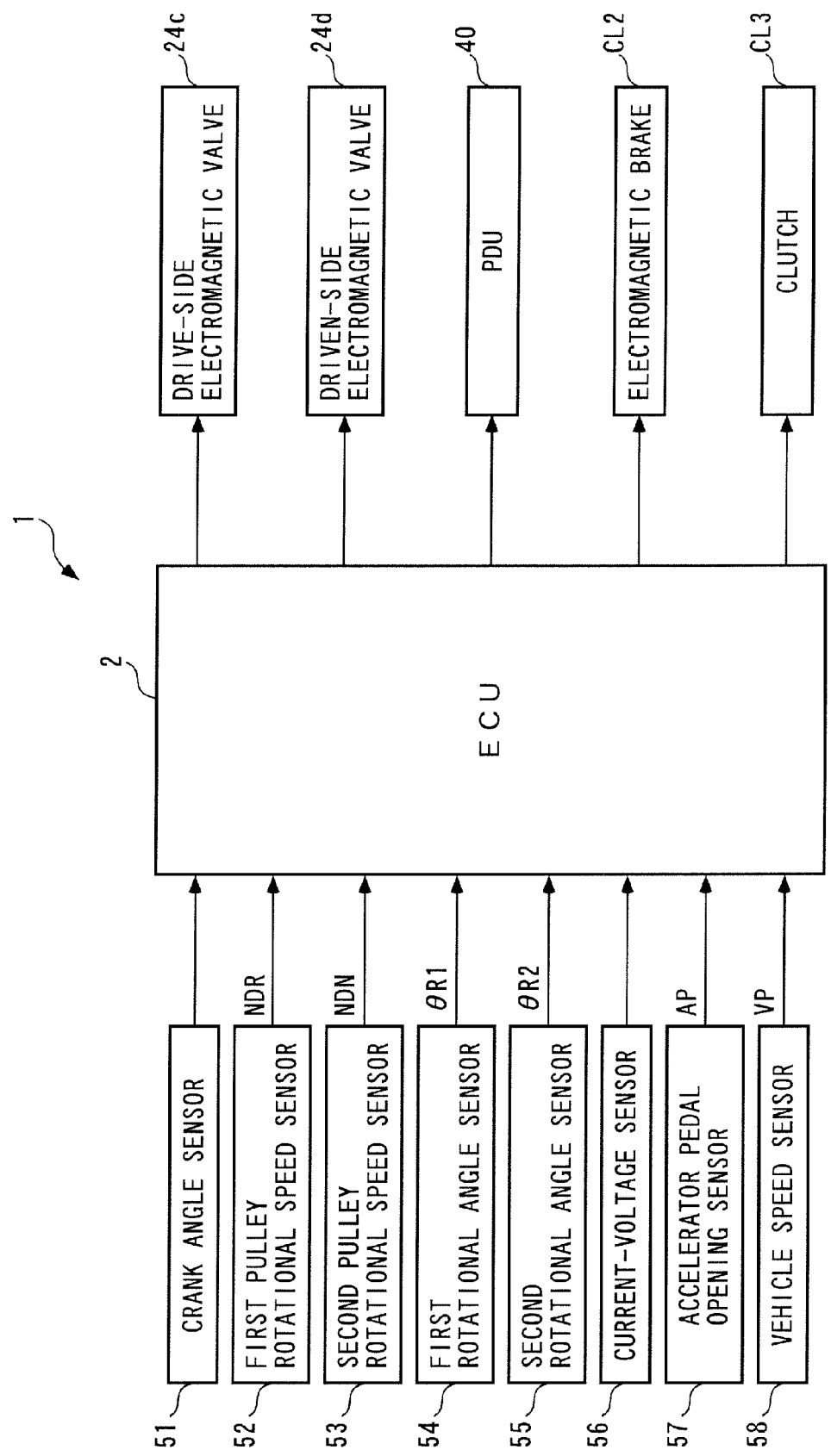
FIG. 2 A block diagram of a control system for controlling an engine and a rotating machine.

Further, as shown in FIG. 2, a crank angle sensor 51 detects the crank angle position of the crankshaft 3a, and delivers a signal indicative of the sensed crank angle position to the ECU 2. The ECU 2 calculates engine speed NE based on the crank angle position. Further, a first pulley rotational speed sensor 52 and a second pulley rotational speed sensor 53 delivers a detection signal indicative of a drive-side pulley rotational speed NDR as the rotational speed of the aforementioned drive pulley 21 and a detection signal indicative of a driven-side pulley rotational speed NDN as the rotational speed of the aforementioned driven pulley 22 to the ECU 2. The ECU 2 calculates a transmission ratio RATIO (=NDR/NDN) of the stepless transmission 20 based on the drive-side pulley rotational speed NDR and the driven-side pulley rotational speed NDN.

Further, a first rotational angle sensor 54 and a second rotational speed sensor 55 deliver respective detection signals indicative of the first and second rotor rotational angles θR1 and θR2 to the ECU 2. The ECU 2 calculates the rotational speeds of the first and second rotors 34 and 35 (hereinafter referred to as the "first rotor rotational speed VR1" and the "second rotor rotational speed VR2", respectively) based on the respective detected first and second rotor rotational angles θR1 and θR2. Further, the ECU 2 controls the PDU 40 based on the first and second rotor rotational angles θR1 and θR2 and the aforementioned equation (39), to thereby control electric power supplied to the stator 33, electric power generated by the stator 33, and the rotational speed of the rotating magnetic field (hereinafter referred to as the "magnetic field rotational speed") VMF.

Further, a current-voltage sensor 56 outputs detection signals indicative of current and voltage values input to and output from the battery 45 to the ECU 2. The ECU 2 calculates a charged state SOC of the battery 45 based on the detection signals. Furthermore, an accelerator pedal opening sensor 57 delivers a detection signal indicative of an accelerator pedal opening AP as a stepped-on amount of an accelerator pedal (not shown) of the vehicle to the ECU 2. A vehicle speed sensor 58 delivers a detection signal indicative of a vehicle speed VP to the ECU 2.

The ECU 2 is implemented by a microcomputer comprised of an I/O interface, a CPU, a RAM and a ROM, and controls the operations of the engine 3 and the rotating machine 31 based on the detection signals from the aforementioned sensors 51 to 58.

Next, a description will be given of the operation of the power plant 1 performed under the control of the ECU 2. Operation modes of the power plant 1 include EV creep, EV standing start, ENG start during EV traveling, ENG traveling, deceleration regeneration, ENG start during stoppage of the vehicle, ENG creep, and ENG-based standing start. Hereafter, a description will be sequentially given of the operation modes, starting with the EV creep. Further, as to all the rotary elements of the power plant 1, rotation in the same direction as the direction of normal rotation of the crankshaft 3a of the engine 3 is referred to as "normal rotation", and rotation in the same direction as the direction of reverse rotation of the crankshaft 3a is referred to as "reverse rotation".

EV Creep

The EV creep is an operation mode for performing a creep operation of the vehicle using only the rotating machine 31 as a drive source in a state where the engine 3 is stopped. During the EV creep, the rotation of the second rotor 35 is permitted by controlling the electromagnetic brake CL2 to the OFF state, and by disengaging the clutch CL3, the connection between the crankshaft 3a and the drive wheels DW and DW via the aforementioned first power transmission path PT1 is released. Further, electric power is supplied from the battery 45 to the stator 33 to generate a rotating magnetic field such that the rotating magnetic field performs normal rotation.

Figure 17:
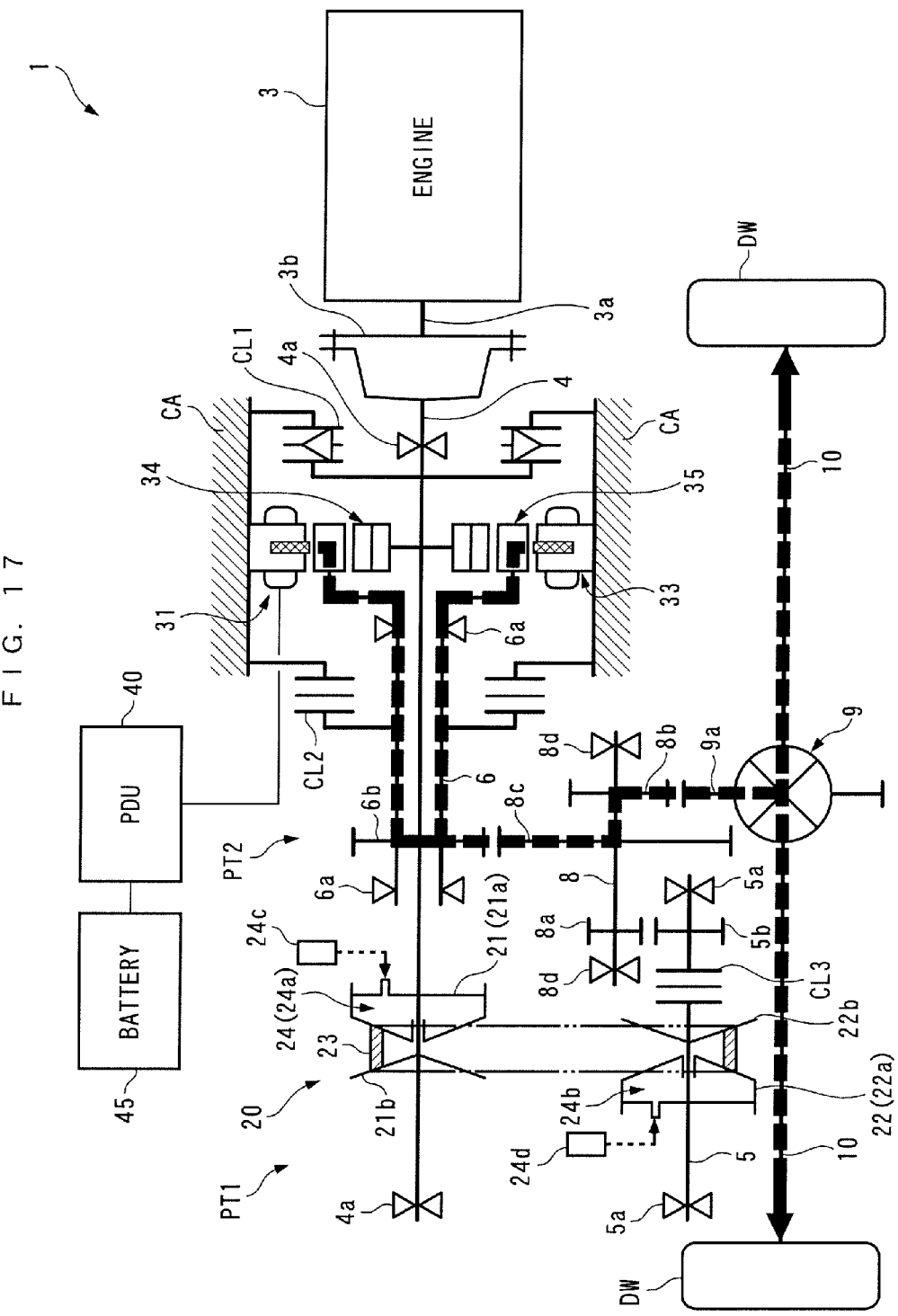
FIG. 17 A diagram showing a state of transmission of torque in the power plant shown in FIG. 1 during EV creep.

As described hereinabove, the one-way clutch CL1 blocks the first rotor 34 from performing reverse rotation together with the crankshaft 3a. Therefore, as is clear from the functions of the rotating machine 31, described above, and the aforementioned equation (41), torque having a magnitude three times as large as that of the driving equivalent torque TSE is transmitted to the second rotor 35 in accordance with supply of electric power to the stator 33. This torque acts on the second rotor 35 to cause the same to perform normal rotation since the reverse rotation of the first rotor 34 is blocked and the rotating magnetic field is caused to perform normal rotation. Further, as shown in FIG. 17, the torque transmitted to the second rotor 35 is transmitted to the drive wheels DW and DW via the second power transmission path PT2, the differential gear mechanism 9, and so forth without via the stepless transmission 20. As a consequence, the drive wheels DW and DW perform normal rotation to cause forward travel of the vehicle. In this case, the electric power supplied to the stator 33 is controlled such that the second rotor rotational speed VR2 becomes very small, whereby the creep operation with a very low vehicle speed VP is carried out. In FIG. 17 and other figures showing states of transmission of torque, referred to hereinafter, a thick broken line with an arrow indicates a flow of torque. Further, although in the stator 33, actually, torque is transmitted in the form of electric energy, in FIG. 17 and other figures showing states of transmission of torque, referred to hereinafter, the input and output of energy to and from the stator 33 is indicated by hatching added to the flow of torque, for convenience.

EV Standing Start

The EV standing start is an operation mode for causing the vehicle to start and travel from the above-described EV creep, using only the rotating machine 31 as a drive source in the state where the engine 3 is stopped. At the time of the EV standing start, the electromagnetic brake CL2 and the clutch CL3 are controlled in the same manner as carried out during the above-described EV creep (the electromagnetic brake CL2: turned off; the clutch CL3: disengaged), and the power supplied from the battery 45 to the stator 33 is increased to increase the driving equivalent torque TSE and at the same time increase the magnetic field rotational speed VMF of the rotating magnetic field performing normal rotation. As indicated by a solid line in FIG. 18, this causes the second rotor rotational speed VR2 to be increased from approximately 0 (indicated by a broken line in the figure) in a state where the first rotor rotational speed VR1 is equal to 0, i.e. the crankshaft 3a is at rest, and in accordance therewith, the rotational speed of the drive wheels DW and DW having the second rotor 35 connected thereto increases, i.e. the vehicle makes a standing start to travel.

Figure 18:
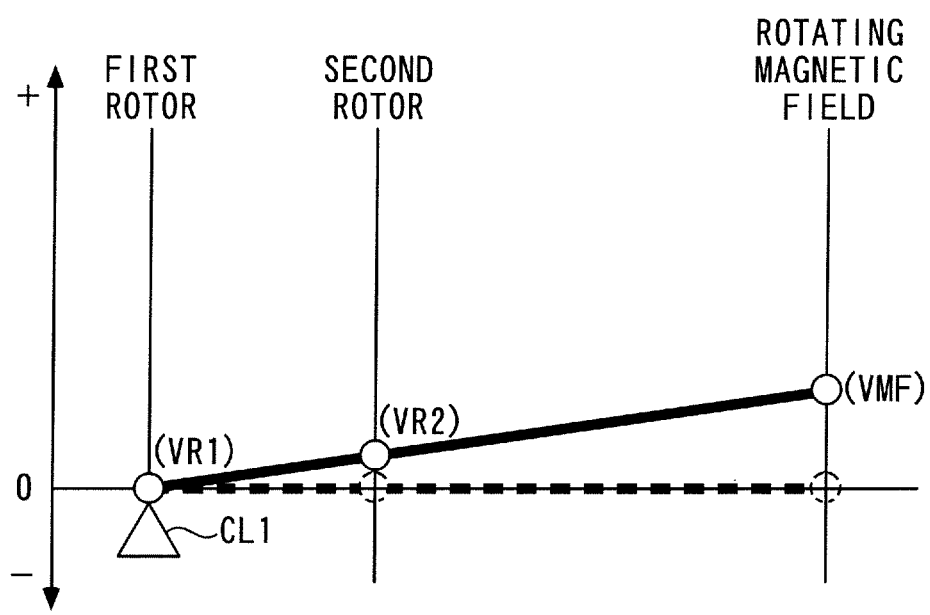
FIG. 18 A velocity nomograph illustrating an example of the relationship between a magnetic field rotational speed, and first and second rotor rotational speeds in the power plant shown in FIG. 1 at the time of EV standing start.
Figure 65:
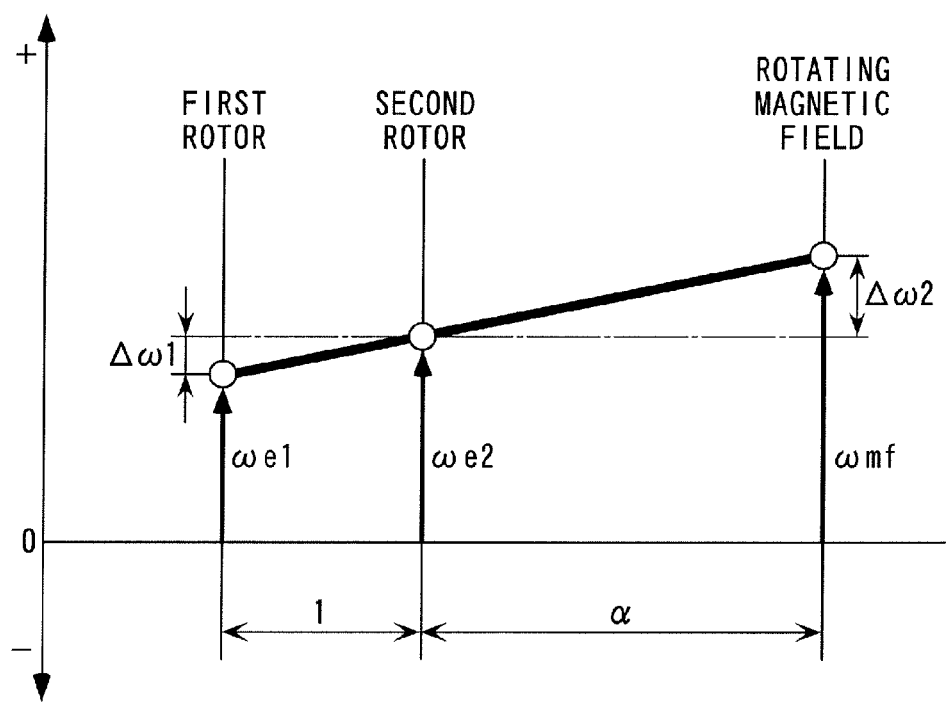
FIG. 65 A velocity nomograph illustrating an example of the relationship between the magnetic field electrical angular velocity, and the first and second rotor electrical angular velocities in the rotating machine according to the present invention.

It should be noted that similarly to the aforementioned velocity nomograph shown in FIG. 65, in the FIG. 18 velocity nomograph, vertical lines intersecting with a horizontal line indicative of a value of 0 are for representing the respective rotational speeds of parameters, and the distance between a white circle shown on each vertical line and the horizontal line corresponds to the rotational speed of each parameter. In the figure and other velocity nomographs, referred to hereinafter, for convenience, symbols indicative of the rotational speeds of the parameters are denoted close to the white circles associated therewith, and the direction of normal rotation and the direction of reverse rotation are represented by "+" and "−", respectively.

ENG Start During EV Traveling

Figure 19:
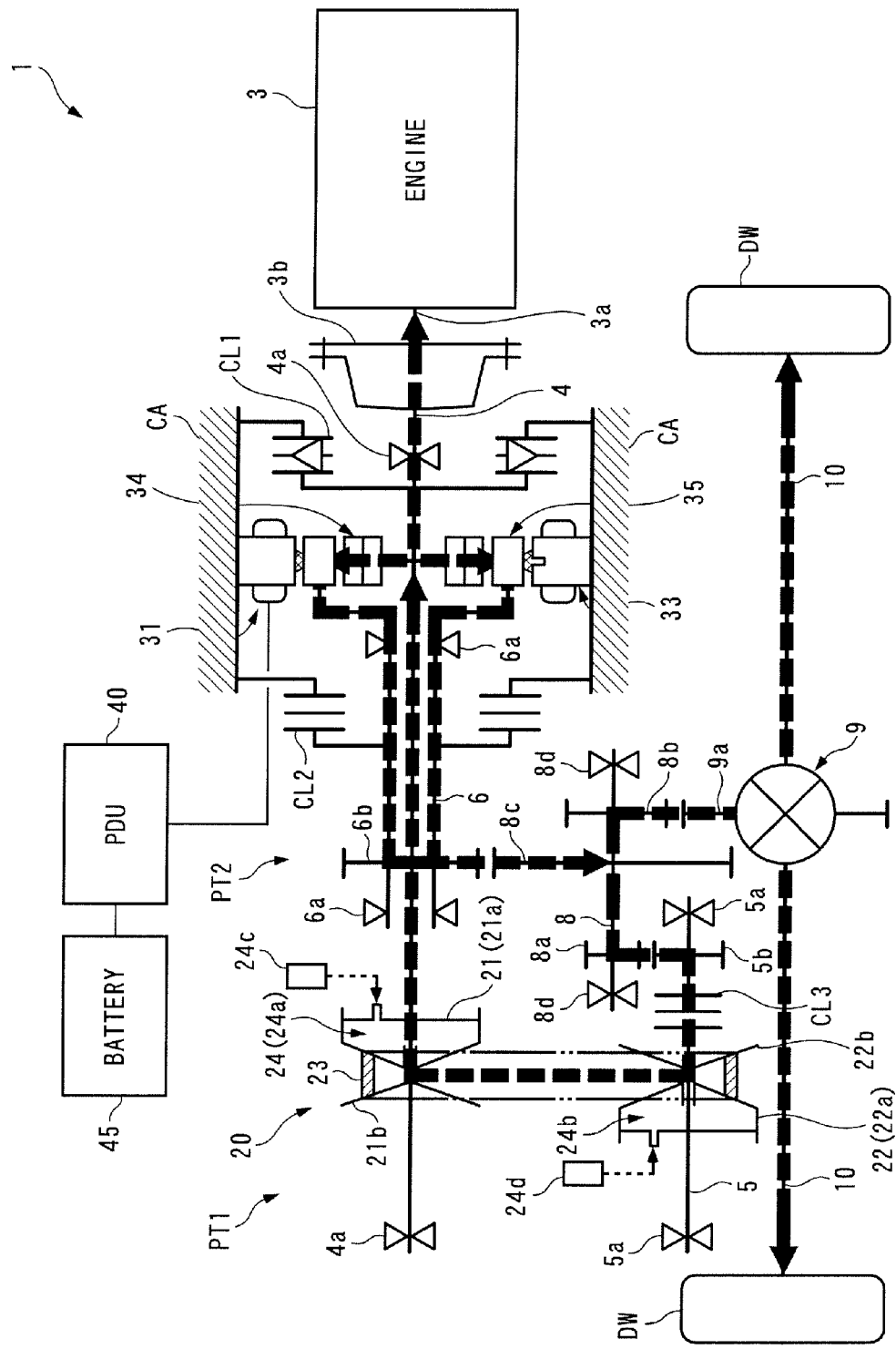
FIG. 19 A diagram showing a state of transmission of torque in the power plant shown in FIG. 1 at the time of ENG start during EV traveling.
Figure 20A:
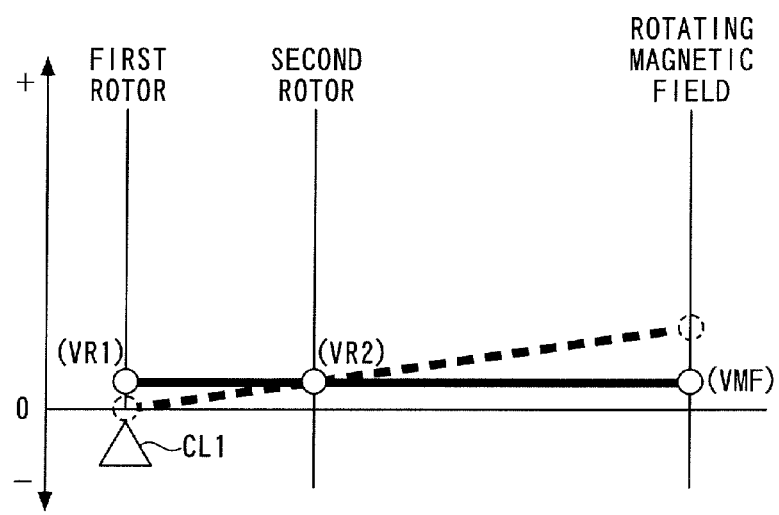
FIG. 20 A velocity nomograph illustrating an example of the relationship between the magnetic field rotational speed, and the first and second rotor rotational speeds in the power plant shown in FIG. 1 at the time of the ENG start during the EV traveling, in respective cases of (a) the vehicle speed being relatively low, and (b) the vehicle speed being relatively high.

The ENG start during EV traveling is an operation mode for starting the engine 3 during traveling of the vehicle after the above-described EV standing start. At the time of the ENG start during EV traveling, the clutch CL3 having been disengaged at the time of the EV standing start is engaged to thereby connect the drive wheels DW and DW to the crankshaft 3a via the first power transmission path PT1 (the electromagnetic brake CL2 is controlled to the OFF state). As shown in FIG. 19, this causes part of the driving equivalent torque TSE from the rotating machine 31 to be transmitted to the first main shaft 4 from the idler shaft 8, via the auxiliary shaft 5 and the stepless transmission 20. After that, part of the transmitted torque is further transmitted to the second rotor 35 via the first rotor 34, and the remaining torque is transmitted to the engine 3. In this state, as indicated by a solid line in FIG. 20(a), the magnetic field rotational speed VMF is lowered from the state (shown by broken line in the figure) before engagement of the clutch CL3 such that the second rotor rotational speed VR2 is held at the value assumed then. This causes the first rotor 34 and the crankshaft 3a to perform normal rotation, thereby increasing the first rotor rotational speed VR1 and the engine speed NE. In this state, according to the detected crank angle position, the ignition operation of fuel injection valves and spark plugs (none of which are shown) of the engine 3 are controlled, whereby the engine 3 is started.

Further, when the ENG start during EV traveling is performed, the driving equivalent torque TSE, i.e. the electric power supplied to the stator 33 and the magnetic field rotational speed VMF, is controlled such that torque is sufficiently transmitted to the drive wheels DW and DW and the engine 3. Further, when connecting the clutch CL3, the degree of engagement thereof is controlled to be progressively increased. This prevents the torque transmitted to the drive wheels DW and DW from suddenly dropping, thereby making it possible to secure excellent drivability. Further, the transmission ratio RATIO of the stepless transmission 20 is controlled according to the magnetic field rotational speed VMF, and the first and second rotor rotational speeds VR1 and VR2, such that the relationship of these speeds shown in the equation (40) is maintained.

Figure 20B:
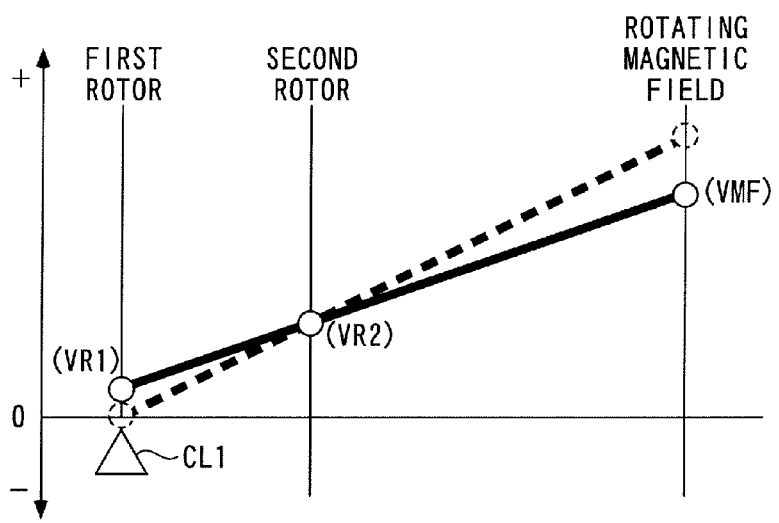

Further, at the time of the ENG start during EV traveling, as indicated by a solid line in FIG. 20(b) (broken line in the figure: before engagement of the clutch CL3), even when the second rotor rotational speed VR2, i.e. the vehicle speed VP is relatively high, differently from the type in which the engine and the rotating machine are directly connected, it is possible to start the engine 3 while holding the first rotor rotational speed VR1, i.e. the engine speed NE relatively low through the control of the aforementioned transmission ratio RATIO and the magnetic field rotational speed VMF. Therefore, it is possible to suppress torque variation at the start of the engine 3 and vibrations and noise caused by the start of the engine 3, which makes it possible to improve marketability.

ENG Traveling

The ENG traveling is an operation mode for causing the vehicle to travel using the power from the engine 3. During the ENG traveling, the electromagnetic brake CL2 is controlled to the OFF state, and at the same time the clutch C13 is engaged to thereby connect the crankshaft 3a to the drive wheels DW and DW via the first power transmission path PT1. Further, basically, the power from the engine 3 is subjected to a speed change by the stepless transmission 20, and is transmitted to the drive wheels DW and DW via the first power transmission path PT1. The operation of the engine 3 and the transmission ratio RATIO of the stepless transmission 20 are controlled according to the calculated engine speed NE, the detected accelerator opening AP and so forth.

Further, during the ENG traveling, when one of the following conditions (a) and (b) is satisfied, electric power is supplied to the stator 33 from the battery 45 to assist the engine 3 by the rotating machine 31.

(a) demanded torque PMCMD>predetermined upper limit value PMH (b) charged state SOC>first predetermined value SOCL Here, the demanded torque PMCMD is a torque demanded of the vehicle, and is calculated according to the detected vehicle speed VP and accelerator opening AP. The upper limit value PMH is set to a value slightly smaller than the upper limit toque that can be transmitted by the stepless transmission 20. The first predetermined value SOCL is set to such a value as will not cause overdischarge of the battery 45. Thus, the assist by the rotating machine 31 is carried out when the demanded torque PMCMD is close to the upper limit torque that can be transmitted by the stepless transmission 20 or when the amount of electric power remaining in the battery 45 is large enough.

Figure 21:
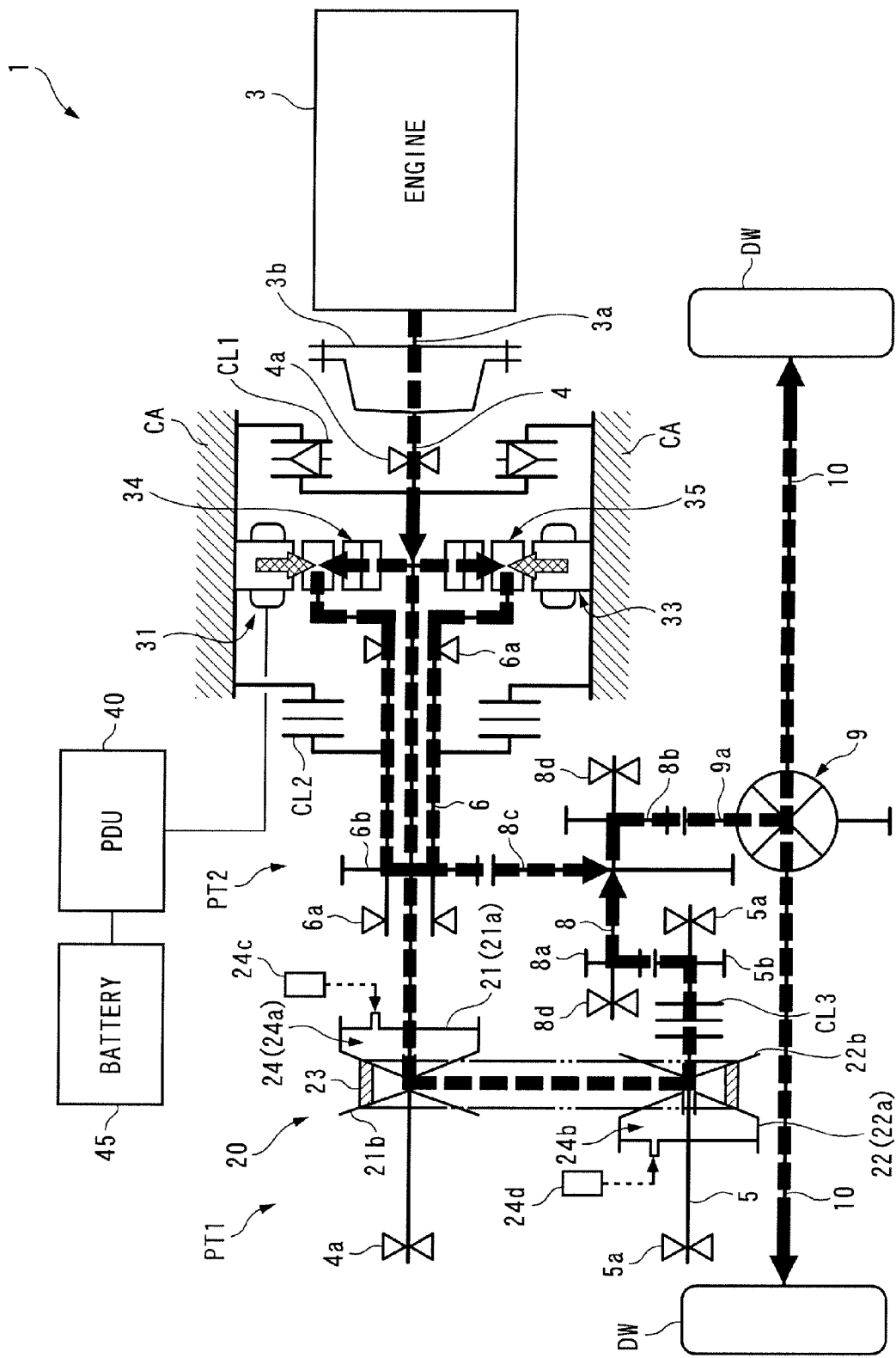
FIG. 21 A diagram showing a state of transmission of torque in the power plant shown in FIG. 1 during assist.

Further, in the rotating machine 31, from the above-described functions thereof, when the directions of the rotations of the rotating magnetic field and the first and second rotors 34 and 35 are identical to each other, the driving equivalent torque TSE and the first rotor transmission torque TR1 are combined as positive torque, and the combined torque is delivered as the second rotor transmission torque TR2. Therefore, during the assist by the rotating machine 31, as shown in FIG. 21, as the driving equivalent torque TSE is transmitted to the second rotor 35, part of the torque of the engine 3 is transmitted to the second rotor 35 via the first rotor 34. Thus, the combined torque formed by combining the driving equivalent torque TSE and part of the torque of the engine 3 is transmitted to the second rotor 35. In this case, as is clear from the aforementioned equation (41), the torque having a magnitude twice as large as that of the driving equivalent torque TSE is transmitted from the engine 3 to the first rotor 34.

Further, the torque transmitted to the second rotor 35 is transmitted to the drive wheels DW and DW via the second power transmission path PT2 and the differential gear mechanism 9, and the remaining torque of the engine 3 is transmitted to the drive wheels DW and DW via the first power transmission path PT1, such as the stepless transmission 20, and the differential gear mechanism 9. As a result, assuming that there is no change in speed by gears or the like, the torque transmitted to the drive wheels DW and DW is equal to the sum of the torque of the engine 3 and the driving equivalent torque TSE. Further, the outputs of the engine 3 and the rotating machine 31 are controlled such that the optimum efficiency is obtained within a range within which the demanded torque PMCMD can be generated.

Further, during the assist by the rotating machine 31 during the ENG traveling, the transmission ratio RATIO of the stepless transmission 20 is controlled in the following manner: First, a target engine speed NECMD and a target magnetic field rotational speed VMFCMD are calculated by searching a NECMD map and a VMFCMD map (neither of which is shown) according to the demanded torque PMCMD and the vehicle speed VP. In these maps, the NECMD value and the VMFCMD value are set such that with respect to the demanded torque PMCMD and the vehicle speed VP at the time, the optimum efficiencies of the engine 3 and the rotating machine 31 are obtained, and the relation between the magnetic field rotational speed VMF, and the first and second rotor rotational speeds VR1 and VR2 shown in the aforementioned equation (40) is maintained. Then, the transmission ratio RATIO is controlled such that the engine speed NE and the magnetic field rotational speed VMF become equal to the calculated NECMD value and VMFCMD value, respectively. This controls the speed relationship between the first and second rotors 34 and 35 such that the magnetic field rotation direction of the rotating magnetic fields becomes identical to the direction of the rotations of the first and second rotors 34 and 35.

Further, during the ENG traveling, if both the following equations (c) and (d) are satisfied, by controlling the PDU 40, the rotating machine 31 generates electric power, and the generated electric power is used to charge the battery 45. This electric power generation is performed using the power from the engine 3 transmitted to the second rotor 35 via the first power transmission path PT1, the idler shaft 8, and the second power transmission path PT2. Hereinafter, this electric power generation is referred to as "the drive-time electric power generation").

(C) demanded torque PMCMD predetermined upper limit value PMEH of electric power that can be generated (d) charged state SOC<second predetermined value SOCH Here, the predetermined upper limit value PMEH of electric power that can be generated is set to a value smaller than the aforementioned upper limit value PMH. The second predetermined value SOCH is set to such a value as will not cause overcharge of the battery 45. That is, the drive-time electric power generation is performed when the demanded torque PMCMD and the charged state SOC are relatively small.

Figure 22:
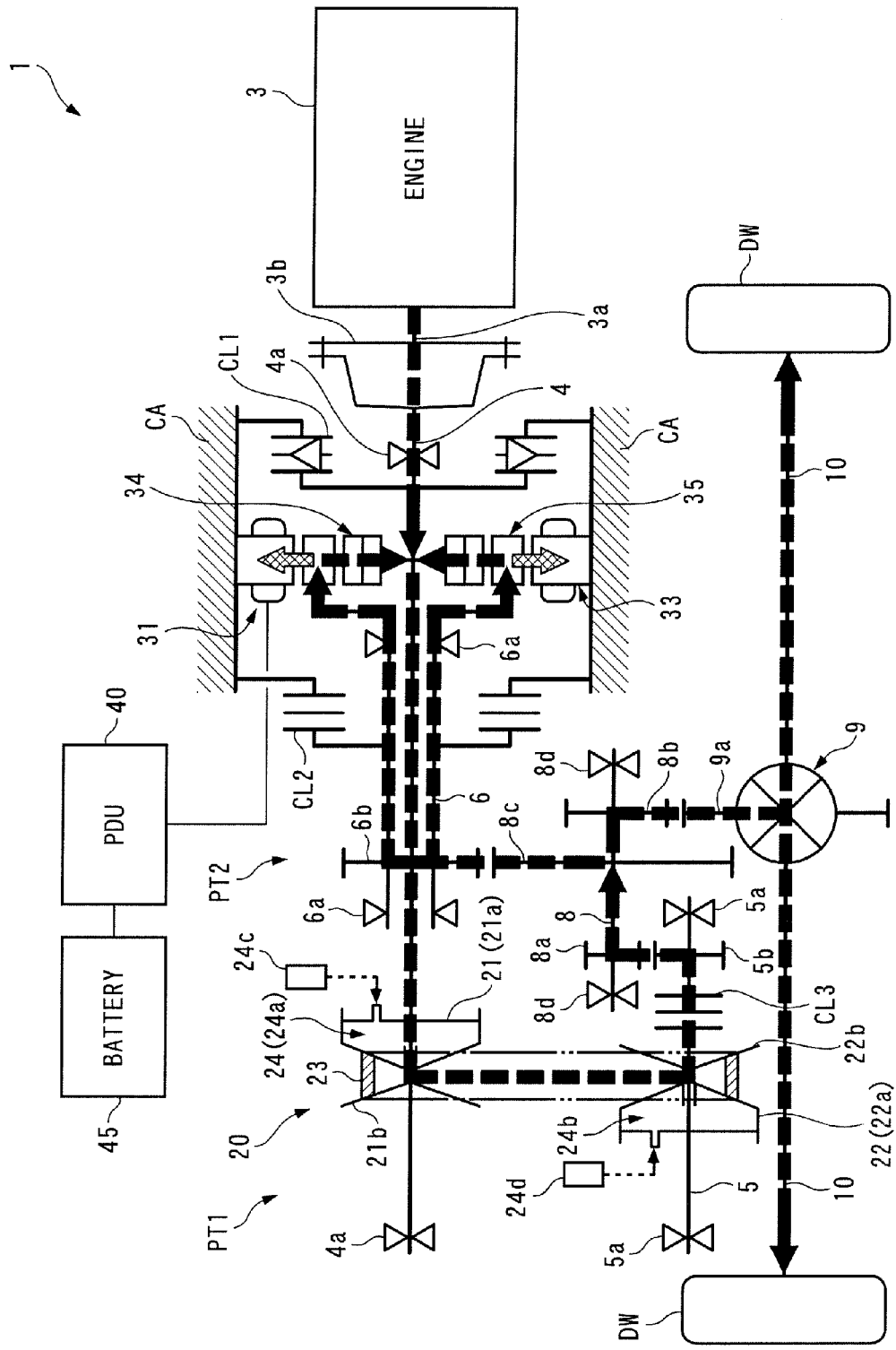
FIG. 22 A diagram showing a state of transmission of torque in the power plant shown in FIG. 1 during drive-time electric power generation.

Further, in the rotating machine 31, from the above-described functions thereof, when the directions of the rotations of the rotating magnetic field and the first and second rotors 34 and 35 are identical to each other, during electric power generation, the second rotor transmission torque TR2 is divided and delivered as the electric power-generating equivalent torque TGE and the first rotor transmission torque TR1. Therefore, as shown in FIG. 22, during the drive-time electric power generation, as part of the torque of the engine 3 is transmitted to the stator 33 via the second rotor 35 as the electric power-generating equivalent torque TGE, part of the torque of the engine 3 is also transmitted to the first rotor 34 via the second rotor 35. In this case, the distribution ratio is TGE:TR1=1:2 since the equation (41) is also satisfied during electric power generation, as described hereinabove.

Further, during the drive-time electric power generation, the torque transmitted to the first rotor 34, as described above, and the torque of the engine 3 are combined, and then the combined torque is transmitted to the idler shaft 8 via the first power transmission path PT1 including the stepless transmission 20. Part of the torque transmitted to the idler shaft 8 is transmitted to the drive wheels DW and DW, and the remaining torque is transmitted to the second rotor 35 via the second power transmission path PT2. In this case, assuming that there is no change in speed by the gears, the torque transmitted to the drive wheels DW and DW has a magnitude equal to a value obtained by subtracting the electric power-generating equivalent torque TGE from the torque of the engine 3.

Further, during the drive-time electric power generation, the output of the engine 3, and electric power generated by the rotating machine 31 are controlled such that the optimum efficiency is obtained within the range within which the demanded torque PMCMD can be generated. Furthermore, the control of the transmission ratio RATIO of the stepless transmission 20 is carried out in the same manner as carried out during the assist. This controls the speed relationship between the first and second rotors 34 and 35 in the same manner as carried out during the assist such that the magnetic field rotation direction becomes identical to the direction of the rotations of the first and second rotors 34 and 35. In this, however, different maps from those used during the assist are used for searching the target engine speed NECMD and the target magnetic field rotational speed VMFCMD.

Figure 23:
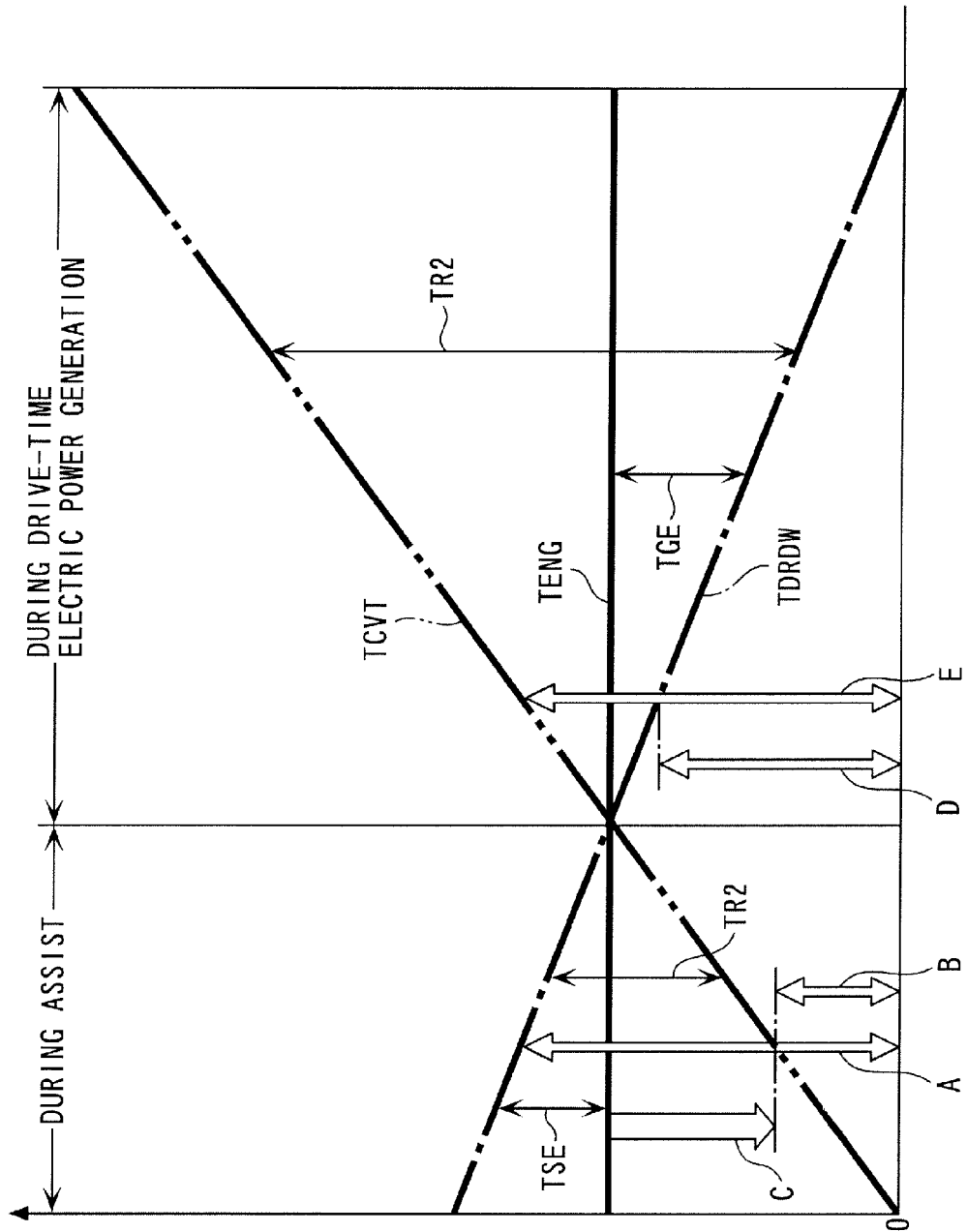
FIG. 23 A diagram showing ratios of foot axis drive torque, CVT transmission torque, and the like to engine torque in the power plant shown in FIG. 1, when holding the engine torque constant during the assist and the drive-time electric power generation.

FIG. 23 is a diagram which shows, assuming that a torque of the engine 3 (hereinafter referred to as the "engine torque") TENG generated by the combustion of the mixture supplied to the engine during the assist and the drive-time electric power generation by the rotating machine 31 is constant, respective ratios of torques transmitted to the drive wheels DW and DW, the stepless transmission 20, etc. to the engine torque TENG. It should be noted that in FIG. 23, it is assumed that there is no change in speed by the gears. As shown in the figure, during the assist, torque transmitted to the drive wheels DW and DW during the assist (hereinafter referred to as "foot axis drive torque") TDRDW is equal to the sum of the engine torque TENG and the driving equivalent torque TSE and becomes larger as the TSE value becomes larger.

Further, as described hereinabove, during the assist, part of the engine torque TENG is transmitted to the first rotor 34, and the remaining torque is transmitted to the stepless transmission 20. The first rotor transmission torque TR1 transmitted to the first rotor 34 and the driving equivalent torque TSE are combined to be transmitted to the second rotor 35. Because of this fact and the fact that the first rotor transmission torque TR1 has a magnitude twice as large as that of the driving equivalent torque TSE, as shown in FIG. 23, the second rotor transmission torque TR2 becomes larger as the driving equivalent torque TSE is larger. Further, as the driving equivalent torque TSE is larger, the first rotor transmission torque TR1 becomes larger, whereby a torque transmitted to the stepless transmission 20 (hereinafter referred to as the "CVT transmission torque" as deemed appropriate) TCVT becomes smaller.

Furthermore, in FIG. 23, arrows A and B represent the foot axis drive torque TDRDW and the CVT transmission torque TCVT at the maximum output of the vehicle, respectively. Assuming the stepless transmission 20 is directly connected to the engine 3, the engine torque TENG is directly transmitted to the stepless transmission 20. According to the present embodiment, however, it is possible to reduce the CVT transmission torque TCVT by an amount of the aforementioned first rotor transmission torque TR1 as represented by an arrow C in FIG. 23.

Further, as shown in FIG. 23, during the drive-time electric power generation, the foot axis drive torque TDRDW has a magnitude equal to a value obtained by subtracting the power-generating equivalent torque TGE from the engine torque TENG, and as the power-generating equivalent torque TGE is larger, i.e. as the amount of generated electric power is larger, it becomes smaller. Further, as described hereinabove, the second rotor transmission torque TR2 is distributed to the stator 33 and the first rotor 34, and hence the second rotor transmission torque TR2 becomes larger as the power-generating equivalent torque TGE is larger. Further, due to the fact that the combined torque formed by combining the torque distributed to the first rotor 34 and the engine torque TENG is transmitted to the stepless transmission 20, and that as the power-generating equivalent torque TGE is larger, the torque distributed to the first rotor 34 becomes larger, the CVT transmission torque TCVT becomes larger as the power-generating equivalent torque TGE is larger. Further, arrows D and E in FIG. 23 represent the foot axis drive torque TDRDW and the CVT transmission torque TCVT during the normal drive-time electric power generation.

Further, during the drive-time electric power generation, the power-generating equivalent torque TGE, i.e. the amount of generated electric power is controlled to be within the predetermine upper limit value. Further, as described hereinbefore, the drive-time electric power generation is carried out when the demanded torque PMCMD is not higher than the upper limit value PMEH of electric power that can be generated, and the PMEH value is configured such that the aforementioned combined torque becomes slightly smaller than the upper limit of torque that can be transmitted by the stepless transmission 20 when the power-generating equivalent torque TGE is equal to the predetermined upper limit value. From the above, during execution of the drive-time electric power generation, it is possible to prevent the CVT transmission torque TCVT from exceeding the upper limit of torque, and hence it is possible to prevent failure of the stepless transmission 20 due to transmission of an excessively large torque.

Deceleration Regeneration

The deceleration regeneration is an operation mode for generating electric power by the rotating machine 31 using inertia energy of the drive wheels DW and DW, and charging the battery 45 with the generated electric power, during forward decelerating traveling of the vehicle, i.e. when the vehicle is traveling forward by inertia. During the deceleration regeneration, similarly to the case of the aforementioned ENG traveling, the electromagnetic brake CL2 is controlled to the OFF state, and at the same time the clutch C13 is engaged. Further, the rotating machine 31 converts the power from the drive wheels DW and DW transmitted to the second rotor 35 via the second power transmission path PT2 into electric power to generate electric power and charges the battery 45 with the generated electric power.

Figure 24:
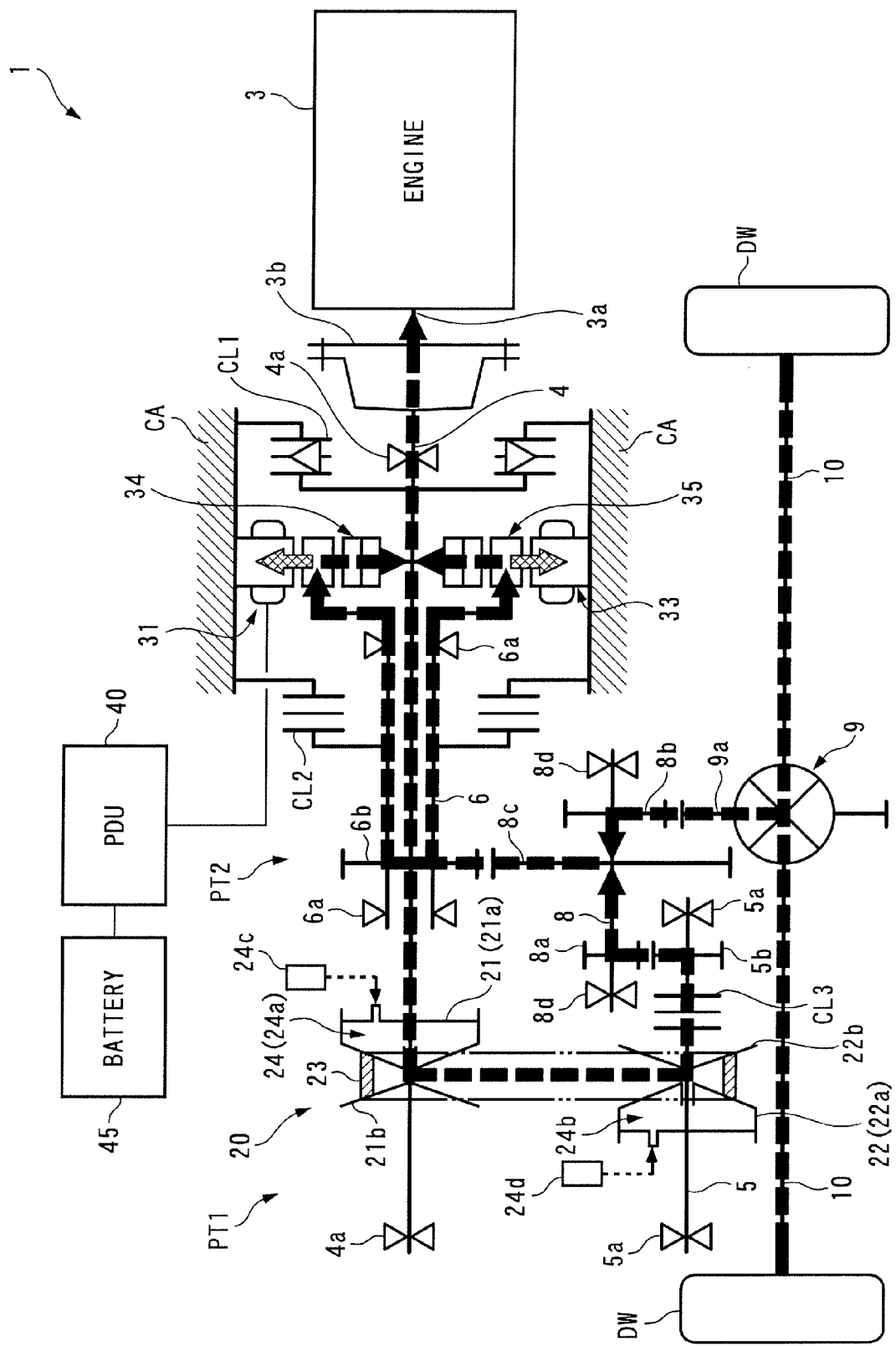
FIG. 24 A diagram showing a state of transmission of torque in the power plant shown in FIG. 1 during deceleration regeneration and at the same time when a ratio of engine drive torque to the foot axis input torque is small.
Figure 25:
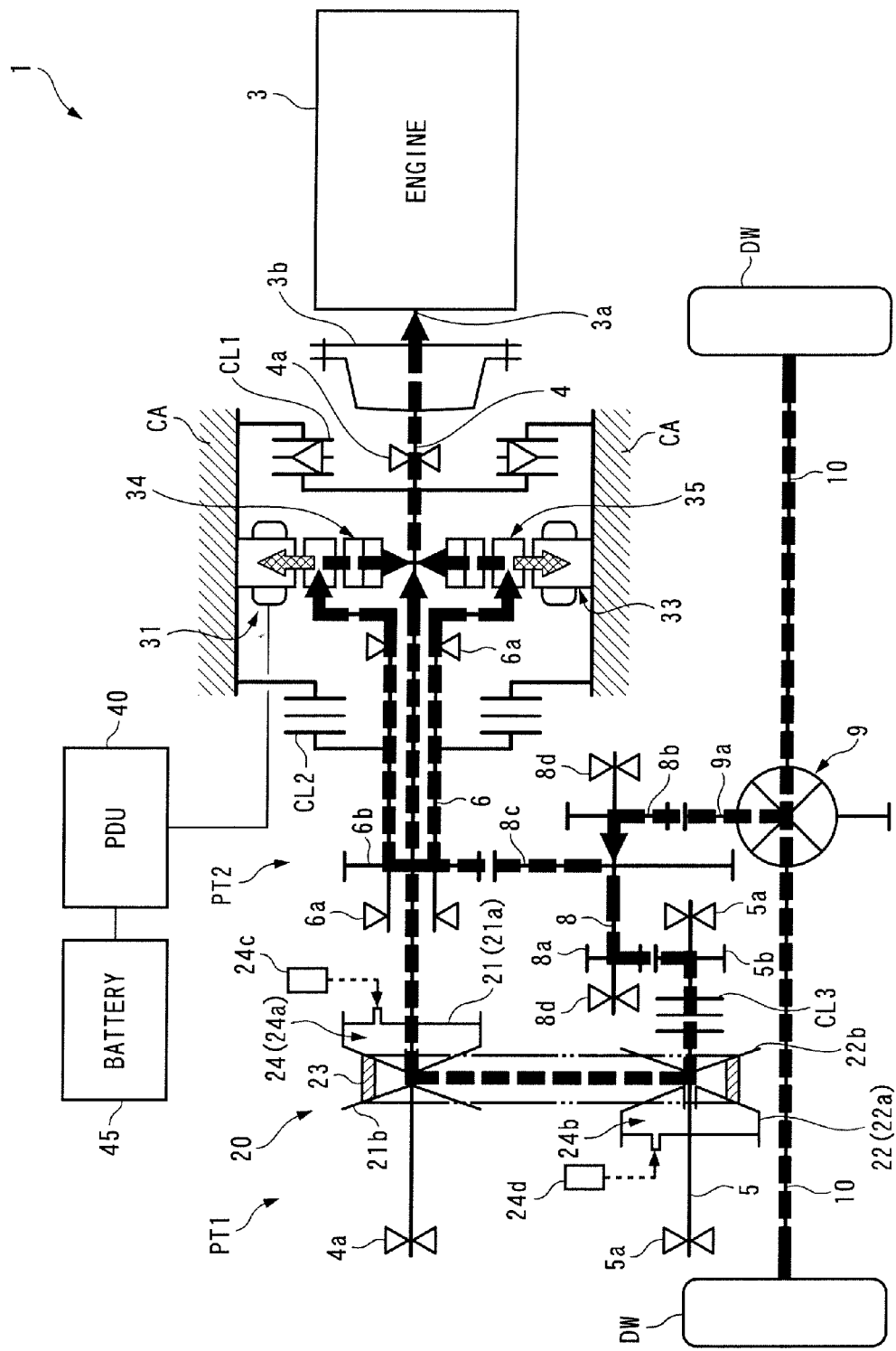
FIG. 25 A diagram showing a state of transmission of torque in the power plant shown in FIG. 1 during deceleration regeneration and at the same time when the ratio of engine drive torque to the foot axis input torque is large.

As shown in FIGS. 24 and 25, during the deceleration regeneration, the torque due to the inertia of the drive wheels DW and DW, which is transmitted to the second rotor 35, is distributed to the stator 33 and the first rotor 34, similarly to the case of the above-described drive-time electric power generation. FIG. 24 shows a case in which the ratio of the torque of the drive wheels DW and DW transmitted to the engine 3 to the torque of the drive wheels DW and DW is small. In this case, as illustrated in the figure, all the torque of the drive wheels DW and DW is transmitted to the second rotor 35 via the second power transmission path PT2, and part of the torque distributed to the first rotor 34 via the second rotor 35 is further transmitted to the second rotor 35 via the first power transmission path PT1, the idler shaft 8, and the second power transmission path PT2, as described above. Thus, the combined torque formed by combining all the torque of the drive wheels DW and DW and part of the torque distributed to the first rotor 34 is transmitted to the second rotor 35. Further, the torque remaining after being distributed to the first rotor 34 is transmitted to the engine 3 via the first main shaft 4. As a result, assuming that there is no change in speed by the gears, the sum of the electric power-generating equivalent torque TGE transmitted to the stator 33 and torque transmitted to the engine 3 becomes equal to the torque of the drive wheels DW and DW.

Further, during the deceleration regeneration, when the ratio of the torque transmitted from the drive wheels DW and DW to the engine 3 to the torque of the drive wheels DW and DW is large, part of the torque of the drive wheels DW and DW is transmitted to the second rotor 35 via the second power transmission path PT2, and the remainder of the torque is transmitted to the main shaft 4 via the auxiliary shaft 5 and the stepless transmission 20, as shown in FIG. 25. Further, the torque transmitted to the main shaft 4 is combined with the torque distributed to the first rotor 34, and then is transmitted to the engine 3. As a result, assuming that there is no change in speed by the gears, the sum of the electric power-generating equivalent torque TGE and the torque transmitted to the engine 3 becomes equal to the torque of the drive wheels DW and DW.

Furthermore, during the deceleration regeneration, the transmission ratio RATIO of the stepless transmission 20 is controlled in the same manner as during the above-described drive-time electric power generation such that the optimum power generation efficiency of the rotating machine 31 is obtained, whereby the speed relationship between the first and second rotors 34 and 35 is controlled such that the magnetic field rotation direction becomes identical to the direction of the rotations of the first and second rotors 34 and 35.

Figure 26:
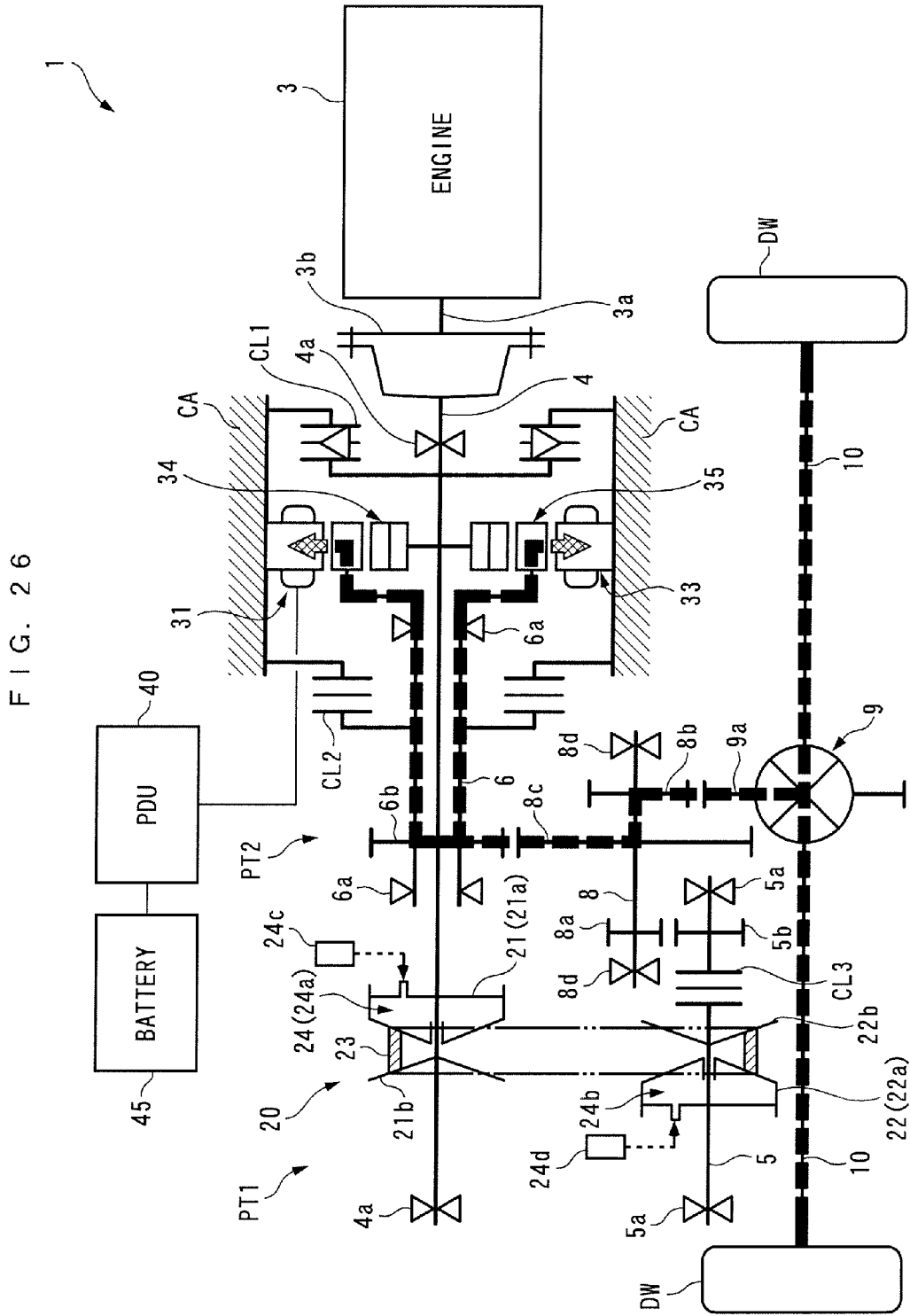
FIG. 26 A diagram showing a state of transmission of torque in the power plant shown in FIG. 1 during deceleration regeneration in a case where the clutch is disengaged and the first rotor is held unrotatable.

It should be noted that the operation in the deceleration regeneration mode may be performed in the following manner: The clutch CL3 is disengaged, and at the same time, the first rotor 34 is held unrotatable by a lock mechanism (not shown) formed e.g. by an electromagnetic brake or a handbrake, whereby the first rotor rotational speed VR1 is held at 0. In this state, using the power from the drive wheels DW and DW, the rotating machine 31 may perform electric power generation. This makes it possible, as shown in FIG. 26, to transmit all the torque of the drive wheels DW and DW to the second rotor 35 via the second power transmission path PT2 without via the first power transmission path PT1 including the stepless transmission 20, and hence it is possible to generate electric power by converting the power from the drive wheels DW and DW into electric power without transmitting the power to the crankshaft 3a.

ENG Start During Stoppage of the Vehicle

Figure 27:
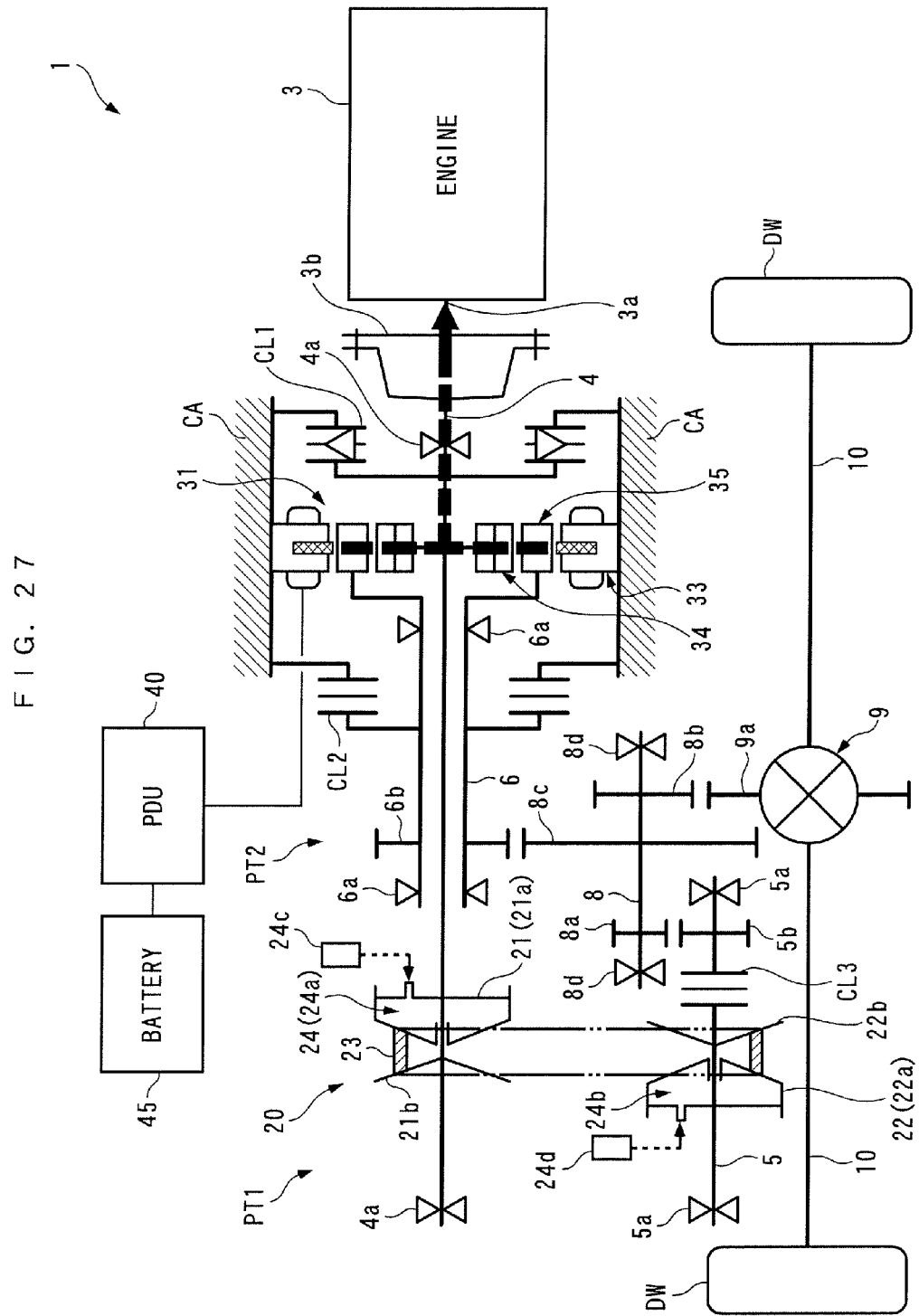
FIG. 27 A diagram showing a state of transmission of torque in the power plant shown in FIG. 1 at the time of ENG start during stoppage of the vehicle.
Figure 28:
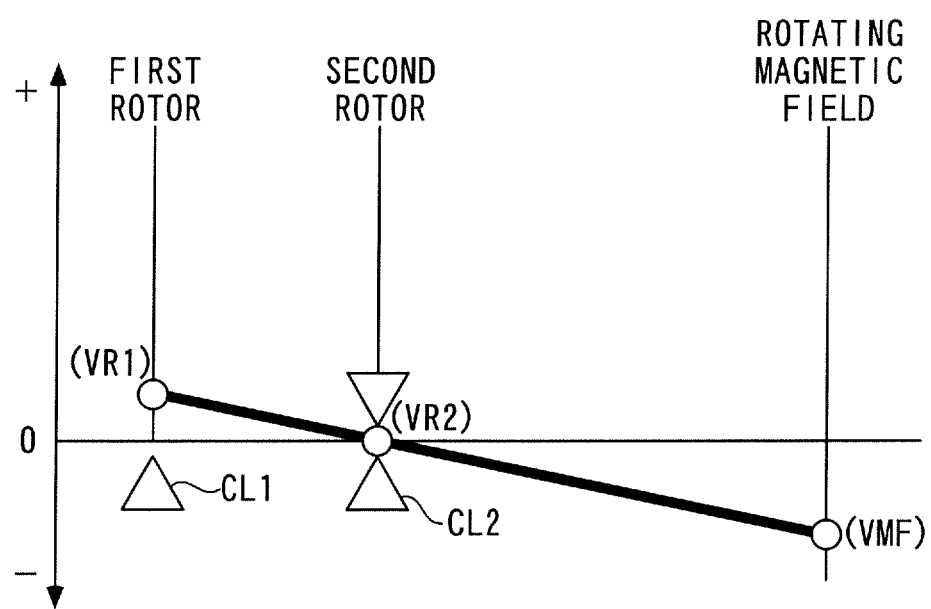
FIG. 28 A velocity nomograph illustrating an example of the relationship between the magnetic field rotational speed, and the first and second rotor rotational speeds in the power plant shown in FIG. 1 at the time of the ENG start during stoppage of the vehicle.

The ENG start during stoppage of the vehicle is an operation mode for starting the engine 3 during stoppage of the vehicle. At the time of the ENG start during stoppage of the vehicle, the electromagnetic brake CL2 is controlled to the ON state to thereby hold the second rotor 35 in an unrotatable state, and at the same time the clutch CL3 is disengaged to release the connection between the crankshaft 3a and the drive wheels DW and DW via the first power transmission path PT1. Further, electric power is supplied from the battery 45 to the stator 33. As is clear from the aforementioned functions of the rotating machine 31, this causes torque having a magnitude twice as large as that of the driving equivalent torque TSE to be transmitted to the first rotor 34, and further be transmitted to the crankshaft 3a via the first main shaft 4 as shown in FIG. 27. In this case, as shown in FIG. 28, the rotating magnetic field is caused to perform reverse rotation. From the above, as shown in the figure, the first rotor 34 performs normal rotation together with the crankshaft 3a in a state where the second rotor rotational speed VR2 is equal to 0, i.e. in a state where the drive wheels DW and DW are at rest. In this state, the ignition operation of the fuel injection valves and spark plugs of the engine 3 is controlled, whereby the engine 3 is started.

ENG Creep

The ENG creep is an operation mode for performing the creep operation of the vehicle using the power from the engine 3. During the ENG creep, the electromagnetic brake CL2 is controlled to the OFF state to thereby permit the rotation of the second rotor 35, and the clutch CL3 is disengaged to release the connection between the crankshaft 3a and the drive wheels DW and DW via the first power transmission path PT1. Further, the rotating machine 31 generates electric power by converting part of the power from the engine 3 transmitted to the first rotor 34 into electric power.

Figure 29:
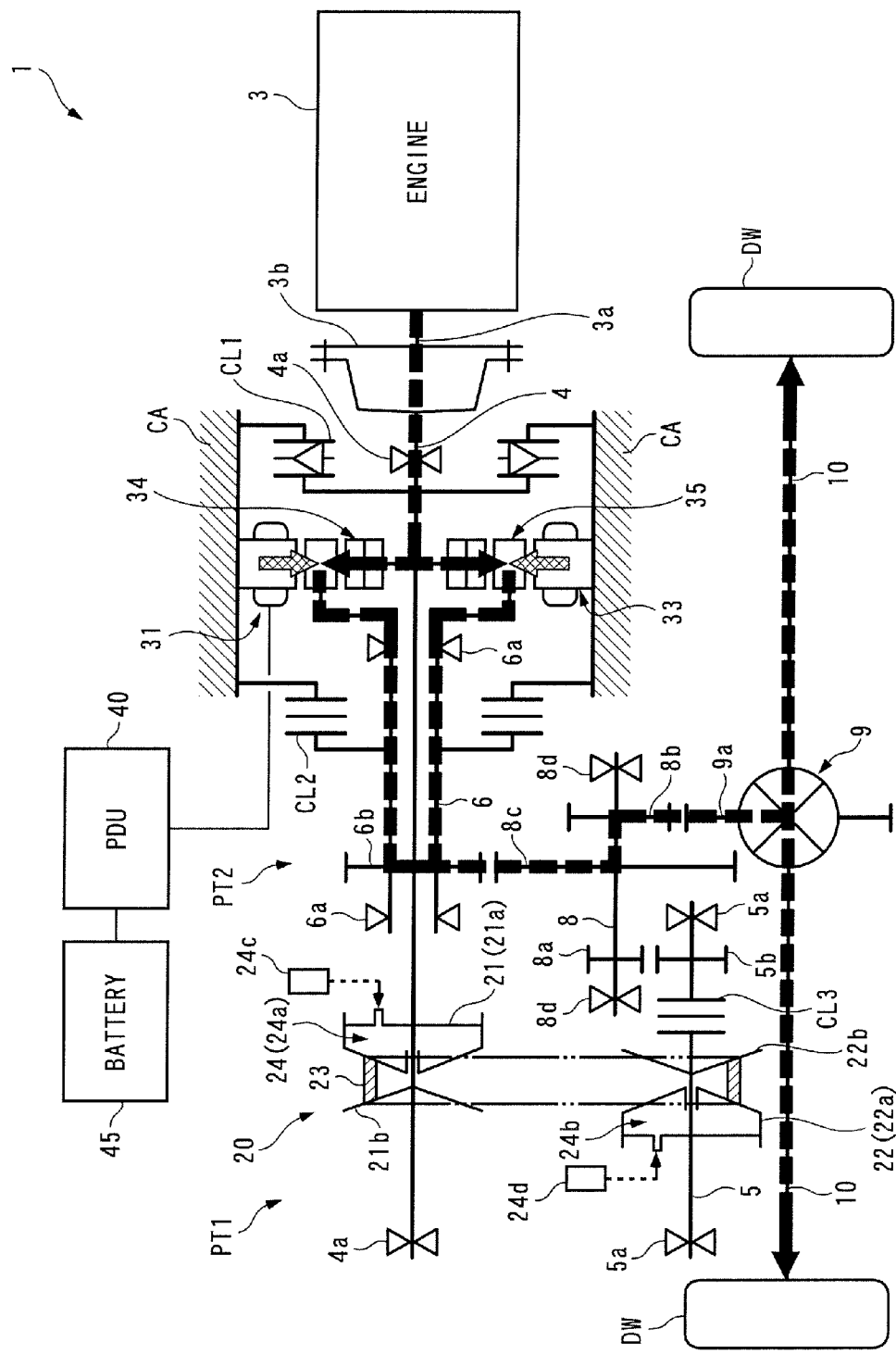
FIG. 29 A diagram showing a state of transmission of torque in the power plant shown in FIG. 1 during ENG creep.

Along with the power generation, the electric power-generating equivalent torque TGE is transmitted from the stator 33 to the second rotor 35. In this case, the rotating magnetic field rotates in a direction opposite to the direction of rotation of the first rotor 34 (see a velocity nomograph of a broken line in FIG. 30), and hence the electric power-generating equivalent torque TGE acts to cause the second rotor 35 to rotate in the same direction as the direction of rotation of the first rotor 34. Further, as shown in FIG. 29, part of the engine torque TENG is further transmitted to the second rotor 35 via the first rotor 34 such that it is balanced with the aforementioned electric power-generating equivalent torque TGE. In this case, the combination ratio between the electric power-generating equivalent torque TGE and the first rotor transmission torque TR1 is 1:2. Furthermore, the torque transmitted to the second rotor 35 is transmitted to the drive wheels DW and DW via the second power transmission path PT2, so that the drive wheels DW and DW perform normal rotation. Further, during the ENG creep, the amount of electric power generated by the rotating machine 31 is controlled such that the second rotor rotational speed VR2 becomes very small, whereby the creep operation is carried out.

In the ENG creep, part of the engine torque TENG is transmitted to the drive wheels DW and DW, as described above, which makes it possible to prevent a large reaction force from the drive wheels DW and DW from acting on the engine 3, and therefore, it is possible to perform the creep operation without causing engine stall. It should be noted that the above-described ENG creep operation is mainly carried out when the charged state SOC is small or during hill-climbing. The ENG creep operation is also carried out during stoppage of the vehicle after the decelerating traveling thereof.

ENG-Based Standing Start

The ENG-based standing start is an operation mode for starting the vehicle using the power from the engine 3, and is selected when the vehicle is started during the above-described ENG creep operation. At the time of the ENG-based standing start, similarly to the above-described ENG creep, the electromagnetic brake CL2 and the clutch CL3 are controlled to the OFF state and the disengaged state, respectively. Further, the amount of electric power generated by the rotating machine 31 is progressively increased to thereby progressively increase the electric power-generating equivalent torque TGE, and at the same time the magnetic field rotational speed VMF of the rotating magnetic field performing reverse rotation (see the velocity nomograph of the broken line in FIG. 30) is controlled such that it become equal to 0. It should be noted that when the magnetic field rotational speed VMF is equal to 0, the power (energy) of the engine 3 is not transmitted to the stator 33, but is all transmitted to the second rotor 35, and further to the drive wheels DW and DW via the second power transmission path PT2.

Figure 30:
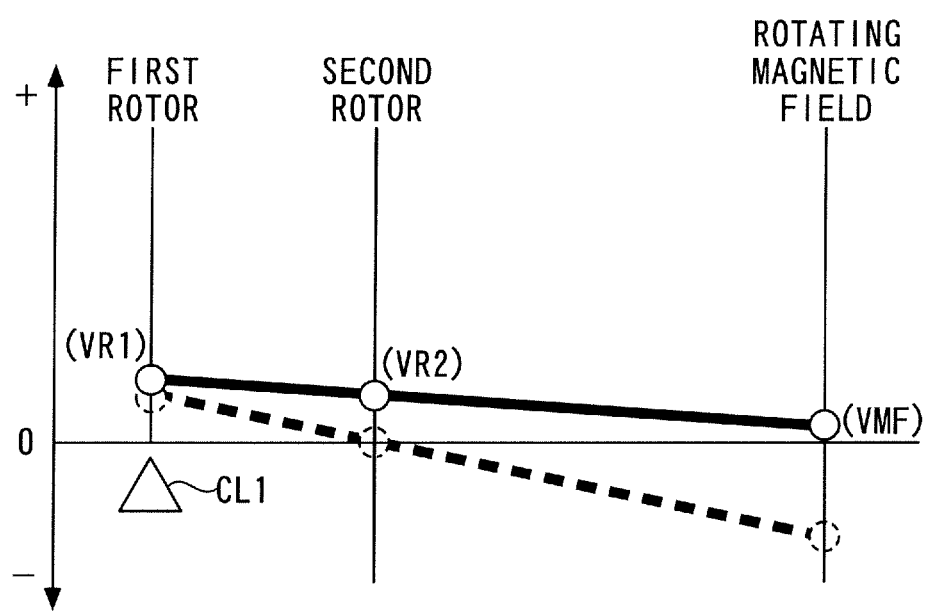
FIG. 30 A velocity nomograph illustrating an example of the relationship between the magnetic field rotational speed, and the first and second rotor rotational speeds in the power plant shown in FIG. 1 at the time of ENG-based standing start.
Figure 31:
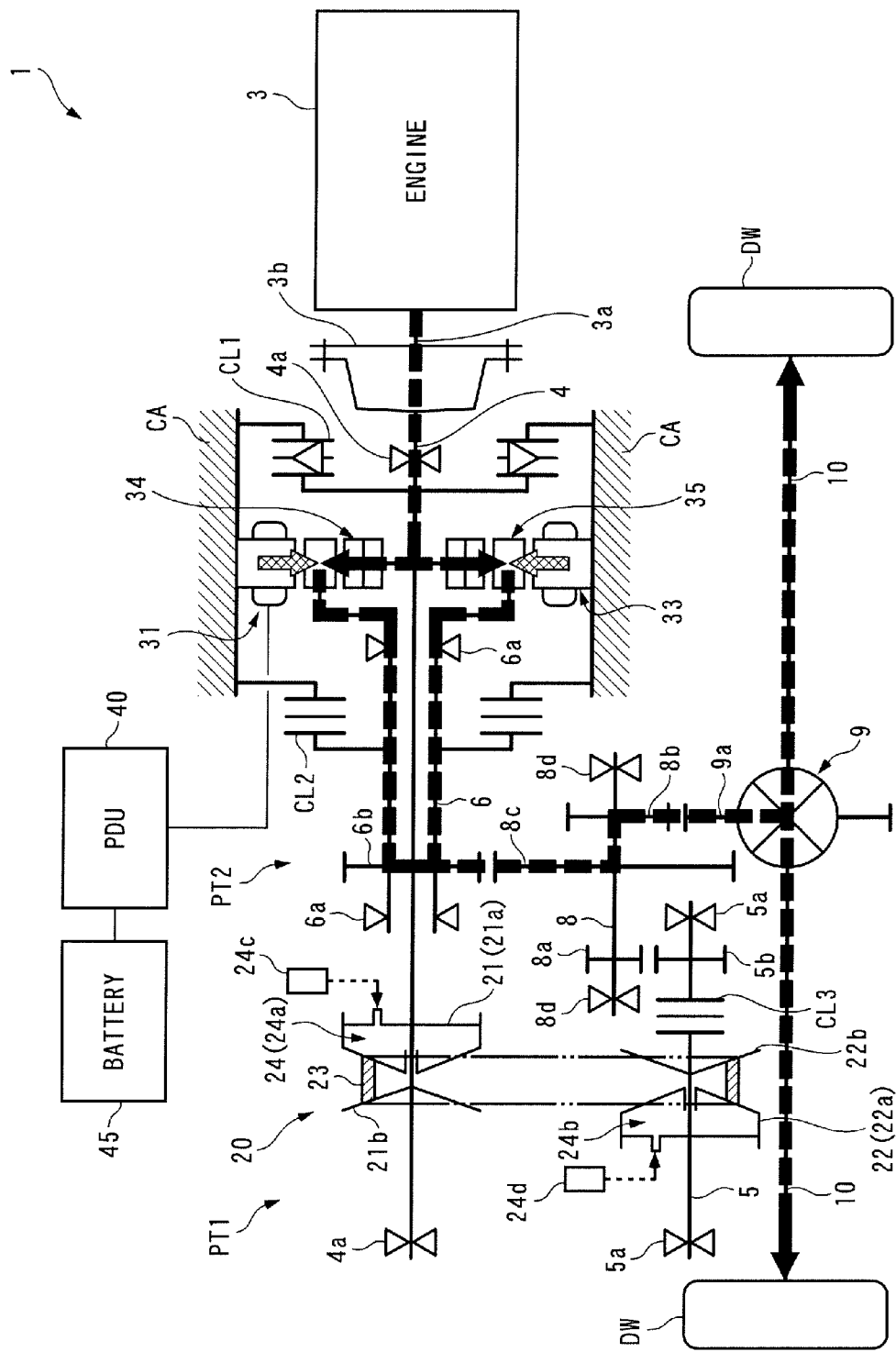
FIG. 31 A diagram showing a state of transmission of torque in the power plant shown in FIG. 1 at the time of the ENG-based standing start.

Then, after the magnetic field rotational speed VMF becomes equal to 0, the electric power is supplied from the battery 45 to the stator 33 to cause the rotating magnetic field to perform normal rotation (see a solid line in FIG. 30). As a result, as shown in FIG. 31, the driving equivalent torque TSE and the engine torque TENG are combined by the second rotor 35, and then the combined torque is transmitted to the drive wheels DW and DW via the second power transmission path PT2. In this case, the driving equivalent torque TSE, i.e. the electric power supplied to the stator 33 and the magnetic field rotational speed VMF are controlled such that it increases progressively. From the above, as shown in the solid line in FIG. 30, the second rotor rotational speed VR2 rises from the state having been equal to 0 (broken line in the figure), which accordingly causes the vehicle to make a standing start. Then, after the vehicle speed VP has appropriately increased, by controlling the transmission ratio RATIO of the stepless transmission 20, the rotational speeds of the input shaft and output shaft of the clutch CL3 are controlled such that they become equal to each other. In this state, the clutch CL3 is engaged, to perform the operation by the above-described ENG traveling.

As described hereinabove, at the time of the ENG-based standing start, the electric power-generating equivalent torque TGE and the driving equivalent torque TSE are progressively increased, which progressively increases torque transmitted from the engine 3 to the drive wheels DW and DW via the first and second rotors 34 and 35. This makes it possible to prevent the large reaction force from the drive wheels DW and DW from acting on the engine 3, and therefore, it is possible to start the vehicle without causing engine stall.

As described above, according to the present embodiment, differently from the conventional power plant, connection between the crankshaft 3a of the engine 3, and the first rotor 34 and the drive wheels DW and DW, and connection between the second rotor 35 and the drive wheels DW and DW are established without using a planetary gear unit for use in distributing and combining power. Therefore, there is no power transmission loss caused by the planetary gear unit, which makes it possible to increase the driving efficiency of the engine 3 or the rotating machine 31 in driving the drive wheels DW and DW, the electric power-generating efficiency of the rotating machine 31 in generating electric power using the power from the drive wheels DW and DW, and the electric power-generating efficiency of the rotating machine 31 in generating electric power using the power from the engine 3. For the same reason, compared with the conventional cases using the planetary gear unit, it is possible to simplify the construction, and accurately control the vehicle speed VP without being affected by the backlash between teeth of the gears.

Further, the second rotor 35 is connected to the drive wheels DW and DW via the second power transmission path PT2 which does not include the stepless transmission 20, and the crankshaft 3a is connected to the drive wheels DW and DW via the first power transmission path PT1 which includes the stepless transmission 20, during engagement of the clutch CL3, and is connected to the drive wheels DW and DW via the first rotor 34, the second rotor 35, and the second power transmission path PT2 during occurrence of the rotating magnetic field. Further, during the assist by the rotating machine 31, power can be transmitted to the drive wheels DW and DW without via the stepless transmission 20 by the amount of the first rotor transmission torque TR1, which makes it possible to suppress power transmission loss at the stepless transmission 20, thereby making it possible to increase the driving efficiency of the power plant 1 in its entirety. Further, it is possible to reduce the CVT transmission torque TCVT by the amount of the first rotor transmission torque TR1, and hence, by employing a stepless transmission adapted to the reduced CVT transmission torque TCVT, it is possible to attain the high efficiency and reduced size of the stepless transmission 20, which in turn makes it possible to attain the reduction of the size of the power plant 1 in its entirety and further improvement of the driving efficiency thereof.

Furthermore, as already described with reference to FIGS. 17 and 26, at the time of the EV standing start or during the deceleration regeneration, by disengaging the clutch CL3, the power transmission between the rotating machine 31 and the drive wheels DW and DW can be carried out only via the second power transmission path PT2 and the second rotor 35, entirely without via the stepless transmission 20. Therefore, it is possible to completely prevent power transmission loss at the stepless transmission 20, and further increase the driving efficiency of the rotating machine 31 in driving the drive wheels DW and DW, and the electric power-generating efficiency of the rotating machine 31 in generating electric power using the power from the drive wheels DW and DW.

Further, in the rotating machine 31, the ratio of the number of pole pairs of the magnet magnetic poles of the permanent magnets 34a to the number of pole pairs of the armature magnetic poles (hereinafter referred to as the "pole pair number ratio") α is set to 2.0. By thus setting the pole pair number ratio α, in such a case as a large torque is transmitted from the second rotor 35 to the drive wheels DW and DW, e.g. at the time of the EV standing start or the ENG-based standing start, it is possible, as is clear from the aforementioned equation (32), to deliver a torque larger than a torque output e.g. when the pole pair number ratio α is smaller than 1.0, from the second rotor 35, and transmit the same to the drive wheels DW and DW. Therefore, it is possible to make smaller the maximum values of the driving equivalent torque TSE and the electric power-generating equivalent torque TGE demanded of the stator 33, thereby making it possible to reduce the size of the stator 33, and in turn to further reduce the size of the power plant 1. Further, by setting the pole pair number ratio α as mentioned above, during the assist, it is possible to transmit a larger torque to the first rotor 34 than when the pole pair number ratio α is smaller than 1.0 and hence it is possible to further reduce the CVT transmission torque TCVT, thereby making it possible to further reduce the size of the stepless transmission 20.

Further, the stepless transmission 20 is provided which is capable of steplessly changing the transmission ratio RATIO, and the transmission ratio RATIO of the stepless transmission 20 is controlled such that during the assist, the engine speed NE and the magnetic field rotational speed VMF become equal to the NECMD value and the VMFCMD value, respectively, which are set such that the optimum efficiencies of the engine 3 and the rotating machine 31 can be obtained. This makes it possible to drive the drive wheels DW and DW while controlling the outputs of the engine 3 and the rotating machine 31 such that the optimum efficiencies thereof can be obtained. Therefore, it is possible to further enhance the driving efficiency of the power plant 1 in its entirety.

Furthermore, at the time of the ENG-based standing start, by disengaging the clutch CL3, and controlling the electric power generated by the rotating machine 31 and the electric power supplied to the stator 33, torque transmitted from the engine 3 to the drive wheels DW and DW via the first and second rotors 34 and 35 is progressively increased, so that it is possible to start the vehicle without causing engine stall. This makes it possible to connect between the engine 3 and the drive wheels DW and DW without using a friction start clutch. Further, after the start of the vehicle, the clutch CL3 is engaged in the state where the rotational speeds of the input shaft and output shaft of the clutch CL3 are controlled through the control of the transmission ratio RATIO such that they become equal to each other. Therefore, in a case where the operation by the above-described ENG start during EV traveling is performed not by engaging the clutch CL3 but by using a starter (not shown), an ON/OFF-type clutch, such as a dog tooth clutch, which requires smaller energy for operation, can be used in place of the friction clutch, as the clutch CL3. In this case, it is possible to improve the fuel economy of the engine 3, compared with a case where the engine 3 is used as a drive source of the friction start clutch.

Furthermore, as already described with reference to FIGS. 17 and 18, during the EV creep or at the time of the EV standing start, the one-way clutch CL1 and the casing CA block the reverse rotation of the crankshaft 3a, and the clutch CL3 disconnects between the crankshaft 3a and the drive wheels DW and DW. Therefore, it is possible to properly drive the drive wheels DW and DW using the power from the rotating machine 31, while blocking the reverse rotation of the crankshaft 3a. In this case, by disengaging the clutch CL3, the engine 3 is prevented from being dragged, which makes it possible to obtain the high driving efficiency of the engine 3.

Further, as already described with reference to FIGS. 27 and 28, at the time of the ENG start during stoppage of the vehicle, the second rotor 35 is held unrotatable by the electromagnetic brake CL2, and the crankshaft 3a and the drive wheels DW and DW are disconnected from each other by the clutch CL3. Further, the stator 33 is supplied with electric power to cause the rotating magnetic field to perform reverse rotation. This makes it possible to cause the crankshaft 3a to perform normal rotation without driving the drive wheels DW and DW, which in turn makes it possible to start the engine 3.

Figure 32:
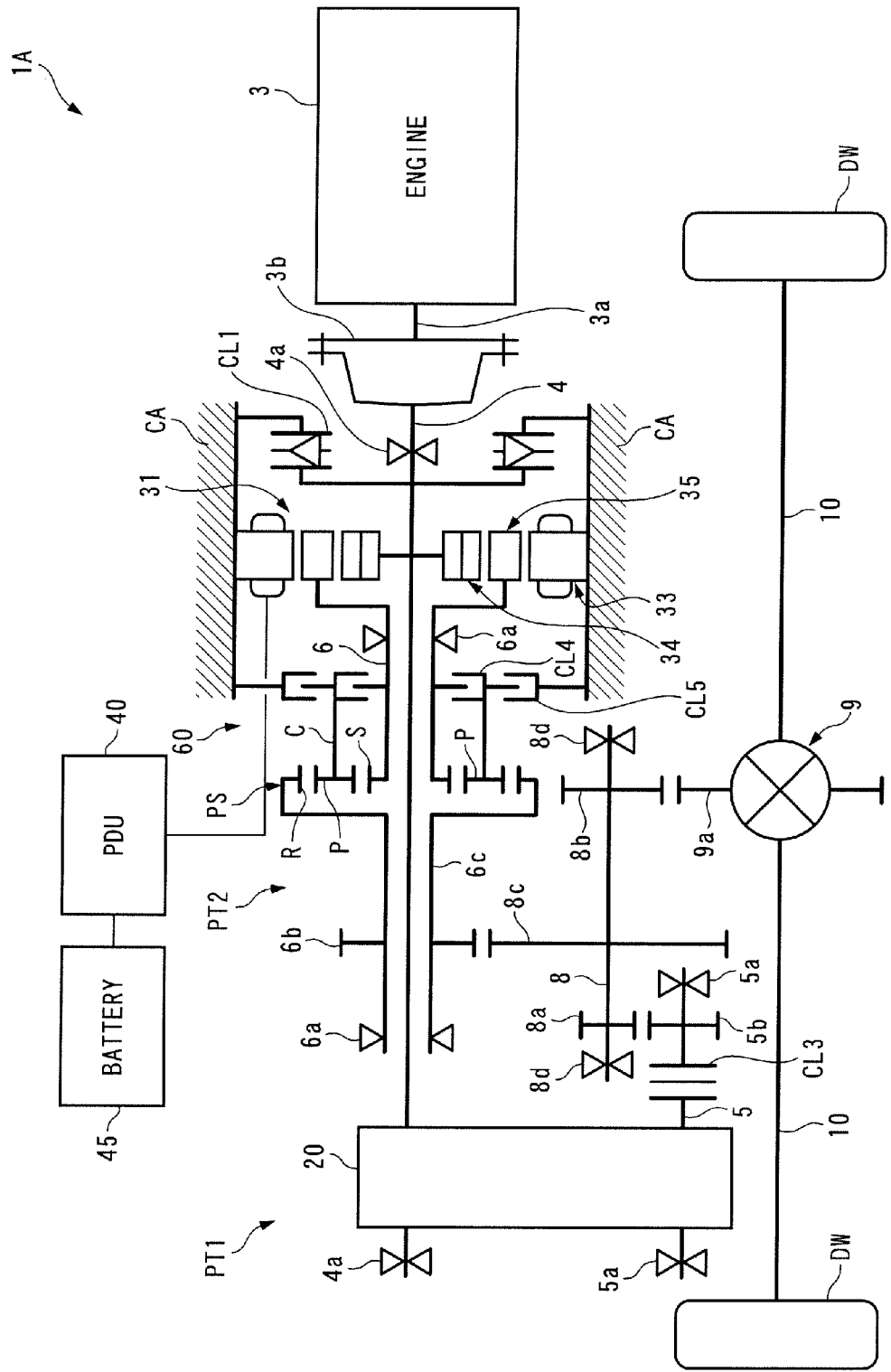
FIG. 32 A schematic diagram of a power plant according to a second embodiment.

Next, a power plant 1A according to a second embodiment of the present invention will be described with reference to FIG. 32. The power plant 1A is distinguished from the power plant 1 according to the first embodiment mainly in that the power plant 1A further includes a normal/reverse rotation-switching mechanism 60. In FIG. 32, the component elements identical to those of the first embodiment are denoted by the same reference numerals. It should be noted that in the figure, the stepless transmission 20 is shown in a simplified manner for convenience. This also applies to the other figures, referred to hereinafter. The following description is mainly given of different points from the first embodiment.

The above-described normal/reverse rotation-switching mechanism 60 includes a planetary gear unit PS, a clutch CL4 (second clutch, rotor lock mechanism), and an electromagnetic brake CL5 (carrier lock mechanism, rotor lock mechanism). The planetary gear unit PS is comprised of a sun gear S, a ring gear R disposed on an outer periphery of the sun gear S, a plurality of (e.g. three) planetary gears P (only two of which are shown) in mesh with the gears S and R, a carrier C rotatably supporting the planetary gears P, and so forth. The sun gear S is integrally formed on the aforementioned second main shaft 6, and is rotatable in unison with the second main shaft 6. Further, the above-described ring gear R is integrally formed on a third main shaft 6c via a flange having an annular plate-shape. The third main shaft 6c is formed to be hollow, and is disposed in a rotatable manner. The aforementioned first main shaft 4 is rotatably fitted in the third main shaft 6c. With the above arrangement, the ring gear R is rotatable in unison with the third main shaft 6c. Further, differently from the first embodiment, the aforementioned electromagnetic brake CL2 is not provided, and the aforementioned gear 6b is integrally formed not on the second main shaft 6 but on the third main shaft 6c.

As described above, the sun gear S is connected to the second rotor 35 via the second main shaft 6, and the ring gear R is connected to the drive wheels DW and DW via the third main shaft 6c, the idler shaft 8, the differential gear mechanism 9, and so forth. That is, the second rotor 35 is always mechanically connected to the drive wheels DW and DW without using the transmission, via the second main shaft 6, the planetary gear unit PS, the third main shaft 6c, the gear 6b, the third idler gear 8c, the idler shaft 8, the second idler gear 8b, the gear 9a, the differential gear mechanism 9, and the drive shafts 10 and 10. In the present embodiment, a sequence of the component elements from the second main shaft 6 to the gear 6b, described above, correspond to the second power transmission path PT2.

The above-described clutch CL4 is an electromagnetic clutch, for example. The degree of engagement of the clutch CL4 is controlled by the ECU 2, whereby the connection between the carrier C and the second main shaft 6, i.e. between the carrier C and the sun gear S is established and interrupted. The electromagnetic brake CL5 is turned on or off by the ECU 2. In the ON state, the electromagnetic brake CL5 holds the carrier C in an unrotatable state, whereas in the OFF state, the electromagnetic brake CL5 allows the rotation of the carrier C.

Similarly to the first embodiment, the power plant 1A configured as above is operated in the operation modes, such as the EV standing start and the ENG-based standing start. Further, to cause forward travel of the vehicle, the clutch CL4 is engaged to thereby connect between the carrier C and the sun gear S, and at the same time the electromagnetic brake CL5 is controlled to the OFF state to thereby allow the rotation of the carrier C. In this state, when the operations by the operation modes, such as the EV standing start and the ENG-based standing start, are performed as described hereinabove, the power transmitted to the second rotor 35 is transmitted to the ring gear R via the sun gear S, the carrier C, and the planetary gears P, and accordingly the sun gear S, the carrier C, and the ring gear R rotate in unison with the second rotor 35. Further, the power transmitted to the ring gear R is transmitted to the drive wheels DW and DW via the third main shaft 6c, the differential gear mechanism 9, and so forth. As a consequence, the drive wheels DW and DW perform normal rotation to cause forward travel of the vehicle.

On the other hand, to cause reverse travel of the vehicle, the clutch CL4 is disengaged to thereby disconnect between the carrier C and the sun gear S, and the electromagnetic brake CL5 is controlled to the ON state, to thereby hold the carrier C unrotatable, and further hold the clutch CL3 in a disengaged state. In this state, when the operations by the operation modes, such as the EV standing start and the ENG-based standing start, are performed as described above, the power transmitted to the second rotor 35 is transmitted to the ring gear R via the sun gear S and the planetary gears P. As described above, since the carrier C is held unrotatable, the ring gear R rotates in a reverse direction with respect to the sun gear S, i.e. the second rotor 35. Further, the power transmitted to the ring gear R is transmitted to the drive wheels DW and DW via the third main shaft 6c, etc. As a consequence, the drive wheels DW and DW perform reverse rotation to cause reverse travel of the vehicle. In this case, as is apparent from the characteristics of the planetary gear unit PS, torque transmitted to the sun gear S is transmitted to the ring gear R in an increased state.

When the above-described reverse travel of the vehicle is performed using the power from the engine 3, if the charged state SOC is smaller than the aforementioned first predetermined value SOCL, the engine speed NE is increased such that the rotating magnetic field performs reverse rotation, and electric power generation is performed by the rotating machine 31 to charge the battery 45 with the generated electric power. This makes it possible, as is apparent from the operation during the ENG creep already described with reference to FIGS. 29 and 30, to cause reverse travel of the vehicle while charging the battery 45.

Hereinafter, an operation mode of the normal/reverse rotation-switching mechanism 60, in which by causing the clutch CL4 to be engaged and controlling the electromagnetic brake CL5 to the OFF state, as described above, the power from the second rotor 35 is directly transmitted to the drive wheels DW and DW without changing the rotational direction of the power, will be referred to as the "normal rotation mode". Further, an operation mode of the normal/reverse rotation-switching mechanism 60, in which by causing the clutch CL4 to be disengaged and controlling the electromagnetic brake CL5 to the ON state, the power from the second rotor 35 is transmitted to the drive wheels DW and DW after changing the rotational direction of the power to a reverse direction, will be referred to as the "reverse rotation mode".

When the reverse rotation mode of the normal/reverse rotation-switching mechanism 60 is selected to cause the drive wheels DW and DW to perform reverse rotation, the clutch CL3 is always held in the disengaged state, whereby transmission of the power to the drive wheels DW and DW is performed via the second power transmission path PT2 without via the first power transmission path PT1. In other words, when the reverse rotation mode is selected, out of the above-described operation modes, operation modes in which the clutch CL3 is held in the engaged state, such as the ENG traveling, are not selected, but operation modes in which the clutch CL3 is held in the disengaged state, such as the EV standing start and the ENG-based standing start, are selected. Further, the normal rotation mode is selected during the deceleration regeneration selected during forward decelerating traveling of the vehicle.

It should be noted that in the present embodiment, when the ENG start during stoppage of the vehicle, already described with reference to FIG. 27, is selected, the second rotor 35 is held unrotatable in the following manner: The electromagnetic brake CL5 is controlled to the ON state to thereby hold the carrier C unrotatable, and the clutch CL4 is engaged to thereby connect between the carrier C and the second main shaft 6, i.e. between the carrier C and the second rotor 35. This holds the second rotor 35 unrotatable together with the carrier C.

As described above, the clutch CL4 and the electromagnetic brake CL5 of the normal/reverse rotation-switching mechanism 60 can be used in combination, also as the rotor lock mechanism which holds the second rotor 35 unrotatable. Therefore, compared with a case where a rotor lock mechanism is separately provided without also using the clutch CL4 and the electromagnetic brake CL5 for that use, it is possible to reduce the number of component parts of the power plant 1A, which in turn makes it possible to attain the reduction of the size and costs thereof.

As described above, according to the present embodiment, it is possible to selectively cause the normal and reverse rotations of the drive wheels DW and DW, i.e. the forward or reverse travel of the vehicle, using the power from the second rotor 35, by the normal/reverse rotation-switching mechanism 60 having a simple construction formed by the planetary gear unit PS, the clutch CL4, and the electromagnetic brake CL5. In this case, as is clear from the operation at the time of the ENG-based standing start described in the first embodiment, it is possible to transmit the power from the engine 3 to the drive wheels DW and DW without using the friction start clutch, to thereby cause the forward or reverse travel of the vehicle from rest without causing engine stall. Further, during forward travel of the vehicle, the sun gear S, the carrier C, and the ring gear R rotate in unison, and hence it is possible to transmit the power to the drive wheels DW and DW without causing power transmission loss at the planetary gear unit PS due to meshing of the gears. This makes it possible to obtain quite the same advantageous effects as provided by the first embodiment during forward travel of the vehicle. It should be noted that when the sun gear S, the carrier C, and the ring gear R are rotating in unison due to the engagement of the clutch CL3, the planetary gear unit PS and the drive wheels DW and DW may be connected to each other to cause the vehicle to travel in the reverse direction.

Figure 33:
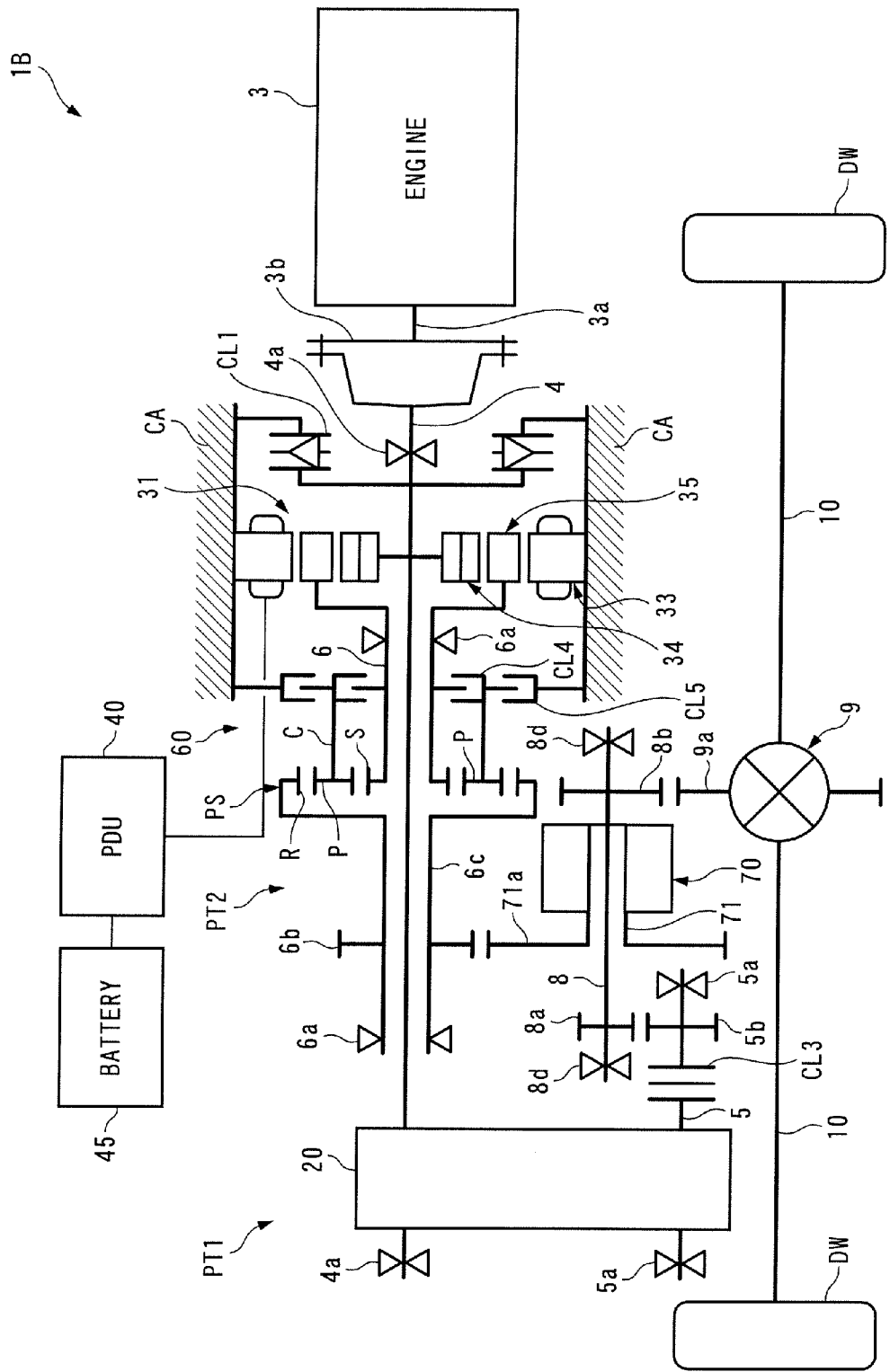
FIG. 33 A schematic diagram of a power plant according to a third embodiment.

Next, a power plant 1B according to a third embodiment of the present invention will be described with reference to FIG. 33. The power plant 1B is distinguished from the power plant 1A according to the second embodiment mainly in that the power plant 1B further includes a transmission 70 (second transmission). In FIG. 33, the component elements identical to those of the second embodiment are denoted by the same reference numerals. The following description is mainly given of different points from the second embodiment.

The above-mentioned transmission 70 is, for example, a belt-type stepless transmission similar to the stepless transmission 20, and includes an input shaft 71 and an output shaft (not shown). The transmission 70 is configured to be capable of outputting power input to the input shaft 71 to the aforementioned output shaft after steplessly changing the speed of the power. The transmission ratio "ratio" (the rotational speed of the input shaft 71/the rotational speed of the output shaft) of the transmission 70 is controlled by the ECU 2. Further, the input shaft 71 is integrally formed with a gear 71a. The gear 71a is in mesh with the aforementioned gear 6b. Furthermore, the output shaft of the transmission 70 is directly connected to the above-described idler shaft 8.

As described above, the second rotor 35 is always mechanically connected to the drive wheels DW and DW via the second main shaft 6, the planetary gear unit PS, the third main shaft 6c, the gear 6b, the gear 71a, the transmission 70, the idler shaft 8, the second idler gear 8b, the gear 9a, the differential gear mechanism 9, and the drive shafts 10 and 10. In the present embodiment, a sequence of the component elements from the second main shaft 6 to the transmission 70, described above, correspond to the second power transmission path PT2.

In the power plant 1B configured as above, when the power is transmitted from the second rotor 35 to the drive wheels DW and DW, such as at the time of the EV standing start, at the time of the ENG-based standing start, during the assist by the rotating machine 31, and during the drive-time electric power generation, the transmission ratio "ratio" of the transmission 70 is controlled in the following manner: First, the target magnetic field rotational speed VMFCMD is calculated by searching a map (not shown) according to the demanded torque PMCMD and the vehicle speed VP. In this map, the target magnetic field rotational speed VMFCMD is set such that the optimum efficiency of the rotating machine 31 is obtained with respect to the demanded torque PMCMD and the vehicle speed VP at the time. Further, different types of the above-mentioned map are prepared for use during stoppage of the engine 3 and for use during operation thereof, respectively. Then, the transmission ratio "ratio" is controlled such that the magnetic field rotational speed VMF becomes equal to the calculated VMFCMD value.

In this case, differently from the first embodiment, during the assist and the drive-time electric power generation, the transmission ratio RATIO of the stepless transmission 20 is controlled in the following manner: The transmission ratio RATIO is controlled such that the engine speed NE becomes equal to the predetermined target engine speed NECMD. The target engine speed NECMD is set such that the optimum efficiency of the engine 3 is obtained. According to the present embodiment, differently from the first and second embodiments, the second rotor rotational speed VR2 can be freely controlled with respect to the vehicle speed VP by controlling the transmission ratio "ratio" of the transmission 70.

Therefore, by controlling the transmission ratios RATIO and "ratio" of the stepless transmission 20 and the transmission 70, the engine speed NE and the magnetic field rotational speed VMF can be freely controlled with respect to the vehicle speed VP, separately from each other, irrespective of the relationship between the magnetic field rotational speed VMF and the first and second rotor rotational speeds VR1 and VR2, based on the aforementioned equation (40). This makes it possible to control the engine speed NE and the magnetic field rotational speed VMF, respectively, such that more excellent efficiencies of the engine 3 and the rotating machine 31 can be obtained, whereby it is possible to enhance the driving efficiency of the engine 3 and the driving efficiency and electric power-generating efficiency of the rotating machine 31.

Further, the transmission ratio "ratio" is controlled to a predetermined lower-speed value larger than 1.0 e.g. at the time of the EV standing start when the vehicle speed VP is low and torque demanded of the rotating machine 31 is large. This increases torque transmitted to the second rotor 35 by the transmission 70, and then the increased torque is transmitted to the drive wheels DW and DW. In accordance therewith, electric power supplied to the rotating machine 31 (or electric power generated by the rotating machine 31) is controlled such that the torque transmitted to the second rotor 35 becomes smaller. Therefore, according to the present embodiment, the maximum value of the torque demanded of the rotating machine 31 can be made smaller, thereby making it possible to reduce the size and costs of the rotating machine 31.

Furthermore, when the vehicle speed VP is very high, the transmission ratio "ratio" is controlled to a predetermined higher-speed value smaller than 1.0. This lowers the second rotor rotational speed VR2 with respect to the vehicle speed VP, and hence it is possible to prevent failure of the rotating machine 31 due to an excessive increase in the second rotor rotational speed VR2.

It should be noted that in the present embodiment, the second rotor 35 is connected to the drive wheels DW and DW via the transmission 70, and hence it is impossible to obtain the effects provided by preventing power transmission loss in the transmission, as in the first embodiment, but it is possible to obtain the same advantageous effects as provided by the second embodiment, except those effects.

Figure 34:
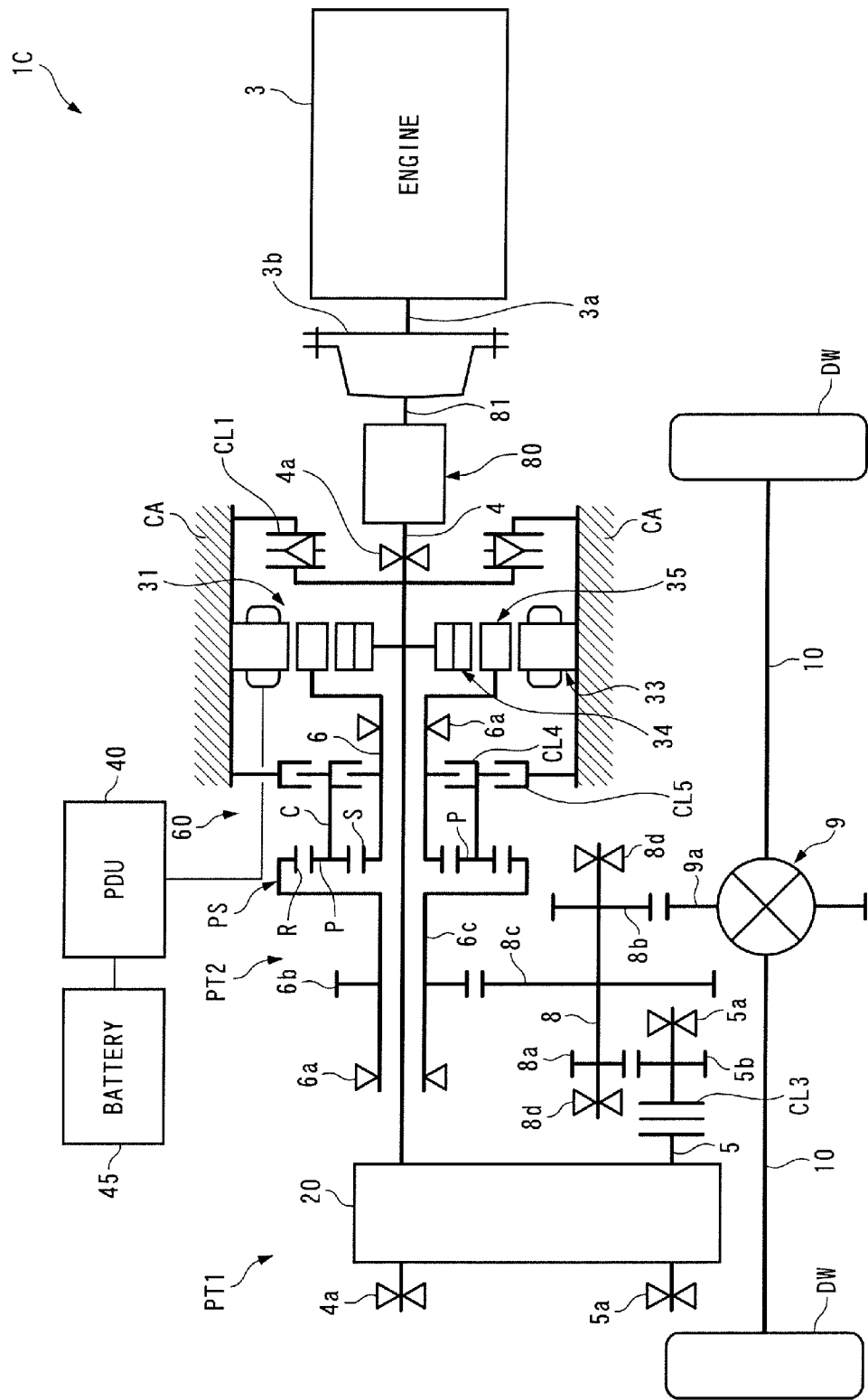
FIG. 34 A schematic diagram of a power plant according to a fourth embodiment.

Next, a power plant 1C according to a fourth embodiment of the present invention will be described with reference to FIG. 34. The power plant 1C is distinguished from the power plant 1A according to the second embodiment mainly in that the power plant 1C further includes a transmission 80 (third transmission). In FIG. 34, the component elements identical to those of the second embodiment are denoted by the same reference numerals. The following description is mainly given of different points from the second embodiment.

The above-described transmission 80 includes an input shaft 81, an output shaft, a planetary gear unit, and a clutch (none of which are shown), and has the function of directly outputting power input to the input shaft 81 to the output shaft, and the function of outputting power input to the input shaft 81 to the output shaft in a speed-reduced state. Thus, in the transmission 80, there are set a total of two speed positions, i.e. a first speed in which a transmission ratio (the rotational speed of the input shaft 81/the rotational speed of the output shaft) is set to a predetermined value larger than 1.0, and a second speed in which the transmission ratio is set to 1.0, and the ECU 2 controls switching between these speed positions.

Further, in the power plant 1C, differently from the first and second embodiments, the flywheel 3b is directly connected not to the first main shaft 4 but to the input shaft 81 of the transmission 80, and the first main shaft 4 is directly connected to the output shaft of the transmission 80. Thus, the first rotor 34 is always mechanically connected to the crankshaft 3a via the first main shaft 4, the transmission 80, and the flywheel 3b. Further, during engagement of the clutch CL3, the crankshaft 3a is mechanically connected to the drive wheels DW and DW via the flywheel 3b, the transmission 80, the first main shaft 4, the stepless transmission 20, the auxiliary shaft 5, the clutch CL3, the gear 5b, the first idler gear 8a, the idler shaft 8, the second idler gear 8b, the gear 9a, the differential gear mechanism 9, and the drive shafts 10 and 10. In the present embodiment, a sequence of the component elements from the flywheel 3b to the auxiliary shaft 5, described above, correspond to the first power transmission path PT1. Furthermore, a gear ratio between the gear 9a of the differential gear mechanism 9 and the second idler gear 8b is set to a predetermined value larger than 1.0 such that the degree of decrease in the speed of the power by the gears 9a and 8b is relatively large.

In the power plant 1C configured as above, at the time of the ENG-based standing start or during the ENG traveling, the speed position of the transmission 80 is controlled to the first speed when the engine speed NE is very high, and otherwise controlled to the second speed. With this configuration, when the engine speed NE is very high, the power from the engine 3 is transmitted to the first rotor 34 in a speed-reduced state, so that it is possible to prevent failure of the rotating machine 31 due to an excessive increase in the first rotor rotational speed VR1. As described hereinabove, since the first rotor 34 is formed by the permanent magnets 34a or the like having low strength, the above-described effects can be particularly effectively obtained.

Further, in such cases where very large torque is transmitted to the drive wheels DW and DW via the first and second rotors 34 and 35 e.g. at the time of the ENG-based standing start, the above-described control of the speed position of the transmission 80 causes the speed position to be controlled to the second speed, whereby the engine torque TENG input to the first rotor 34 becomes smaller compared with a case where the speed position is controlled to the first speed. In accordance therewith, electric power generated by the rotating machine 31 is controlled such that the engine torque TENG transmitted to the first rotor 34 becomes smaller. Further, the engine torque TENG transmitted to the first rotor 34 is transmitted to the drive wheels DW and DW in a state increased by speed reduction by the second idler gear 8b and the gear 9a. From the above, it is possible to make smaller the maximum value of torque demanded of the rotating machine 31, thereby making it possible to further reduce the size and costs of the rotating machine 31.

It should be noted that in the present embodiment, the crankshaft 3a is connected to the drive wheels DW and DW via the transmission 80, and hence it is impossible to obtain the effects provided by suppression of power transmission loss in the transmission, as in the second embodiment, but it is possible to obtain the same advantageous effects as provided by the second embodiment, except those effects.

It should be noted that although in the first to fourth embodiments described above, the clutch CL3 is disposed between the stepless transmission 20 and the drive wheels DW and DW, it may be disposed in the first main shaft 4 between the stepless transmission 20 and the first rotor 34. In this case, at the time of the ENG start during EV traveling described hereinabove with reference to FIG. 19, before the clutch LC3 is engaged, differently from the above-described embodiments, the power from the rotating machine 31 is transmitted to both the pulleys 21 and 22 of the stepless transmission 20 to cause rotation of the pulleys 21 and 22, and hence the transmission ratio RATIO can be controlled to a desired value while preventing the contact surfaces of the pulleys 21 and 22 and the transmission belt 23 from being damaged. In addition, at the time of the ENG start during stoppage of the vehicle which is described hereinabove with reference to FIG. 27, the engine 3 can be started without dragging the stepless transmission 20.

Figure 35:
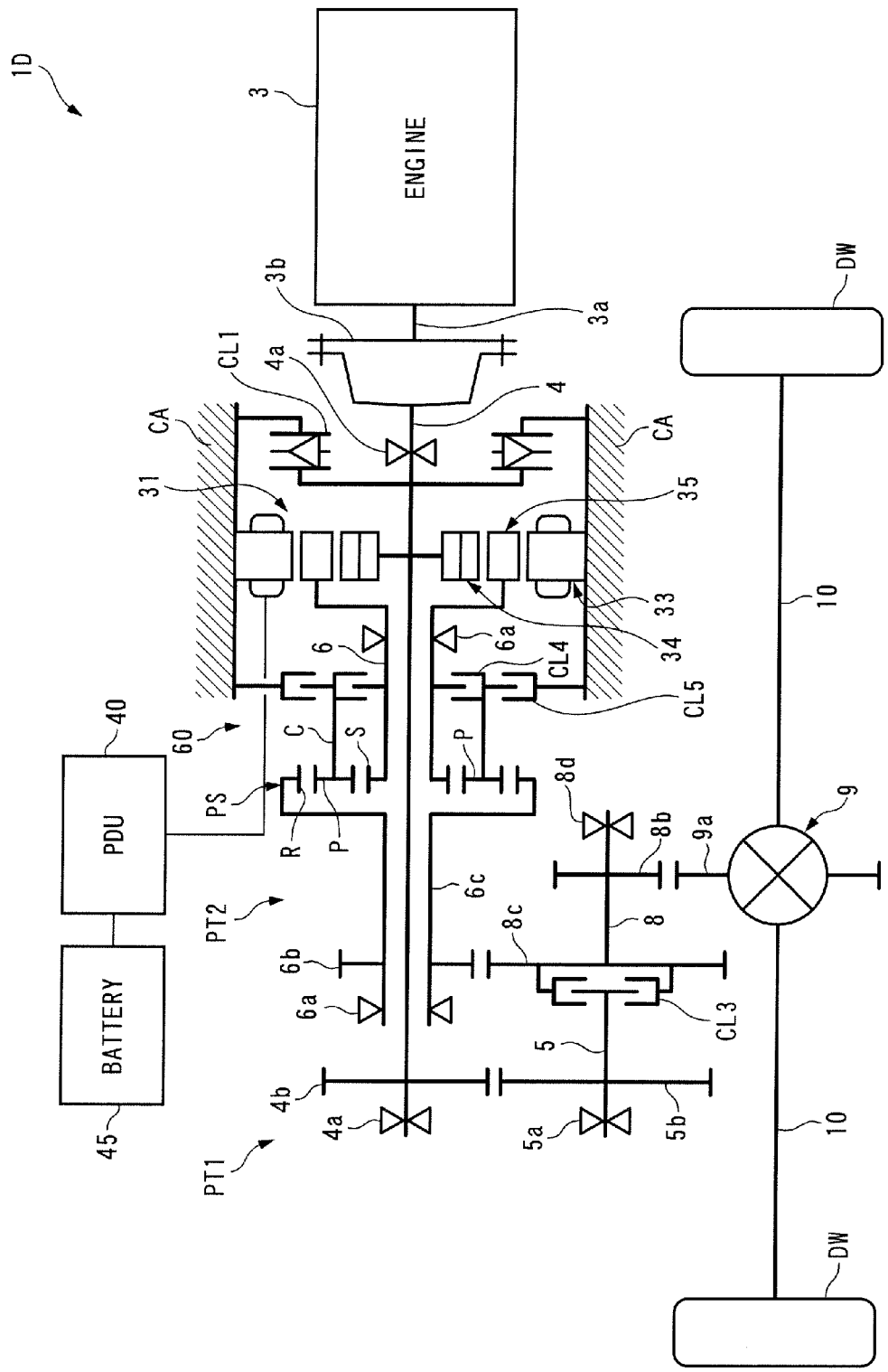
FIG. 35 A schematic diagram of a power plant according to a fifth embodiment.

Next, a power plant 1D according to a fifth embodiment of the present invention will be described with reference to FIG. 35. The power plant 1D is distinguished from the power plant 1A according to the second embodiment mainly in that the stepless transmission 20 is omitted. In FIG. 35, the component elements identical to those of the second embodiment are denoted by the same reference numerals. The following description is mainly given of different points from the second embodiment.

The first main shaft 4 is integrally formed with a gear 4b. The gear 4b is in mesh with the gear 5b integrally formed on the aforementioned auxiliary shaft 5. The gear ratio between the gears 4b and 5b is set to 1:1, for example. Further, differently from the second embodiment, the above-described idler shaft 8 is not provided with the first idler gear 8a, and the clutch CL3 has an input shaft and an output shaft thereof directly connected to the auxiliary shaft 5 and the idler shaft 8, respectively. The degree of engagement of the clutch CL3 is controlled by the ECU 2, whereby the connection between the auxiliary shaft 5 and the idler shaft 8 is established and interrupted. Furthermore, the gear ratio between the above-described gear 6b and third idler gear 8c is set to 1:1.5, for example.

As described hereinabove, the power plant 1D is not provided with a transmission. Further, with the above arrangement, during engagement of the clutch CL3, the crankshaft 3a is mechanically connected to the drive wheels DW and DW via the flywheel 3b, the first main shaft 4, the gear 4b, the gear 5b, the auxiliary shaft 5, the clutch CL3, the idler shaft 8, the second idler gear 8b, the gear 9a, the differential gear mechanism 9, and the drive shafts 10 and 10, without using the transmission. Therefore, during traveling of the vehicle, in a state where the clutch CL3 is being engaged, the engine speed NE is unconditionally determined by the vehicle speed VP. In the present embodiment, a sequence of the component elements from the flywheel 3b to the auxiliary shaft 5, described above, correspond to the first power transmission path PT1.

In the power plant 1D configured as above, the operations by the aforementioned EV creep, EV standing start, ENG start during EV traveling, ENG start during stoppage of the vehicle, ENG creep, and ENG-based standing start, and the switching between the forward travel and reverse travel of the vehicle using the normal/reverse rotation-switching mechanism 60 are performed in the same manner as in the first and second embodiments, and only the ENG traveling and the deceleration regeneration are different from those in the case of the first and second embodiments. Hereinafter, a description will be given of these.

First, a description will be given of the ENG traveling. The ENG traveling includes a first transmission mode and a second transmission mode as transmission modes for transmitting the power from the engine 3. The first transmission mode is selected when predetermined conditions, referred to hereinafter, concerning the vehicle speed VP are not satisfied, and the second transmission mode is selected when the predetermined conditions are satisfied. First, a description is given of the first transmission mode.

During the first transmission mode, the clutch CL3 is disengaged to release the above-described connection between the crankshaft 3a and the drive wheels DW and DW via the first power transmission path PT1 and at the same time the operation of the rotating machine 31 is controlled, whereby the engine torque TENG is transmitted to the drive wheels DW and DW via the first and second rotors 34 and 35, and the second power transmission path PT2 including the second main shaft 6. In this case, when the rotational direction of the rotating magnetic field dependent on the engine speed NE, the vehicle speed VP, and so forth is the direction of normal rotation, electric power is supplied from the battery 45 to the stator 33, whereas when the rotational direction is the direction of reverse rotation, electric power generation is performed by the rotating machine 31. Thus, similarly to the case of the ENG-based standing start already described with reference to FIGS. 30 and 31, the driving equivalent torque TSE and the engine torque TENG are combined during supply of electric power, and the electric power-generating equivalent torque TGE and the engine torque TENG are combined during electric power generation, as positive torque in both of the cases, whereafter the combined torque is transmitted to the drive wheels DW and DW via the second rotor 35 and the second power transmission path PT2.

Further, during the first transmission mode, the speed of the power transmitted from the engine 3 to the drive wheels DW and DW is steplessly changed by controlling the magnetic field rotational speed VMF. That is, the rotating machine 31 functions as a stepless transmission. Hereafter, this point will be described with reference to FIGS. 36 and 37.

Figure 36:
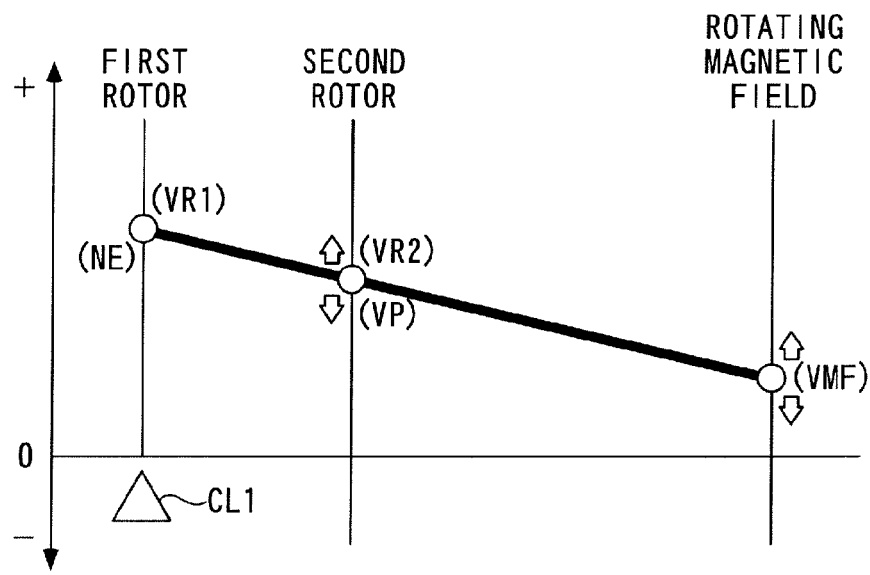
FIG. 36 A diagram which is useful in explaining a speed-changing operation performed when a rotating magnetic field in the power plant shown in FIG. 35 is performing normal rotation FIG. 37 A diagram which is useful in explaining speed-changing operation performed when the rotating magnetic field in the power plant shown in FIG. 35 is performing reverse rotation.
Figure 37:
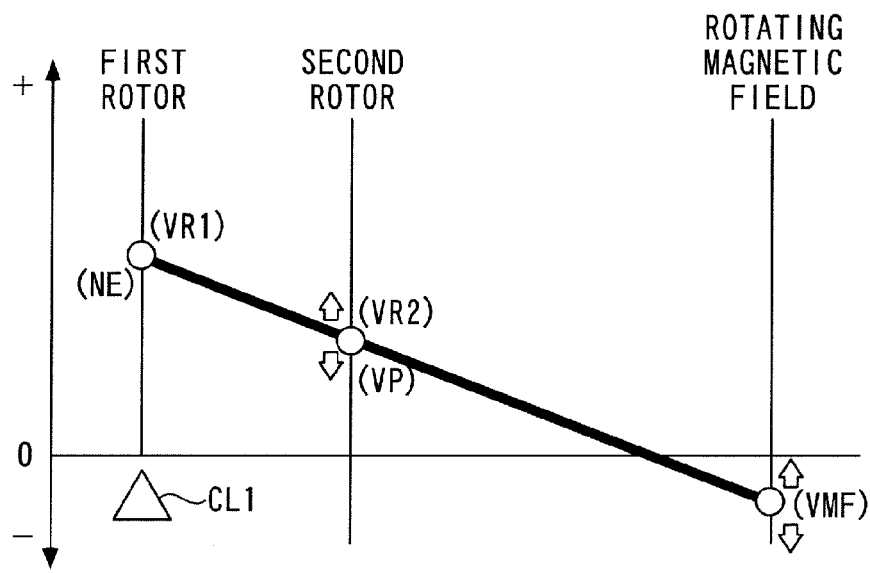

As is apparent from the above-described connection relationship, the first rotor rotational speed VR1 is equal to the engine speed NE, and the second rotor rotational speed VR2 is equal to the vehicle speed VP, assuming that there is no change in speed by the gears. Therefore, the relationship between the magnetic field rotational speed VMF, the first and second rotor rotational speeds VR1 and VR2, the engine speed NE, and the vehicle speed VP is represented in a single velocity nomograph, as shown in FIGS. 36 and 37. Referring to FIG. 36, when the rotating magnetic field performs normal rotation, as is clear from hollow arrows shown in the figure, the speed of the power transmitted to the drive wheels DW and DW is steplessly increased by increasing the magnetic field rotational speed VMF, and is steplessly reduced by reducing the magnetic field rotational speed VMF.

Further, as shown in FIG. 37, when the rotating magnetic field is performing reverse rotation, as is clear from hollow arrows shown in the figure, the speed of the power transmitted to the drive wheels DW and DW is steplessly reduced by increasing the magnetic field rotational speed VMF, and is steplessly increased by reducing the magnetic field rotational speed VMF. In this case, the magnetic field rotational speed VMF is controlled to a value close to 0, whereby electric power input to and output from the battery 45 is suppressed while the speed of the power transmitted to the drive wheels DW and DW is changed to some extent.

Furthermore, during the first transmission mode, to rapidly accelerate the vehicle in response to a very large demanded torque PMCMD, the engine speed NE is rapidly increased by controlling the throttle valve opening and the like, whereby the engine torque TENG is rapidly increased. Further, when the rotational direction of the rotating magnetic field determined by the relationship between the first and second rotor rotational speeds VR1 and VR2 is the direction of normal rotation (see FIG. 36), electric power is supplied to the stator 33, whereas when the rotational direction of the rotating magnetic field is the direction of reverse rotation (see FIG. 37), the rotating machine 31 generates electric power. This causes the engine torque TENG and the driving equivalent torque TSE (or the electric power-generating equivalent torque TGE) both as positive torque to be combined, and then the combined torque is transmitted to the drive wheels DW and DW, thereby rapidly accelerating the vehicle.

As described above, during rapid acceleration of the vehicle, by performing the power transmission in the first transmission mode and disengaging the clutch CL3 to release the mechanical connection between the engine 3 and the drive wheels DW and DW via the first power transmission path PT1, it is possible to increase the engine speed NE irrespective of the vehicle speed VP at the time, thereby making it possible to rapidly increase the engine torque TENG. Further, such engine torque TENG and the driving equivalent torque TSE or the electric power-generating equivalent torque TGE, both as positive torque are combined, and the combined torque is transmitted to the drive wheels DW and DW, so that it is possible to transmit larger torque to the drive wheels DW and DW. This makes it possible to accelerate the vehicle rapidly, thereby making it possible to improve marketability.

Further, during the first transmission mode, when the vehicle performs hill-climbing traveling, the operations of the engine speed NE and the rotating machine 31 are controlled according to the charged state SOC. Specifically, when the charged state SOC is larger than the first predetermined value SOCL, which means that an sufficient amount of the electric power remains in the battery 32, the engine speed NE is controlled according to the vehicle speed VP such that the rotating magnetic field performs normal rotation, and electric power is supplied from the battery 45 to the rotating machine 31 to cause the rotating magnetic field to perform normal rotation. As described above, this causes the engine torque TENG and the driving equivalent torque TSE to be combined by the rotating machine 31, and then the combined torque is transmitted to the drive wheels DW and DW.

On the other hand, when the charged state SOC is smaller than the first predetermined value SOCL during the hill-climbing traveling of the vehicle, the engine speed NE is controlled such that the rotating magnetic field performs reverse rotation, and at the same time electric power is generated by the rotating machine 31 to charge the battery 45 with the generated electric power. As described above, this causes the engine torque TENG and the driving equivalent torque TSE to be combined by the rotating machine 31, and then the combined torque is transmitted to the drive wheels DW and DW. It should be noted that the charging of the battery 45 is performed until the charged state SOC reaches the aforementioned second predetermined value SOCH. This makes it possible to continuously perform hill-climbing traveling while preventing the overdischarge and overcharge of the battery 45.

Further, during the first transmission mode, when the vehicle travels at a constant speed, and at the same time the vehicle speed VP becomes equal to or higher than a predetermined vehicle speed, the second transmission mode is selected in place of the first transmission mode. During the second transmission mode, the clutch CL3 having been disengaged during the first transmission mode is engaged to thereby connect the crankshaft 3a to the drive wheels DW and DW via both the first and second power transmission paths PT1 and PT2. The engagement of the clutch CL3 is performed in a state in which the rotational speed of the input shaft of the clutch CL3 and that of the output shaft thereof are made equal to each other by controlling the engine speed NE through control of the throttle valve opening and the like. The above-described predetermined rotational speed is set to the lowest rotational speed that makes it possible to cause the vehicle to travel without causing engine stall when the crankshaft 3a is connected to the drive wheels DW and DW via the first power transmission path PT1 by engaging the clutch CL3, and is set to a smaller value as maximum torque generated by the engine 3 is larger.

Furthermore, during the second transmission mode in which the clutch CL3 is engaged, the throttle valve opening is controlled such that optimum fuel economy of the engine 3 can be obtained at the engine speed NE unconditionally determined by the vehicle speed VP. When the clutch CL3 is engaged, the engine 3 is placed in a state mechanically, substantially directly connected to the drive wheels DW and DW, and hence very high driving efficiency can be obtained.

Further, in the second transmission mode, during execution of the above-described control of the throttle valve opening (hereinafter referred to as the "optimum fuel economy control"), when torque transmitted from the engine 3 to the drive wheels DW and DW is insufficient for the demanded torque PMCMD, electric power is supplied to the stator 33 for assisting the engine 3 by the rotating machine 31 such that the insufficient amount is compensated for. On the other hand, when torque transmitted from the engine 3 to the drive wheels DW and DW is surplus with respect to the demanded torque PMCMD, the surplus amount is used to perform electric power generation by the rotating machine 31, and the battery 45 is charged by the generated electric power. Such control of the rotating machine 31 makes it possible to expand an operating region where the optimum fuel economy of the engine 3 can be obtained in the above-mentioned state in which the clutch CL3 is engaged. It should be noted that the above-described assist by the rotating machine 31 is performed depending on the charged state SOC.

It should be noted that although the clutch CL3 is disengaged during the first transmission mode so that the normal operation mode or the reverse operation mode is selected as the operation mode of the aforementioned normal/reverse rotation-switching mechanism 60, the clutch CL3 is engaged during the second transmission mode so that only the normal operation mode is selected.

Further, the deceleration regeneration includes a first regeneration mode and a second regeneration mode as regeneration modes therefor. First, a description is given of the first regeneration mode.

During the first regeneration mode, the clutch CL3 is engaged, and the operation mode of the normal/reverse rotation-switching mechanism 60 is set to the normal operation mode (the clutch CL4: engaged, the electromagnetic brake CL5: turned off). At the same time, electric power generation is performed by the rotating machine 31 to charge the battery 45 with the generated electric power. In the first embodiment, as described hereinabove with reference to FIGS. 24 and 25, during the deceleration regeneration, in a state where the clutch CL3 is engaged, the engine 3 is mechanically connected to the drive wheels DW and DW via the first power transmission path PT1, and hence the electric power-generating equivalent torque TGE transmitted to the stator 33, i.e. electric power for charging the battery 45 can be controlled to a larger value as the friction of the engine 3 is smaller and as a consequence torque transmitted from the drive wheels DW and DW to the engine 3 is smaller. Therefore, the first regeneration mode is selected when the friction of the engine 3 is small due to low engine speed NE.

Control during the second regeneration mode is distinguished from the control during the first regeneration mode only in that the clutch CL3 is disengaged. In this case, as is clear from the above-described functions of the rotating machine 31, torque transmitted from the drive wheels DW and DW to the second rotor 35 via the second power transmission path PT2 is distributed to the stator 33 and the first rotor 34 at a distribution ratio of 1:2. When the clutch CL3 is thus disengaged, as the friction of the engine 3 acting on the first rotor 34 is larger, larger electric power can be generated by the stator 33, and hence the second regeneration mode is selected when the friction of the engine 3 is large due to high engine speed NE. It is to be understood that in the first to fourth embodiments, the operation in the deceleration regeneration mode may be performed in the same manner as in the present embodiment.

Further, similarly to the first embodiment, by disengaging the clutch CL3 and at the same time holding the first rotor 34 unrotatable by a lock mechanism formed e.g. by an electromagnetic brake or a handbrake, the first rotor rotational speed VR1 may be held at 0, and in this state, using the power from the drive wheels DW and DW, the operation in the deceleration regeneration mode may be performed. This makes it possible, as already described with reference to FIG. 26, to convert all the power from the drive wheels DW and DW into electric power, i.e. generate electric power.

As described above, according to the present embodiment, since both the crankshaft 3a and the second rotor 35 are connected to the drive wheels DW and DW without using the transmission, it is possible to avoid power transmission loss in the transmission, thereby making it possible to enhance the driving efficiencies of the engine 3 and the rotating machine 31 for driving the drive wheels DW and DW, and the electric power-generating efficiency of the rotating machine 31. Further, the stepless transmission 20 used in the second embodiment is omitted, which makes it possible to attain the reduction of the size and costs of the power plant 1D by the size and costs of the omitted stepless transmission 20.

Further, at the time of the ENG-based standing start, the electric power generation is performed by the rotating machine 31 and then the battery 45 is charged with the generated power, whereafter electric power is supplied from the battery 45 to the rotating machine 31. In a state where the clutch CL3 is disengaged after the ENG-based standing start, the magnetic field rotational speed VMF is controlled to a value close to 0. Further, during traveling at a predetermined constant speed, the clutch CL3 is engaged to transmit the power from the engine 3 to the drive wheels DW and DW in an approximately directly connected state, and the assist and the electric power generation are performed by the rotating machine 31 according to the demanded torque PMCMD. This makes it possible, during traveling of the vehicle, to make the input and output of electric power to and from the battery 45 approximately balanced, so that the size of the battery 45 can be reduced, whereby it is made possible to attain further reduction of the size and costs of the power plant 1D. Further, during disengagement of the clutch CL3 after the ENG-based standing start, the power from the engine 3 can be transmitted to the drive wheels DW and DW while steplessly changing the speed thereof, as described hereinabove with reference to FIGS. 36 and 37.

Furthermore, during disengagement of the clutch CL3, the engine torque TENG and the driving equivalent torque TSE (or the electric power-generating equivalent torque TGE) are combined as positive torque by the second rotor 35, and then the combined torque is transmitted to the drive wheels DW and DW. This makes it possible to transmit larger torque to the drive wheels DW and DW.

It should be noted that in the present embodiment, differently from the second embodiment, the stepless transmission 20 is not provided, and hence it is impossible to obtain the effects provided by the stepless transmission 20, but it is possible to obtain the same advantageous effects as provided by the second embodiment, except those effects. That is, since the same rotating machine 31 as in the first embodiment is included, it is possible to obtain the effects provided by not using a planetary gear unit for use in distributing and combining power, and the effects provided by setting the pole pair number ratio α. Further, since the ENG-based standing start is performed in the same manner as in the first embodiment, it is possible to obtain the effects provided by elimination of the need of the friction start clutch. Further, it is possible to obtain the effects of inclusion of the one-way clutch CL1, the casing CA, and the clutch CL3, on the EV standing start, and the effects of inclusion of the clutches CL3 and CL4 and the electromagnetic brake CL5, on the ENG start during stoppage of the vehicle, in the same manner, as well as the effects provided by inclusion of the normal/reverse rotation-switching mechanism 60, in the same manner.

Further, in the present embodiment, when the above-described ENG start during EV traveling is performed by engaging the clutch CL3, as is clear from the connection relationship between the first and second rotors 34 and 35, in accordance with engagement of the clutch CL3, the speed ratio between the first and second rotor rotational speeds VR1 and VR2 is fixed to a predetermined speed ratio. Therefore, when the vehicle speed VP is high, and the second rotor rotational speed VR2 is high, the engine speed NE is controlled to a lower value suitable for the start of the engine 3, by causing the clutch CL3 to slide without causing the same to be completely engaged, and in this state, the engine 3 is started by controlling the fuel injection valves etc. Therefore, similarly to the first embodiment, it is possible to suppress vibrations and noise caused by the start of the engine 3, which makes it possible to improve marketability.

Figure 38:
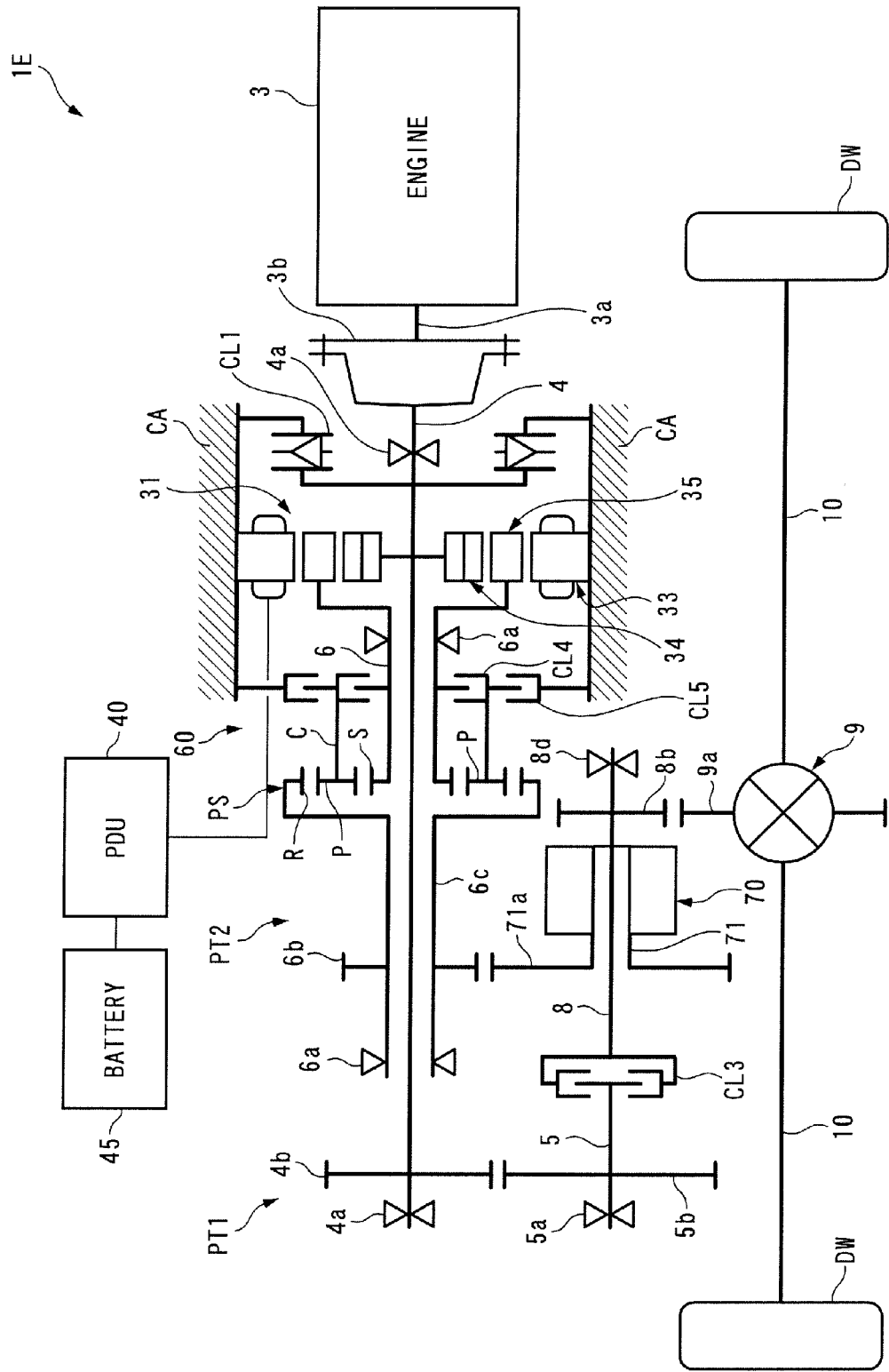
FIG. 38 A schematic diagram of a power plant according to a sixth embodiment.

Next, a power plant 1E according to a sixth embodiment of the present invention will be described with reference to FIG. 38. As shown in the figure, this power plant 1E is formed by combining the above-mentioned power plant 1D according to the fifth embodiment and the above-described transmission 70 according to the third embodiment. More specifically, in the power plant 1E, the second rotor 35 is always mechanically connected to the drive wheels DW and DW via the second power transmission path PT2 including the planetary gear unit PS and the transmission 70, as described in the third embodiment. Further, the power plant 1E is operated in the various operation modes described in the fifth embodiment, in the same manner as in the fifth embodiment, and at the same time, the transmission 70 is controlled in the same manner as in the third embodiment.

Therefore, according to the present embodiment, it is possible to obtain the same advantageous effects as provided by both the third and fifth embodiments, mainly, for example, in that it is possible to reduce the size and costs of the rotating machine 31. It should be noted that in the present embodiment, the second rotor 35 is connected to the drive wheels DW and DW via the transmission 70, and hence it is impossible to obtain the effects provided by preventing power transmission loss in the transmission, as in the fifth embodiment.

Figure 39:
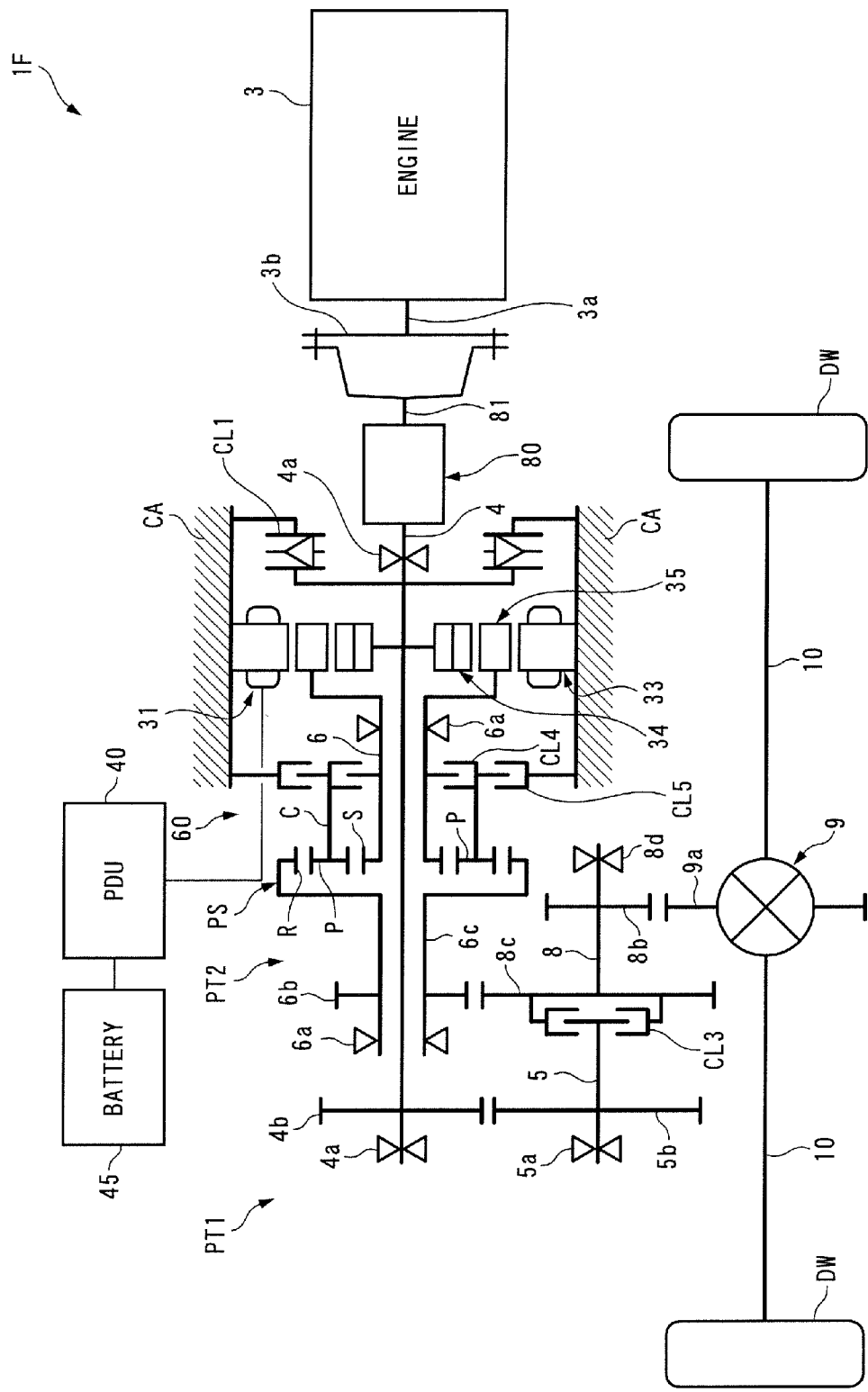
FIG. 39 A schematic diagram of a power plant according to a seventh embodiment.

Next, a power plant 1F according to a seventh embodiment of the present invention will be described with reference to FIG. 39. As shown in the figure, this power plant 1F is formed by combining the power plant 1D according to the fifth embodiment and the above-described transmission 80 in the fourth embodiment. More specifically, in the power plant 1F, the first rotor 34 is always mechanically connected to the crankshaft 3a via the first main shaft 4, the transmission 80, and the flywheel 3b. Further, during engagement of the clutch CL3, the crankshaft 3a is mechanically connected to the drive wheels DW and DW via the flywheel 3b, the transmission 80, the first main shaft 4, the gear 4b, the gear 5b, the auxiliary shaft 5, the clutch CL3, the idler shaft 8, the second idler gear 8b, the gear 9a, the differential gear mechanism 9, and the drive shafts 10 and 10. In the present embodiment, a sequence of the component elements from the flywheel 3b to the auxiliary shaft 5, described above, correspond to the first power transmission path PT1. Further, the gear ratio between the gear 9a of the differential gear mechanism 9 and the second idler gear 8b is set in the same manner as in the fourth embodiment.

Furthermore, the power plant 1F is operated in the various operation modes described in the fifth embodiment, in the same manner as in the fifth embodiment, and the transmission 80 is controlled in the same manner as in the fourth embodiment. Therefore, according to the present embodiment, it is possible to obtain the same advantageous effects as provided by both the fourth and fifth embodiments, mainly, for example, in that it is possible to prevent failure of the rotating machine 31 due to an excessive increase in the first rotor rotational speed VR1. More specifically, since the same rotating machine 31 as in the first embodiment is included, it is possible to similarly obtain the effects provided by not using a planetary gear unit for use in distributing and combining power, and the effects provided by setting the pole pair number ratio α, and since the ENG-based standing start is performed in the same manner as in the first embodiment, it is possible to obtain the effects provided by elimination of the need of the friction start clutch.

Further, it is possible to similarly obtain the effects of inclusion of the one-way clutch CL1, the casing CA, and the clutch CL3, on the EV standing start, and the effects of inclusion of the clutches CL3 and CL4 and the electromagnetic brake CL5, on the ENG start during stoppage of the vehicle, as well as the effects provided by inclusion of the normal/reverse rotation-switching mechanism 60. Furthermore, similarly to the fifth embodiment, by disengaging the clutch CL3 and controlling the operation of the rotating machine 31, it is possible to transmit the power from the engine 3 to the drive wheels DW and DW while steplessly changing the speed thereof, and also, during disengagement of the clutch CL3, it is possible to combine the engine torque TENG and the driving equivalent torque TSE (or the electric power-generating equivalent torque TGE) as positive torque and then transmit the combined torque to the drive wheels DW and DW.

It should be noted that in the present embodiment, the crankshaft 3a is connected to the drive wheels DW and DW via the transmission 80, and hence it is impossible to obtain the effects provided by preventing power transmission loss in the transmission, as in the fifth embodiment.

Figure 40:
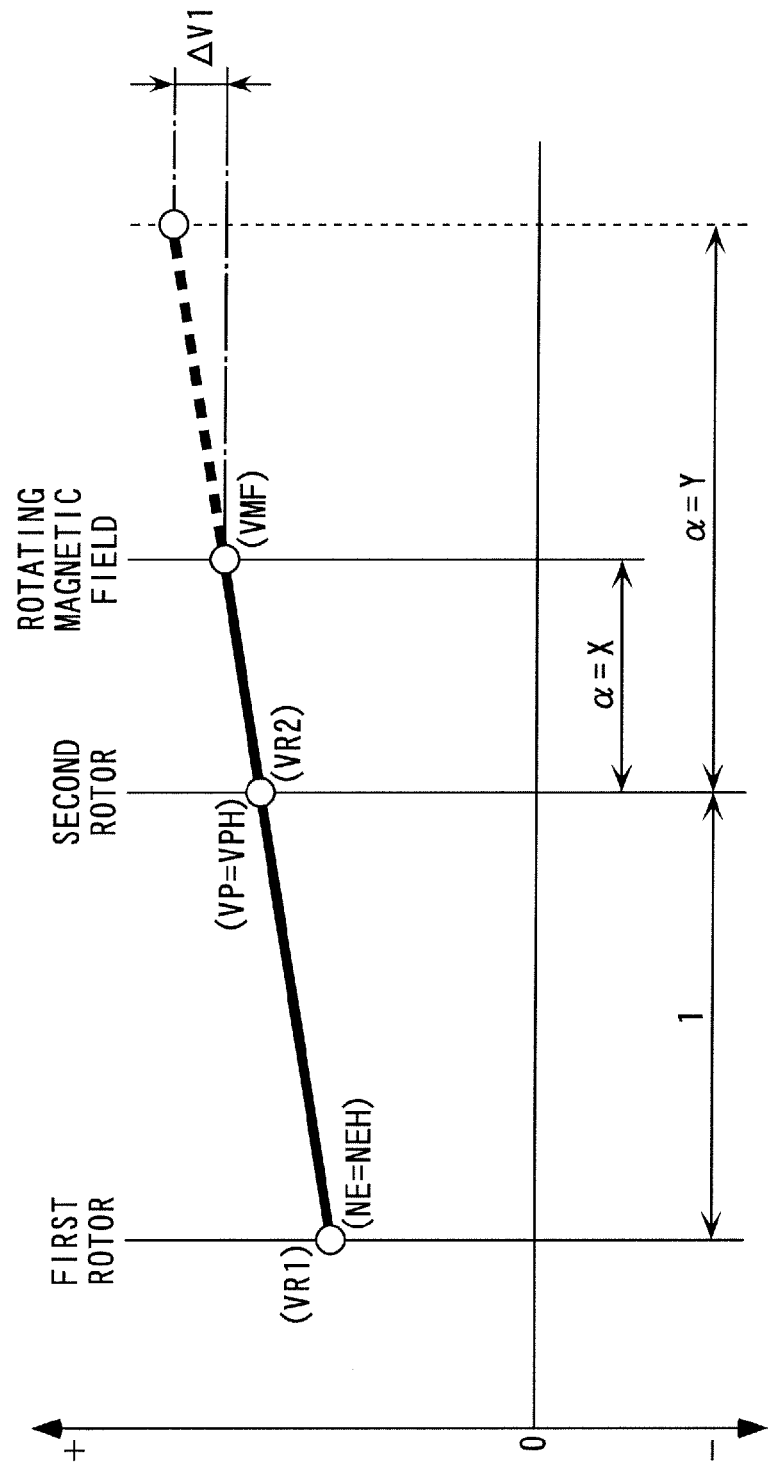
FIG. 40 A velocity nomograph illustrating an example of the relationship between the magnetic field rotational speed, and the first and second rotor rotational speeds in the power plants shown in FIGS. 1 and 35 and so forth, when a pole pair number ratio is set to a first predetermined number and a second predetermined number, respectively.

It should be noted that although in the above-described first to seventh embodiments, the pole pair number ratio α is set to 2.0, if the pole pair number ratio α is set to less than 1.0, it is possible to obtain the following advantageous effects: FIG. 40 shows the relationship between the magnetic field rotational speed VMF and the first and second rotor rotational speeds VR1 and VR2 in a case where the pole pair number ratio α is set to a first predetermined value X smaller than 1.0 (solid line), together with the relationship between the rotational speeds in a case where the pole pair number ratio α is set to a second predetermined value Y larger than 1.0 (broken line). Further, in the figure, from the above-mentioned connection relationship, it is regarded that the first rotor rotational speed VR1 is equal to the engine speed NE, and at the same time the second rotor rotational speed VR2 is equal to the vehicle speed VP.

For example, during high-speed traveling of the vehicle, as shown in FIG. 40, when the engine speed NE is equal to a predetermined highest rotational speed NEH, and at the same time the vehicle speed VP is equal to a predetermined highest speed VPH, the second rotor rotational speed VR2 exceeds the first rotor rotational speed VR1, which is relatively high, whereby the magnetic field rotational speed VMF exceeds the second rotor rotational speed VR2, which is relatively high, and becomes very high. In contrast, when the pole pair number ratio α is set to the first predetermined value X, the magnetic field rotational speed VMF can be lowered by ΔV1 than when the pole pair number ratio α is set to the second predetermined value Y, whereby it is possible to prevent the driving efficiency and the electric power-generating efficiency from being lowered by occurrence of loss due to an excessive increase in the magnetic field rotational speed VMF.

Further, although in the first to seventh embodiments, the first rotor 34 is connected to the drive wheels DW and DW, the first rotor 34 is not necessarily required to be connected to the drive wheels DW and DW insofar as it is connected to the crankshaft 3a. For example, the crankshaft 3a may be connected to two rotating shafts using gears or the like such that one of the rotating shafts is connected to the first rotor 34, and the other rotating shaft is connected to the drive wheels DW and DW via the first main shaft 4. In this case, in the seventh embodiment, the crankshaft 3a can be connected to the drive wheels DW and DW without via the transmission 80, and hence similarly to the fifth embodiment, it is possible to prevent power transmission loss in the transmission to thereby attain high driving efficiency.

Figure 41:
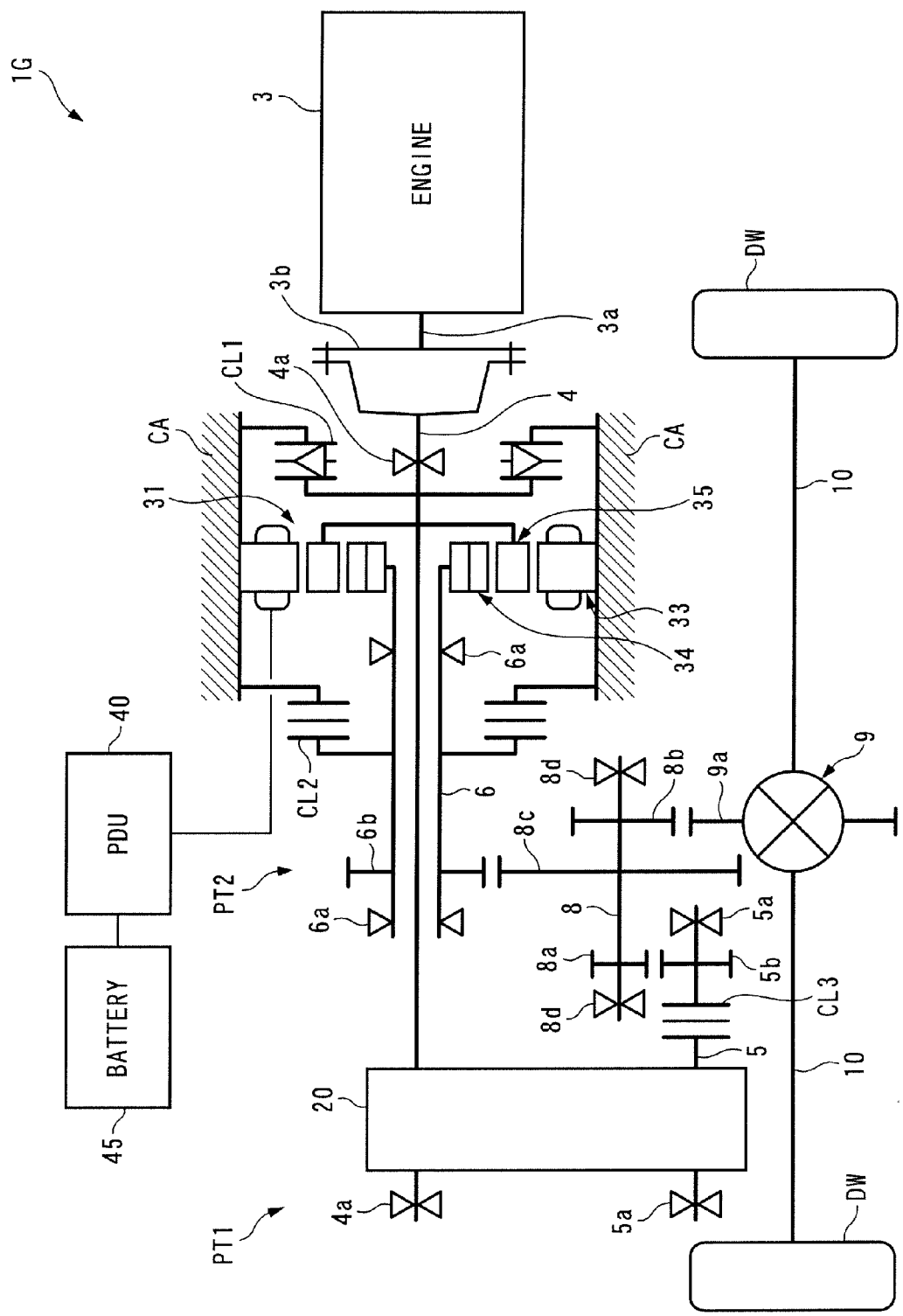
FIG. 41 A schematic diagram of a power plant according to an eighth embodiment.

Next, a power plant 1G according to an eighth embodiment of the present invention will be described with reference to FIG. 41. The power plant 1G is distinguished from the power plant 1 according to the above-described first embodiment only in that the connection relationship between the first and second rotors 34 and 35 and the engine 3 is opposite to that in the power plant 1. In FIG. 41, the component elements identical to those of the first embodiment are denoted by the same reference numerals. The following description is mainly given of different points from the first embodiment.

As shown in FIG. 41, the second rotor 35 is integrally formed on the first main shaft 4, and the first rotor 34 is integrally formed on the second main shaft 6. That is, in the power plant 1G, the second rotor 35 is always mechanically connected to the crankshaft 3a via the first main shaft 4 and the flywheel 3b, and the first rotor 34 is always mechanically connected to the drive wheels DW and DW via the second power transmission path PT2, which does not include the transmission described in the first embodiment. Further, during engagement of the clutch CL3, the crankshaft 3a is mechanically connected to the drive wheels DW and DW via the first power transmission path PT1, which includes the stepless transmission 20 described in the first embodiment. Further, differently from the first embodiment, the clutch CL3 is formed not by a friction clutch but by a dog tooth clutch.

Next, the operation of the power plant 1G controlled by the ECU 2 will be described. The power plant 1G has operation modes, such as the EV creep described in the first embodiment. Due to the above-described connection relationship, part of control in the operation modes is different from the control in the first embodiment. Now, a description will be sequentially given of these operation modes, starting with the ENG start during stoppage of the vehicle.

ENG Start During Stoppage of the Vehicle

Figure 42:
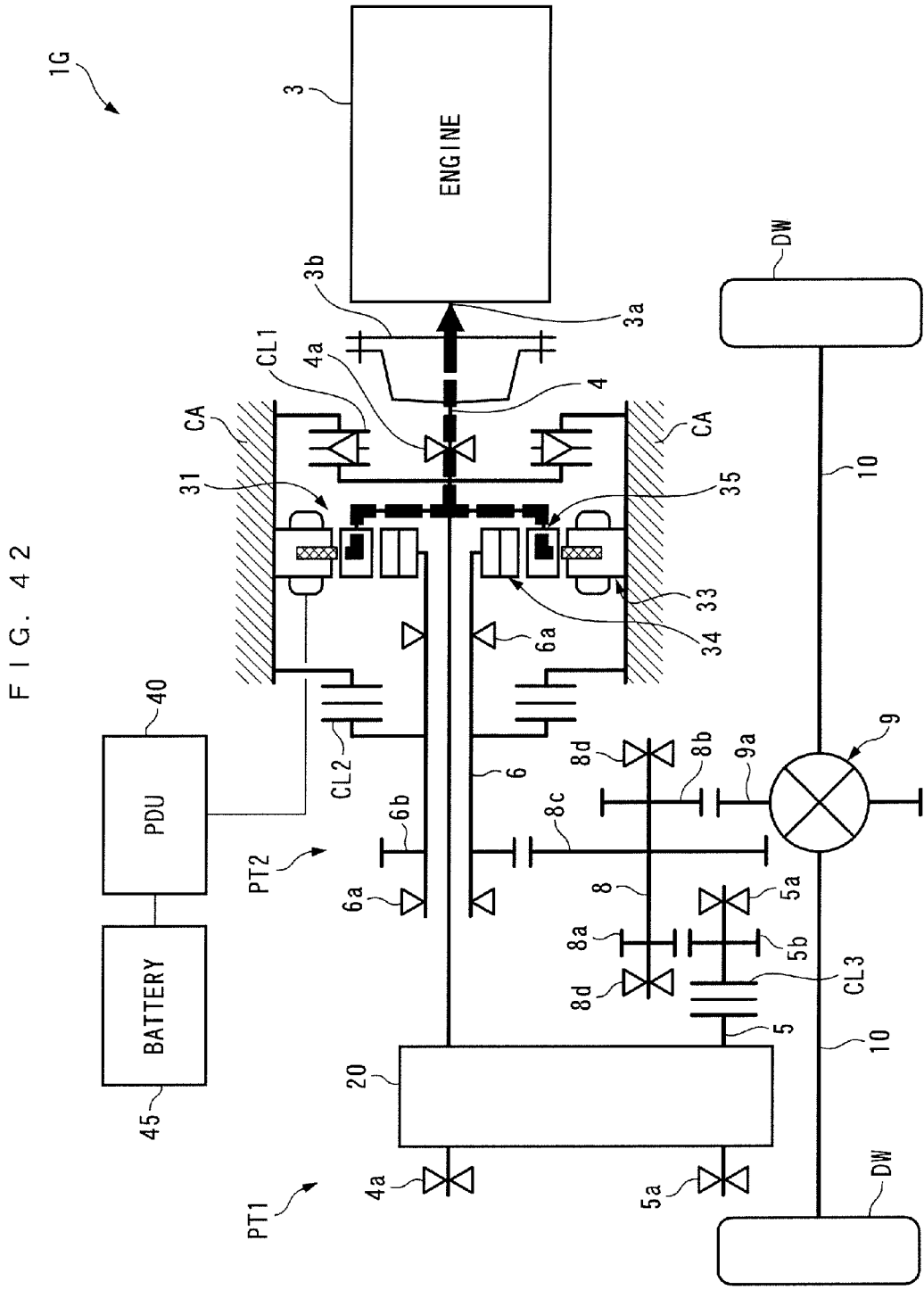
FIG. 42 A diagram showing a state of transmission of torque in the power plant shown in FIG. 41 at the time of the ENG start during stoppage of the vehicle.

At the time of the ENG start during stoppage of the vehicle, the electromagnetic brake CL2 is controlled to the ON state to thereby hold the second main shaft 6 and the first rotor 34 integral therewith unrotatable, and at the same time the clutch CL3 is disengaged to thereby release the connection between the crankshaft 3a and the drive wheels DW and DW via the first power transmission path PT1. Further, electric power is supplied to the stator 33. From the above, as shown in FIG. 42, the driving equivalent torque TSE is transmitted from the stator 33 to the second rotor 35, and further to the crankshaft 3a. In this case, as is clear from the aforementioned equation (41), the torque having a magnitude three times as large as that of the driving equivalent torque TSE is transmitted to the crankshaft 3a. Further, as shown in FIG. 43, the rotating magnetic field is caused to perform normal rotation. From the above, as shown in the figure, in a state of the first rotor rotational speed VR1 being equal to 0, i.e. in a state of the drive wheels DW and DW being at rest, the second rotor 35 performs normal rotation together with the crankshaft 3a. In this state, the engine 3 is started by controlling the ignition operation of the fuel injection valves and the spark plugs of the engine 3.

ENG Creep

During the ENG creep, the electromagnetic brake CL2 is controlled to the OFF state to thereby permit the rotation of the second main shaft 6 and the first rotor 34 integrally formed therewith. Furthermore, the clutch CL3 is disengaged, and at the rotating machine 31, part of the power from the engine 3 transmitted to the second rotor 35 is converted into electric power to generate electric power and charge the battery 45 with the generated electric power.

Figure 44:
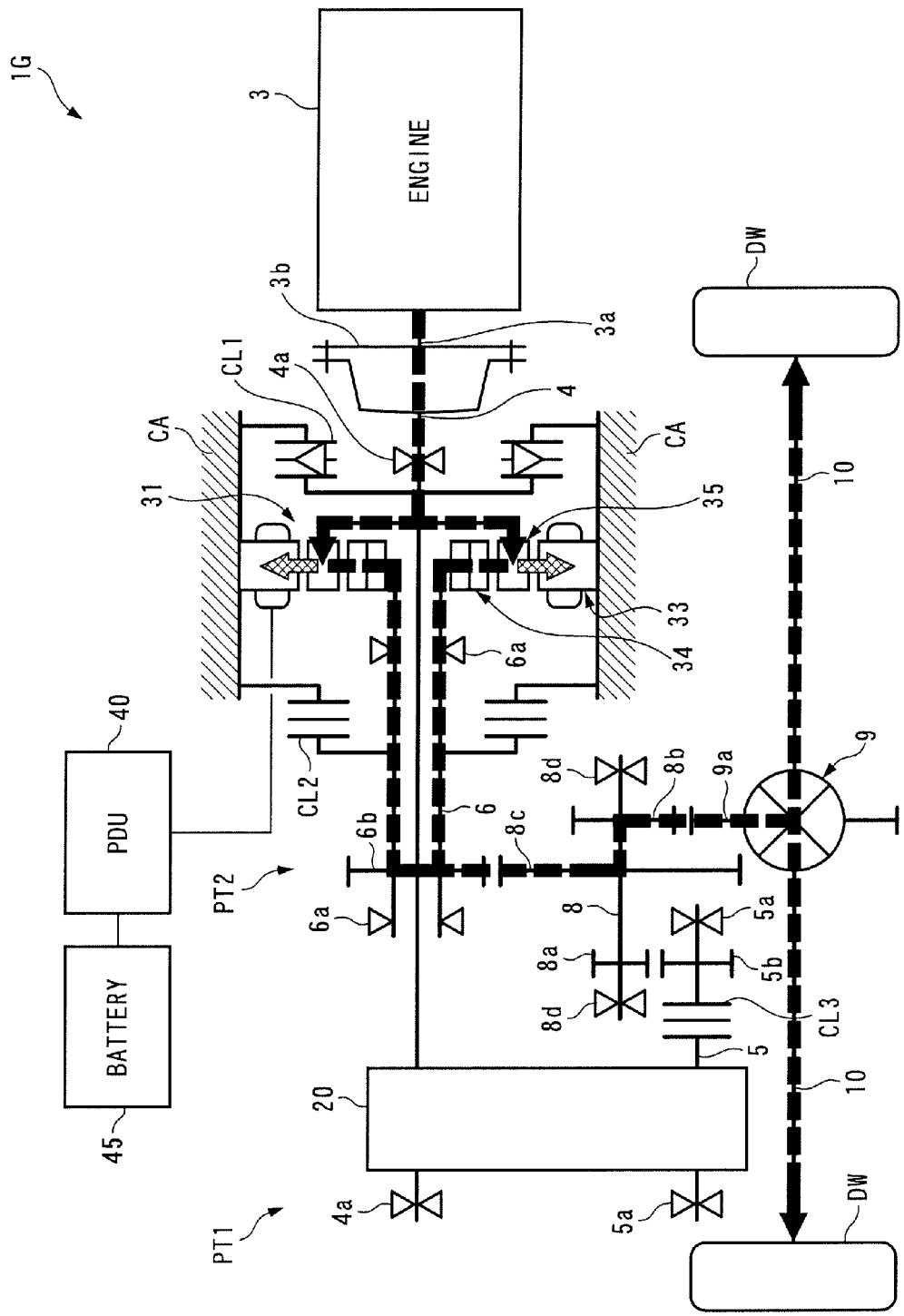
FIG. 44 A diagram showing a state of transmission of torque in the power plant shown in FIG. 41 during the ENG creep.

Along with this electric power generation, as shown in FIG. 44, part of the engine torque TENG is transmitted to the second rotor 35, and the torque transmitted to the second rotor 35 is distributed to the stator 33 and the first rotor 34. The torque distribution ratio in this case is such that power-generating equivalent torque TGE:first rotor transmission torque TR1=1:2. Further, the torque distributed to the first rotor 34 is transmitted to the drive wheels DW and DW via the second power transmission path PT2 including the second main shaft 6 etc., to act on the drive wheels DW and DW in such a direction as will cause them to perform normal rotation. Further, the amount of electric power generated by the rotating machine 31 is controlled such that the first rotor rotational speed VR1 becomes very small, whereby the creep operation is performed. As described above, during the ENG creep, similarly to the first embodiment, part of the engine torque TENG is transmitted to the drive wheels DW and DW, so that it is possible to perform the creep operation without causing engine stall.

ENG-Based Standing Start

At the time of the ENG-based standing start, similarly to the above-described ENG creep, the electromagnetic brake CL2 and the clutch CL3 are controlled to the OFF state and the disengaged state, respectively, and at the same time the engine torque TENG and the engine speed NE are increased. Then, the amount of electric power generated by the rotating machine 31 is progressively increased to thereby progressively increase the electric power-generating equivalent torque TGE transmitted from the second rotor 35 to the stator 33. In this case, as described above, the torque transmitted to the second rotor 35 is distributed to the stator 33 and the first rotor 34 at the distribution ratio of 1:2, and hence by progressively increasing the electric power-generating equivalent torque TGE as described above, torque transmitted from the engine 3 to the drive wheels DW and DW via the second rotor 35 and the first rotor 34 is progressively increased. Further, the magnetic field rotational speed VMF generated in accordance with electric power generation is increased.

Figure 45:
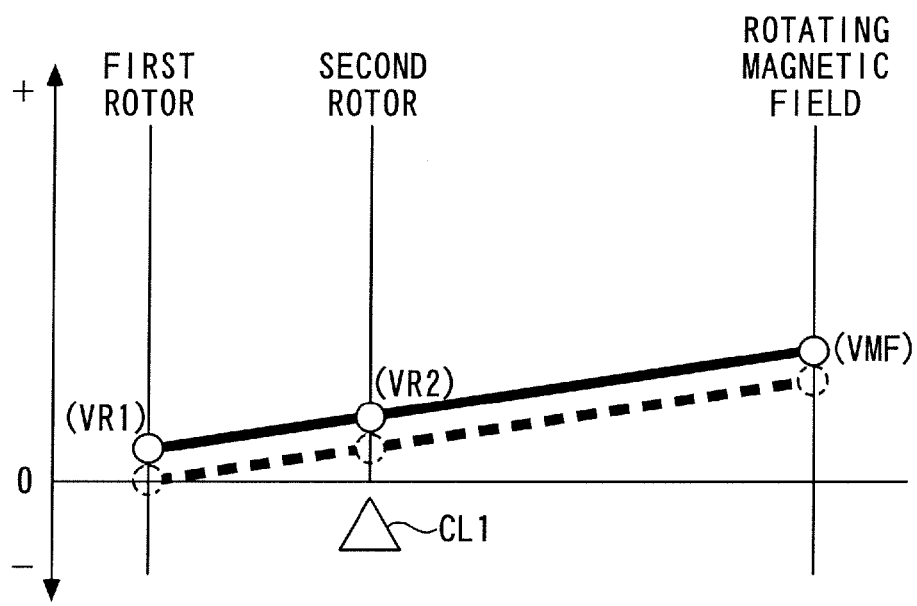
FIG. 45 A velocity nomograph illustrating an example of the relationship between the magnetic field rotational speed, and the first and second rotor rotational speeds in the power plant shown in FIG. 41 at the time of the ENG-based standing start.

From the above, as indicated by a solid line in FIG. 45, the first rotor rotational speed VR1 rises from the state having been approximately equal to 0 (broken line in the figure), and the rotational speed of the drive wheels DW and DW connected to the first rotor 34, i.e. the vehicle speed VP, also increases to cause the vehicle to make a standing start. Then, after the vehicle speed VP has appropriately increased, by controlling the transmission ratio RATIO of the stepless transmission 20, the rotational speeds of the aforementioned input shaft and output shaft of the clutch CL3 are controlled such that they become equal to each other. In this state, the clutch CL3 is engaged, to perform an operation by the ENG traveling.

As described hereinabove, at the time of the ENG-based standing start, similarly to the first embodiment, it is possible to progressively increase the torque transmitted from the engine 3 to the drive wheels DW and DW, which makes it possible to start the vehicle without causing engine stall.

ENG Traveling

During the ENG traveling, similarly to the above-mentioned first embodiment, the electromagnetic brake CL2 and the clutch CL3 are controlled to the OFF state and the disengaged state, respectively, and basically, the power from the engine 3 is subjected to a speed change by the stepless transmission 20, and is transmitted to the drive wheels DW and DW via the first power transmission path PT1.

Further, during the ENG traveling, the power from the engine 3 is basically controlled such that the optimum fuel economy can be obtained. Furthermore, when the charged state SOC is larger than the aforementioned predetermined value SOCL, that is, a sufficient amount of electric power remains in the battery 45, and at the same time the power of the engine 3 controlled as described above is insufficient for a demanded output determined by the vehicle speed VP and the demanded torque PMCMD at the time, electric power is supplied from the battery 45 to the stator 33 such that the insufficient amount is compensated for, whereby the assist by the rotating machine 31 is performed.

Figure 46:
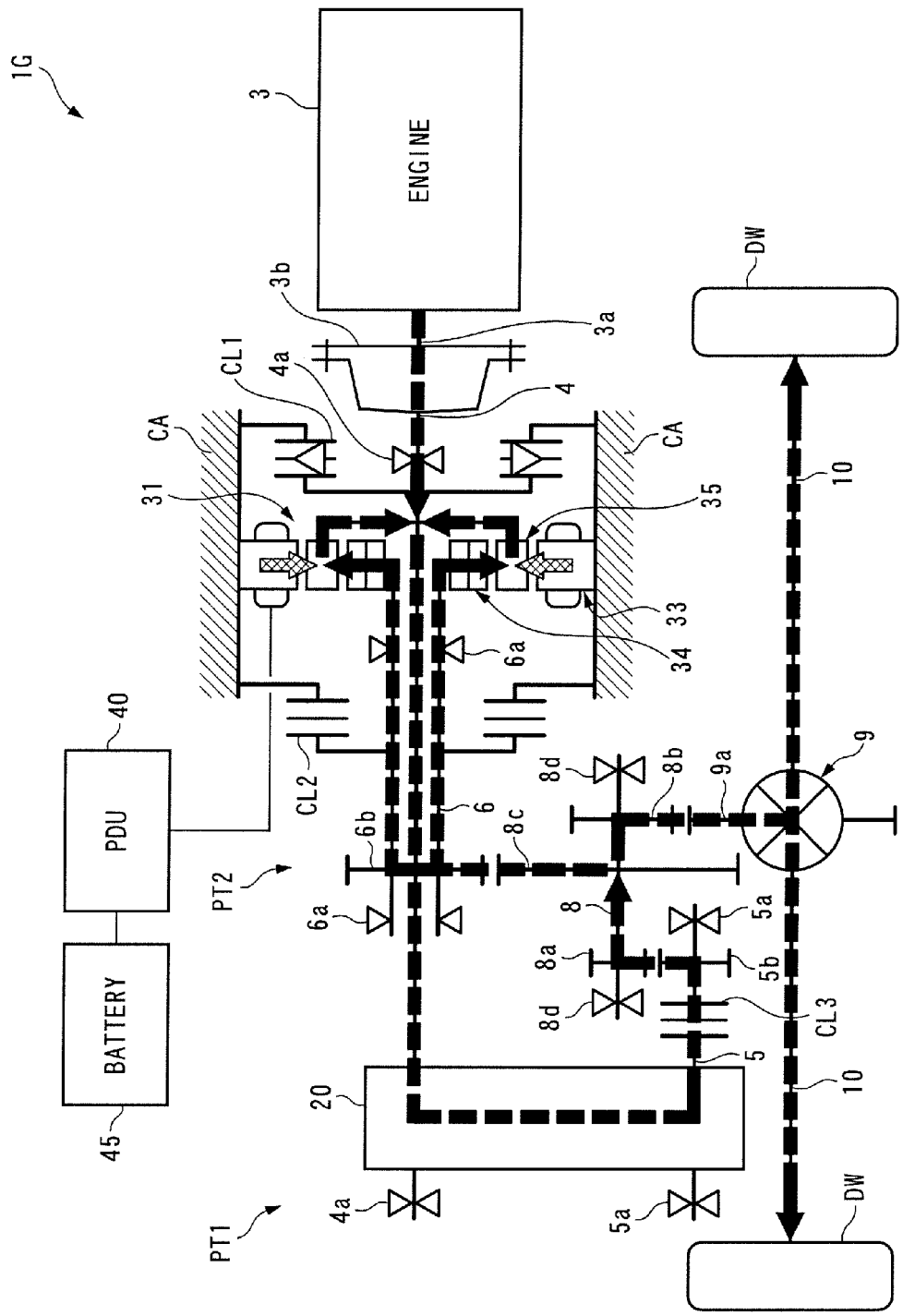
FIG. 46 A diagram showing a state of transmission of torque in the power plant shown in FIG. 41 during the assist.

During the above assist, as shown in FIG. 46, the driving equivalent torque TSE from the stator 33 and torque transmitted to the first rotor 34, as described hereinafter, are combined and the combined torque is transmitted to the second rotor 35. The distribution ratio in this case is such that driving equivalent torque TSE:first rotor transmission torque TR1=1:2. The torque transmitted to the second rotor 35 and the engine torque TENG are combined, and then the combined torque is transmitted to the idler shaft 8 via the first main shaft 4 and the stepless transmission 20. Part of the torque transmitted to the idler shaft 8 is transmitted to the first rotor 34 via the second power transmission path PT2 (second main shaft 6), and the remainder thereof is transmitted to the drive wheels DW and DW via the differential gear mechanism 9 etc. As a result, assuming that there is no change in speed by the gears, the torque transmitted to the drive wheels DW and DW becomes equal to the sum of the engine torque TENG and the driving equivalent torque TSE.

On the other hand, during traveling of the vehicle, when the charged state SOC is smaller than the aforementioned second predetermined value SOCH, that is, the electric power of the battery 45 is relatively small, and at the same time the power from the engine 3, which is controlled such that the optimum fuel economy can be obtained as described above, is surplus with respect to the above-mentioned demanded output, the surplus amount is used to perform the aforementioned drive-time electric power generation by the rotating machine 31, and the battery 45 is charged with the generated electric power. Similarly to the first embodiment, this electric power generation is carried out by using the power from the engine 3 transmitted to the second rotor 35.

Figure 47:
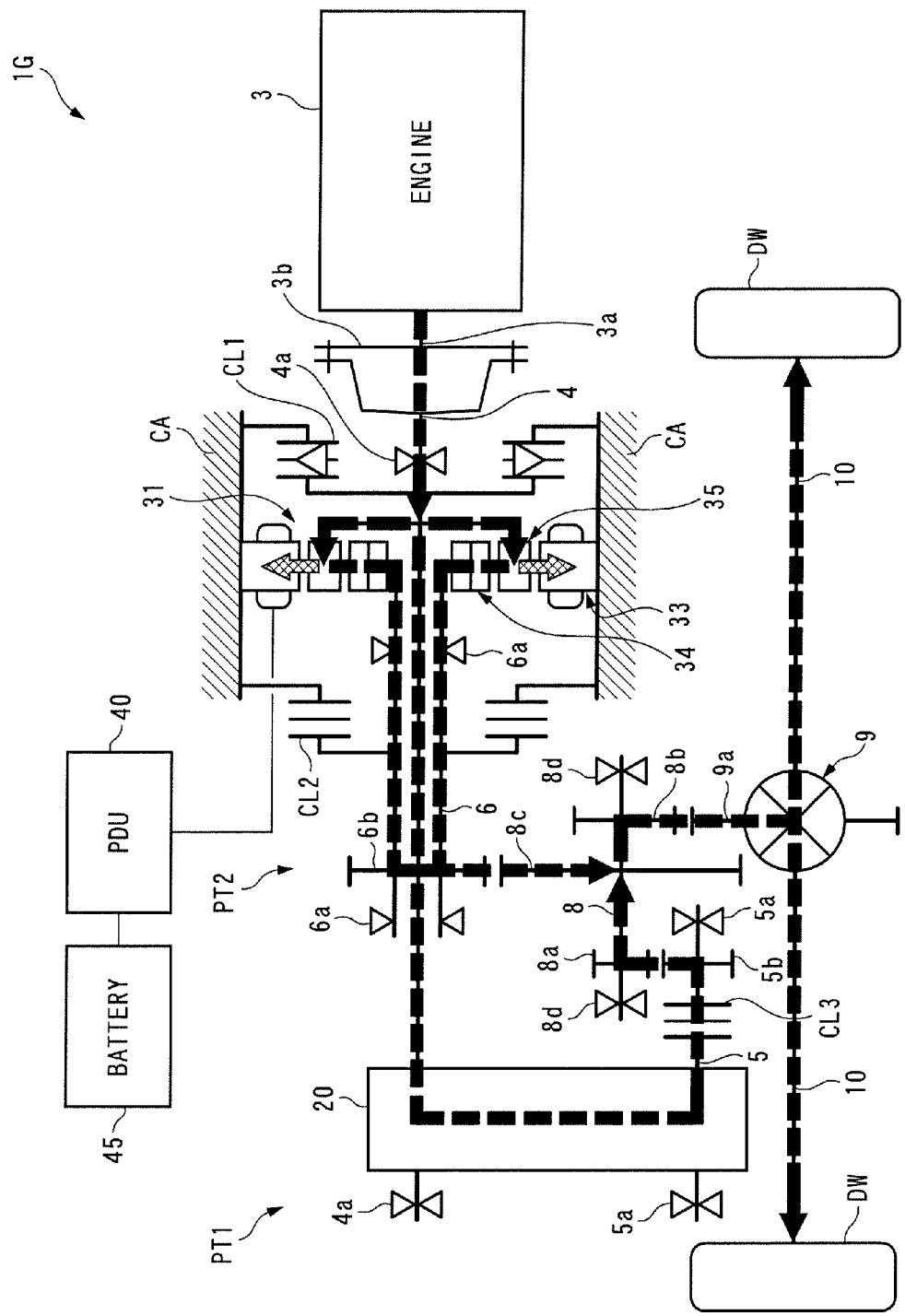
FIG. 47 A diagram showing a state of transmission of torque in the power plant shown in FIG. 41 during the drive-time electric power generation.

During the drive-time electric power generation, as shown in FIG. 47, part of the engine torque TENG is transmitted to the second rotor 35, and further is distributed to the stator 33 and the first rotor 34 at the distribution ratio of 1:2. The remainder of the engine torque TENG is transmitted to the stepless transmission 20, and is transmitted to the drive wheels DW and DW via the idler shaft 8 etc. together with the torque distributed to the first rotor 34 as described above. As a consequence, assuming that there is no change in speed by the gears, the torque transmitted to the drive wheels DW and DW has a magnitude equal to a value obtained by subtracting the electric power-generating equivalent torque TGE transmitted to the stator 33, from the engine torque TENG.

Further, during the assist and the drive-time electric power generation, the transmission ratio RATIO of the stepless transmission 20 is controlled in the same manner as in the first embodiment such that the optimum efficiencies of the engine 3 and the rotating machine 31 can be obtained. This controls the speed relationship between the first and second rotors 34 and 35 such that the magnetic field rotation direction becomes identical to the direction of rotations of the first and second rotors 34 and 35.

Figure 48:
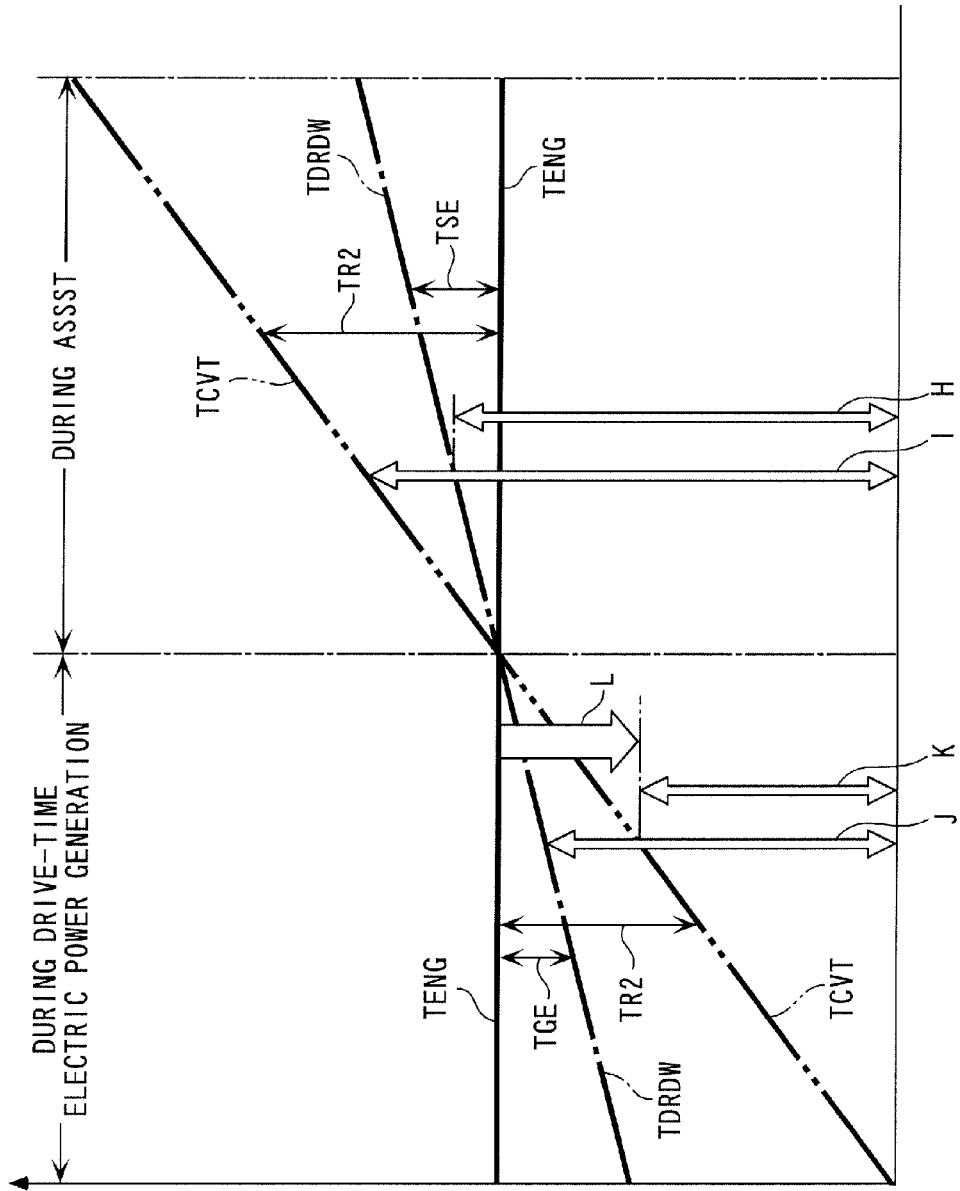
FIG. 48 A diagram showing respective ratios of the foot axis drive torque, the CVT transmission torque, and the like to the engine torque in the power plant shown in FIG. 41, when the engine torque is held constant during the assist and the drive-time electric power generation.

FIG. 48 is a diagram showing respective ratios of torques transmitted to the drive wheels DW and DW and the stepless transmission 20 etc. to the engine torque TENG, in a state where the engine torque TENG is held constant during the assist and the drive-time electric power generation by the aforementioned rotating machine 31. It should be noted that in FIG. 48, it is assumed that there is no change in speed by the gears. As shown in the figure, the foot axis drive torque TDRDW transmitted to the drive wheels DW and DW during the assist is equal to the sum of the engine torque TENG and the driving equivalent torque TSE, and becomes larger as the TSE value becomes larger. Further, as described above, since combined torque formed by combining the second rotor transmission torque TR2 transmitted to the second rotor 35 and the engine torque TENG is transmitted to the stepless transmission 20, and this second rotor transmission torque TR2 becomes larger as the driving equivalent torque TSE becomes larger, the CVT transmission torque TCVT transmitted to the stepless transmission 20 becomes larger as the driving equivalent torque TSE becomes larger. Furthermore, arrows H and I in FIG. 48 represent the foot axis drive torque TDRDW and the CVT transmission torque TCVT at the maximum output of the vehicle, respectively.

Further, as shown in FIG. 48, during the drive-time electric power generation, the foot axis drive torque TDRDW has a magnitude equal to a value obtained by subtracting the electric power-generating equivalent torque TGE from the engine torque TENG, and as the electric power-generating equivalent torque TGE is larger, i.e. as the amount of generated electric power is larger, it becomes smaller. Furthermore, as described hereinabove, the second rotor transmission torque TR2 is distributed to the stator 33 and the first rotor 34 along with the electric power generation, and hence the second rotor transmission torque TR2 becomes larger as the electric power-generating equivalent torque TGE distributed to the stator 33 is larger. Further, since part of the engine torque TENG is transmitted to the second rotor 35, and the remainder of the engine torque TENG is transmitted to the stepless transmission 20, the CVT transmission torque TCVT becomes smaller as the second rotor transmission torque TR2 is larger, i.e. as the electric power-generating equivalent torque TGE is larger.

Further, arrows J and K in FIG. 48 represent the foot axis drive torque TDRDW and the CVT transmission torque TCVT during the normal drive-time electric power generation, respectively. When the stepless transmission 20 is directly connected to the engine 3, the engine torque TENG is directly transmitted to the stepless transmission 20. In contrast, according to the present embodiment, the CVT transmission torque TCVT can be reduced by the magnitude of the second rotor transmission torque TR2, as indicated by an arrow L in FIG. 48. In this case, since the engine torque TENG is distributed from the second rotor 35 to the stator 33 and the first rotor 34 at the distribution ratio of 1:2, the CVT transmission torque TCVT is reduced by a magnitude three times as large as that of the electric power-generating equivalent torque TGE.

Deceleration Regeneration

During the deceleration regeneration, similarly to the first embodiment, the electromagnetic brake CL2 is controlled to the OFF state, and at the same time electric power generation is performed by the rotating machine 31 to charge the battery 45 with the generated electric power.

Figure 49:
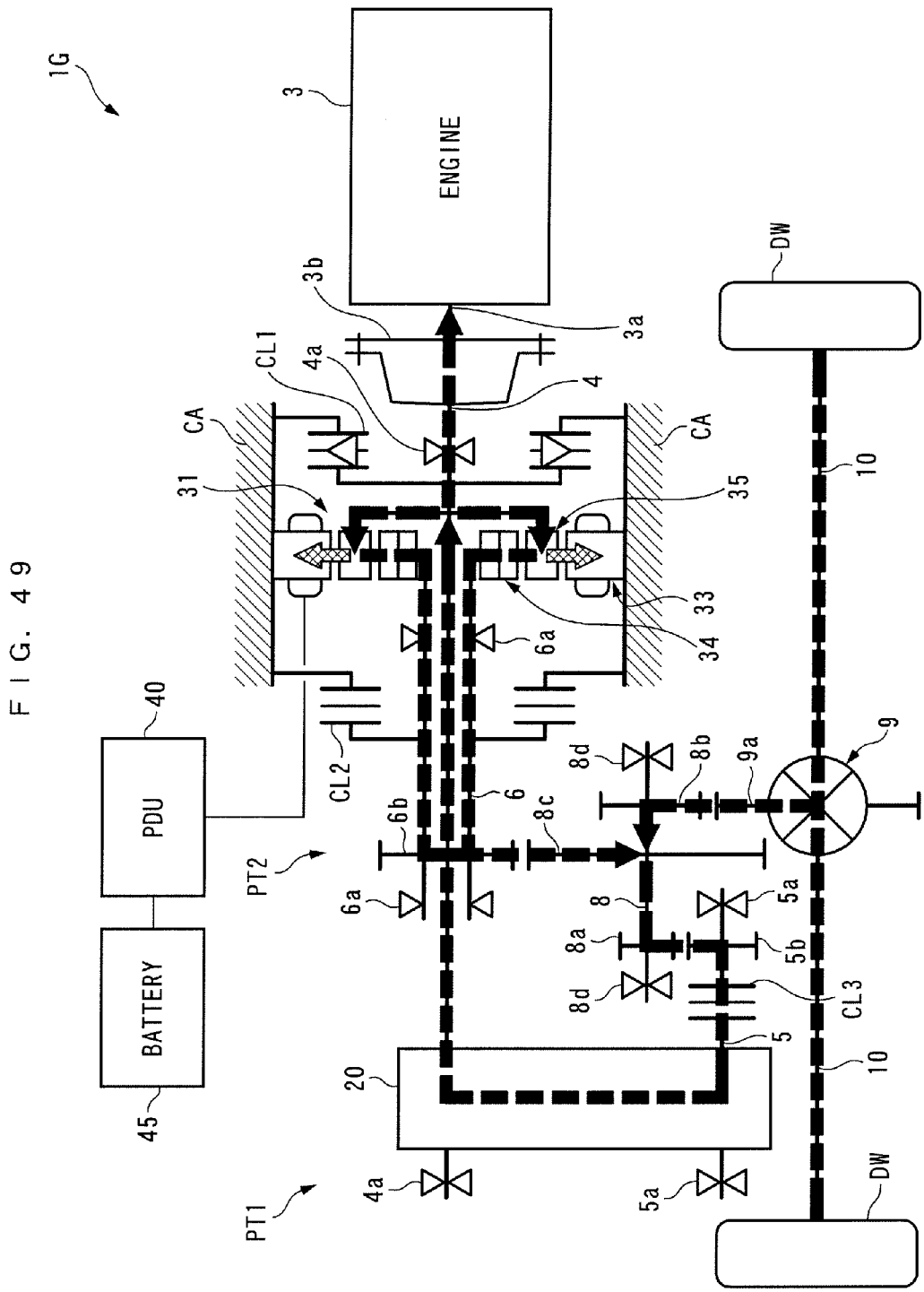
FIG. 49 A diagram showing a state of transmission of torque in the power plant shown in FIG. 41 when the clutch is engaged during the deceleration regeneration.

During the deceleration regeneration, when the clutch CL3 is held in the engaged state, as shown in FIG. 49, torque transmitted to the second rotor 35, as described hereinafter, is distributed to the stator 33 and the first rotor 34. The torque distributed to the first rotor 34 is transmitted to the idler shaft 8 via the second main shaft 6, and is transmitted to the first main shaft 4 together with the torque of the drive wheels DW and DW via the auxiliary shaft 5 and the stepless transmission 20. Part of the torque transmitted to the first main shaft 4 is transmitted to the second rotor 35, and the remainder is transmitted to the engine 3. As a consequence, the sum of the electric power-generating equivalent torque TGE transmitted to the stator 33 and the torque transmitted to the engine 3 becomes equal to the torque of the drive wheels DW and DW. It should be noted in this case, the transmission ratio RATIO of the stepless transmission 20 is controlled, similarly to the first embodiment, such that the optimum efficiency of the rotating machine 31 can be obtained, whereby the speed relationship between the first and second rotors 34 and 35 is controlled such that the magnetic field rotation direction becomes identical to the direction of the rotations of the first and second rotors 34 and 35.

Figure 51:
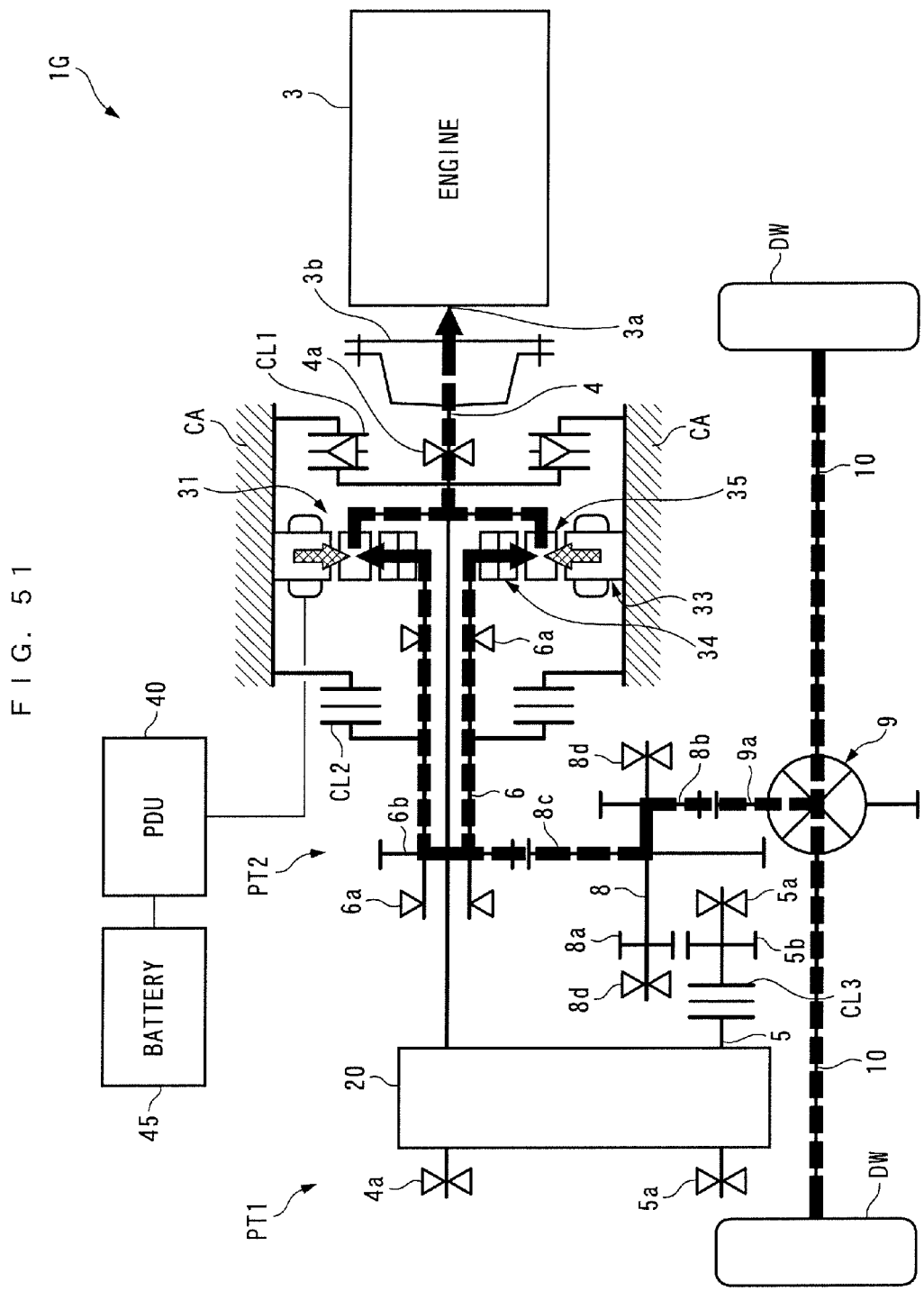
FIG. 51 A diagram showing a state of transmission of torque in the power plant shown in FIG. 41 when the clutch is disengaged during the deceleration regeneration.

Further, during the deceleration regeneration, assuming that the clutch CL3 is disengaged, when the direction of rotation of the rotating magnetic field, which is determined by the second rotor rotational speed VR2 corresponding to the engine speed NE at the time and the first rotor rotational speed VR1 corresponding to the vehicle speed VP at the time, is reverse to the direction of rotation of the first rotor 34 as shown in FIG. 50, it is possible to perform electric power generation, in a disengaged state of the clutch CL3. In this case, the rotating magnetic field rotates in a direction opposite to the direction of rotation of the first rotor 34, so that as shown in FIG. 51, the torque transmitted from the drive wheels DW and DW to the first rotor 34 via the second power transmission path PT2 and the electric power-generating equivalent torque TGE transmitted from the stator 33 are combined by the second rotor 35, and the combined torque is transmitted to the engine 3. That is, in this case, by using friction acting from the engine 3 on the second rotor 35, it is possible to transmit the power (energy) of the drive wheels DW and DW transmitted to the first rotor 34, to the stator 33 to convert the power into electric power. Therefore, when electric power generation is performed in the disengaged state of the clutch CL3, as the friction of the engine 3 is larger, larger electric power can be generated to charge the battery 45.

Inversely, during the deceleration regeneration, when the clutch CL3 is engaged, the engine 3 and the drive wheels DW and DW are mechanically connected to each other via the first power transmission path PT1, and hence as the friction of the engine 3 is larger, the torque transmitted from the drive wheels DW and DW to the engine 3 becomes larger, which makes smaller the electric power-generating equivalent torque TGE distributed to the stator 33 to make smaller electric power used for charging the battery 45. With this configuration, during the deceleration regeneration, when the friction of the engine 3 is small, the clutch CL3 is engaged, whereas when the friction of the engine 3 is large, the clutch CL3 is disengaged, whereby it is possible to charge the battery 45 with larger electric power.

Figure 52:
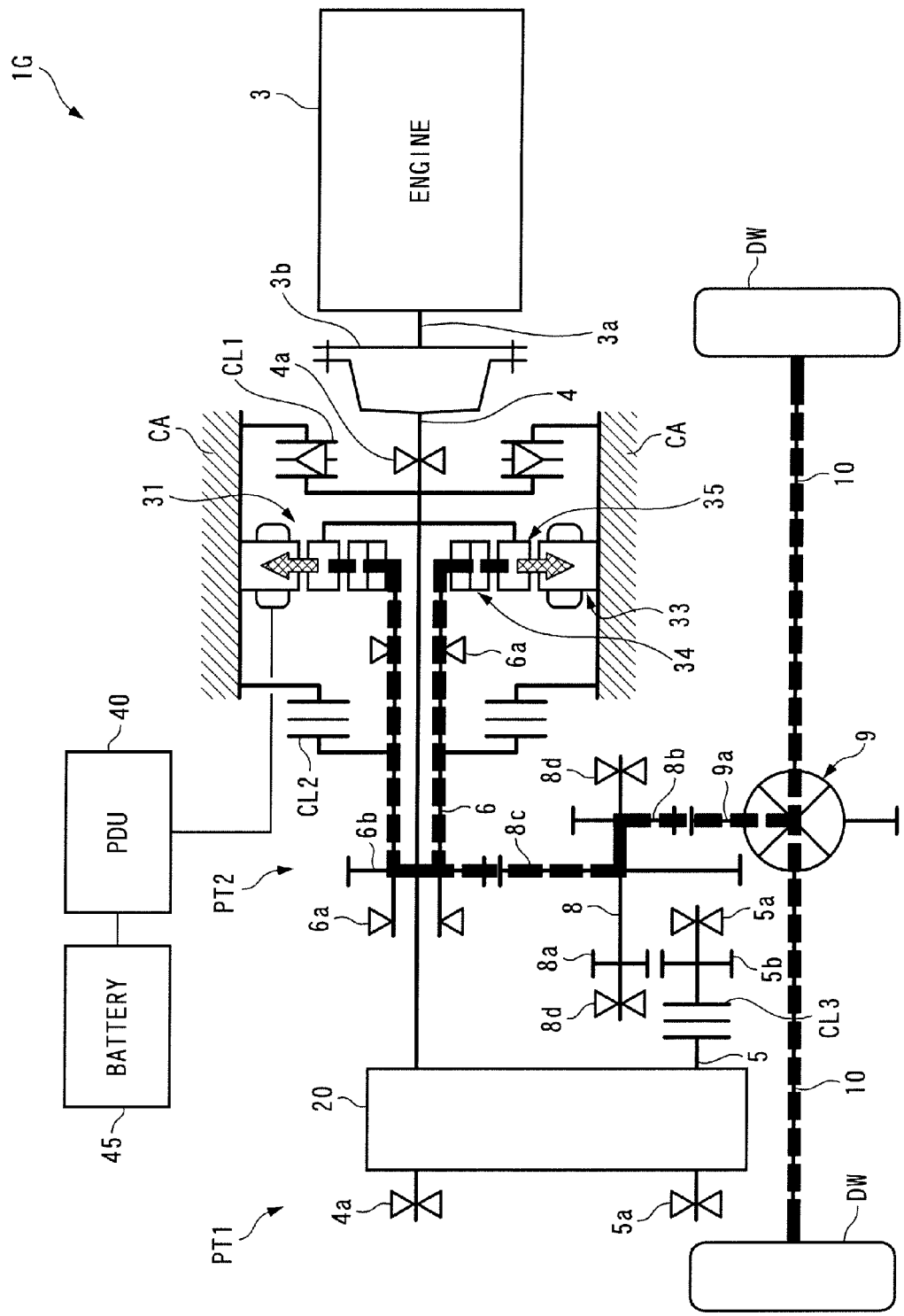
FIG. 52 A diagram showing a state of transmission of torque in the power plant shown in FIG. 41 when the clutch is disengaged during the deceleration regeneration with the second rotor held unrotatable.

Further, the deceleration regeneration may be performed in the following manner: The clutch CL3 is disengaged, and at the same time with a lock mechanism (not shown) formed e.g. by an electromagnetic brake or a hand brake, the second rotor 35 is held unrotatable, whereby the second rotor rotational speed VR2 is held at 0, and in this state, the rotating machine 31 may generate electric power using the power from the drive wheels DW and DW. This makes it possible, as shown in FIG. 52, to transmit all the torque from the drive wheels DW and DW to the first rotor 34 via the second power transmission path PT2 without via the first power transmission path PT1 including the stepless transmission 20, and convert all the power from the drive wheels DW and DW into electric power to generate electric power.

EV Creep

Figure 53:
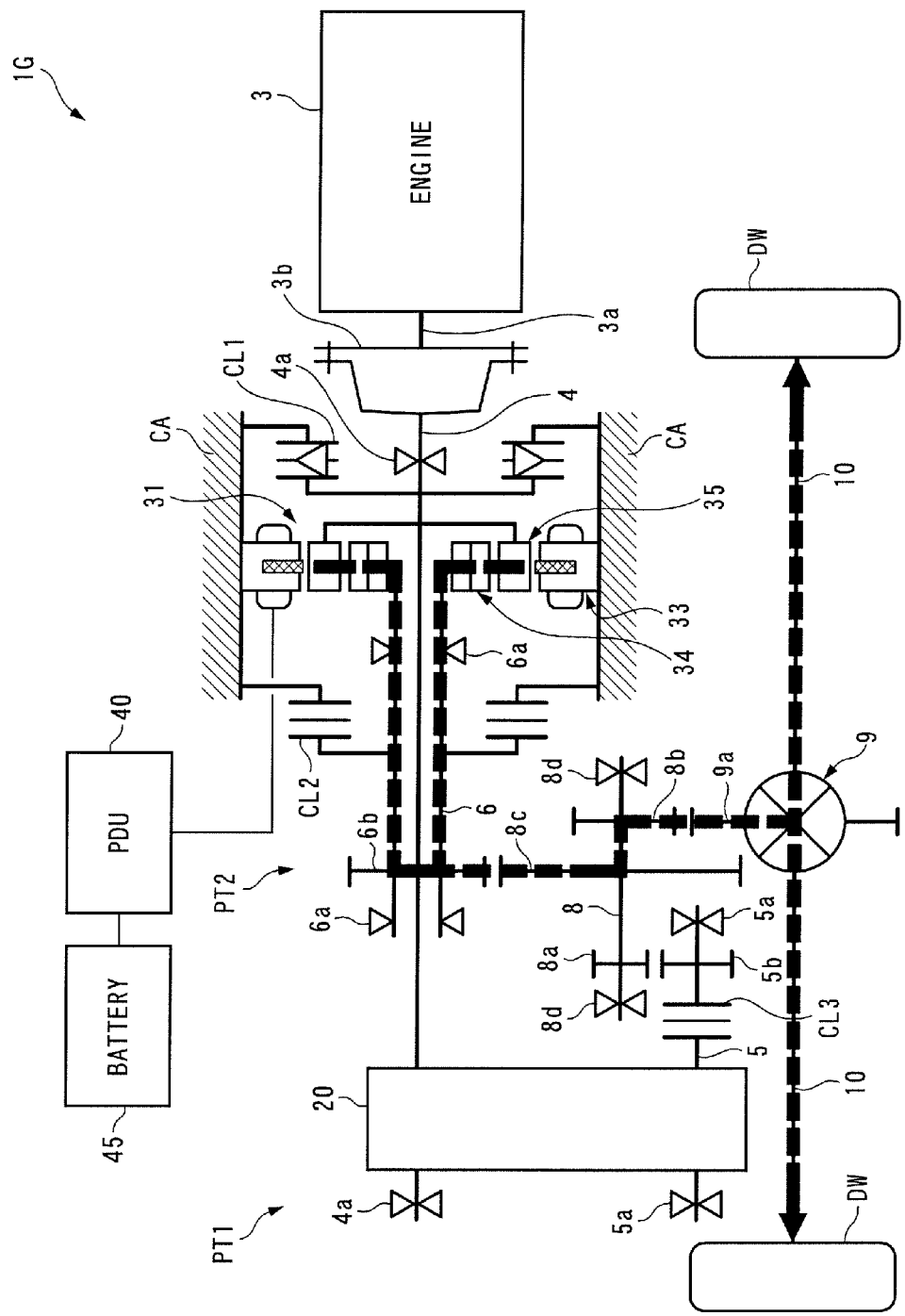
FIG. 53 A diagram showing a state of transmission of torque in the power plant shown in FIG. 41 during the EV creep.

During the EV creep, the electromagnetic brake CL2 and the clutch CL3 are controlled to the OFF state and the disengaged state, respectively, and at the same time electric power is supplied from the battery 45 to the stator 33, whereby the rotating magnetic field is generated such that it performs reverse rotation. The second rotor 35 is blocked from performing reverse rotation together with the crankshaft 3a, by the one-way clutch CL1 and the casing CA. As a consequence, as shown in FIG. 53, the driving equivalent torque TSE from the stator 33 is transmitted to the first rotor 34, and is further transmitted to the drive wheels DW and DW via the second power transmission path PT2 without via the first power transmission path PT1 including the stepless transmission 20. Further, electric power supplied to the stator 33 is controlled such that the first rotor rotational speed VR1 becomes very small, whereby the creep operation is performed.

EV Standing Start

Figure 54:
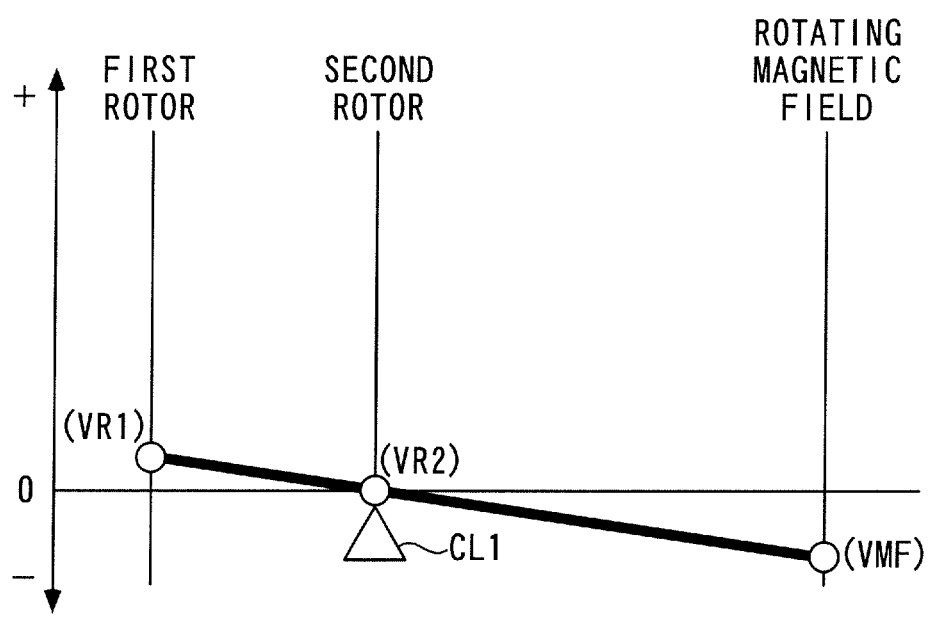
FIG. 54 A velocity nomograph illustrating an example of the relationship between the magnetic field rotational speed, and the first and second rotor rotational speeds in the power plant shown in FIG. 41 at the time of the EV standing start.

At the time of the EV standing start, in the same manner as the above-described EV creep, the electromagnetic brake CL2 and the clutch CL3 are controlled (the electromagnetic brake CL2: turned off, the clutch CL3: disengaged); electric power supplied from the battery 45 to the stator 33 is increased; the driving equivalent torque TSE is increased; and the magnetic field rotational speed VMF of the rotating magnetic field performing reverse rotation is increased. As shown in FIG. 54, this causes the first rotor rotational speed VR1 to increase in a state where the second rotor rotational speed VR2 is equal to 0, i.e. the crankshaft 3a is at rest, and accordingly, the vehicle makes a standing start to travel.

ENG Start During EV Traveling

At the time of the ENG start during EV traveling, supply of electric power to the stator 33 is stopped to cause the vehicle to travel by inertia. In this state, the crankshaft 3a is caused to perform normal rotation by a starter, not shown, and the engine 3 is started by controlling the fuel injection valves etc. Further, after the start of the engine 3, the transmission ratio RATIO of the stepless transmission 20 is controlled to thereby control the rotational speeds of the input shaft and output shaft of the clutch CL3 such that they become equal to each other. In this state, the clutch CL3, which has been disengaged, is engaged.

As described above, according to the present embodiment, differently from the conventional power plant, connection between the crankshaft 3a of the engine 3, and the second rotor 35 and the drive wheels DW and DW, and connection between the first rotor 34, and the drive wheels DW and DW are established without using the planetary gear unit for use in distributing and combining power. Therefore, without causing no power transmission loss by the planetary gear unit, it is possible, similarly to the first embodiment, to obtain effects obtained by dispensing with the planetary gear unit, such as increases in the driving efficiencies of the engine 3 and the rotating machine 31 in driving the drive wheels DW and DW, an increase in the electric power-generating efficiency of the rotating machine 31 in generating electric power using the power from the drive wheels DW and DW, and an increase in the electric power-generating efficiency of the rotating machine 31 in generating electric power using the power from the engine 3.

Further, the first rotor 34 is connected to the drive wheels DW and DW via the second power transmission path PT2 which does not include the stepless transmission 20, and the crankshaft 3a is connected to the drive wheels DW and DW, during engagement of the clutch CL3, via the first power transmission path PT1 which includes the stepless transmission 20, and during occurrence of the rotating magnetic field, via the second rotor 35, the first rotor 34, and the second power transmission path PT2. Further, during the drive-time electric power generation by the rotating machine 31, power can be transmitted to the drive wheels DW and DW without via the stepless transmission 20 by the amount of the second rotor transmission torque TR2, which makes it possible to suppress power transmission loss at the stepless transmission 20, thereby making it possible to increase the driving efficiency of the power plant 1 in its entirety. Further, it is possible to reduce the CVT transmission torque TCVT by the amount of the second rotor transmission torque TR2, and hence, by employing a stepless transmission adapted to the reduced CVT transmission torque TCVT, it is possible to attain the high efficiency and reduced size of the stepless transmission 20, which in turn makes it possible to attain the reduction of the size of the power plant 1G in its entirety and further improvement of the driving efficiency thereof.

Furthermore, as described with reference to FIGS. 52 and 53, during the deceleration regeneration or at the time of the EV standing start, by disengaging the clutch CL3, the power transmission between the rotating machine 31 and the drive wheels DW and DW can be carried out via the second power transmission path PT2 and the first rotor 34, i.e. entirely without via the stepless transmission 20. Therefore, it is possible to completely prevent power transmission loss at the stepless transmission 20, and further increase the driving efficiency of the rotating machine 31 in driving the drive wheels DW and DW, and the electric power-generating efficiency of the rotating machine 31 in generating electric power using the power from the drive wheels DW and DW.

Further, similarly to the first embodiment, in the rotating machine 31, the pole pair number ratio α is set to 2.0, so that it is possible to reduce the size of the stator 33 to further reduce the size of the power plant 1G in its entirety, and during the drive-time electric power generation, it is possible to further reduce the CVT transmission torque TCVT, thereby making it possible to further reduce the size of the stepless transmission 20.

Furthermore, the transmission ratio RATIO of the stepless transmission 20 is controlled in the same manner as in the first embodiment. This makes it possible to drive the drive wheels DW and DW while controlling the outputs of the engine 3 and the rotating machine 31 such that the optimum efficiencies thereof can be obtained. Therefore, it is possible to enhance the driving efficiency of the power plant 1G in its entirety.

Further, similarly to the first embodiment, at the time of the ENG-based standing start, by disengaging the clutch CL3, and controlling the operation of the rotating machine 31, the torque transmitted from the engine 3 to the drive wheels DW and DW via the second and first rotors 35 and 34 is progressively increased, so that it is possible to start the vehicle without causing engine stall. In addition to this, after the ENG-based standing start and the ENG start during EV traveling, the clutch CL3 can be engaged in a state where the rotational speeds of the input shaft and output shaft of the clutch CL3 are equal to each other, and hence in the present embodiment, differently from the first embodiment, not the friction clutch but the dog tooth clutch is used as the clutch CL3. This makes it possible to improve the fuel economy of the engine 3.

Furthermore, as described with reference to FIGS. 53 and 54, during the EV creep or at the time of the EV standing start, the one-way clutch CL1 and the casing CA block the reverse rotation of the crankshaft 3a, and the clutch CL3 disconnects between the crankshaft 3a and the drive wheels DW and DW. Therefore, it is possible to properly drive the drive wheels DW and DW using the power from the rotating machine 31, while blocking the reverse rotation of the crankshaft 3a. In this case, by disengaging the clutch CL3, the engine 3 is prevented from being dragged, which makes it possible to obtain the high driving efficiency of the engine 3.

Further, as already described with reference to FIGS. 42 and 43, at the time of the ENG start during stoppage of the vehicle, the first rotor 34 is held unrotatable by the electromagnetic brake CL2, and the crankshaft 3a and the drive wheels DW and DW are disconnected from each other by the clutch CL3. Further, electric power is supplied to the stator 33 to thereby cause the rotating magnetic field to perform normal rotation. This makes it possible to cause the crankshaft 3a to perform normal rotation without driving the drive wheels DW and DW, which in turn makes it possible to start the engine 3.

Figure 55:
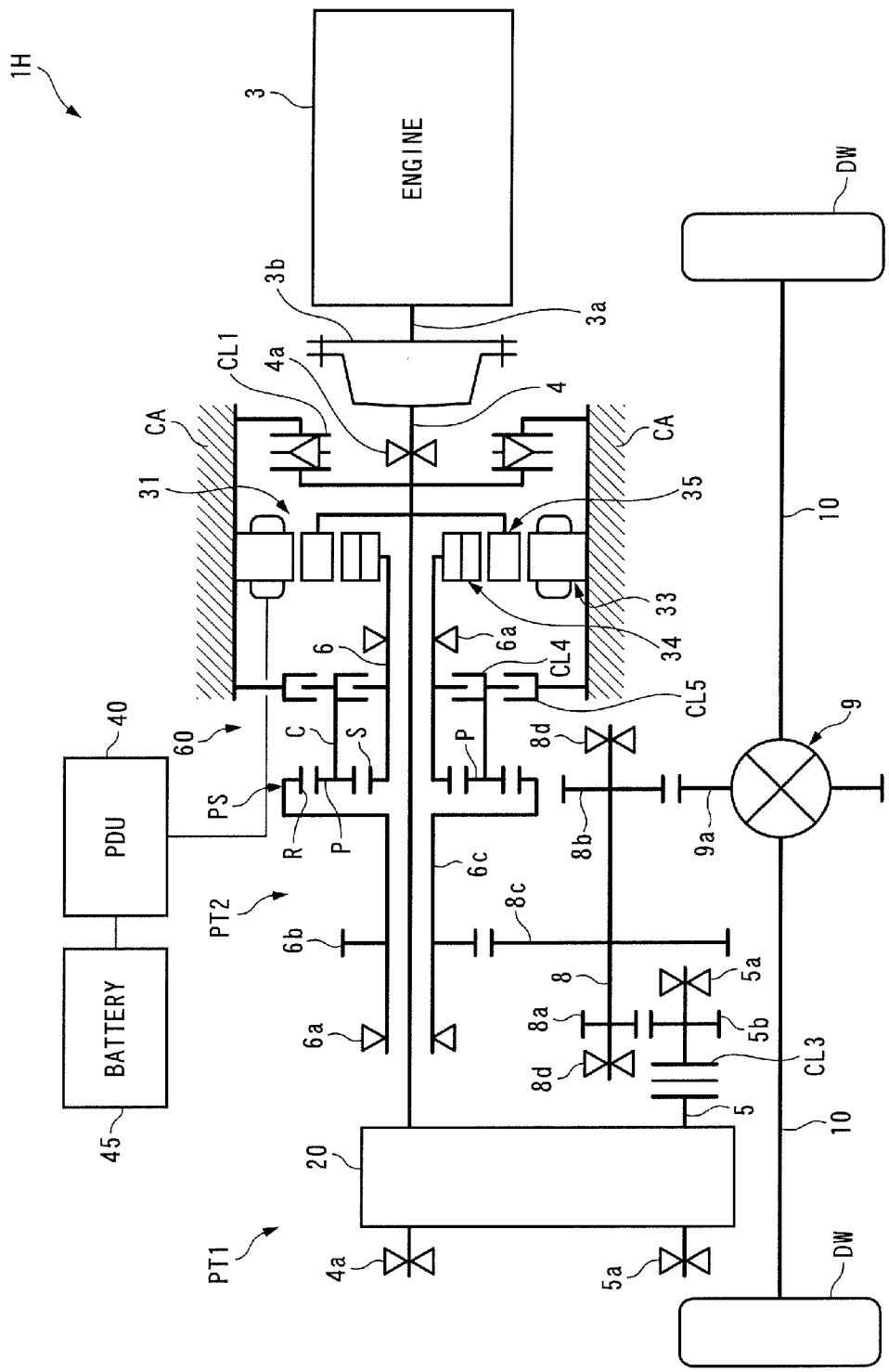
FIG. 55 A schematic diagram of a power plant according to a ninth embodiment.

Next, a power plant 1H according to a ninth embodiment of the present invention will be described with reference to FIG. 55. As shown in the figure, this power plant 1H is formed by combining the above-described power plant 1G according to the eighth embodiment and the above-described normal/reverse rotation-switching mechanism 60 in the second embodiment. That is, in the power plant 1H, the first rotor 34 is always mechanically connected to the drive wheels DW and DW via the second power transmission path PT2 including the planetary gear unit PS, described in the second embodiment, without using the transmission. Further, the power plant 1H is operated in the various operation modes described in the eighth embodiment, in the same manner as in the eighth embodiment. The normal/reverse rotation-switching mechanism 60 is controlled in the same manner as in the second embodiment.

Therefore, according to the present embodiment, when the power from the rotating machine 31 and the engine 3 is transmitted to the drive wheels DW and DW via the first rotor 34 and the second power transmission path PT2, as in the EV standing start or the ENG-based standing start, similarly to the second embodiment, the normal and reverse rotations of the drive wheels DW and DW, i.e. the forward travel and reverse travel of the vehicle can be selectively carried out by control of the normal/reverse rotation-switching mechanism 60. In this case, as is apparent from the operation at the time of the ENG-based standing start, described in the eighth embodiment, it is possible to transmit the power from the engine 3 to the drive wheels DW and DW without using the friction start clutch, to thereby cause the vehicle to perform forward or reverse travel from rest without causing engine stall. Further, similarly to the second embodiment, during forward travel of the vehicle, the sun gear S, the carrier C, and the ring gear R rotate in unison, and hence in the planetary gear unit PS, it is possible to transmit the power to the drive wheels DW and DW without causing power transmission loss due to meshing of the gears. Other various effects similar to those obtained by the eighth embodiment can be obtained.

Figure 56:
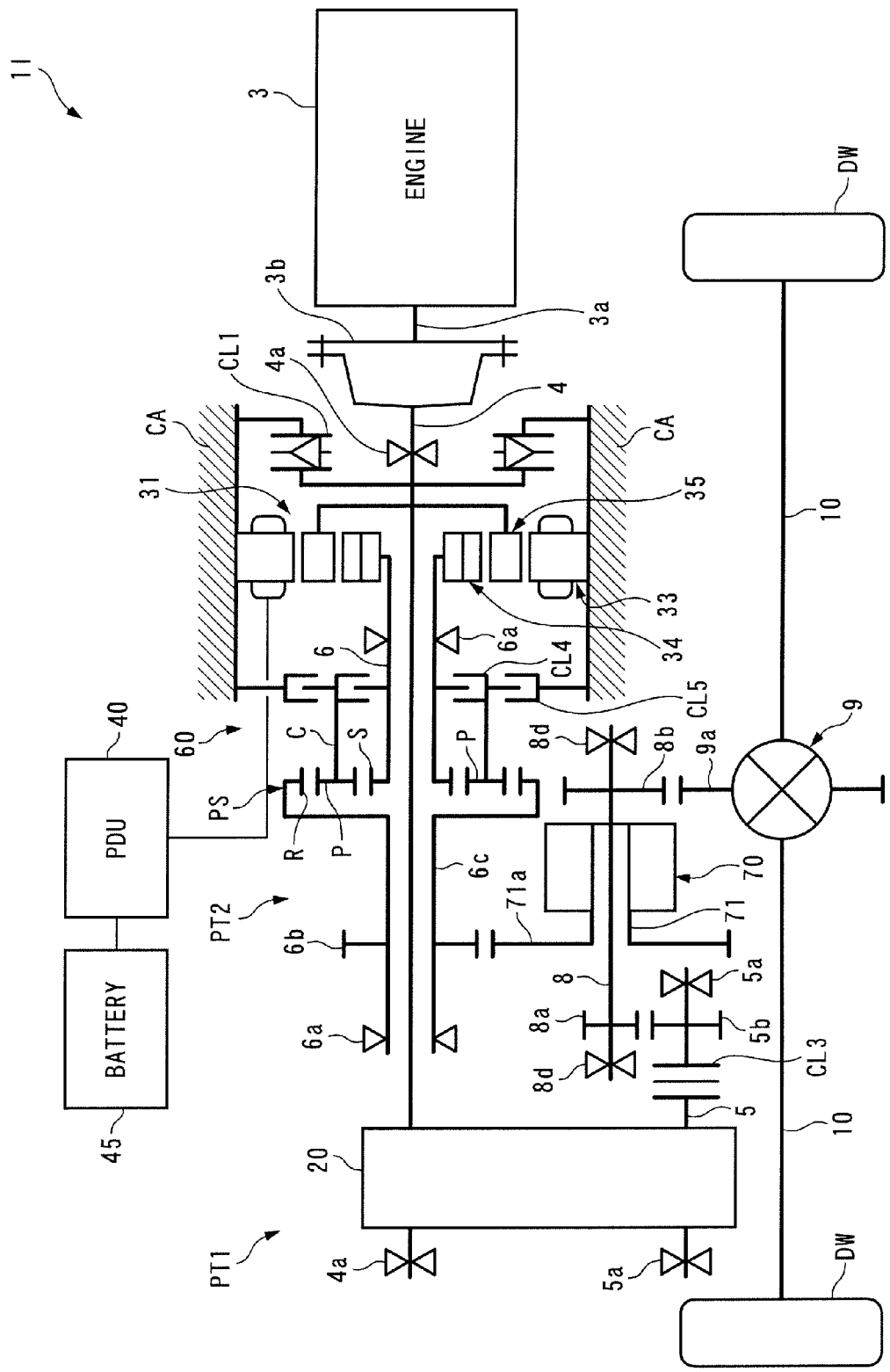
FIG. 56 A schematic diagram of a power plant according to a tenth embodiment.

Next, a power plant 1I according to a tenth embodiment of the present invention will be described with reference to FIG. 56. As shown in the figure, this power plant 1I is formed by combining the above-described power plant 1H according to the ninth embodiment and the aforementioned transmission 70 in the third embodiment. That is, in the power plant 1I, the first rotor 34 is always mechanically connected to the drive wheels DW and DW via the second power transmission path PT2 including the planetary gear unit PS and the transmission 70, described in the third embodiment. Further, the power plant 1I is operated in the various operation modes described in the ninth embodiment, in the same manner as in the ninth embodiment. The transmission 70 is controlled in the same manner as in the third embodiment.

Therefore, according to the present embodiment, it is possible to mainly obtain the same effects as obtained by both the third and ninth embodiments. In this case, in the present embodiment, differently from the third embodiment, the first rotor 34 formed by the permanent magnets 34a having low strength is connected to the drive wheels DW and DW via the transmission 70, and therefore the present embodiment is particularly effective in preventing failure of the rotating machine 31 due to an excessive increase in the first rotor rotational speed VR1. It should be noted that in the present embodiment, the first rotor 34 is connected to the drive wheels DW and DW via the transmission 70, which makes it impossible to obtain the effects provided by suppression of power transmission loss in the transmission, as in the ninth embodiment.

Figure 57:
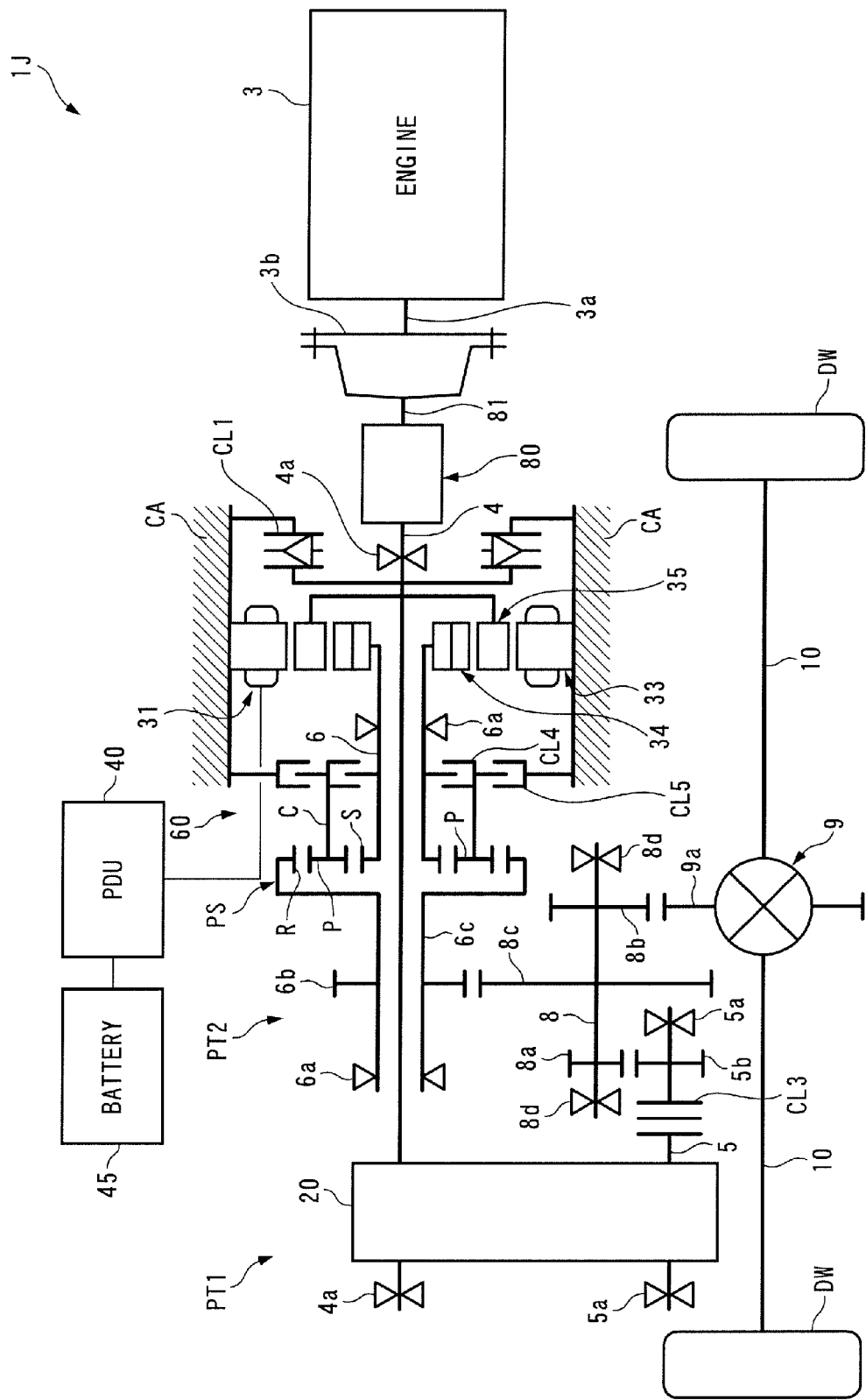
FIG. 57 A schematic diagram of a power plant according to an eleventh embodiment.

Next, a power plant 1J according to an eleventh embodiment of the present invention will be described with reference to FIG. 57. As shown in the figure, this power plant 1J is formed by combining the power plant 1H according to the ninth embodiment and the transmission 80 in the fourth embodiment. That is, in the power plant 1J, the second rotor 35 is always mechanically connected to the crankshaft 3a via the first main shaft 4, the transmission 80, and the flywheel 3b. Further, during engagement of the clutch CL3, the crankshaft 3a is mechanically connected to the drive wheels DW and DW via the first power transmission path PT1 including the transmission 80 and the stepless transmission 20, described in the fourth embodiment. Further, the gear ratio between the gear 9a of the differential gear mechanism 9 and the second idler gear 8b is set in the same manner as in the fourth embodiment. Furthermore, the power plant 1J is operated in the various operation modes described in the ninth embodiment, in the same manner as in the ninth embodiment. The transmission 80 is controlled in the same manner as in the fourth embodiment.

Therefore, according to the present embodiment, it is possible to mainly obtain the same effects as obtained by both the fourth and ninth embodiments. It should be noted that in the present embodiment, the crankshaft 3a is connected to the second rotor 35 via the transmission 80, which makes it impossible to obtain the effects provided by suppression of power transmission loss in the transmission, as in the ninth embodiment.

It should be noted that although in the eighth to eleventh embodiments, the clutch CL3 is disposed between the stepless transmission 20 and the drive wheels DW and DW, it may be disposed in the first main shaft 4 between the stepless transmission 20 and the second rotor 35. In this case, at the time of the ENG start during EV traveling, before the clutch LC3 is engaged, differently from the above-described embodiments, the power from the rotating machine 31 is transmitted to both the pulleys 21 and 22 of the stepless transmission 20 to cause rotation of the pulleys 21 and 22, and hence the transmission ratio RATIO can be controlled to a desired value while preventing the contact surfaces of the pulleys 21 and 22 and the transmission belt 23 from being damaged. In addition, at the time of the ENG start during stoppage of the vehicle which is described hereinabove with reference to FIG. 42, the engine 3 can be started without dragging the stepless transmission 20.

Figure 58:
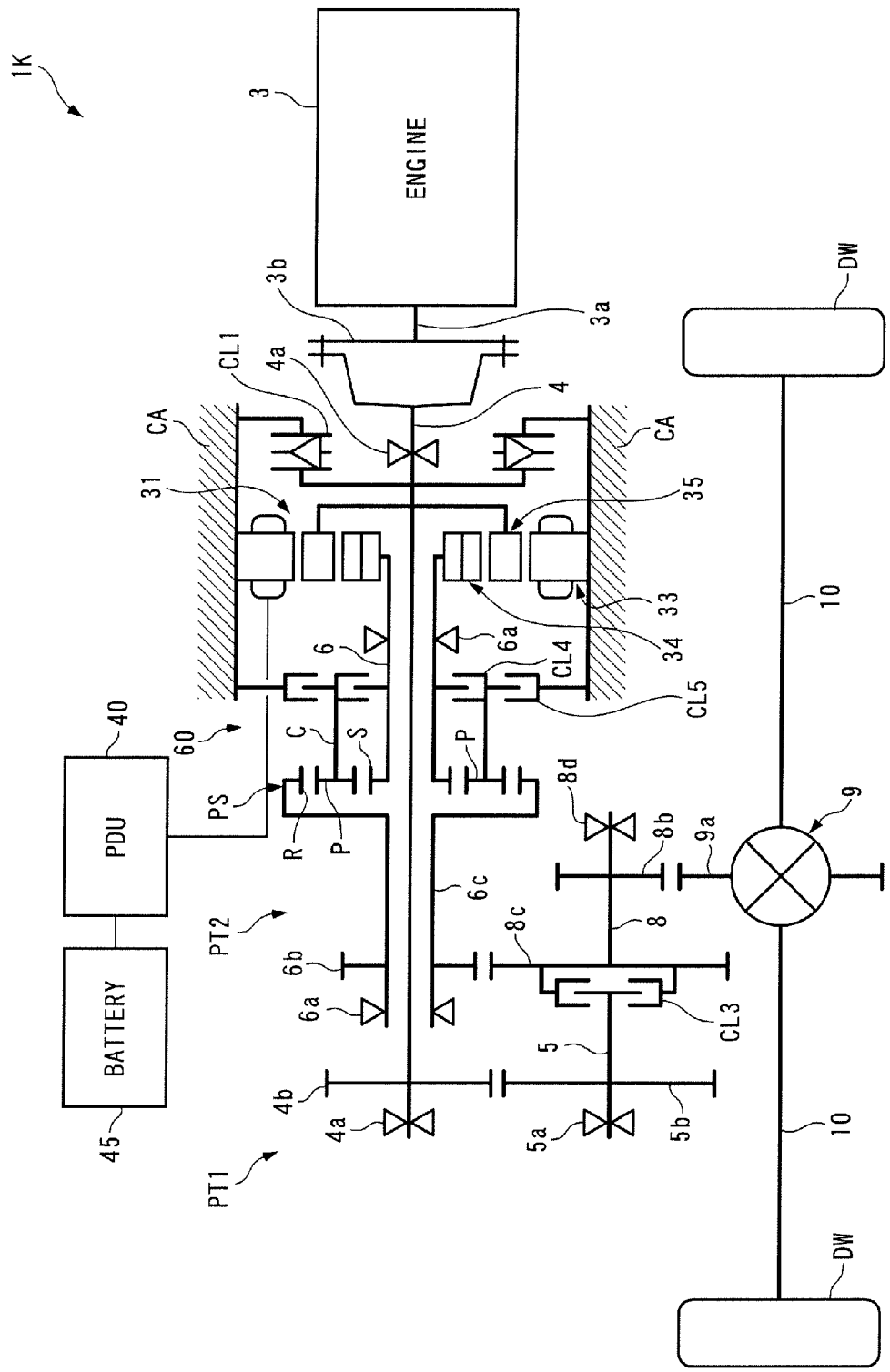
FIG. 58 A schematic diagram of a power plant according to a twelfth embodiment.

Next, a power plant 1K according to a twelfth embodiment of the present invention will be described with reference to FIG. 58. As shown in the figure, this power plant 1K is distinguished from the above-described power plant 1D according to the above-described fifth embodiment only in that the connection relationship between the first and second rotors 34 and 35 and the engine 3 is opposite to that in the power plant 1D. The second rotor 35 is integrally formed on the first main shaft 4, and the first rotor 34 is integrally formed on the second main shaft 6. In other words, the power plant 1K is distinguished from the above-described power plant 1G according to the above-described ninth embodiment in that the stepless transmission 20 is omitted. The power plant 1K is not provided with a transmission.

As described above, the second rotor 35 is always mechanically connected to the crankshaft 3a via the first main shaft 4 and the flywheel 3b, similarly to the eighth embodiment. Further, the first rotor 34 is always mechanically connected to the drive wheels DW and DW via the second power transmission path PT2 described in the second embodiment without using a transmission. Furthermore, during engagement of the clutch CL3, the crankshaft 3a is mechanically connected to the drive wheels DW and DW via the first power transmission path PT1 described in the fifth embodiment without using the transmission.

Further, in the power plant 1K, the operations by the above-mentioned EV creep, EV standing start, ENG start during EV traveling, ENG start during stoppage of the vehicle, ENG creep, and ENG-based standing start, and the switching of the forward travel and reverse travel of the vehicle using the normal/reverse rotation-switching mechanism 60 are performed in the same manner as in the eighth and ninth embodiments, and this embodiment is different from the eighth and ninth embodiments only in the ENG traveling. Hereinafter, a description will be given of the different point.

Similarly to the fifth embodiment, the ENG traveling includes the first transmission mode and the second transmission mode as transmission modes for transmitting the power from the engine 3. The second transmission mode is selected when the vehicle is in a constant-speed traveling state in which it is traveling at a constant speed equal to or higher than a predetermined vehicle speed, and otherwise the first transmission mode is selected. First, a description is given of the first transmission mode.

During the first transmission mode, the clutch CL3 is disengaged to release the connection between the crankshaft 3a and the drive wheels DW and DW via the first power transmission path PT1, and at the same time the operation of the rotating machine 31 is controlled, whereby the engine torque TENG is transmitted to the drive wheels DW and DW via the second and first rotors 35 and 34, and the second power transmission path PT2 including the second main shaft 6 and the like. In this case, when the rotational direction of the rotating magnetic field determined by the engine speed NE, the vehicle speed VP, and so forth is the direction of normal rotation, differently from the fifth embodiment, electric power generation is performed by the rotating machine 31, whereas when the rotational direction of the rotating magnetic field is the direction of reverse rotation, electric power is supplied from the battery 45 to the stator 33. During the electric power generation, similarly to the case of the ENG-based standing start described above with reference to FIG. 44 and the like, this cause the engine torque TENG to be distributed to the stator 33 and the first rotor 34. The torque distributed to the first rotor 34 is transmitted to the drive wheels DW and DW via the second power transmission path PT2. Further, during the supply of electric power to the stator 33, the engine torque TENG is transmitted to the first rotor 34 via the second rotor 35 using the driving equivalent torque TSE as a reaction force. Further, the engine torque TENG is transmitted to the drive wheels DW and DW via the second power transmission path PT2.

Further, during the first transmission mode, the speed of the power transmitted from the engine 3 to the drive wheels DW and DW is steplessly changed by controlling the magnetic field rotational speed VMF. That is, the rotating machine 31 functions as a stepless transmission. Hereafter, this point will be described with reference to FIGS. 59 and 60.

As is apparent from the above-described connection relationships, the second rotor rotational speed VR2 is equal to the engine speed NE, and assuming that there is no change in speed by the gears, the first rotor rotational speed VR1 is equal to the vehicle speed VP. Therefore, the relationship between the magnetic field rotational speed VMF, the first and second rotor rotational speeds VR1 and VR2, the engine speed NE, and the vehicle speed VP is represented in a single velocity nomograph, as shown in FIGS. 59 and 60.

Figure 59:
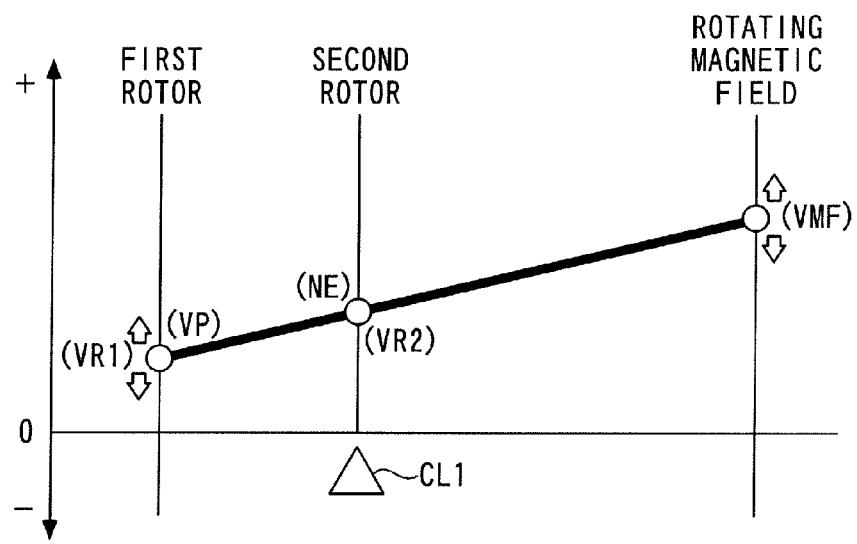
FIG. 59 A diagram which is useful in explaining a speed-changing operation performed when a rotating magnetic field in the power plant shown in FIG. 58 is performing normal rotation.
Figure 60:
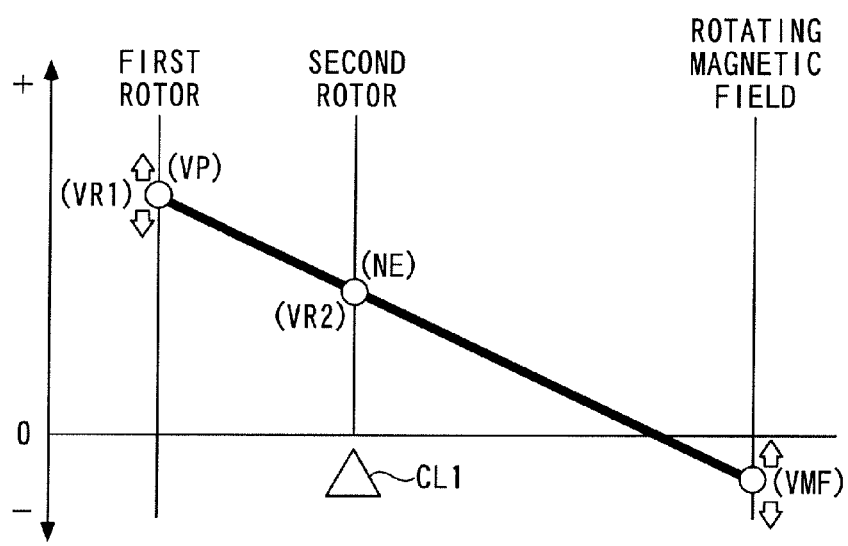
FIG. 60 A diagram which is useful in explaining a speed-changing operation performed when the rotating magnetic field in the power plant shown in FIG. 58 is performing reverse rotation.

Referring to FIG. 59, when the rotating magnetic field performs normal rotation, as is clear from hollow arrows shown in the figure, the speed of the power transmitted to the drive wheels DW and DW is steplessly reduced by increasing the magnetic field rotational speed VMF, and is steplessly increased by reducing the magnetic field rotational speed VMF. Further, as shown in FIG. 60, when the rotating magnetic field is performing reverse rotation, as is clear from hollow arrows shown in the figure, the speed of the power transmitted to the drive wheels DW and DW is steplessly increased by increasing the magnetic field rotational speed VMF, and is steplessly reduced by reducing the magnetic field rotational speed VMF. In this case, the magnetic field rotational speed VMF is controlled to a value close to 0, whereby electric power input to and output from the battery 45 is suppressed while changing the speed of the power transmitted to the drive wheels DW and DW to some extent.

Further, during the first transmission mode, to rapidly accelerate the vehicle in response to a very large demanded torque PMCMD, the engine speed NE is rapidly increased by controlling the throttle valve opening etc., whereby the engine torque TENG is rapidly increased. Further, when the rotational direction of the rotating magnetic field determined by the relationship between the first and second rotor rotational speeds VR1 and VR2 is the direction of normal rotation (see FIG. 59), the rotating machine 31 generates electric power, and the battery 45 is charged with the generated electric power, whereas when the rotational direction of the rotating magnetic field is the direction of reverse rotation (see FIG. 60), electric power is supplied to the stator 33. As a consequence, as described hereinabove, the rapidly increased engine torque TENG is transmitted to the drive wheels DW and DW via the second rotor 35, the first rotor 34, and the second power transmission path PT2. As a consequence, the vehicle is rapidly accelerated.

Furthermore, during the first transmission mode, the electric power generated by the rotating machine 31 and the electric power supplied to the stator 33 are controlled such that the driving equivalent torque TSE and the electric power-generating equivalent torque TGE become equal to ⅓ of the engine torque TENG.

As described above, during rapid acceleration of the vehicle, similarly to the fifth embodiment, by performing the power transmission in the first transmission mode, and disengaging the clutch CL3 to release the mechanical connection between the engine 3 and the drive wheels DW and DW via the first power transmission path PT1, it is possible to increase the engine speed NE irrespective of the vehicle speed VP at the time, thereby making it possible to rapidly increase the engine torque TENG. Further, through the above-described control of the rotating machine 31, as is clear from the aforementioned functions of the rotating machine 31, torque having a magnitude corresponding to ⅔ of the rapidly increased engine torque TENG is transmitted to the drive wheels DW and DW via the second rotor 35 and the first rotor 34, whereby it is possible to transmit relatively large torque to the drive wheels DW and DW. This makes it possible to accelerate the vehicle rapidly, thereby making it possible to improve marketability.

Further, when the vehicle performs hill-climbing traveling in the first transmission mode, the operations of the engine speed NE and the rotating machine 31 are controlled according to the charged state SOC. Specifically, when the charged state SOC is larger than the first predetermined value SOCL, which means that a sufficient amount of the electric power remains in the battery 32, the engine speed NE is controlled according to the vehicle speed VP such that the rotating magnetic field performs reverse rotation, and electric power is supplied from the battery 45 to the rotating machine 31 to cause the rotating magnetic field to perform reverse rotation. This causes the engine torque TENG to be transmitted to the drive wheels DW and DW, as described hereinabove.

On the other hand, when the charged state SOC is smaller than the first predetermined value SOCL during the hill-climbing traveling of the vehicle, the engine speed NE is controlled such that the rotating magnetic field performs normal rotation, and at the same time electric power is generated by the rotating machine 31 to charge the battery 45 with the generated electric power. This causes the engine torque TENG to be transmitted to the drive wheels DW and DW, as described hereinabove. It should be noted that the charging of the battery 45 is performed until the charged state SOC reaches the aforementioned second predetermined value SOCH. From the above, similarly to the fifth embodiment, it is possible to continuously perform hill-climbing traveling while preventing the overdischarge and overcharge of the battery 45.

Further, during the second transmission mode, the clutch CL3 having been disengaged during the first transmission mode is engaged to thereby connect the crankshaft 3a to the drive wheels DW and DW via both the first and second power transmission paths PT1 and PT2. Similarly to the fifth embodiment, the engagement of the clutch CL3 is performed in a state in which the rotational speed of the input shaft of the clutch CL3 and that of the output shaft thereof are made equal to each other by controlling the engine speed NE through control of the throttle valve opening.

Furthermore, during the second transmission mode in which the clutch CL3 is engaged, similarly to the fifth embodiment, the throttle valve opening is controlled such that optimum fuel economy of the engine 3 can be obtained by the engine speed NE unconditionally determined by the vehicle speed VP. When the clutch CL3 is engaged, the engine 3 is mechanically approximately directly connected to the drive wheels DW and DW, and hence very high driving efficiency can be obtained.

Further, during execution of the optimum fuel economy control by the aforementioned throttle valve opening, when torque transmitted from the engine 3 to the drive wheels DW and DW is insufficient for the demanded torque PMCMD, electric power is supplied to the stator 33 for assisting the engine 3 by the rotating machine 31 such that the insufficient amount is compensated for. On the other hand, when torque transmitted from the engine 3 to the drive wheels DW and DW is surplus with respect to the demanded torque PMCMD, the surplus amount is used to perform electric power generation by the rotating machine 31, and the battery 45 is charged with the generated electric power. Such control of the rotating machine 31 makes it possible to expand an operating region where the optimum fuel economy of the engine 3 can be obtained in the above-described engaged state of the clutch CL3. It should be noted that the above-described assist by the rotating machine 31 is performed depending on the charged state SOC.

As described above, according to the present embodiment, since both the crankshaft 3a and the first rotor 34 are connected to the drive wheels DW and DW without using the transmission, it is possible to avoid power transmission loss in the transmission, thereby making it possible to enhance the driving efficiencies of the engine 3 and the rotating machine 31 for driving the drive wheels DW and DW, and the electric power-generating efficiency of the rotating machine 31. Further, the stepless transmission 20 used in the ninth embodiment is omitted, which makes it possible to attain the reduction of the size and costs of the power plant 1K by the size and costs of the omitted stepless transmission 20. Furthermore, in the first transmission mode during the ENG traveling, the power from the engine 3 can be transmitted to the drive wheels DW and DW while steplessly changing the speed thereof, as described hereinabove with reference to FIGS. 59 and 60.

It should be noted that in the present embodiment, differently from the ninth embodiment, the stepless transmission 20 is not provided, and hence it is impossible to obtain the effects provided by control of the transmission ratio RATIO thereof, but it is possible to obtain the same advantageous effects as provided by the ninth embodiment, except those effects. That is, since the same rotating machine 31 as in the ninth embodiment is included, it is possible to obtain the effects provided by not using a planetary gear unit for use in distributing and combining power, and the effects provided by setting the pole pair number ratio α, and since the ENG-based standing start is performed in the same manner as in the ninth embodiment, it is possible to obtain the effects provided by elimination of the need of the friction start clutch. Further, it is possible to obtain the effects of inclusion of the one-way clutch CL1, the casing CA, and the clutch CL3, on the EV standing start, and the effects of inclusion of the clutches CL3 and CL4 and the electromagnetic brake CL5, on the ENG start during stoppage of the vehicle, in the same manner, as well as the effects provided by inclusion of the normal/reverse rotation-switching mechanism 60, in the same manner.

Figure 61:
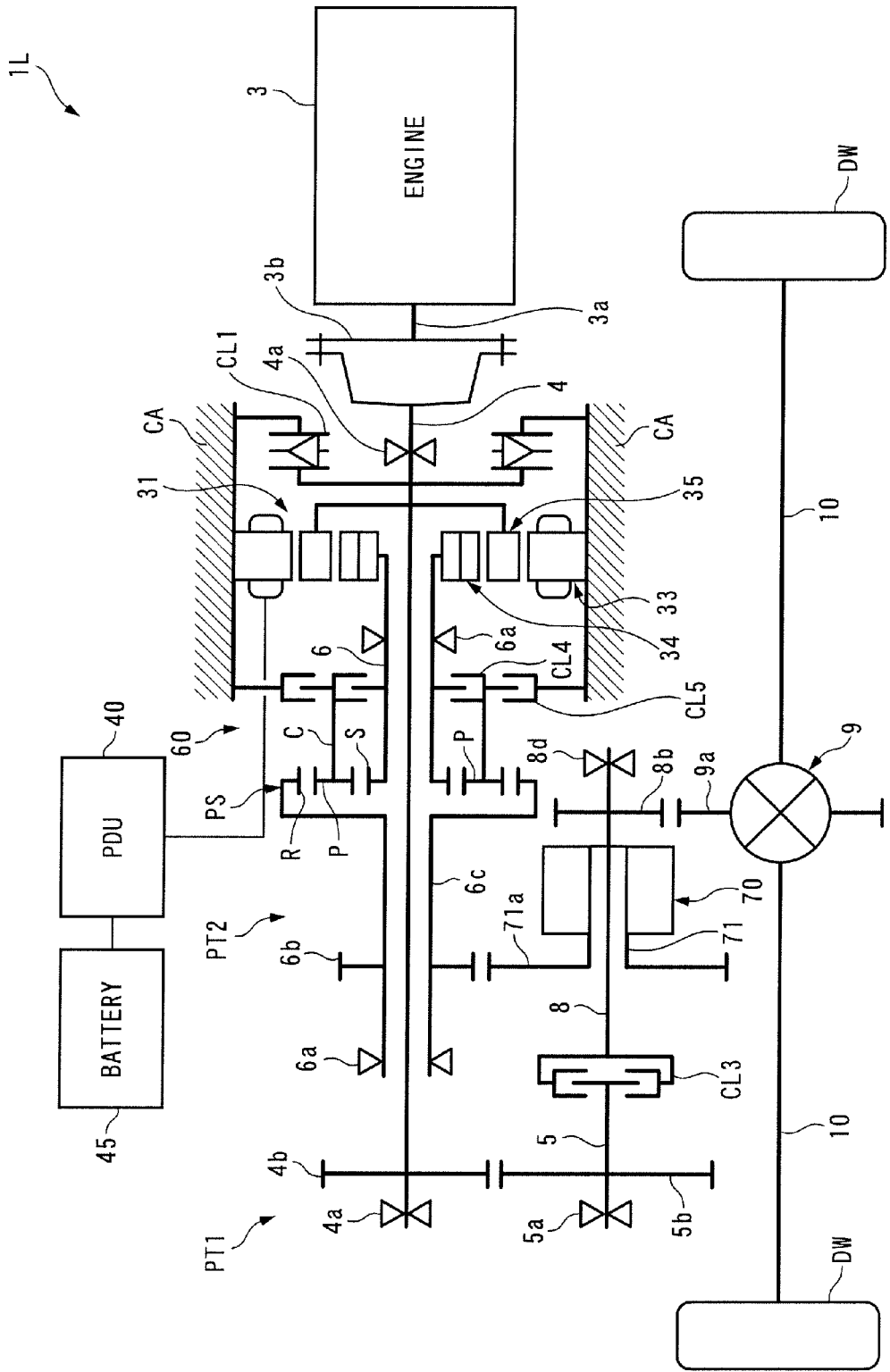
FIG. 61 A schematic diagram of a power plant according to a thirteenth embodiment.

Next, a power plant 1L according to a thirteenth embodiment of the present invention will be described with reference to FIG. 61. As shown in the figure, this power plant 1L is formed by combining the above-described power plant 1K according to the twelfth embodiment and the transmission 70 in the third embodiment. More specifically, in the power plant 1L, the first rotor 34 is always connected to the drive wheels DW and DW via the second power transmission path PT2 including the planetary gear unit PS and the transmission 70, described in the third embodiment. Further, the power plant 1L is operated in the various operation modes described in the twelfth embodiment, in the same manner as in the twelfth embodiment. The transmission 70 is controlled in the same manner as in the third embodiment.

Therefore, according to the present embodiment, it is possible to obtain the same effects as obtained by both the third and twelfth embodiments, mainly, for example, in that it is possible to reduce the size and costs of the rotating machine 31. It should be noted that in the present embodiment, the first rotor 34 is connected to the drive wheels DW and DW via the transmission 70, and hence it is impossible to obtain the effects provided by preventing power transmission loss in the transmission, as in the twelfth embodiment.

Figure 62:
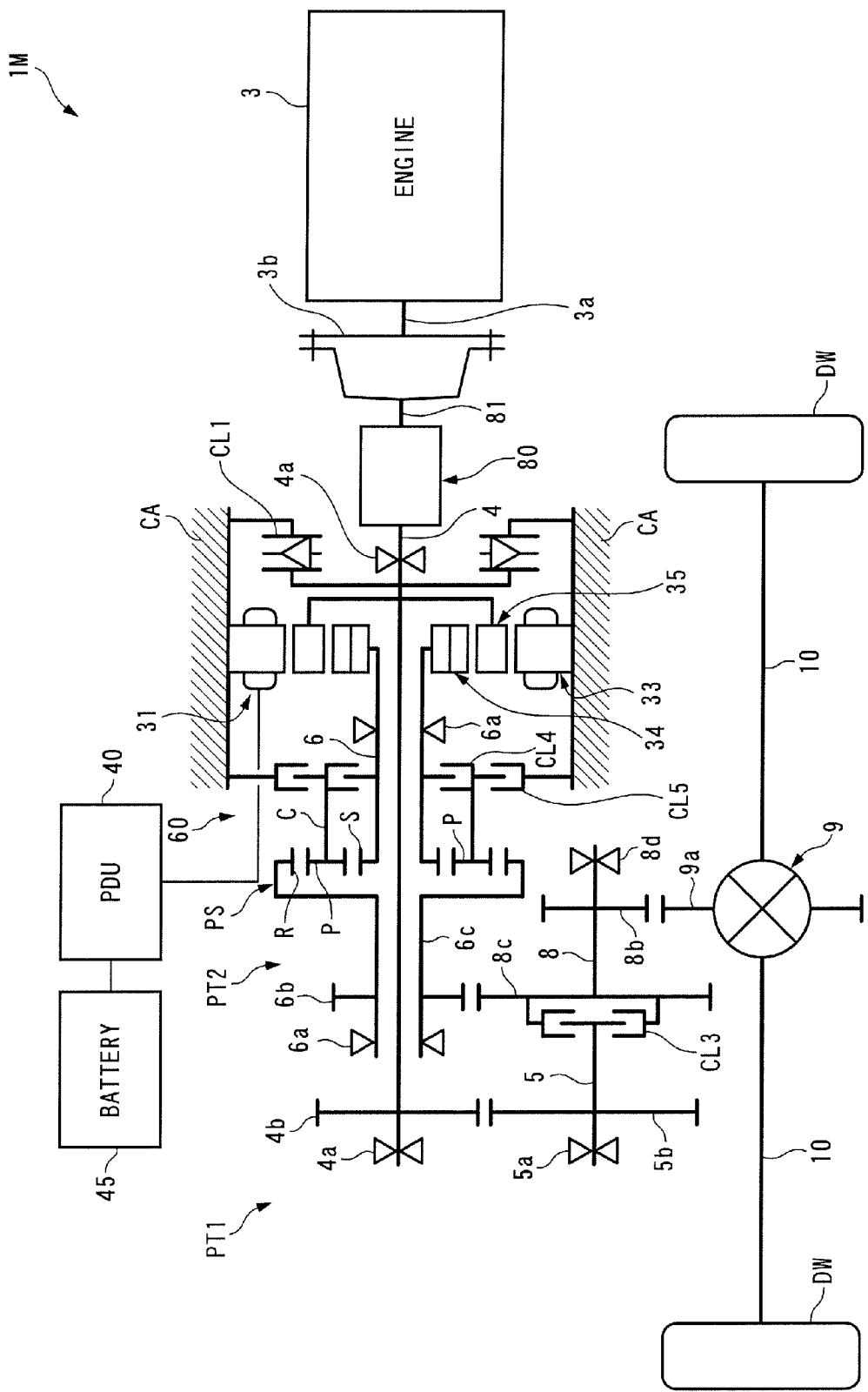
FIG. 62 A schematic diagram of a power plant according to a fourteenth embodiment.

Next, a power plant 1M according to a fourteenth embodiment of the present invention will be described with reference to FIG. 62. As shown in the figure, this power plant 1M is formed by combining the power plant 1K according to the twelfth embodiment and the transmission 80 in the fourth embodiment. More specifically, in the power plant 1M, similarly to the eleventh embodiment, the second rotor 35 is always mechanically connected to the crankshaft 3a via the first main shaft 4, the transmission 80, and the flywheel 3b. Further, during engagement of the clutch CL3, the crankshaft 3a is mechanically connected to the drive wheels DW and DW via the first power transmission path PT1 including the transmission 80, described in the seventh embodiment. Furthermore, the power plant 1M is operated in the various operation modes described in the twelfth embodiment, in the same manner as in the twelfth embodiment. The transmission 80 is controlled in the same manner as in the fourth embodiment.

Therefore, according to the present embodiment, it is possible to obtain the same effects as obtained by both the fourth and twelfth embodiments, mainly, for example, in that it is possible to prevent failure of the rotating machine 31 due to an excessive increase in the second rotor rotational speed VR2. More specifically, since the same rotating machine 31 as in the twelfth embodiment is included, it is possible to obtain the effects provided by not using a planetary gear unit for use in distributing and combining power, and the effects provided by setting the pole pair number ratio α, and since the ENG-based standing start is performed in the same manner as in the twelfth embodiment, it is possible to obtain the effects provided by elimination of the need of the friction start clutch.

Further, it is possible to obtain the effects of inclusion of the one-way clutch CL1, the casing CA, and the clutch CL3, on the EV standing start, and the effects of inclusion of the clutches CL3 and CL4 and the electromagnetic brake CL5, on the ENG start during stoppage of the vehicle, in the same manner, as well as the effects provided by inclusion of the normal/reverse rotation-switching mechanism 60, in the same manner. Furthermore, similarly to the twelfth embodiment, by disengaging the clutch CL3 and controlling the operation of the rotating machine 31, it is possible to transmit the power from the engine 3 to the drive wheels DW and DW while steplessly changing the speed thereof. It should be noted that in the present embodiment, the crankshaft 3*a* is connected to the drive wheels DW and DW via the transmission 80, and hence it is impossible to obtain the effects provided by preventing power transmission loss in the transmission, as in the twelfth embodiment.

Figure 63:
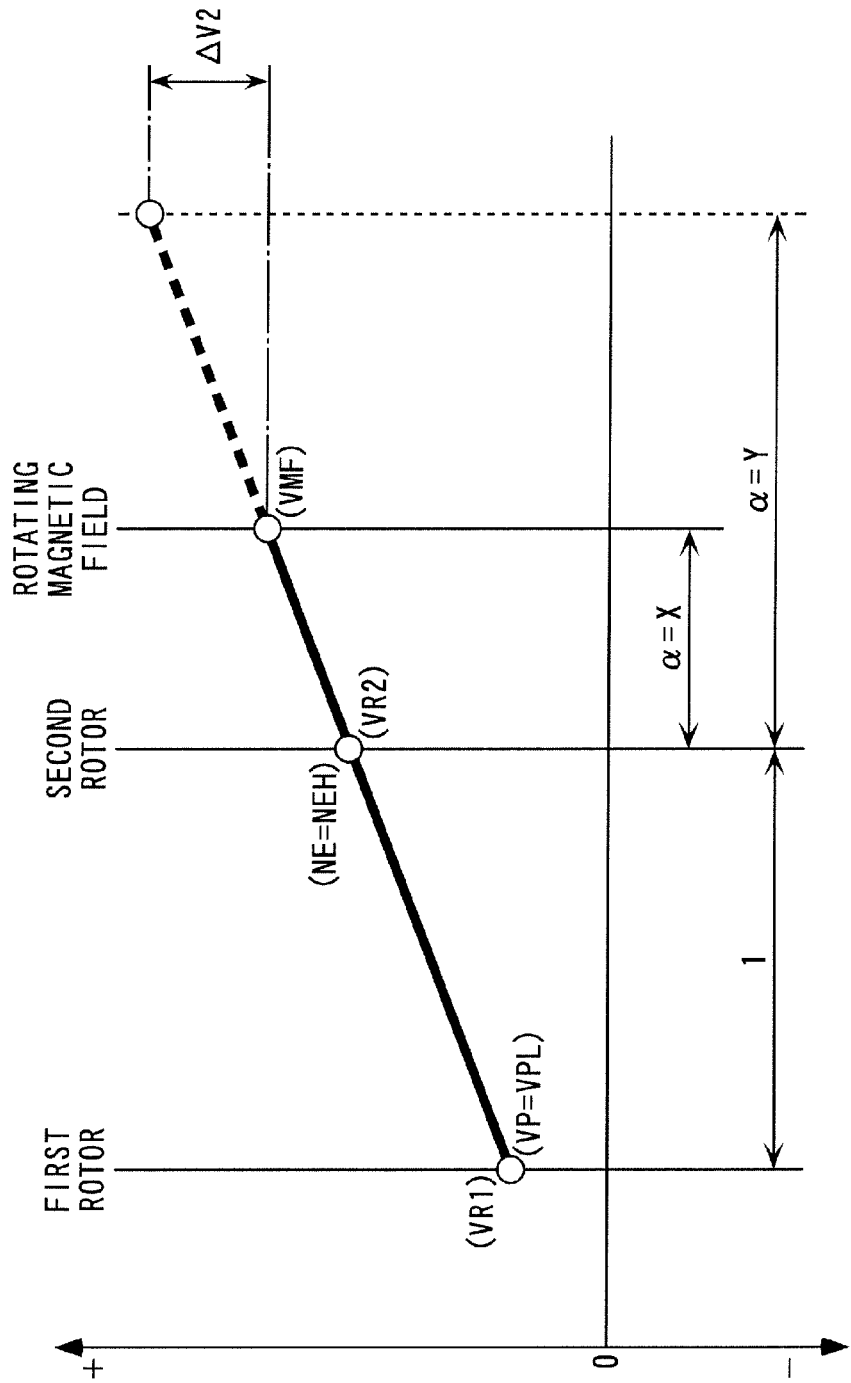
FIG. 63 A velocity nomograph illustrating an example of the relationship between the magnetic field rotational speed, and the first and second rotor rotational speeds in the power plants shown in FIGS. 41 and 58 and so forth, when the pole pair number ratio is set to the first predetermined number and the second predetermined number, respectively.
Figure 64:
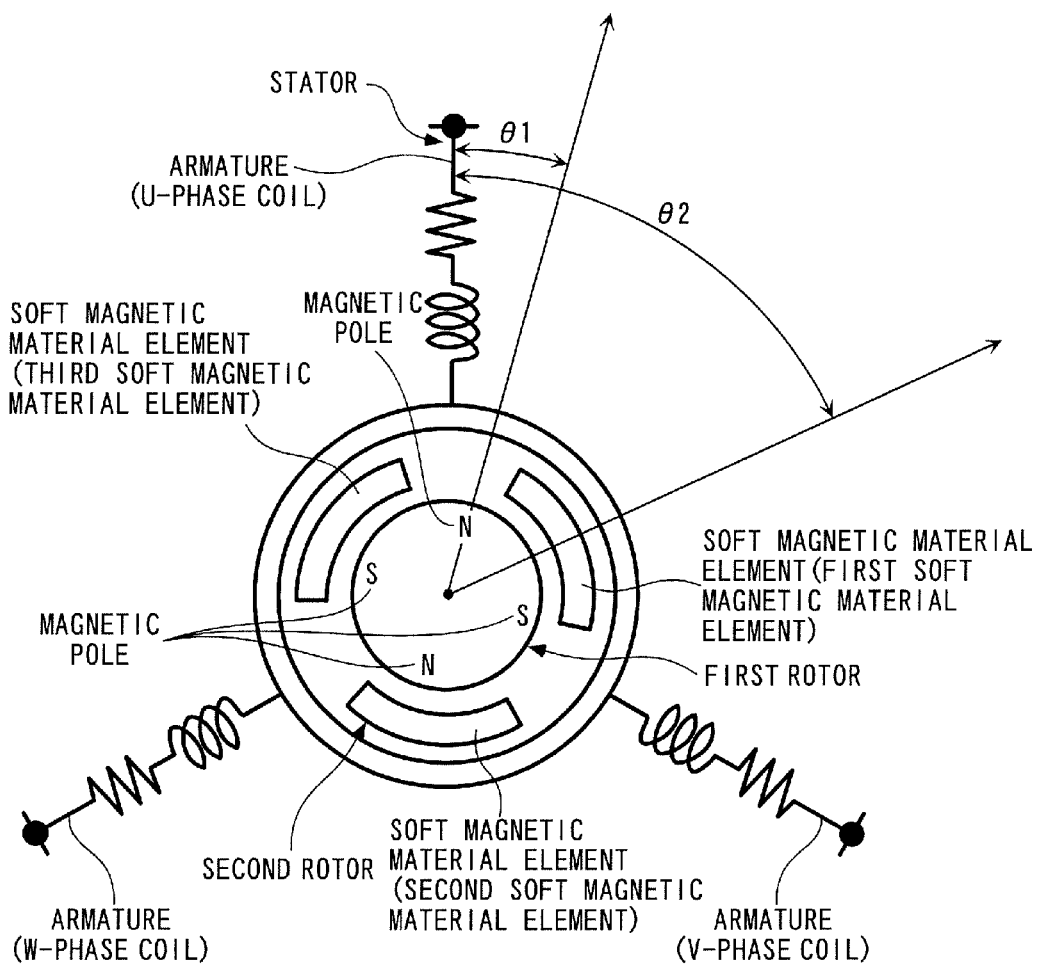
FIG. 64 A diagram of an equivalent circuit of the rotating machine according to the present invention.

It should be noted that although in the above-described eighth to fourteenth embodiments, the pole pair number ratio $\alpha$ is set to 2.0, if the pole pair number ratio $\alpha$ is set to less than 1.0, it is possible to obtain the following advantageous effects: FIG. 63 shows the relationship between the magnetic field rotational speed VMF and the first and second rotor rotational speeds VR1 and VR2 in a case where the pole pair number ratio $\alpha$ is set to the first predetermined value X smaller than 1.0 (solid line), together with the relationship between the rotational speeds in a case where the pole pair number ratio $\alpha$ is set to the second predetermined value Y larger than 1.0 (broken line). Further, in the figure, from the above-described connection relationship, it is regarded that the first rotor rotational speed VR1 is equal to the vehicle speed VP, and at the same time the second rotor rotational speed VR2 is equal to the engine speed NE.

For example, at the time of rapid acceleration during low-speed traveling of the vehicle, as shown in FIG. 63, when the engine speed NE is equal to the predetermined highest rotational speed NEH, and at the same time the vehicle speed VP is equal to a relatively low predetermined speed VPL, the first rotor rotational speed VR1 is relatively low, and at the same time the second rotor rotational speed VR2 is relatively high, whereby the magnetic field rotational speed VMF exceeds the relatively high second rotor rotational speed VR2, and becomes very high. In contrast, when the pole pair number ratio $\alpha$ is set to the first predetermined value X, the magnetic field rotational speed VMF can be lowered by $\Delta$V2 than when the pole pair number ratio $\alpha$ is set to the second predetermined value Y, whereby it is possible to prevent the driving efficiency and the electric power-generating efficiency from being reduced by occurrence of loss due to an excessive increase in the magnetic field rotational speed VMF.

Further, although in the eighth to fourteenth embodiments, the second rotor 35 is connected to the drive wheels DW and DW, but the second rotor 35 is not necessarily required to be connected to the drive wheels DW and DW insofar as it is connected to the crankshaft 3*a*. For example, the crankshaft 3*a* may be connected to two rotating shafts using gears or the like such that one of the rotating shafts is connected to the second rotor 35, and the other rotating shaft is connected to the drive wheels DW and DW via the first main shaft 4. In this case, in the fourteenth embodiment, the crankshaft 3*a* can be connected to the drive wheels DW and DW without using the transmission 80, and hence similarly to the twelfth embodiment, it is possible to prevent power transmission loss in the transmission to thereby attain high driving efficiency.

It should be noted that the present invention is by no means limited to the embodiments described above, but can be practiced in various forms. For example, although in the above-described embodiments, there are used four armature magnetic poles, eight magnet magnetic poles, and six cores 35*a*, that is, the ratio between the number of armature magnetic poles, the number of magnetic poles, and the number of soft magnetic material elements in the invention is 1:2:1.5, by way of example, this is not limitative, but desired numbers can be employed as the number of the armature magnetic poles, the number of the magnet magnetic poles, and the number of the cores 35*a*, respectively, insofar as the ratio therebetween satisfies 1:m:(1+m)/2 (m$\neq$1.0). Further, although in the above-described embodiments, the cores 35*a* are formed by steel plates, they may be formed by other soft magnetic materials. Further, in the above-described embodiments, the stator 33 and the first rotor 34 are arranged at an outer location and an inner location in the radial direction, respectively, this is not limitative, but inversely, they may be arranged at an inner location and an outer location in the radial direction, respectively. Further, although in the embodiments, the rotating machine 31 is constructed as a so-called radial type by arranging the stator 33 and the first and second rotors 34 and 35 in the radial direction, the rotating machine 31 may be constructed as a so-called axial type by arranging the stator 33 and the first and second rotors 34 and 35 in the axial direction.

Further, although in the above-described embodiments, one magnetic pole is formed by the magnetic pole of a single permanent magnet 34*a*, it may be formed by the magnetic poles of a plurality of permanent magnets. For example, if one magnetic pole is formed by arranging two permanent magnets in an inverted-V shape such that the magnetic poles thereof become closer to each other toward the stator 33, it is possible to improve the directivity of the aforementioned magnetic force line ML. Further, electromagnets or armatures that can generate a moving magnetic field may be used in place of the permanent magnets 34*a* used in the above-described embodiments. Further, although in the above-described embodiments, the U-phase to W-phase coils 33*c* to 33*e* are wound in the slots 33*b* by distributed winding, this is not limitative, but they may be wound by concentrated winding. Further, although in the above-described embodiments, the coils 33*c* to 33*e* are formed by three-phase coils of U-phase to W-phase, the number of phases can be set as desired insofar as the coils can generate a rotating magnetic field. Further, it is to be understood that a desired number of slots, other than that used in the above-described embodiments may be employed as the number of the slots 33*b*. Further, although in the above-described embodiments, the slots 33*b*, the permanent magnets 34*a*, and the cores 35*a* are arranged at equally-spaced intervals, they may be arranged at unequally-spaced intervals.

Further, although in the above-described embodiments, the stepless transmission 20 is used as the first transmission according to the present invention, it is to be understood that a step-type transmission may be used. Further, although in the above-described embodiments, the belt-type stepless transmission is used as the stepless transmission 20, a toroidal-type or a hydraulic-type stepless transmission may be employed. Furthermore, although in the above-described embodiments, the transmission 70 is formed by the belt-type stepless transmission, the transmission 70 may be formed by a toroidal-type or a hydraulic-type stepless transmission or a step-type transmission. Further, although in the above-described embodiments, the transmission 80 has two speed positions, by way of example, this is not limitative, but it is to be understood that the transmission 80 may have any other suitable number of speed positions. This also applies to the transmission ratios of the speed positions. Furthermore, it is to be understood that a belt-type, a toroidal-type, or a hydraulic-type stepless transmission may be used as the transmission 80.

Further, although in the above-described embodiments, the friction multi-disc clutch or the dog tooth clutch is used as the clutch CL3, an electromagnetic clutch may be employed. Furthermore, in place of the electromagnetic brake CL2 in the embodiments, it is possible to use a rotor lock mechanism formed e.g. by a hand brake or a wet multi-disc clutch, which holds the second or first rotor 35 or 34 unrotatable. Further, in place of the one-way clutch CL1 and the casing CA in the embodiments, it is possible to use a brake mechanism formed e.g. by a hand brake or a wet multi-disc clutch, which prevents the reverse rotation of the crankshaft 3a.

Further, in place of the one-way clutch CL1 and the casing CA in the embodiments, a lock mechanism formed e.g. by an electromagnetic brake or a hand brake may be used for holding the first or second rotor 34 or 35 unrotatable. In this case, as in the first embodiment, when the first rotor 34 is held unrotatable, it is possible to cause the reverse rotations of the drive wheels DW and DW to cause the reverse travel of the vehicle, by causing the magnetic field to perform reverse rotation at the time of the above-described EV standing start. Further, as in the eighth embodiment and the like, when the second rotor 35 is held unrotatable, it is possible to cause the reverse rotations of the drive wheels DW and DW to cause the reverse travel of the vehicle, by causing the rotating magnetic field to perform normal rotation at the time of the above-described EV standing start.

Further, although in the above-described embodiments, the combination of the planetary gear unit PS and the clutch CL4 is used as the normal/reverse rotation-switching mechanism 60, it is to be understood that any other suitable type of normal/reverse rotation-switching mechanism may be used insofar as it is capable of selectively switching the direction of rotation of the drive wheels DW and DW to one of the direction of the normal rotation and the direction of the reverse rotation. Furthermore, although in the embodiments, the sun gear S and the ring gear R of the normal/reverse rotation-switching mechanism 60 are connected to the second main shaft 6 and the third main shaft 6c, respectively, the connection relationship may be reversed. That is, the sun gear S and the ring gear R may be connected to the third main shaft 6c and the second main shaft 6, respectively. Further, although in the above-described embodiments, the clutch CL4 is formed by the electromagnetic clutch, the clutch CL4 may be formed by a friction multi-disc clutch. Furthermore, in place of the electromagnetic brake CL5 in the embodiments, it is possible to use a carrier lock mechanism formed e.g. by a hand brake or a wet multi-disc clutch, which holds the carrier C unrotatable. Further, it is to be understood that the normal/reverse rotation-switching mechanism 60 may be omitted, as required. In this case, the electromagnetic brake CL2 is used as the rotor lock mechanism for holding the other rotor in the present invention unrotatable.

Furthermore, although in the above-described embodiments, the control system for controlling the component elements, such as the engine 3 and the rotating machine 31, is formed by the ECU 2 and the PDU 40, the control system may be formed by a combination of a microcomputer and electric circuits. Further, although in the above-described embodiments, the engine 3 as a heat engine in the present invention is a gasoline engine, the engine 3 may be a diesel engine or an external combustion engine. Furthermore, although in the above-described embodiments, the present invention is applied to a vehicle, by way of example, this is not limitative, but for example, it can be applied to a boat and an aircraft. It is to be further understood that various changes and modifications may be made without departing from the spirit and scope thereof.

The power plant according to the present invention is very useful in enhancing the driving efficiency and the power-generating efficiency thereof.

We claim:
1. A power plant for driving driven parts, including:
a heat engine having an output shaft for outputting power,
a first transmission connected to said output shaft of said heat engine and the driven parts, for changing speed of power from said heat engine and transmitting the power to the driven parts, and
a rotating machine,
wherein said rotating machine comprises:
a first rotor having a magnetic pole row that is formed by a predetermined plurality of magnetic poles arranged in a circumferential direction, and has each two adjacent magnetic poles so disposed as to have polarities different from each other, said first rotor being rotatable in the circumferential direction;
an unmovable stator having an armature row that is formed by a plurality of armatures arranged in the circumferential direction, and is disposed in a manner opposed to said magnetic pole row, for generating a rotating magnetic field rotating in the circumferential direction between said armature row and said magnetic pole row, by a predetermined plurality of armature magnetic poles generated at said plurality of armatures; and
a second rotor having a soft magnetic material element row that is formed by a predetermined plurality of soft magnetic material elements arranged in the circumferential direction in a manner spaced from each other, and is disposed such that said soft magnetic material element row is positioned between said magnetic pole row and said armature row, said second rotor being rotatable in the circumferential direction,
wherein a ratio between a number of the armature magnetic poles, a number of the magnetic poles, and a number of said soft magnetic material elements is set to $1:m:(1+m)/2$ $(m \neq 1.0)$, one of said first and second rotors being connected to said output shaft of said heat engine, the other of said first and second rotors being connected to the driven parts.

2. A power plant as claimed in claim 1, wherein said first transmission is formed by a stepless transmission that is capable of steplessly changing a transmission ratio.

3. A power plant as claimed in claim 1, further comprising a second transmission for changing speed of power from the other of said first and second rotors and transmitting the power to the driven parts.

4. A power plant as claimed in claim 1, further comprising a third transmission for changing the speed of the power from said heat engine and transmitting the power to the one of said first and second rotors.

5. A power plant as claimed in claim 1, further comprising a first clutch for connecting and disconnecting between said output shaft of said heat engine and the driven parts.

6. A power plant as claimed in claim 5, further comprising a brake mechanism for limiting or blocking reverse rotation of said output shaft of said heat engine.

7. A power plant as claimed in claim 5, further comprising a rotor lock mechanism for holding the other of said first and second rotors unrotatable.

8. A power plant as claimed in claim 5, further comprising a normal/reverse rotation-switching mechanism for selectively switching a direction of rotation of the driven parts rotated by power transmitted from the other of said first and second rotors to one of a direction of normal rotation and a direction of reverse rotation.

9. A power plant as claimed in claim 8, wherein the other of said first and second rotors is connected to the driven parts via said normal/reverse rotation-switching mechanism, and
wherein said normal/reverse rotation-switching mechanism comprises:
a planetary gear unit including a sun gear, a ring gear, and a carrier for rotatably supporting planetary gears in mesh with said sun gear and said ring gear, one of said sun gear and said ring gear being connected to the other of said first and second rotors, and the other of said sun gear and said ring gear being connected to the driven parts;
a second clutch for connecting and disconnecting between the one of said sun gear and said ring gear and said carrier; and
a carrier lock mechanism for holding said carrier unrotatable.

10. A power plant as claimed in claim 1, wherein said first rotor is connected to said output shaft of said heat engine, and said second rotor is connected to the driven parts.

11. A power plant for driving driven parts, including:
a heat engine having an output shaft for outputting power, said output shaft being connected to the driven parts without using a transmission,
a first clutch for connecting and disconnecting between said output shaft of said heat engine and the driven parts, and
a rotating machine,
wherein said rotating machine comprises:
a first rotor having a magnetic pole row that is formed by a predetermined plurality of magnetic poles arranged in a circumferential direction, and has each two adjacent magnetic poles so disposed as to have polarities different from each other, said first rotor being rotatable in the circumferential direction;
an unmovable stator having an armature row that is formed by a plurality of armatures arranged in the circumferential direction, and is disposed in a manner opposed to said magnetic pole row, for generating a rotating magnetic field rotating in the circumferential direction between said armature row and said magnetic pole row, by a predetermined plurality of armature magnetic poles generated at said plurality of armatures; and
a second rotor having a soft magnetic material element row that is formed by a predetermined plurality of soft magnetic material elements arranged in the circumferential direction in a manner spaced from each other, and is disposed such that said soft magnetic material element row is positioned between said magnetic pole row and said armature row, said second rotor being rotatable in the circumferential direction,
wherein a ratio between a number of the armature magnetic poles, a number of the magnetic poles, and a number of said soft magnetic material elements is set to 1:m:(1+m)/2 (m≠1.0), one of said first and second rotors being connected to said output shaft of said heat engine, the other of said first and second rotors being connected to the driven parts.

12. A power plant as claimed in claim 11, further comprising a transmission for changing speed of power from the other of said first and second rotors and transmitting the power to the driven parts.

13. A power plant as claimed in claim 11, further comprising a brake mechanism for limiting or blocking reverse rotation of said output shaft of said heat engine.

14. A power plant as claimed in claim 11, further comprising a rotor lock mechanism for holding the other of said first and second rotors unrotatable.

15. A power plant as claimed in claim 11, further comprising a normal/reverse rotation-switching mechanism for selectively switching a direction of rotation of the driven parts rotated by power transmitted from the other of said first and second rotors to one of a direction of normal rotation and a direction of reverse rotation.

16. A power plant as claimed in claim 15, wherein the other of said first and second rotors is connected to the driven parts via said normal/reverse rotation-switching mechanism, and
wherein said normal/reverse rotation-switching mechanism comprises:
a planetary gear unit including a sun gear, a ring gear, and a carrier for rotatably supporting planetary gears in mesh with said sun gear and said ring gear, one of said sun gear and said ring gear being connected to the other of said first and second rotors, and the other of said sun gear and said ring gear being connected to the driven parts;
a second clutch for connecting and disconnecting between the one of said sun gear and said ring gear and said carrier; and
a carrier lock mechanism for holding said carrier unrotatable.

17. A power plant as claimed in claim 11, wherein said first rotor is connected to said output shaft of said heat engine, and said second rotor is connected to the driven parts.

18. A power plant for driving driven parts, including:
a heat engine having an output shaft for outputting power, said output shaft being connected to the driven parts,
a first clutch for connecting and disconnecting between said output shaft of said heat engine and the driven parts, and
a rotating machine,
wherein said rotating machine comprises:
a first rotor having a magnetic pole row that is formed by a predetermined plurality of magnetic poles arranged in a circumferential direction, and has each two adjacent magnetic poles so disposed as to have polarities different from each other, said first rotor being rotatable in the circumferential direction;
an unmovable stator having an armature row that is formed by a plurality of armatures arranged in the circumferential direction, and is disposed in a manner opposed to said magnetic pole row, for generating a rotating magnetic field rotating in the circumferential direction between said armature row and said magnetic pole row, by a predetermined plurality of armature magnetic poles generated at said plurality of armatures; and
a second rotor having a soft magnetic material element row that is formed by a predetermined plurality of soft magnetic material elements arranged in the circumferential direction in a manner spaced from each other, and is disposed such that said soft magnetic material element row is positioned between said magnetic pole row and said armature row, said second rotor being rotatable in the circumferential direction,
wherein a ratio between a number of the armature magnetic poles, a number of the magnetic poles, and a number of said soft magnetic material elements is set to 1:m:(1+m)/2 (m 1.0), one of said first and second rotors being connected to said output shaft of said heat engine, the other of said first and second rotors being connected to the driven parts, the power plant further comprising a transmission for changing speed of power from said heat engine and transmitting the power to the one of said first and second rotors.

19. A power plant as claimed in claim 18, further comprising a brake mechanism for limiting or blocking reverse rotation of said output shaft of said heat engine.

20. A power plant as claimed in claim 18, further comprising a rotor lock mechanism for holding the other of said first and second rotors unrotatable.

21. A power plant as claimed in claim 18, further comprising a normal/reverse rotation-switching mechanism for selectively switching a direction of rotation of the driven parts rotated by power transmitted from the other of said first and second rotors to one of a direction of normal rotation and a direction of reverse rotation.

22. A power plant as claimed in claim 21, wherein the other of said first and second rotors is connected to the driven parts via said normal/reverse rotation-switching mechanism, and
    wherein said normal/reverse rotation-switching mechanism comprises:
    a planetary gear unit including a sun gear, a ring gear, and a carrier for rotatably supporting planetary gears in mesh with said sun gear and said ring gear, one of said sun gear and said ring gear being connected to the other of said first and second rotors, and the other of said sun gear and said ring gear being connected to the driven parts;
    a second clutch for connecting and disconnecting between the one of said sun gear and said ring gear and said carrier; and
    a carrier lock mechanism for holding said carrier unrotatable.

23. A power plant as claimed in claim 18, wherein said first rotor is connected to said output shaft of said heat engine, and said second rotor is connected to the driven parts.

* * * * *